United States Patent

Numazaki et al.

[11] Patent Number: 6,144,366
[45] Date of Patent: Nov. 7, 2000

[54] METHOD AND APPARATUS FOR GENERATING INFORMATION INPUT USING REFLECTED LIGHT IMAGE OF TARGET OBJECT

[75] Inventors: Shunichi Numazaki; Miwako Doi, both of Kanagawa; Akira Morishita, Tokyo; Naoko Umeki; Hiroki Miura, both of Kanagawa, all of Japan

[73] Assignee: Kabushiki Kaisha Toshiba, Kawasaki, Japan

[21] Appl. No.: 08/953,667

[22] Filed: Oct. 17, 1997

[30] Foreign Application Priority Data

| Oct. 18, 1996 | [JP] | Japan | 8-275949 |
| Jan. 31, 1997 | [JP] | Japan | 9-019397 |
| Feb. 12, 1997 | [JP] | Japan | 9-027752 |

[51] Int. Cl.[7] .................................................. G09G 5/08
[52] U.S. Cl. ........................ 345/156; 345/157; 345/158
[58] Field of Search ................................ 345/158, 157, 345/156, 419, 425; 463/31, 32, 33, 36, 37; 250/200, 206.1, 208.1, 214 R

[56] References Cited

U.S. PATENT DOCUMENTS

| 4,320,292 | 3/1982 | Oikawa et al. | 250/227 |
| 4,516,020 | 5/1985 | Simpson et al. | 250/214 L |
| 4,839,685 | 6/1989 | Ishiguro et al. | 354/403 |
| 4,841,349 | 6/1989 | Nakano | 357/30 |
| 4,956,794 | 9/1990 | Zeevi et al. | 364/559 |
| 5,243,182 | 9/1993 | Murata et al. | 250/222.1 |
| 5,297,061 | 3/1994 | Dementhon et al. | 364/559 |
| 5,323,174 | 6/1994 | Klapman et al. | 345/156 |
| 5,353,042 | 10/1994 | Klapman et al. | 345/156 |
| 5,423,554 | 6/1995 | Davis | 273/437 |
| 5,481,622 | 1/1996 | Gerhardt et al. | 382/103 |
| 5,627,565 | 5/1997 | Morishita | 345/158 |
| 5,686,942 | 11/1997 | Ball | 345/158 |
| 5,703,356 | 12/1997 | Bidiville et al. | 250/221 |
| 5,729,475 | 3/1998 | Romanik, Jr. | 364/559 |
| 5,801,704 | 9/1998 | Oohara et al. | 345/358 |
| 5,819,206 | 10/1998 | Horton et al. | 702/150 |
| 5,900,863 | 5/1999 | Numazaki | 345/158 |

*Primary Examiner*—William A. Cuchlinski, Jr.
*Assistant Examiner*—Marthe Y. Marc-Coleman
*Attorney, Agent, or Firm*—Oblon, Spivak, McClelland, Maier & Neustadt, P.C.

[57] ABSTRACT

A method and an apparatus for generating information input which are capable of realizing a direct command type information input scheme by which the gesture or the motion can be inputted easily. The apparatus has a timing signal generation unit for generating a timing signal; a lighting unit for emitting a light whose intensity vary in time, according to the timing signal generated by the timing signal generation unit; and a reflected light extraction unit having a sensor array for detecting a reflected light from a target object resulting from the light emitted by the lighting unit, in synchronization with the timing signal generated by the timing signal generation unit, so as to obtain a spatial intensity distribution of the reflected light in a form of a reflected light image indicative of an information input related to the target object, in separation from an external light that is illuminating the target object.

96 Claims, 101 Drawing Sheets

FIG.12
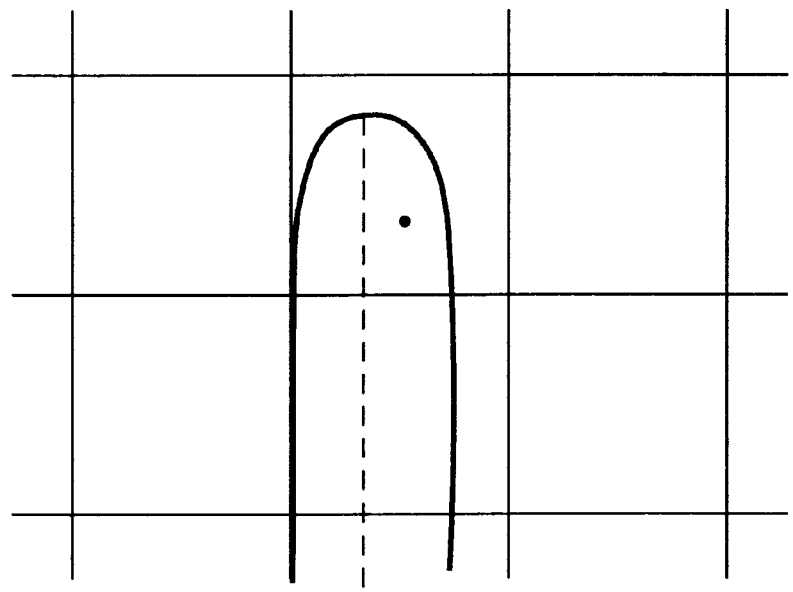
CALCULATED
X-COORDINATE OF
CENTER OF GRAVITY
DOES NOT CHANGE
FINGER TIP
MOVEMENT
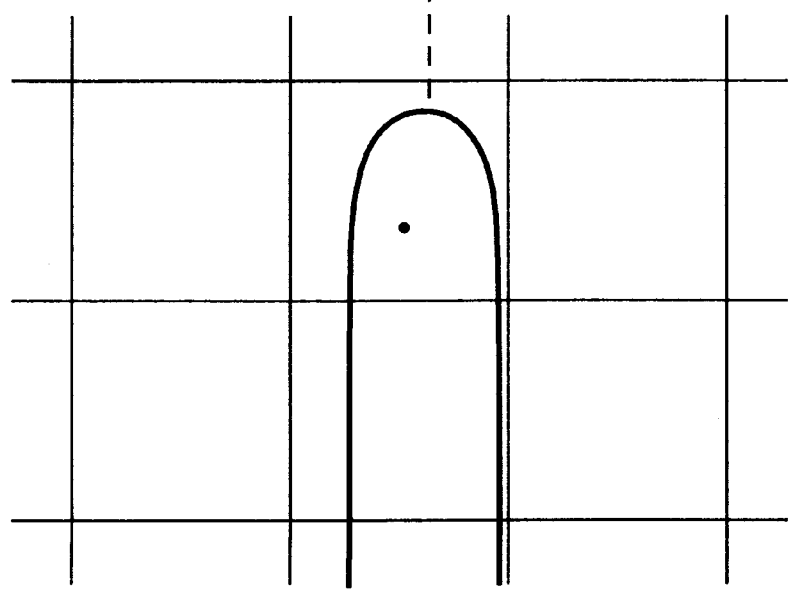

FIG.15

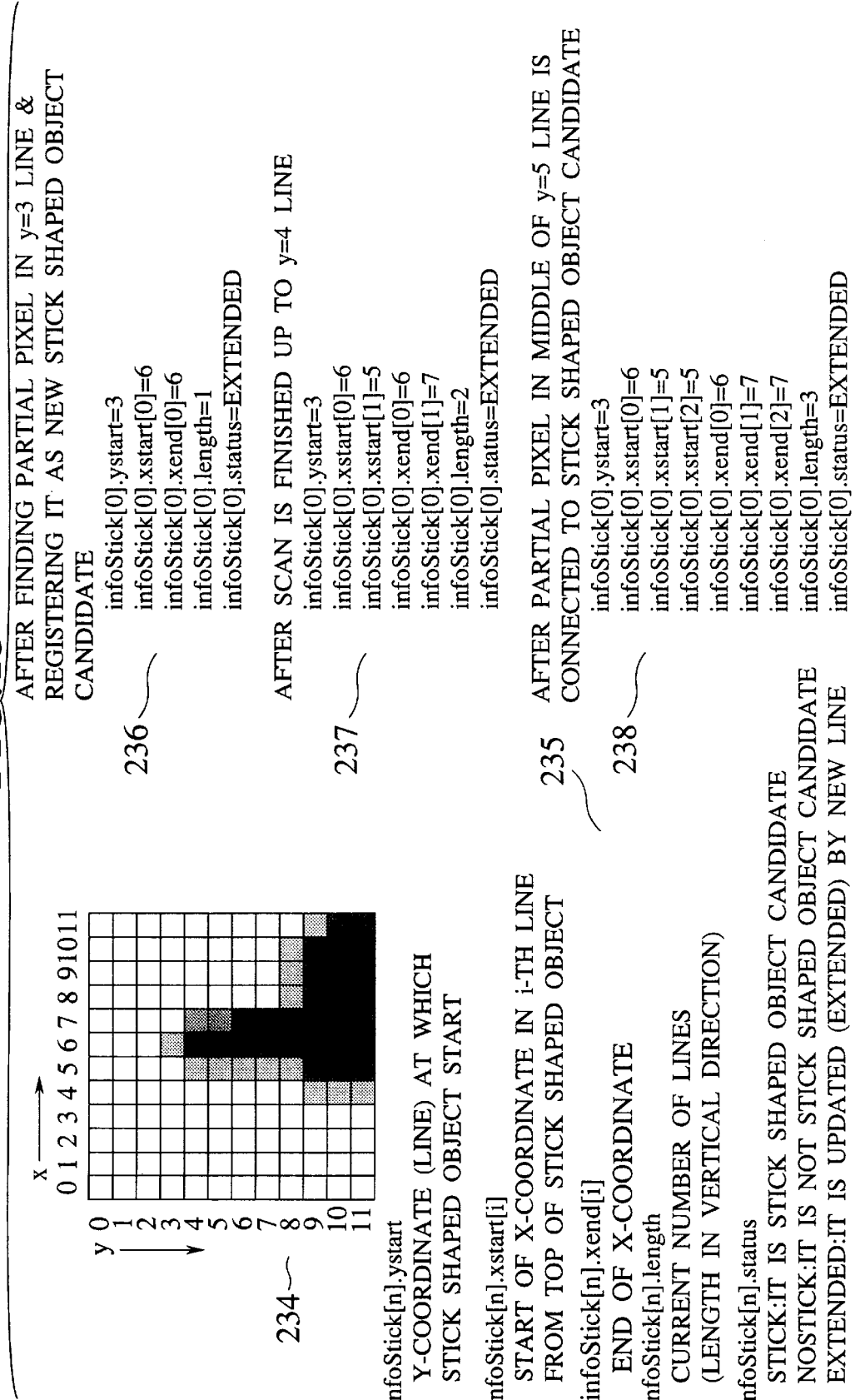

AFTER FINDING PARTIAL PIXEL IN y=3 LINE &
REGISTERING IT AS NEW STICK SHAPED OBJECT
CANDIDATE

236 —
infoStick[0].ystart=3
infoStick[0].xstart[0]=6
infoStick[0].xend[0]=6
infoStick[0].length=1
infoStick[0].status=EXTENDED AFTER SCAN IS FINISHED UP TO y=4 LINE 237 —
infoStick[0].ystart=3
infoStick[0].xstart[0]=6
infoStick[0].xstart[1]=5
infoStick[0].xend[0]=6
infoStick[0].xend[1]=7
infoStick[0].length=2
infoStick[0].status=EXTENDED

235

AFTER PARTIAL PIXEL IN MIDDLE OF y=5 LINE IS
CONNECTED TO STICK SHAPED OBJECT CANDIDATE

238 —
infoStick[0].ystart=3
infoStick[0].xstart[0]=6
infoStick[0].xstart[1]=5
infoStick[0].xstart[2]=5
infoStick[0].xend[0]=6
infoStick[0].xend[1]=7
infoStick[0].xend[2]=7
infoStick[0].length=3
infoStick[0].status=EXTENDED

234 — infoStick[n].ystart
  Y-COORDINATE (LINE) AT WHICH
  STICK SHAPED OBJECT START
infoStick[n].xstart[i]
  START OF X-COORDINATE IN i-TH LINE
  FROM TOP OF STICK SHAPED OBJECT
infoStick[n].xend[i]
  END OF X-COORDINATE
infoStick[n].length
  CURRENT NUMBER OF LINES
  (LENGTH IN VERTICAL DIRECTION)
infoStick[n].status
  STICK:IT IS STICK SHAPED OBJECT CANDIDATE
  NOSTICK:IT IS NOT STICK SHAPED OBJECT CANDIDATE
  EXTENDED:IT IS UPDATED (EXTENDED) BY NEW LINE

FIG.16

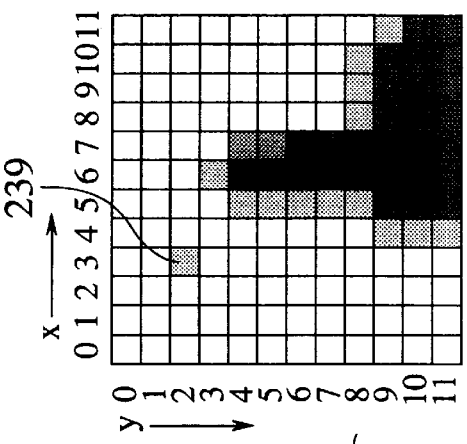

AFTER SCAN OF y=2 LINE IS FINISHED
infoStick[0].ystart=2
infoStick[0].xstart[0]=3
infoStick[0].xend[0]=3
infoStick[0].length=1
infoStick[0].status=EXTENDED AFTER SCAN OF y=3 LINE IS FINISHED
infoStick[0].ystart=2
infoStick[0].xstart[0]=3
infoStick[0].xend[0]=3
infoStick[0].length=1
infoStick[0].status=NOSTICK infoStick[1].ystart=3
infoStick[1].xstart[0]=6
infoStick[1].xend[0]=6
infoStick[1].length=1
infoStick[1].status=EXTENDED

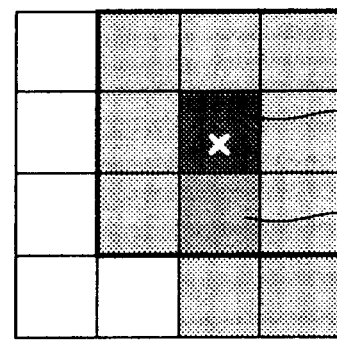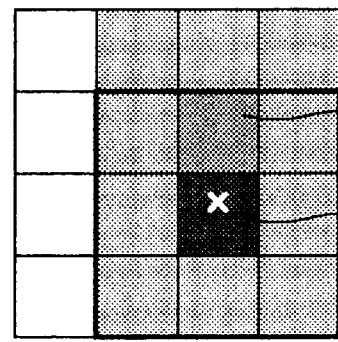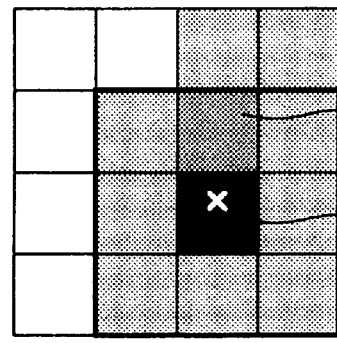
FIG.20

FIG.26

SHAPE INTERPRETATION RULES FOR POINTING

RULE -1:ONE RECTANGLE→POINTING
RULE -2:TWO RECTANGLES→TWO FINGER OPERATION
RULE -3:OTHERS→MOTION INPUT
⋮
⋮

POINTING RULE
 VERTICAL & HORIZONTAL CHECK
  VERTICAL/HORIZONTAL≈1→OBJECT SELECT/MOVE FORWARD
  VERTICAL/HORIZONTAL<1→SLOPE CHECK-1
  VERTICAL/HORIZONTAL>1→SLOPE CHECK-2
 SLOPE CHECK-1
  SLOPE≈0 & CENTER OF GRAVITY RIGHT→ROTATION TO RIGHT
  SLOPE≈0 & CENTER OF GRAVITY LEFT→ROTATION TO LEFT
   ⋮
   ⋮
 SLOPE CHECK-2
  SLOPE≈0 & CENTER OF GRAVITY UPPER→TURNING UPWARD
  SLOPE≈0 & CENTER OF GRAVITY LOWER
                                   →TURNING DOWNWARD
   ⋮
   ⋮

FIG.29

SHAPE INTERPRETATION RULES FOR POWER ON/OFF

RULE -1: ONE RECTANGLE → POINTING
RULE -2: TWO RECTANGLES → TWO FINGERS
RULE -3: FIVE RECTANGLES → FIVE FINGERS
⋮

POINTING RULE
   AREA CHECK
     AREA >> $\alpha$ → FIST
     AREA ≦ $\alpha$ → NULL
⋮

COMMAND GENERATION
  FIVE FINGERS, FIST, TWO FINGERS → POWER OFF
  TWO FINGERS, FIST, FIVE FINGERS → POWER ON

FIG.31
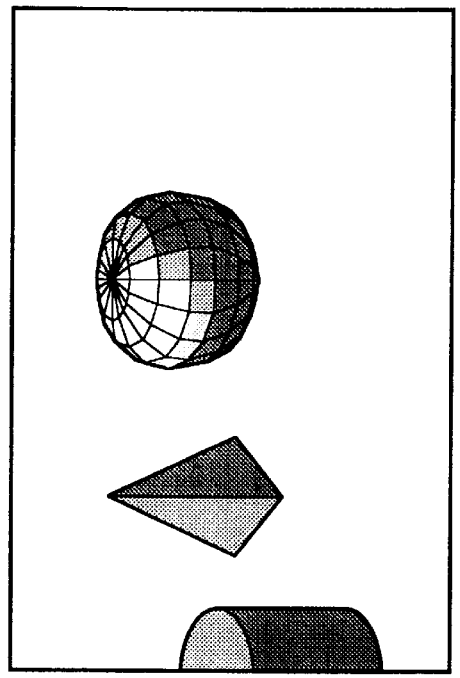
a) VIEWPOINT-1
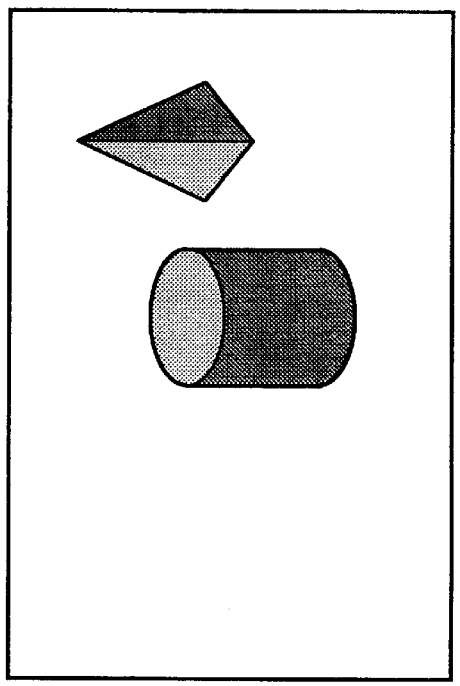
b) VIEWPOINT-2
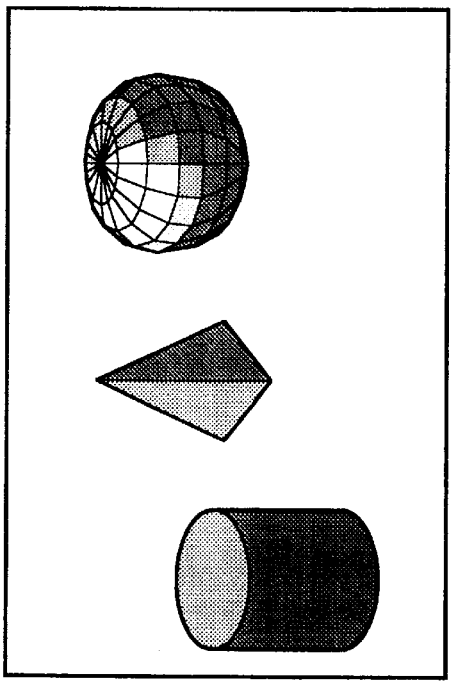
c) VIEWPOINT-3

FIG.33

SHAPE INTERPRETATION RULES FOR
MOVING OBJECT PARALLAX

---

RULE-1: TWO RECTANGLES→FACE CHECK
RULE-2: OTHERS→NULL

FACE CHECK
  DISTANCE TO LARGER RECTANGLE>DISTANCE TO SMALLER
    RECTANGLE→VIEWPOINT CHECK
  OTHERS→NULL
VIEWPOINT CHECK
  $L \neq 0$→VIEWPOINT DIRECTION=arcsin((L-R)/L)
  $L = 0$→VIEWPOINT DIRECTION=-90°

$v=[(X_n,Y_n)-(X_{n-1},Y_{n-1})]/M \cdot 30$

SWINGING RANGE $(X_n-X_{n-1})/M \cdot 30$

SPEED $(Y_n-Y_{n-1})/M \cdot 30$

FIG.42
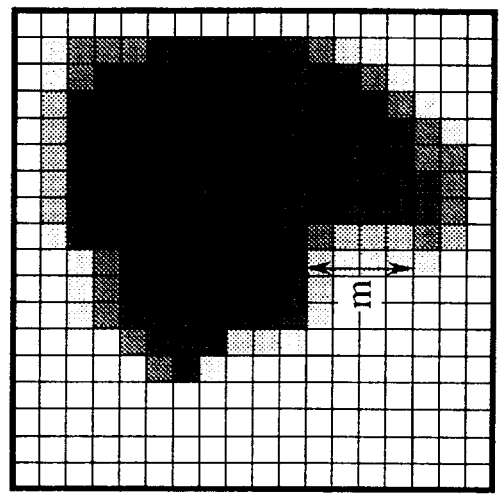
c)
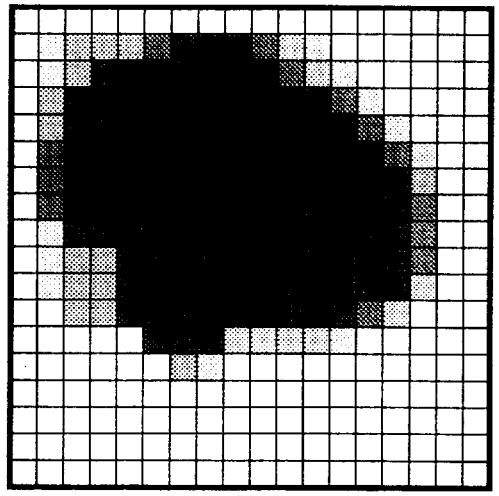
b)
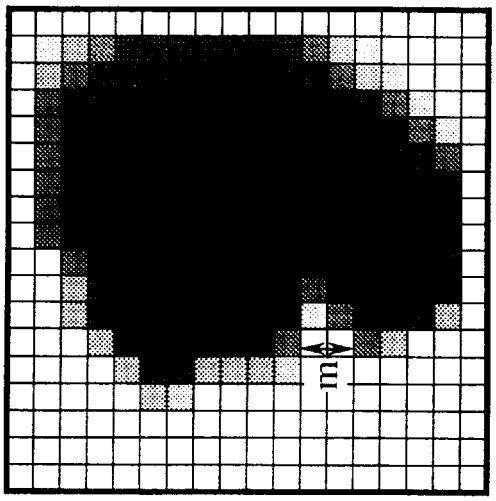
a)

FIG.48
ORIGINAL IMAGE
MASK
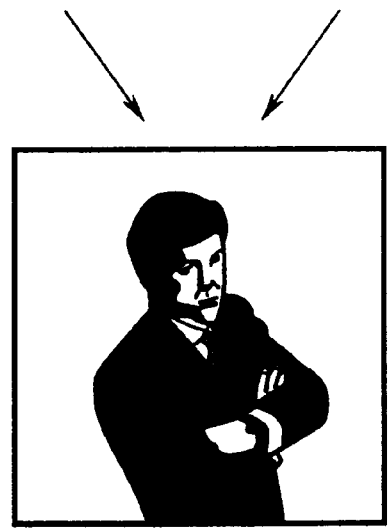
EXTRACTED IMAGE

FIG.51
BACKGROUND IMAGE     EXTRACTED IMAGE
 
COMPOSED IMAGE

FIG.64

| INPUT \ COORDINATE | 0 | 1 | 2 | | 4094 | 4095 |
|---|---|---|---|---|---|---|
| 0 | 255 | 255 | 255 | | 255 | 255 |
| 1 | 255 | 255 | 255 | | 255 | 255 |
| 2 | 255 | 255 | 255 | | 255 | 255 |
| 3 | 255 | 255 | 255 | | 255 | 255 |
| 4 | 255 | 255 | 255 | | 255 | 255 |
| 5 | 255 | 255 | 255 | | 255 | 255 |
| 6 | 255 | 255 | 255 | | 255 | 255 |
| 7 | 255 | 255 | 255 | | 255 | 255 |
| 8 | 255 | 255 | 255 | | 255 | 255 |
| 99 | 39 | 37 | 40 | | 38 | 39 |
| 100 | 38 | 36 | 39 | | 37 | 38 |
| 101 | 38 | 36 | 39 | | 37 | 38 |
| 102 | 37 | 35 | 38 | | 36 | 37 |
| 103 | 37 | 35 | 38 | | 36 | 37 |
| 104 | 36 | 34 | 37 | | 35 | 36 |
| 105 | 36 | 34 | 37 | | 35 | 36 |
| 106 | 35 | 33 | 36 | | 34 | 35 |
| 107 | 35 | 33 | 36 | | 34 | 35 |
| 108 | 34 | 32 | 35 | | 34 | 34 |
| 109 | 34 | 32 | 35 | | 33 | 34 |
| 247 | 1 | 0 | 2 | | 1 | 1 |
| 248 | 1 | 0 | 2 | | 1 | 1 |
| 249 | 1 | 0 | 2 | | 1 | 1 |
| 250 | 1 | 0 | 2 | | 1 | 1 |
| 251 | 1 | 0 | 2 | | 0 | 1 |
| 252 | 0 | 0 | 1 | | 0 | 0 |
| 253 | 0 | 0 | 1 | | 0 | 0 |
| 254 | 0 | 0 | 1 | | 0 | 0 |
| 255 | 0 | 0 | 1 | | 0 | 0 |

FIG.66

| INPUT \ COORDINATE | 0 | 1 | 2 | | 4094 | 4095 |
|---|---|---|---|---|---|---|
| 0 | 255 | 255 | 255 | | 255 | 255 |
| 8 | 296 | 290 | 293 | | 298 | 296 |
| 16 | 191 | 187 | 188 | | 193 | 191 |
| 24 | 144 | 141 | 141 | | 146 | 144 |
| 32 | 116 | 114 | 113 | | 118 | 116 |
| 40 | 97 | 95 | 94 | | 99 | 97 |
| 48 | 83 | 82 | 80 | | 85 | 83 |
| 56 | 72 | 71 | 69 | | 74 | 72 |
| 64 | 64 | 62 | 61 | | 66 | 64 |
| 72 | 56 | 55 | 53 | | 58 | 56 |
| 80 | 50 | 49 | 47 | | 52 | 50 |
| 88 | 45 | 44 | 42 | | 47 | 45 |
| 96 | 40 | 39 | 37 | | 42 | 40 |
| 104 | 36 | 35 | 33 | | 38 | 36 |
| 112 | 32 | 32 | 29 | | 34 | 32 |
| 120 | 29 | 29 | 26 | | 31 | 29 |
| 128 | 26 | 26 | 23 | | 28 | 26 |
| 136 | 24 | 23 | 21 | | 26 | 24 |
| 144 | 21 | 21 | 18 | | 23 | 21 |
| 152 | 19 | 18 | 16 | | 21 | 19 |
| 160 | 17 | 16 | 14 | | 19 | 17 |
| 168 | 15 | 15 | 12 | | 17 | 15 |
| 176 | 13 | 13 | 10 | | 15 | 13 |
| 184 | 11 | 11 | 8 | | 13 | 11 |
| 192 | 10 | 10 | 7 | | 12 | 10 |
| 200 | 8 | 8 | 5 | | 10 | 8 |
| 208 | 7 | 7 | 4 | | 9 | 7 |
| 216 | 6 | 5 | 3 | | 8 | 6 |
| 224 | 4 | 4 | 1 | | 6 | 4 |
| 232 | 3 | 3 | 0 | | 5 | 3 |
| 240 | 2 | 2 | 0 | | 4 | 2 |
| 248 | 1 | 1 | 0 | | 3 | 1 |
| 255 | 0 | 0 | 0 | | 2 | 0 |

FIG.71

PLEASE PLACE THE REFERENCE
PLATE AT DISTANCE OF 20cm.

CORRECTION
DATA
PRODUCTION

CANCEL (a) EXTERNAL LIGHT LEVEL
(b) EXTERNAL LIGHT SIGNALS CONVERTED INTO PULSES
(c) LIGHTING PULSE
(d) STORING OPERATION

METHOD AND APPARATUS FOR GENERATING INFORMATION INPUT USING REFLECTED LIGHT IMAGE OF TARGET OBJECT

BACKGROUND OF THE INVENTION

1. Field of the Invention

The present invention relates to a method and an apparatus for generating information input in which input information is extracted by obtaining a reflected light image of a target object.

2. Description of the Background Art

There are various input devices for computers, and among them, a mouse is widely used as one of the most popular input devices along with a keyboard. However, the mouse can only carry out manipulations such as a moving of a cursor and a selection from a menu, so that the mouse is only capable of playing a role of a two-dimensional pointing device at best. In other words, the mouse can only handle two-dimensional information, and it is difficult to select a thing with a depth aspect such as an object in a three-dimensional space. Also, in a case of producing the animation by using a computer, for example, it is difficult to give a natural motion to a character by means of manipulation information input operations using the input device like mouse.

Also, in the multi-modal field, there is a demand for a scheme that enables to handle a device in a form close to a natural human communication by inputting manipulation information such as a gesture like a hand action or a body motion and a posture, as a complement to the input information given by the input means such as speech input, keyboard, mouse, track ball, etc.

For this reason, in recent years, the three-dimensional pointing device for enabling the recognition of natural human gestures has been developed as one technique for enabling a variety of input operations in the multi-modal field and others by compensating the difficulties associated with the pointing in the three-dimensional space.

For example, there is a proposition of a three-dimensional pointing device as shown in FIG. 105. This device has a ball shaped operation portion in a middle of its body, and ten keys arranged at a peripheral portion. This device has six degrees of freedom corresponding to six different ways for operating the ball shaped operation portion, that is, pushing a front part of it, pushing a central part of it, pushing a rear part of it, pulling it upward, rotating it to the right, and rotating it to the left.

By assigning appropriate roles to these six degrees of freedom, it is possible to control a position (x, y, z) and an orientation (x-axis, y-axis, z-axis) of a cursor in the three-dimensional space, or a position (x, y, z) and an orientation (x-axis, y-axis, z-axis) of a viewpoint with respect to the three-dimensional space.

However, this three-dimensional pointing device requires a considerable level of skills so that when this device is actually operated it is quite difficult to control a cursor or a viewpoint exactly as desired. For example, when one tries to rotate the ball to the left or right, a front part or a rear part of the ball can be pushed at the same time unintentionally, such that a cursor is moved or a viewpoint is shifted to a totally unexpected direction.

As oppose to such a three-dimensional pointing device, there are also input devices that use a hand action or a body motion, known by the names such as a data glove, a data suit, and a cyber-glove. Among them, the data glove is a glove shaped device which has optical fibers on its surface. These optical fibers are provided up to finger joints so as to utilize a change of a light conduction due to a bending of a finger. By measuring an amount of light conduction, it is made possible to determine how much each finger joint is bent. A position of a hand itself in the three-dimensional space is measured by a magnetic sensor provided on the back of the hand.

As a result, when a command corresponding to a specific hand action is determined in advance, such as a pointing by an index finger indicates a forward move, for example, it is possible to realize an operation (called a walk-through) using the data glove that simulates a motion of walking about while variously changing a viewpoint within the three-dimensional space.

However, such a three-dimensional pointing device is associated with the following problems.

First of all, it is very expensive and therefore not suitable for home use.

Secondly, the recognition error is inevitable as an angle of the finger joint is to be measured. For example, suppose that a state of extending only the index finger while the other fingers are turned in is defined as a forward move command. Here, even when the index finger is extended it is rather unlikely for an angle of the second joint of the index finger to become exactly 180°, so that unless a margin is provided, it would be impossible to recognize this state except when the finger is completely extended.

Thirdly, the operator is required to wear the data glove so that a natural movement can be obstructed, and also it is necessary to calibrate the light conduction state in a state of opening the hand and a state of closing the hand every time the data glove is worn, so that it is not very convenient to use. Moreover, because of the use of the optical fibers, a problem like a broken fiber occurs during the continuous use so that it is very much an article of consumption.

In addition, despite of the fact that it is a very expensive and not easily handlable device, unless the size of the glove perfectly fits, it is difficult to recognize sophisticated hand actions because the light conduction state tends to deviate from the calibrated state during the use.

Because of such numerous problems associated with it, the data glove has not become as popular as originally expected despite of the fact that it was a device that trigerred the VR (Virtual Reality) technology, and there is no significant reduction of its price so that there are many problems related to its convenience in use.

For this reason, there are some attempts which try to input a hand action or a body motion without requiring the operator to wear a special device such as the data glove. For example, there is a technique for recognizing a shape of the hand by analyzing dynamic images such as video images. However, to this end, there is a need to develop a technique for extracting a target image from the background image. Namely, in a case of recognizing a hand action, it is necessary to extract the hand alone, but this has turned out to be a technically rather difficult thing to do.

For example, consider a case of extracting a hand portion in an image according to the color information. Since the hand is in the flesh color, it is possible to contemplate a scheme for extracting only those pixel portions that have the flesh color as image information. However, it is impossible to distinguish pixels corresponding to the flesh color of the hand portion alone if beige clothes or walls are present in the background. Also, even if it is made possible to distinguish the beige and the flesh color by some adjustments, the color tone will be changed when the lighting is changed, so that it is still difficult to extract the hand portion stably.

In order to resolve these problems, there is a measure for imposing a limitation on the background image such as the placing of a blue mat on the background so as to make the extraction easy. There is also a measure to paint the finger tips with a color that can be easily extracted from the background, or wear a ring in such a color. However, these limitations are not realistic so that they are utilized for experiments but not for practical use.

On the other hand, as another available technique for recognizing the hand action, it is possible to utilize a device for inputting range images called range finder. Typically, the range finder is based on the principle that a spot light or a slit light is irradiated onto a target object and then a distance is determined by the principle of the triangular survey according to a position at which the reflected light is received. This spot light or slit light is mechanically scanned in order to obtain the two-dimensional distance information.

This range finder is capable of generating the range image in very high precision, but the device requires a very large scale configuration and a high cost. Also, the input is very time-consuming and it is difficult to carry out the real time processing.

There are also devices, some of which are already in practical use, for capturing a shape or a motion of the hand or the body by attaching color markers or light emitting elements to the hand or a part of the body, and detecting these color markers or light emitting elements by using the image.

However, the requirement for mounting some element at every occasion of its operation is a great demerit from a viewpoint of the convenience of the user, and can limit its application range significantly. Moreover, as can be seen in the example of the data glove, a device that requires to mount some element on the movable part such as hand tends to have a problem of the durability.

Now, setting aside the input devices as described above, the conventional art of the camera technique will be described.

In the conventional camera technique, in order to realize the chromakey, that is, a character composition with respect to the background, it has been necessary to take an image of the character with the blue back in advance so as to make it easier to extract the character. For this reason, the location for taking images has been limited to a place like studio where it is possible to take images with the blue back. Else, in order to extract the character from the video image taken without using the blue back, it has been necessary to manually edit the character extraction range scene by scene, which is very time-consuming.

Similarly, in a case of generating the character in the three-dimensional space, the conventional camera technique uses a scheme in which a three-dimensional model is produced in advance and then the texture mapping for attaching a picture of the character thereto is carried out. However, the three-dimensional model production and the texture mapping require considerable time and effort so that this scheme has been almost impractical except for some special case where the great expense is permitted such as the movie production.

As described, conventionally, there has been no input device of a direct command type by which the gesture or the motion can be inputted easily. In particular, there has been no device by which the pointing or the viewpoint change in the three-dimensional space can be carried out easily. Also, it has been impossible to give a natural motion to the animation character by using the gesture or the motion of a user directly. In addition, in the conventional camera technique, it has not been possible to extract a specific character alone or input the depth information on the character easily.

SUMMARY OF THE INVENTION

It is therefore an object of the present invention to provide to provide a method and an apparatus for generating information input which are capable of realizing a direct command type information input scheme by which the gesture or the motion can be inputted easily.

It is another object of the present invention to provide a method and an apparatus for generating information input which are capable of realizing an information input scheme by which the pointing or the viewpoint change in the three-dimensional space can be carried out easily.

It is another object of the present invention to provide a method and an apparatus for generating information input which are capable of realizing an information input scheme by which it is possible to give a natural motion to the animation character by using the gesture or the motion of a user directly.

It is another object of the present invention to provide a method and an apparatus for generating information input which are capable of realizing an information input scheme by which a specific character alone can be extracted and the depth information on the character can be inputted easily.

It is another object of the present invention to provide a method and an apparatus for generating information input which are capable of extracting a specific target object at high precision easily even under an environment incorporating the external light fluctuation.

It is another object of the present invention to provide a method and an apparatus for generating information input which are capable of extracting an image of a target object in an optimum state even when a distance with respect to the target object is changing.

According to one aspect of the present invention there is provided an information input generation apparatus, comprising: a timing signal generation unit for generating a timing signal; a lighting unit for emitting a light whose intensity vary in time, according to the timing signal generated by the timing signal generation unit; and a reflected light extraction unit having a sensor array for detecting a reflected light from a target object resulting from the light emitted by the lighting unit, in synchronization with the timing signal generated by the timing signal generation unit, so as to obtain a spatial intensity distribution of the reflected light in a form of a reflected light image indicative of an information input related to the target object, in separation from an external light that is illuminating the target object.

According to another aspect of the present invention there is provided a method of information input generation, comprising the steps of: (a) generating a timing signal; (b) emitting a light whose intensity vary in time at a lighting unit, according to the timing signal generated by the step (a); and (c) detecting a reflected light from a target object resulting from the light emitted by the step (b), in synchronization with the timing signal generated by the step (a), so as to obtain a spatial intensity distribution of the reflected light in a form of a reflected light image indicative of an information input related to the target object, in separation from an external light that is illuminating the target object, at a reflected light extraction unit.

Other features and advantages of the present invention will become apparent from the following description taken in conjunction with the accompanying drawings.

BRIEF DESCRIPTION OF THE DRAWINGS

FIG. 12 is another diagram for explaining the operation of the feature data generation unit of FIG. 9.

FIG. 15 is a diagram for explaining the operation of the feature data generation unit of FIG. 9 according to the flow charts of FIG. 13.

FIG. 16 is another diagram for explaining the operation of the feature data generation unit of FIG. 9 according to the flow charts of FIG. 13.

FIG. 20 is another diagram for explaining additional aspect of the operation carried out by the feature data generation unit of FIG. 9.

FIG. 26 is a diagram showing an exemplary shape interpretation rule used in the feature data generation unit of FIG. 23.

FIG. 29 is a diagram showing another exemplary shape interpretation rule used in the feature data generation unit of FIG. 23.

FIG. 31 is a diagram showing exemplary views from three viewpoints indicated in FIG. 30.

FIG. 33 is a diagram showing an exemplary shape interpretation rule used in the viewpoint extraction operation by the feature data generation unit of FIG. 23.

FIG. 42 is a diagram showing exemplary reflected light images used in the feature data generation unit of FIG. 35.

FIG. 48 is a diagram for explaining the operation carried out by the information input generation apparatus of FIG. 46.

FIG. 51 is a diagram for explaining another operation carried out by the information input generation apparatus according to the fifth embodiment of the present invention.

FIG. 64 is a diagram showing an exemplary table data used in a correction table of the information input generation apparatus of FIG. 63.

FIG. 66 is a diagram showing an exemplary table data used in a correction table of the information input generation apparatus of FIG. 63.

FIG. 71 is a diagram showing an exemplary dialogue box used in a user commanding unit of the information input generation apparatus of FIG. 70.

DETAILED DESCRIPTION OF THE PREFERRED EMBODIMENTS

The present invention is basically directed to an information input scheme in which the light is irradiated onto a target object from a light source, and the reflected light from this target object is captured as an image, so that information on this target object such as its shape, motion, distance, etc., can be obtained from this reflected light image. In addition, in the present invention, a plurality of operation patterns for the lighting and charge storing operation are provided and selectively used according to the external light state so that the reflected light image can be obtained at high precision regardless of the external light state. In the following, various embodiments of this information input scheme will be described in detail.

<First Embodiment>

Figure 1:
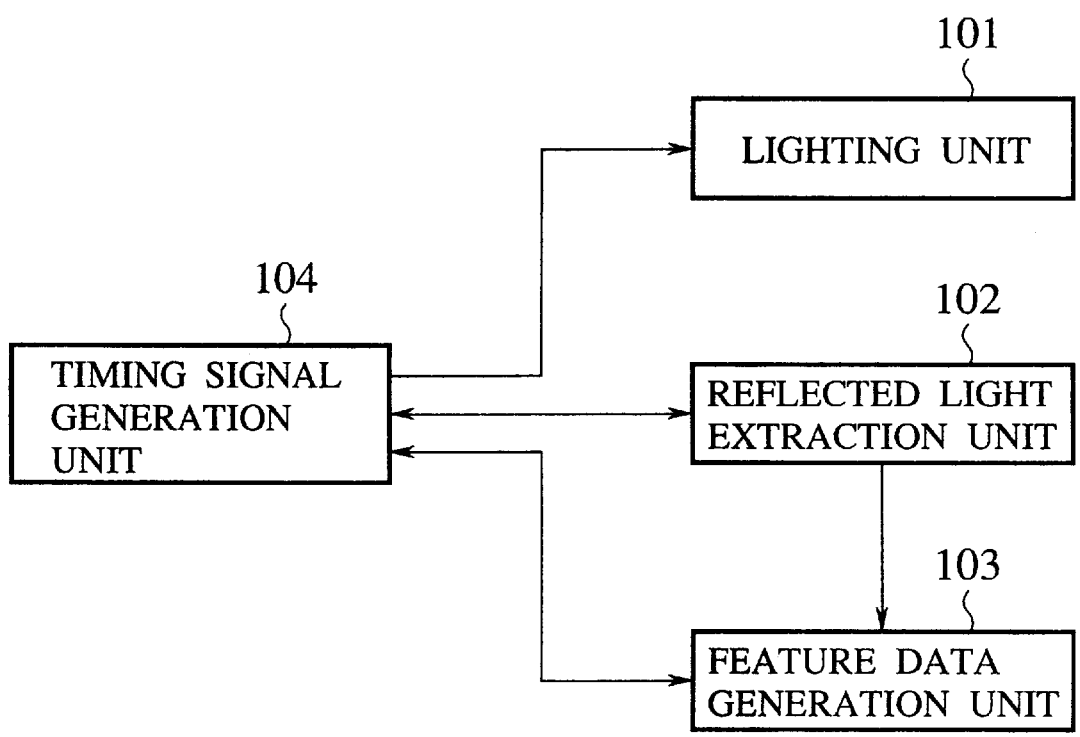
FIG. 1 is a schematic block diagram showing an exemplary configuration of an information input generation apparatus according to the first embodiment of the present invention.

FIG. 1 shows an exemplary configuration of an information input generation apparatus according to the first embodiment of the present invention, which comprises a lighting unit 101, a reflected light extraction unit 102, a feature data generation unit 103, and a timing signal generation unit 104.

The lighting unit 101 emits a light whose intensity varies in time according to the timing signal generated by the timing signal generation unit 104. This light is irradiated onto a target object located in front of the lighting unit 101.

The reflected light extraction unit 102 extracts the reflected light from the target object resulting from the light emitted by the lighting unit 101. Preferably, this reflected light extraction unit 102 extracts the spatial intensity distribution of the reflected light. This spatial intensity distribution of the reflected light can be captured as an image which will be referred to as a reflected light image hereafter.

The reflected light extraction unit 102 has a photo-detection section for detecting a receiving light amount in order to extract the reflected light from the target object. In general, the photo-detection section detects not only the reflected light from the target object resulting from the light emitted by the lighting unit 101 but also the external light such as illumination light or sunlight. For this reason, the reflected light extraction unit 102 takes a difference between a received light amount detected when the lighting unit 101 is emitting the light and a received light amount detected when the lighting unit 101 is not emitting the light, so as to obtain only a component for the reflected light from the target object resulting from the light emitted by the lighting unit 101. In other words, the reflected light extraction unit 102 is also controlled by the timing signal generation unit 104 which generates the signal for controlling the lighting unit 101.

The feature data generation unit 103 extracts various feature data from the reflected light image. Many different types of the feature data and their extraction methods can be used in the present invention, as will be described in detail in the later embodiments. When the target object is a hand, it becomes possible to obtain the information regarding a gesture or a pointing according to the feature data extracted from the reflected light image of the hand, for example, and it becomes possible to operate a computer by using this obtained information. It is also possible to extract the 3D information on the target object for further utilization. Note that this feature data generation unit 103 is not an indispensable element of the present invention, and it is also possible to directly input or utilize the reflected light image obtained by the reflected light extraction unit 102.

Now, the technical improvements incorporated in this information input generation apparatus of the first embodiment will be described in further detail with reference to FIG. 2.

Figure 2:
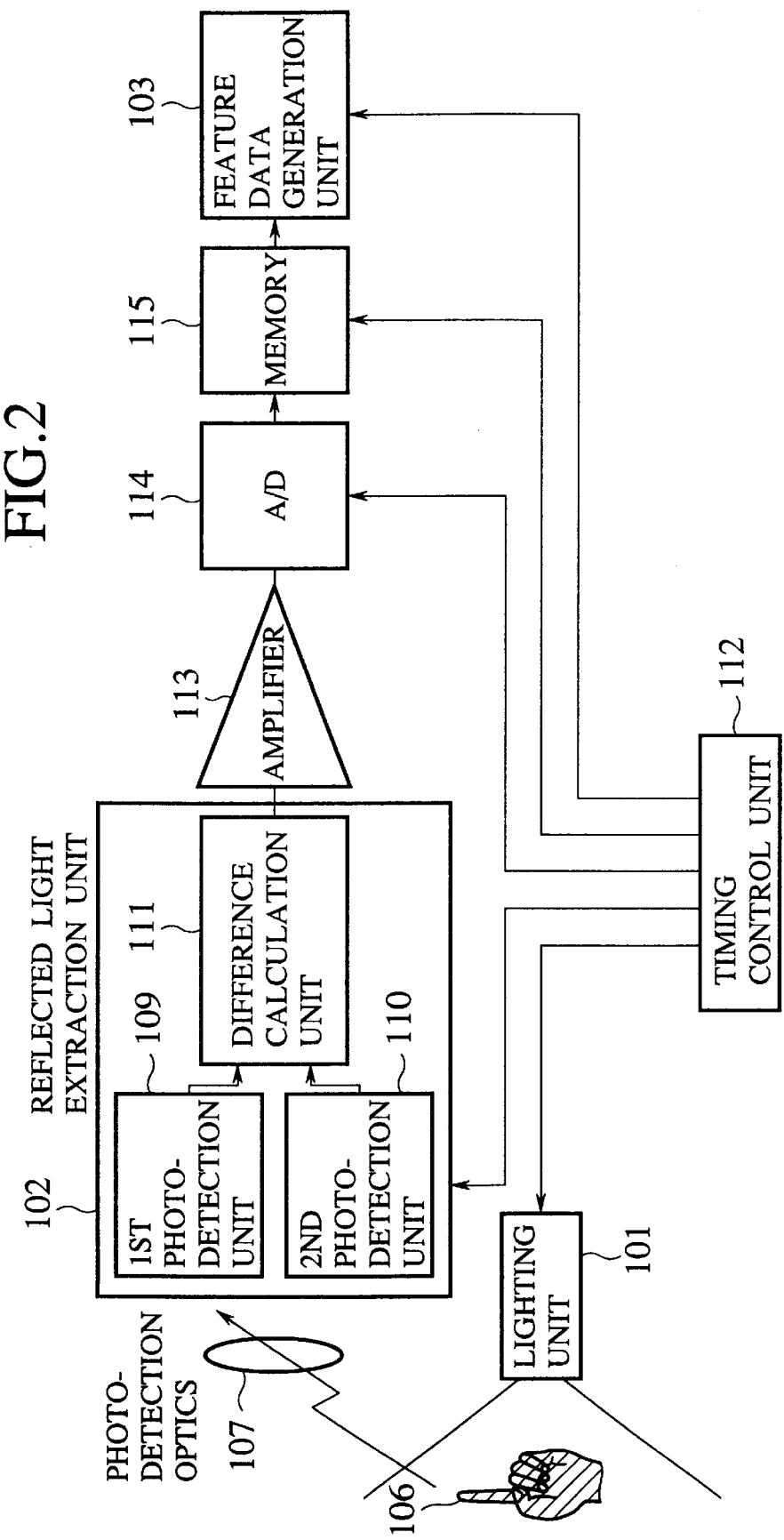
FIG. 2 is a detailed block diagram of the information input generation apparatus of FIG. 1.

FIG. 2 shows an exemplary detailed configuration of this information input generation apparatus of the first embodiment. In FIG. 2, the light emitted by the lighting unit 101 is reflected by the target object 106, and an image is formed on a photo-detection plane of the reflected light extraction unit 102 by a photo-detection optics 107. The reflection light extraction unit 102 detects the intensity distribution of this reflected light, that is, the reflected light image. Here, the reflected light extraction unit 102 has a first photo-detection unit 109, a second photo-detection unit 110, and a difference calculation unit 111.

Each of the first photo-detection unit 109 and the second photo-detection unit 110 detects the optical image formed on the photo-detection plane and converts it into image signals corresponding to the received light amounts. The first photo-detection unit 109 and the second photo-detection unit 110 carry out this photo-detection operation at different timings. A timing control unit 112 (corresponding to the timing signal generation unit 104 of FIG. 1) controls their operation timings such that the lighting unit 101 emits the light when the first photo-detection unit 109 is in a photo-detecting state, whereas the lighting unit 101 does not emit the light when the second photo-detection unit 110 is in a photo-detecting state.

By means of this control, the first photo-detection unit 109 detects the received light amounts by receiving the reflected light from the object resulting from the light emitted by the lighting unit 101 as well as the external light such as illumination light or sunlight.

On the other hand, the second photo-detection unit 110 only receives the external light. Here, the timings at which the first and second photo-detection units 109 and 110 receive the lights are set to be different but close to each other, so that the fluctuation of the external light between these timings is ignorable. Consequently, a difference between the image detected by the first photo-detection unit 109 and the image detected by the second photo-detection unit 110 corresponds to a component for the reflected light from the object resulting from the light emitted by the lighting unit 101, and therefore it is possible to extract the reflected light image corresponding to the component for the reflected light from the object resulting from the light emitted by the lighting unit 101.

The difference calculation unit 111 calculates this difference between the images detected by the first photo-detection unit 109 and the second photo-detection unit 110, and outputs the obtained difference.

The further detail of this reflected light extraction unit 102 will be described below.

The reflected light extraction unit 102 sequentially outputs the reflected light amount for each pixel of the reflected light image. The output from the reflected light extraction unit 102 is then amplified by an amplifier 113, converted from analog signals into digital signals by an A/D converter 114, and stored at a memory 115. Then, at an appropriate timing, the data stored in this memory 115 are read out and processed at the feature data generation unit 103. The timing control unit 112 controls this overall operation.

When the target object to be detected is a human hand, it is preferable to use a device that can emit the near infrared light which is invisible to the human eyes, as the lighting unit 101. In this case, the light emitted from the lighting unit 101 cannot be seen by the target human being so that the target human being will not sense the glare of the light. Also, when the lighting unit 101 emits the near infrared light, a near infrared light passing filter should preferably be provided at the photo-detection optics 107. This filter can pass the near infrared light in the emitted wavelength, while blocking the visible light and the far infrared light, so that the most of the external light can be removed by this filter.

Now, the reflected light from the object decreases considerably when a distance to the object increases. In a case where the object surface scatters the light uniformly, the received light amount per each pixel of the reflected light image as seen by the receiving side becomes smaller in counter-proportion to the square of the distance to the object. Consequently, when the target object 106 is placed in front of this multi-dimensional information input generation apparatus of the present invention, the reflected light from the background becomes ignorably small, and therefore it is possible to obtain the reflected light image only from the object. Thus, when the target object 106 in a form of a hand is placed in front of this multi-dimensional information input generation apparatus, it is possible to obtain the reflected light image of the hand alone.

At this point, a value of each pixel of the reflected light image indicates the reflected light amount received by a unit photo-detector cell corresponding to each pixel. The reflected light amount can be affected by the property of the object (that is, whether or not the object totally reflects the light, scatters the light, absorbs the light, etc.), the orientation of the object surface, the distance to the object, etc., and in a case where the object as a whole scatters the light uniformly, the reflected light amount is closely related to the distance to the object.

The hand has such a property, so that the reflected light image of the hand is dependent on the distance to the hand, the leaning of the hand (that causes the partially different distance), etc. Consequently, by extracting these features as the feature data, it is possible to input and generate various information.

In a case where it is desired to extract a 3D shape, it is desirable to obtain the distance information at high precision. In such a case, it is preferable to use a logarithmic amplifier as the amplifier 113. The received light amount at the photo-detection section is counter-proportional to the square of the distance, but when the logarithmic amplifier is used, the output of the logarithmic amplifier is counter-proportional to the distance, so that it becomes possible to utilize the dynamic range effectively.

Now, with reference to FIG. 3, an exemplary configuration of the reflected light extraction unit 102 will be described in further detail.

Figure 3:
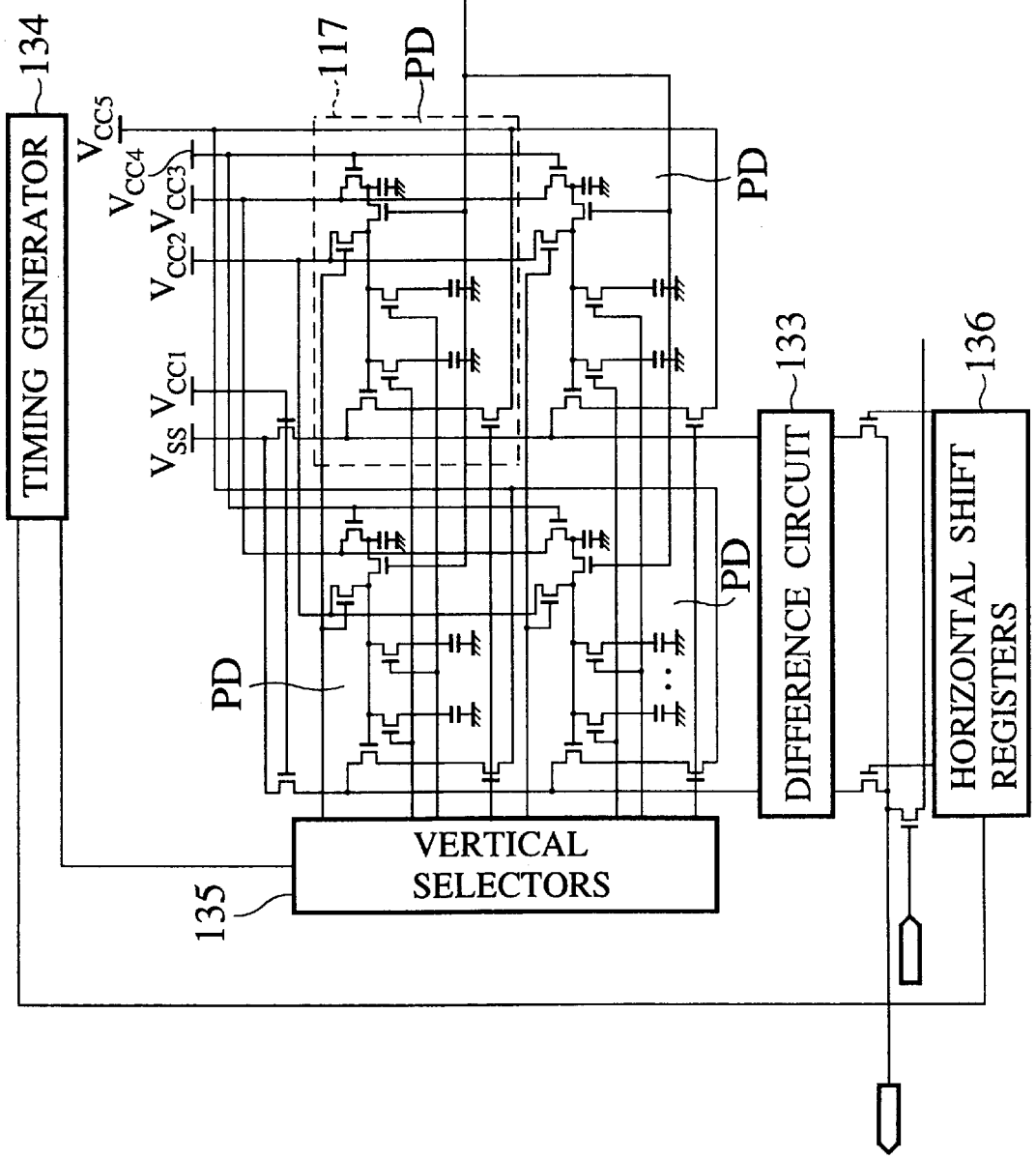
FIG. 3 is a block diagram showing an exemplary configuration of a reflected light extraction unit in the information input generation apparatus of FIG. 1.
Figure 4:
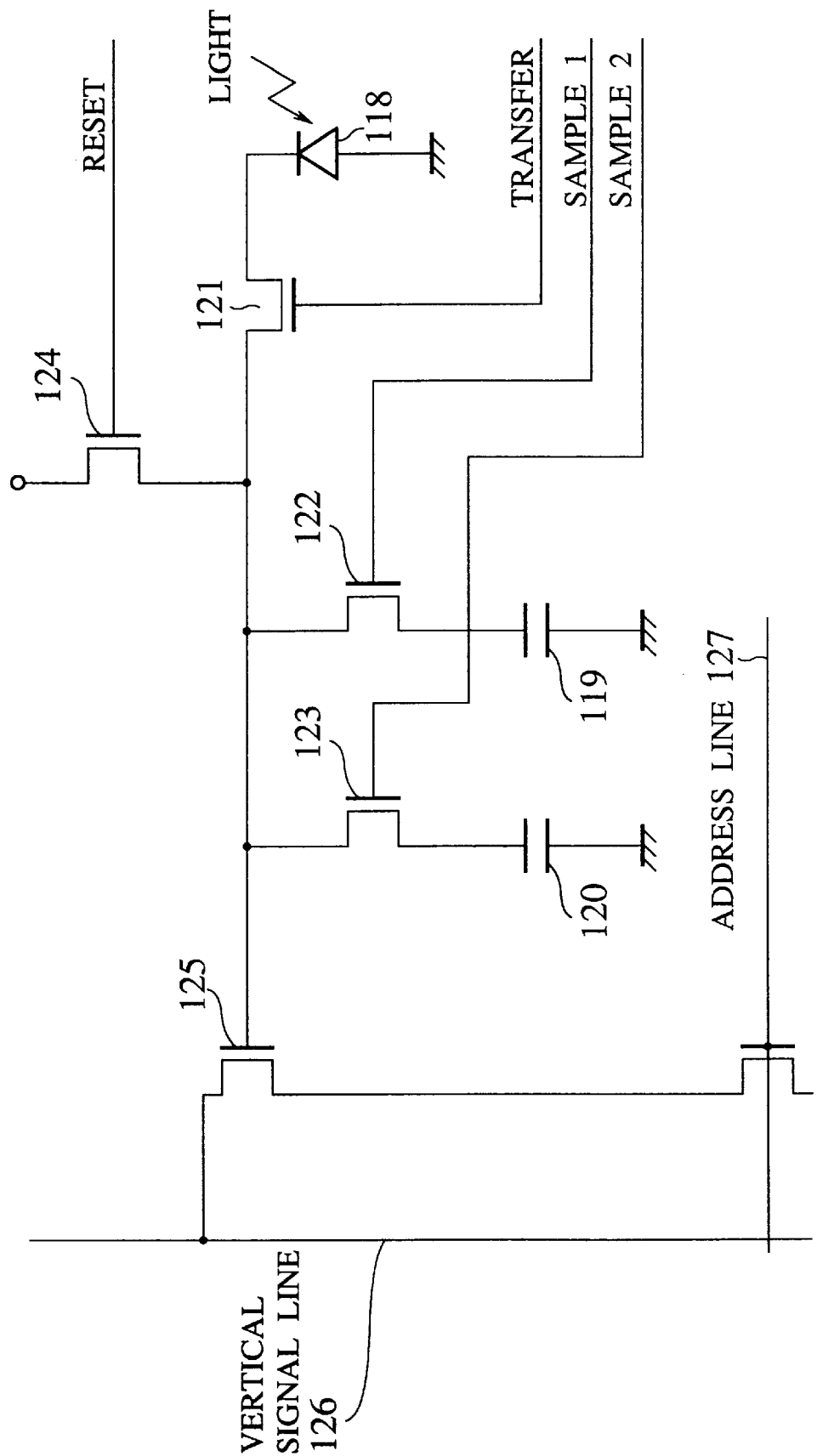
FIG. 4 is a block diagram showing an exemplary configuration of a unit photo-detector cell in the reflected light extraction unit of FIG. 3.

The reflected light extraction unit 102 of FIG. 3 has the photo-detection section formed by CMOS sensors, which includes a plurality of unit photo-detector cells, each corresponding to each pixel of the reflected light image, so as to be able to capture the intensity distribution of the reflected light. In FIG. 3, a simplified case of 2×2 pixels is shown for the sake of clarity, where a portion 117 enclosed by a dashed line is a unit photo-detector cell PD for one pixel. Each unit photo-detector cell PD for one pixel has a configuration as shown in FIG. 4.

In relation to FIG. 2 described above, one pixel part of the first photo-detection unit 109 and one pixel part of the second photo-detection unit 110 constitutes a single unit photo-detector cell PD in FIG. 3. As shown in FIG. 4, each unit photo-detector cell PD has one photo-electric conversion unit 118 formed by a photo-diode and two charge storage units 119 and 120 formed by capacitors. Between the photo-electric conversion unit 118 and the charge storage units 119 and 120, several gates (122 and 123 in this example of FIG. 4) are provided, so that the charges generated at the photo-electric conversion unit 118 can be selectively lead to either one of the two charge storage units 119 and 120 by controlling these gates. Here, the control signal for these gates and the lighting control signal for the lighting unit 101 are synchronized.

Figure 5:
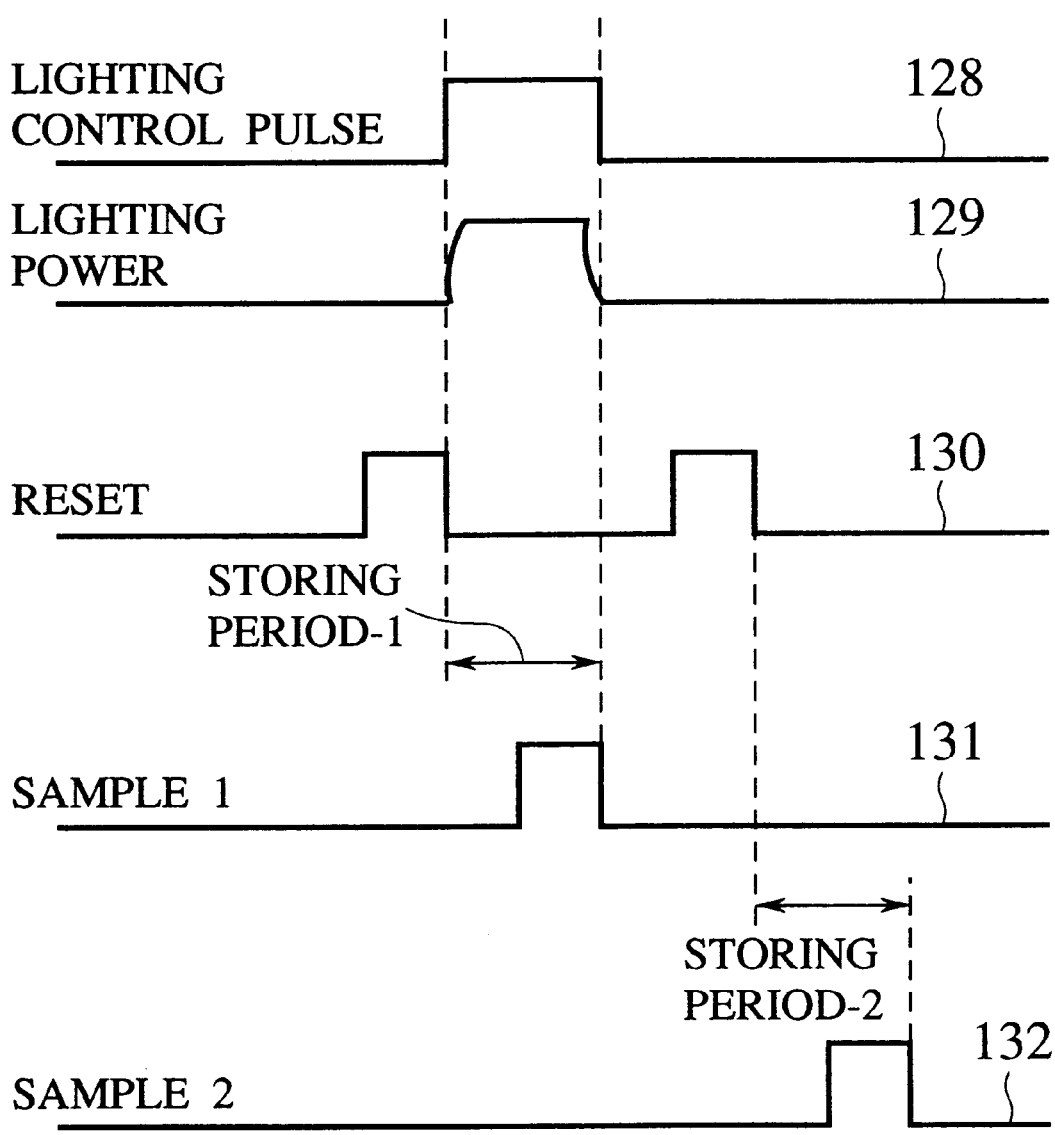
FIG. 5 is a timing chart for control signals used in the information input generation apparatus of FIG. 1.

FIG. 5 shows time changes of the control signals in the photo-detection section, the lighting control signal, and the lighting power.

A lighting control pulse 128 is a signal for controlling the lighting unit 101, for a case of realizing the light pulse emission. The lighting unit 101 emits the light when the lighting control pulse 128 is in "HIGH" level, and does not emit the light when the lighting control pulse 128 is in "LOW" level.

In response to this lighting control signal, the light actually emitted from the lighting unit 101 has a waveform that changes in time as indicated by the lighting power 129 in FIG. 5, which is determined by the time response of the light emitting element used as a light source in the lighting unit 101. The control signals including RESET 130, SAMPLE1 131, SAMPLE2 132, and TRANSFER are also given to the photo-detection section.

The TRANSFER is a signal for controlling a transfer gate 121 that transfers the changes generated at the photo-electric conversion unit 118 to the next stage. When this signal is in "HIGH" level, the charges accumulated at the photo-electric conversion unit 118 are transferred. After the charge storing, at a time of charge transfer to an output gate 125, this transfer gate 121 is closed so that the changes generated at the photo-electric conversion unit 118 do not flow into the output gate 125 which is formed by an amplifying transistor connected with a transistor for selecting this unit photo-detector cell having a gate connected with an address line 127, where the photo-diode of the photo-electric conversion unit 118 is connected with a gate of this amplifying transistor, while each of the capacitors of the two charge storage units 119 and 120 has one electrode connected to this amplifying transistor while another electrode is grounded, as shown in FIG. 4.

The RESET 130 is a reset control signal for controlling a reset gate 124 formed by a reset transistor. While the TRANSFER is "HIGH", when the RESET becomes "HIGH", the reset gate 124 is opened so that the charges accumulated at the photo-electric conversion unit 118 are discharged through the transfer gate 121 and the reset gate 124.

The SAMPLE1 131 and SAMPLE2 132 are control signals for controlling sample gates 122 and 123 in order to lead the changes from the photo-electric conversion unit 118.

Now, the operation of the unit photo-detector cell according these control signals will be described in detail.

In the unit photo-detection cell, the transfer gate 121 is kept open during the charge storing period. First, by opening the reset gate 124, the unnecessary charges accumulated between the photo-electric conversion unit 118 and the sample gates 122 and 123 are discharged. Then, by closing the reset gate 124, the charges obtained by the photo-electric conversion are accumulated between the photo-electric conversion unit 118 and the sample gates 122 and 123.

After a prescribed period of time, the first sample gate 122 is opened so that the accumulated charges are transferred to the first charge storage unit 119. Consequently, the charges obtained by the photo-electric conversion during the "storing period-1" as indicated in FIG. 5 which extends since the RESET 130 becomes "LOW" until the SAMPLE1 131 becomes "LOW" will be stored into the first charge storage unit 119. After the first sample gate 122 is closed, the reset gate 124 is opened again to discharge the unnecessary charges, and then closed. Then, after the prescribed period of time, the second sample gate 123 is opened so that the charges generated by the photo-electric conversion are transferred to the second charge storage unit 120 this time. Consequently, the charges obtained by the photo-electric conversion during the "storing period-2" as indicated in FIG. 5 which extends since the RESET 130 becomes "LOW" until the SAMPLE2 132 becomes "LOW" will be stored into the second charge storage unit 120. Here, the "storing period-1" and the "storing period-2" have the same duration.

Here, the lighting unit 101 emits the light during the charge storing period called "storing period-1" whereas the lighting unit 101 does not emit the light during the charge storing period called "storing period-2".

As a result, the first charge storage unit 119 stores the charges generated from both the reflected light from the object resulting from the light emitted by the lighting unit 101 and the external light such as illumination light or the sunlight, whereas the second charge storage unit 120 stores the charges generated from the external light alone.

Here, the charge storing period called "storing period-1" and the charge storing period called "storing period-2" are close in time, so that the size of the fluctuation of the external light between them can be regarded as sufficiently small. Consequently, a difference between the charge amounts in the first charge storage unit 119 and the second charge storage unit 120 can be regarded as the charge amount generated by the reflected light from the target object 106 resulting from the light emitted by the lighting unit 101.

For the SAMPLE1; SAMPLE2, RESET and TRANSFER as described above, the same signals are given to all the unit photo-detector cells, so that the charge storing is carried out at all the unit photo-detector cells in synchronization. This implies that a single light emission is sufficient in obtaining the one frame of the reflected light image. Consequently, it is possible to reduce the power required for the light emission. Also, a LED can be used as the light source, where the LED has a property that it can emit more intense light instantaneously when the DUTY ratio of the lighting pulse is smaller (that is, when the pulse interval is longer compared with a single pulse width), so that it is possible to utilize the lighting power efficiently.

After the charge storage, the charge extraction is carried out. First, a single line is selected by a vertical selectors 135. Then, from the unit photo-detector cells of each selected line, the charges stored in the first charge storage unit 119 and the second charge storage unit 120 are sequentially taken out, and their difference is obtained by a difference circuit 133. The obtained difference is then taken out by selecting a row by a horizontal shift registers 136.

Note that, in this example, at a time of the charge extraction, the extraction cell addresses are specified by the shift registers so that the output order is fixed (to that of the sequential output) but the random access is possible by generating arbitrary address. In such a case, it is possible to extract charges from only a part of the photo-detection section, so that the sensor operation frequency can be lowered or the frame rate of the reflected light image can be increased. For example, in a case of detecting a small object that only occupies a part of the image and tracing its motion, it suffices to search this object in a vicinity of its location in some frame, so that it suffices to extract charges for only a part of the images.

Also, a case of using the near infrared light as the light source has been described, but the present invention is not necessarily limited to this case, and it is also possible to use the visible light under the condition that prevents the human eyes from sensing the glare of the light (such as the condition that the light amount is not too large, or that the light is directed so that it does not enter into the human eye directly, etc.). In addition, the present invention is not necessarily limited to a case of using the light, and it is also possible to use the electromagnetic waves, ultrasonic waves, etc. It is also possible to omit the near infrared light passing filter under the condition that requires no consideration for the influence of the external light.

Note that it is also possible to realize the photo-detection section by using the CCD image sensors for usual imaging purpose instead of the CMOS sensors, but the use of the CMOS sensors is advantageous in view of both the performance and the cost.

Namely, although it is possible to use the CCD image sensors and a light source, the CCD can only image once in every $1/60$ second (in unit of field). Consequently, even when the lighting unit 101 is controlled to emit the light in the first $1/60$ second and not to emit the light in the next $1/60$ second, the external light can fluctuate largely during this $1/60$ second interval so that the difference will not be equal to the reflected light amount. The fluorescent light has its intensity fluctuating in a period of $1/100$ second, so that this problem can be caused. Even in the usual imaging using the CCD image sensors, it is known that the phenomenon called flickering can occur, where the brightness of the image flickers due to the difference between the imaging period and the fluctuation period of the external light.

In a case of using the CMOS sensors for the photo-detection section as described above, the CMOS sensors have the structural property that it is possible to control the photo-detection (charge storing) and the read out arbitrarily in unit of pixel, and the control time can be as short as about $1/10000$ second or less, but it can also be set to any sufficiently long time, so that it is possible to eliminate the influence of the external light fluctuation by selecting the optimum value according to the fluctuation of the external light.

In the imaging using the CCD image sensors, in order to prevent the flickering, there are cases where the charge storing period is set to be $1/100$ second so that it matches with the fluctuation period of the fluorescent light. Similarly, in a case of synchronizing this operation with the lighting unit, it is possible to suppress the influence of the external light by setting the charge storing period to be $1/100$ second, or by setting one field to be $1/100$ second by changing the CCD driving signals. However, in such cases, there arises another problem. Namely, when the target object in a form of the hand is moving, the position of the hand can be slightly displaced between the imaging at a time of the light emission and the imaging at a time of no light emission. When the difference is taken in this state, the reflected light image is largely disturbed at the edge portion of the object (hand) in particular.

In addition, there is a significant difference in compactness of the configuration between a case of using the CCD image sensors and a case of using the CMOS sensors. Namely, in a case of using the CCD, it is at least necessary to provide an A/D converter, a memory for storing data for one frame part, and a calculation circuit for obtaining a difference image. Moreover, in a case of using the CCD, it is also necessary to separately provide a driver IC.

In contrast, in a case of using the CMOS sensors in a configuration where a plurality of unit photo-detector cells are arranged two-dimensionally as described above, various circuits can be formed on a base of the CMOS sensors (a substrate on which the CMOS sensors are formed), so that it is possible to contain the driver in the same chip. In addition, the difference between a case of light emission and a case of no light emission can be taken within the sensors so that no difference calculation circuit is necessary. Moreover, it is also possible to contain an A/D converter, a memory, and a control unit in one chip, so that it can be realized at a very low cost.

In the above, the configuration up to the extraction of an image (the reflected light image) of the target object alone has been described. This much of a configuration by itself is sufficiently useful as a commercial product, but in practical use, it is often preferable to use the present invention in a form that matches with the need of a user by applying some processing to the obtained reflected light image.

For example, by inputting the reflected light image of the hand, it is possible to realize the pointing or gesture input. The feature data generation unit 103 extracts the information useful for this purpose from the reflected light image, by extracting the feature quantity, processing the feature quantity, or generating some other information from the feature quantity.

A representative example for the processing of the reflected light image is the distance information extraction and a region extraction. As already described above, when the object has a uniform and homogeneous scattering surface, the reflected light image can be regarded as a range image. Consequently, it is possible to extract a 3D shape of the object. When the object is the hand, it is possible to detect an inclination of the palm of the hand, which appears as a partially different distances. Also, when the hand is moved, the change of the pixel values can be regarded as a change of the distance.

It is also possible to process the reflected light image so as to extract the object property information such as a color information and a material information of the target object.

The extracted distance information and/or the object property information can then be utilized in extracting an object image of at least a part of the target object for the purpose of further processing.

Also, as there is almost no reflected light from remote object such as the background, it is possible to extract the shape of the object easily by the processing for extracting a region with the pixel value over a certain threshold from the reflected light image. For example, when the object is the hand, it is quite easy to extract its silhouette image. Even in a case of using the range image, it is often preferable to extract a region according to a threshold once and then use the distance information within that region.

In this manner, it becomes possible to extract the target object image easily, so that it becomes possible to realize various information input operations or commanding operations using the target object image.

As described, according to this first embodiment, it becomes possible to acquire the reflected light image of the object such as the hand, easily in real time. This eliminates the need of an image processing for extracting a target object image which is a type of image processing that is most difficult to realize conventionally and has been a hindrance to the application of the image processing. Consequently, according to this first embodiment, it becomes possible to provide various types of image processing that have been difficult to realize at the practically usable level conventionally, in a form which is easy to realize and stable, and at a low cost, so that it can be a great innovation to the wide ranging fields such as industry, home, and amusement.

<Second Embodiment>

Referring now to FIG. 6 to FIG. 22, the second embodiment of the present invention will be described in detail.

This second embodiment is directed to one exemplary case of the feature data generation unit in the first embodiment.

When the hand is used as the target object, it is possible to capture the information on a position and a shape of the hand without a contact, so that it is possible to utilize the present invention as a means for inputting information from a human being to a machine. The pointing operation (an operation for inputting a position) has been carried out conventionally by using a device called pointing device such as mouse or track ball, but according to this second embodiment, this pointing operation can be realized by the hand action alone without a contact. In the following, a device for realizing this non-contact pointing will be described in detail.

First, an example of the non-contact pointing will be described. According to the present invention, a shape of the hand can be easily detected, so that it is possible to utilize the present invention as the non-contact pointing device, which can be a suitable pointing means for a portable information device and the like.

In this second embodiment, a user extends his hand in front of the input device in a state of extending all the fingers, and then makes the hand action, which is a very natural operation to do for a user. In this case, the reflected light image appears as shown in a left half of FIG. 6. A finger tip position is detected from this reflected light image by means of the image processing and utilized for the pointing operation. The extended finger portion appears as an upward pointing stick shaped object, so that it is not so difficult to obtain the coordinates of this tip end by the image processing. However, by simply obtaining the coordinates of the stick shaped tip end, it is only possible to obtain the finger tip position at the precision corresponding to the resolution of the reflected light image.

Figure 7:
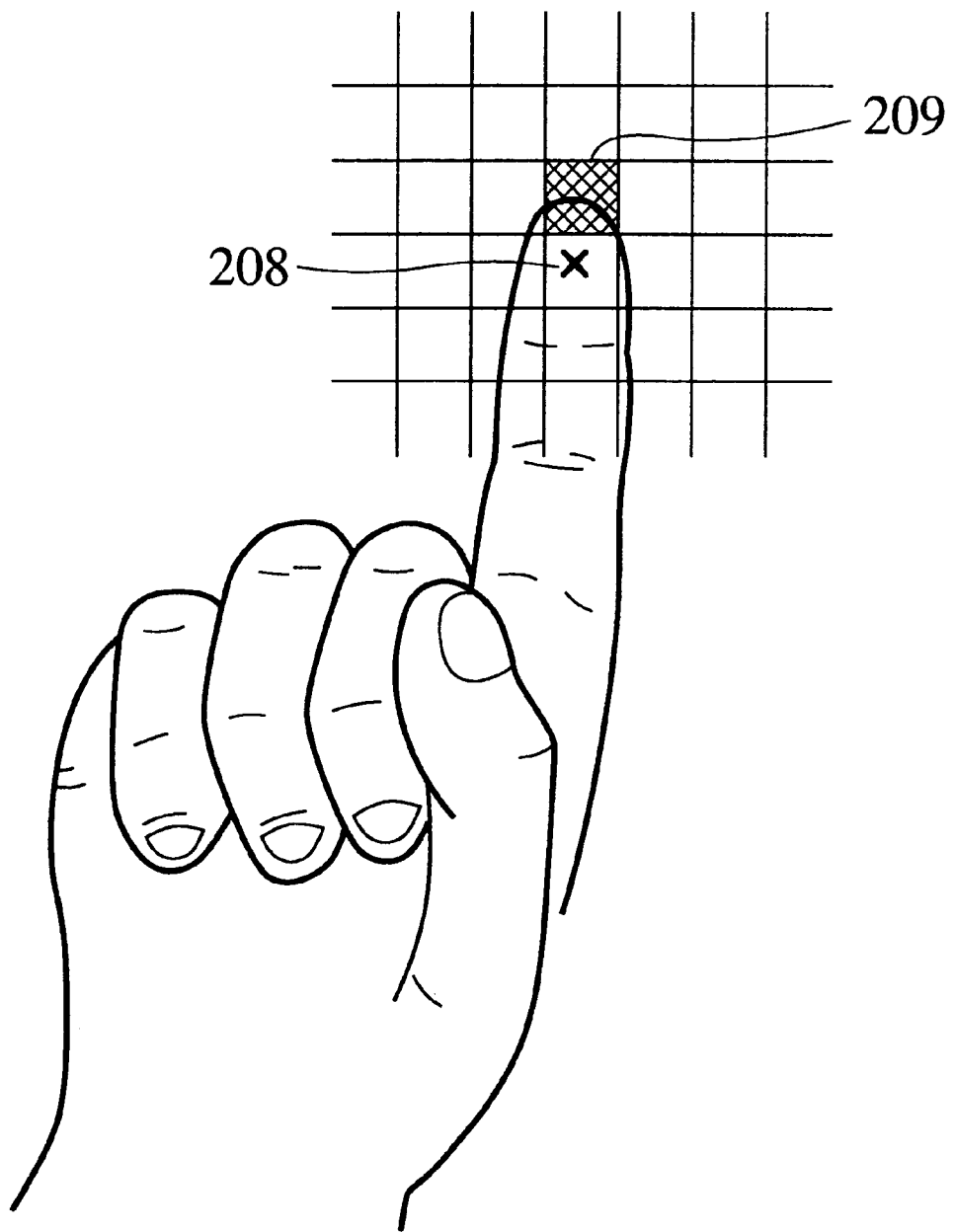
FIG. 7 is a diagram for explaining a finger tip position extraction operation in the second embodiment of the present invention.

In general, the reflected light extraction unit can be manufactured at lower cost when the required number of pixels is smaller. Consequently, if it is possible to obtain the finger tip position at high precision from the rough reflected light image, it becomes possible to manufacture the non-contact pointing device at low cost. To this end, in this second embodiment, the position of a X mark 208 as indicated in FIG. 7 is obtained by the resolution above the pixels rather than the coordinates of the finger tip, and this position is utilized for the pointing as a feature point. This point is a center of gravity of a part of the finger tip (image). The manner for extracting this center of gravity position from the rough reflected light image will now be described in detail.

Figure 8:
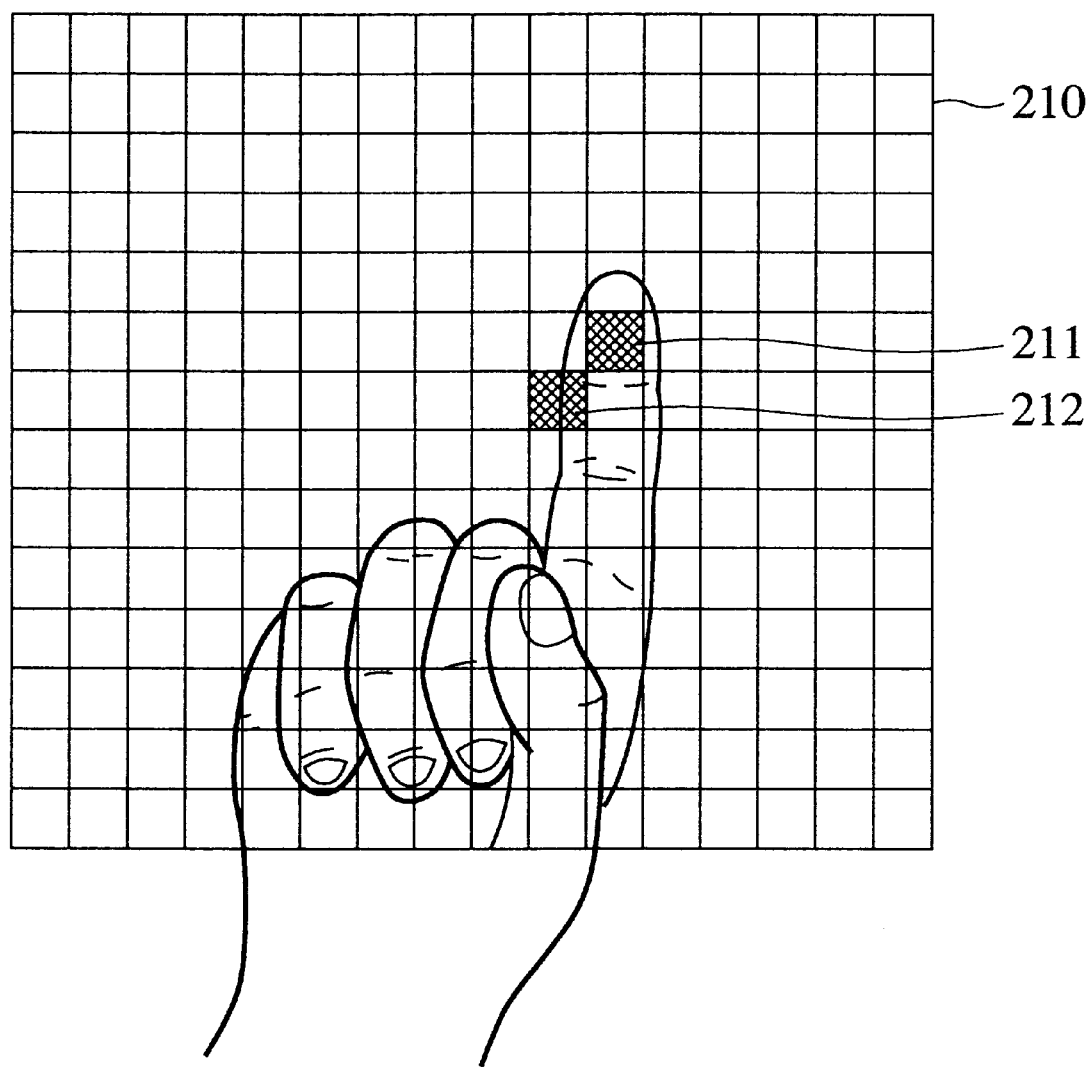
FIG. 8 is another diagram for explaining a finger tip position extraction operation in the second embodiment of the present invention.

Consider the pixel values in this reflected light image. It is already mentioned that the pixel value can be converted into the distance information. However, when the resolution of the reflected light image is rough, this idea is not necessarily applicable to the region surrounding the hand. Now suppose that the relationship between the pixels in the reflected light image and a target space is as shown in FIG. 8. Here, the reflected light from one block in FIG. 8 corresponds to the pixel value of one pixel in the reflected light image. From this FIG. 8, it can be seen that the reflected light from a block 211 is about a half of the reflected light from a block 212. The reflected light amount is changed according to a rate by which the target object occupies each block, even if the target object is located at the same distance. In other words, in this case, the decrease of the reflected light amount indicates a position of the edge of the hand.

Now suppose that the finger position has slightly moved. Then, a rate by which the finger occupies each block changes, so that the pixel values will be slightly changed. Even if the reflected light image is rough, when the pixel values can be obtained at certain precision, it is possible to obtained the pointing position by the resolution above the pixels by using the pixel values. It is experimentally confirmed that a good pointing precision can be achieved when the width of the extended finger covers two to three pixels. A method for obtaining the finger tip position at high precision from the rough image will now be described in detail.

Figure 9:
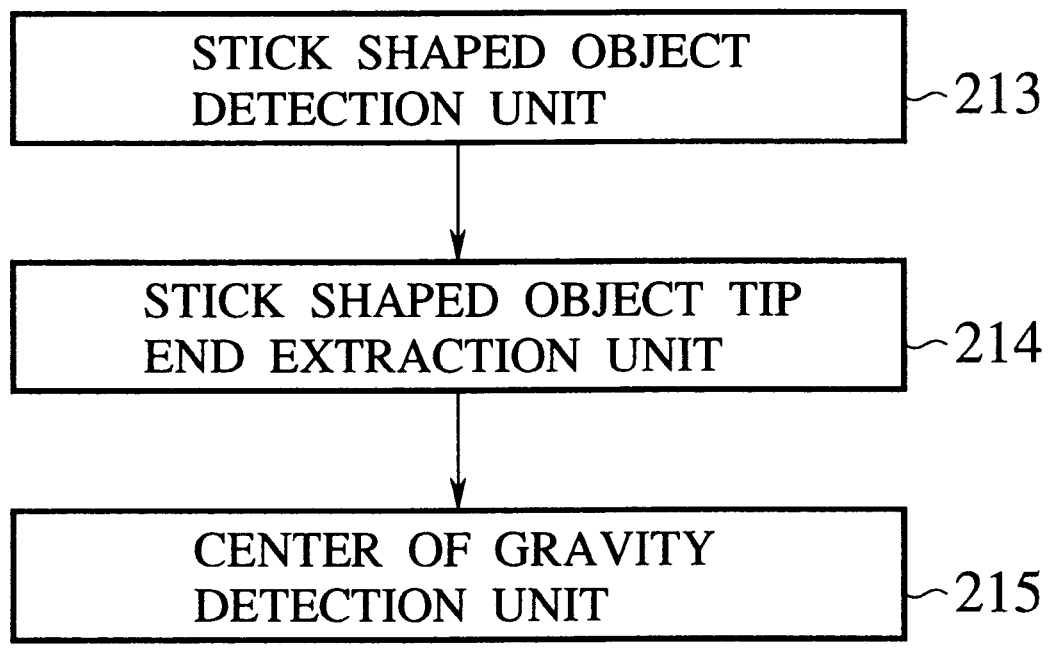
FIG. 9 is a block diagram showing one exemplary configuration of a feature data generation unit according to the second embodiment of the present invention.

FIG. 9 shows an exemplary configuration of the feature data generation unit according to this second embodiment, which comprises a stick shaped object detection unit 213, a stick shaped object tip end extraction unit 214, and a center of gravity detection unit 215.

The stick shaped object detection unit 213 detects a stick shaped object extending in the vertical direction, that is, an upward extended finger (normally an index finger) of the hand of the operator. Then, the stick shaped object tip end extraction unit 214 extracts an upper tip end of the stick shaped object (index finger) extending in the vertical direction, and then the center of gravity detection unit 215 obtains the center of gravity of that extracted portion.

At this point, if the portion is extracted in pixel units, the pixel value sum of the extracted portion largely fluctuates because the pixels are rough, and the precision of the detected center of gravity would become poor (as will be described in detail below). Consequently, the stick shaped object tip end extraction unit 214 extracts the tip end portion while correcting some pixel values such that the pixel value sum of the extracted portion satisfies a certain condition. Then, the center of gravity detection unit 215 calculates the center of gravity of the tip end portion extracted by the stick shaped object tip end extraction unit 214, and set this calculates center of gravity as a finger tip position.

More specifically, this feature data generation unit of FIG. 9 operates as follows.

Here, it is assumed that, when a user extends a finger for the purpose of commanding an operation, a commanding finger (normally an index finger) is extended upwards in the reflected light image. Consequently, when the hand is extended in a shape (such as that of a fist) that does not match this assumption, there is a possibly that a correct detection cannot be made.

Figure 6:
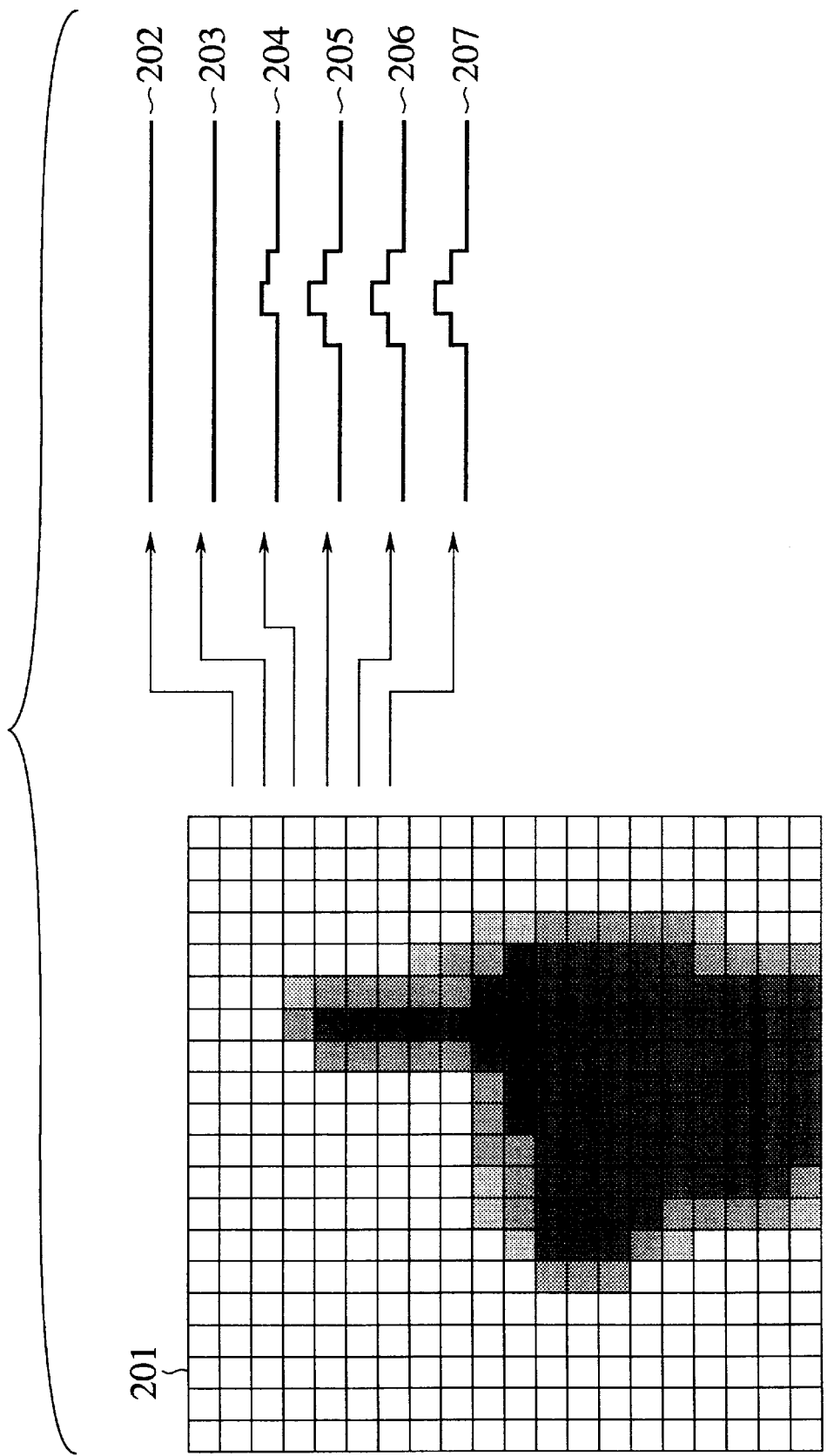
FIG. 6 is a diagram showing an exemplary reflected light image used in the second embodiment of the present invention.

First, the reflected light image 201 as shown in FIG. 6 is scanned along the horizontal direction from the top. When the finger tip is not present at an upper end of the reflected light image, in the upper part normally, all the pixels in one line have pixel values nearly equal to 0 as indicated by lines 202 to 203 in FIG. 6. When there is a portion where the pixel value becomes locally large in one line along the horizontal direction as indicated by a line 204 in FIG. 6, this position and this line are memorized. This is repeated for the several lines as indicated in lines 205 to 207 in FIG. 6, and when the portion where the pixel value becomes locally large coincides over several lines, it can be judged that the stick shaped object (index finger, for example) extending in the vertical direction is present there. Then, a region where the extended finger is most likely present is enclosed by a rather large enclosure, and for this partial image, the following processing is carried out by the stick shaped object tip end extraction unit 214.

Figure 10:
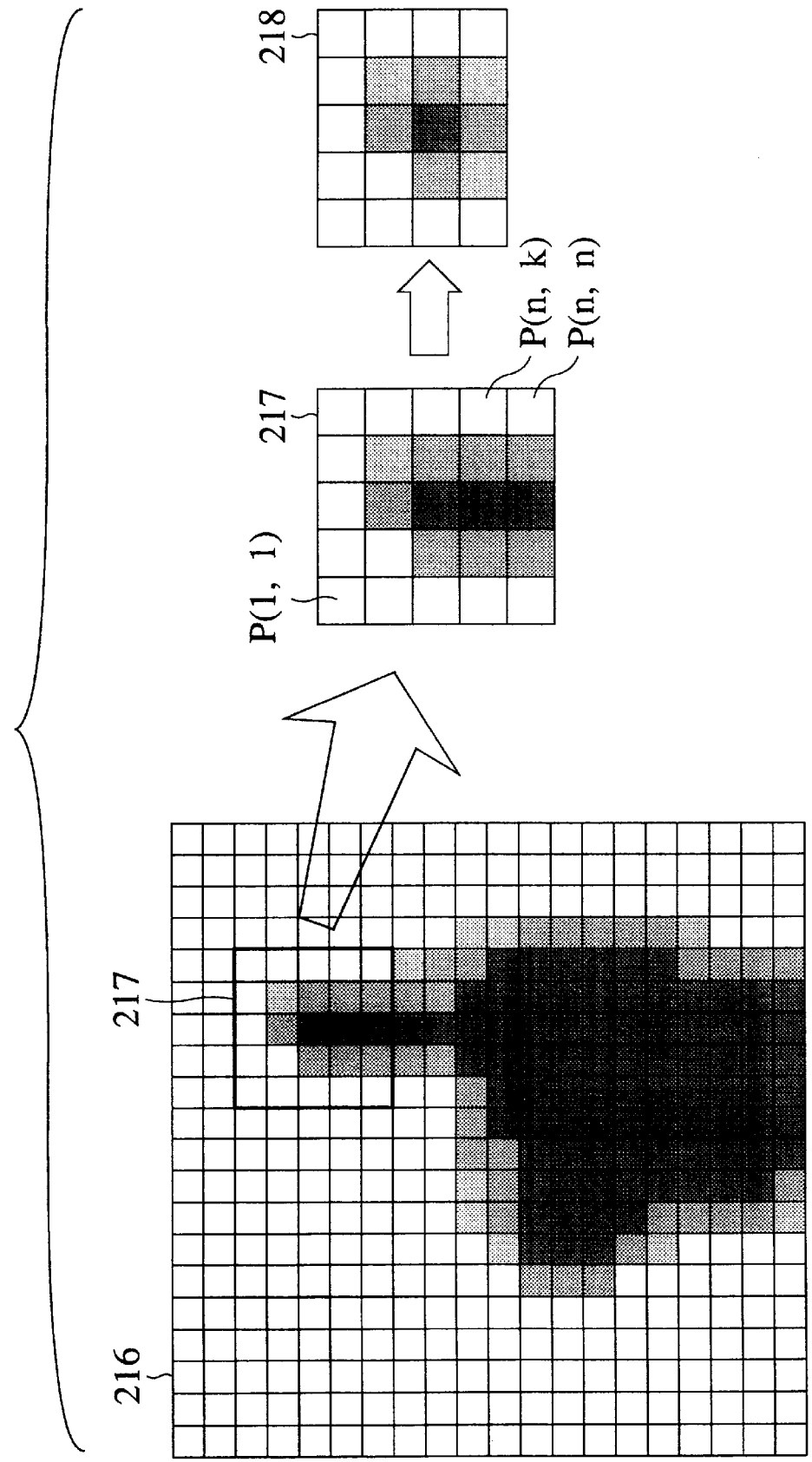
FIG. 10 is a diagram showing an exemplary reflected light image processed by the feature data generation unit of FIG. 9.

FIG. 10 shows an original reflected light image 216 in which the finger tip is judged to be present within a partial image 217 by the stick shaped object detection unit 213. In this partial image 217, it is assumed that the upper left corner pixel value is P(1,1), the upper right corner pixel value is P(n,1), the lower left corner pixel value is P(1,n), and the lower right corner pixel value is P(n,n).

Here, a certain threshold TH is set up in advance, and values k and a that satisfy the following equation (1) are obtained.

$$TH = \sum_{x=1}^{n} \sum_{y=1}^{k-1} P(x, y) + a \cdot \sum_{x=1}^{n} P(x, k) \quad (0 < a \leq 1) \quad (1)$$

Then, the pixel values P(1,k) to P(n,k) are corrected by using the obtained value a. Namely, the old pixel values P'(1,k) to P'(n,k) are updated according to the following equation (2).

$$P(x,k) = a \cdot P'(x,k) \quad (x=1, 2, \ldots, n) \quad (2)$$

The pixel values P(1,1) to P(n,k) including the corrected pixel values P(1,k) to P(n,k) constitute the extracted portion 218. The upper three lines of the extracted portion 218 are the same as the upper three lines of the partial image 217, while the fourth line of the extracted portion 218 (enclosed by a bold line) is corrected by multiplying the value a to the respective pixel values of the fourth line of the partial image 217, so that it appears paler in FIG. 10.

Next, at the center of gravity detection unit 215, the center of gravity (xx,yy) is determined by using the obtained pixel values P(1,1) to P(n,k) according to the following equations (3) and (4).

$$xx = \sum_{x=1}^{n} \sum_{y=1}^{k} x \cdot P(x, y) \Big/ \sum_{x=1}^{n} \sum_{y=1}^{k} P(x, y) \quad (3)$$

$$yy = \sum_{x=1}^{n} \sum_{y=1}^{k} y \cdot P(x, y) \Big/ \sum_{x=1}^{n} \sum_{y=1}^{k} P(x, y) \quad (4)$$

The center of gravity (xx,yy) obtained here nearly coincides with a center of gravity of an image obtained by extracting a certain length from a top (where a length to be extracted is related to the threshold TH) of the extended finger in the image of FIG. 8. Here, the pixels are rougher than the usual TV image so that the above described correction is made in order to achieve the same effect as maintaining the length to be extracted constant. Note that the precision of the center of gravity (xx,yy) becomes better when the pixel value P(x,y) of each pixel is obtained at the better precision.

Here, the reason for correcting the pixel values P(1,k) to P(n,k) as described above will be explained. Namely, what might happens if the center of gravity (xx,yy) is calculated without correcting the pixel values P(1,k) to P(n,k) will be considered with references to FIGS. 11A and 11B.

Figure 11A:
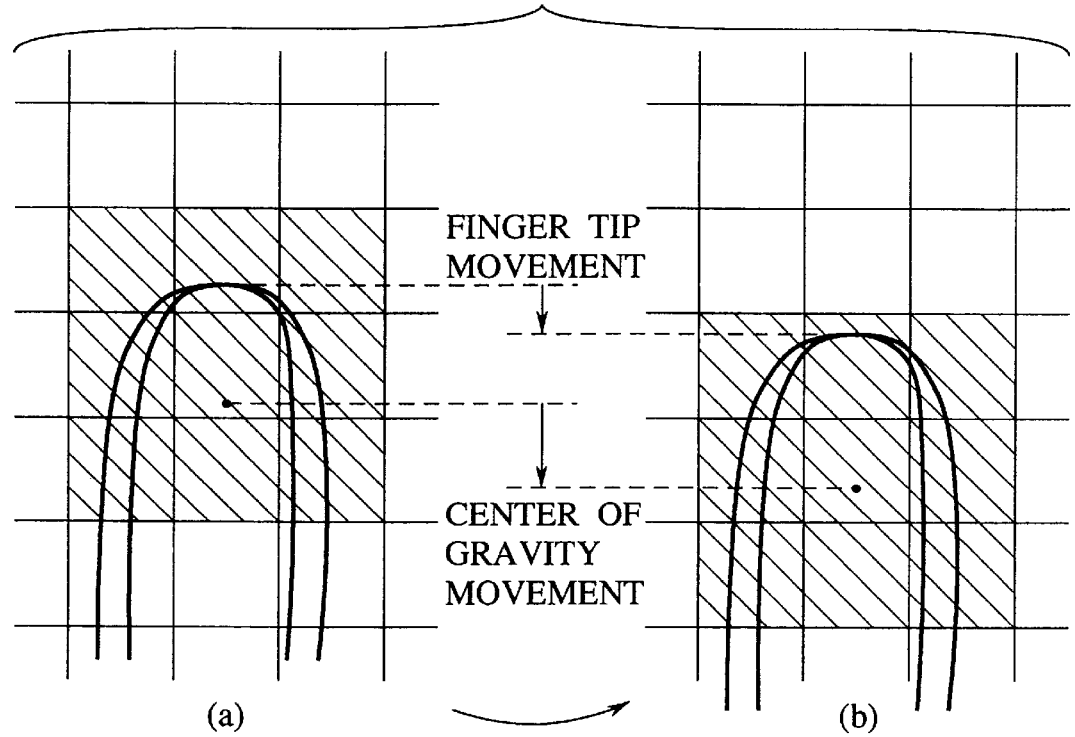
FIGS. 11A and 11B are diagrams for explaining the operation of the feature data generation unit of FIG. 9.
Figure 11B:
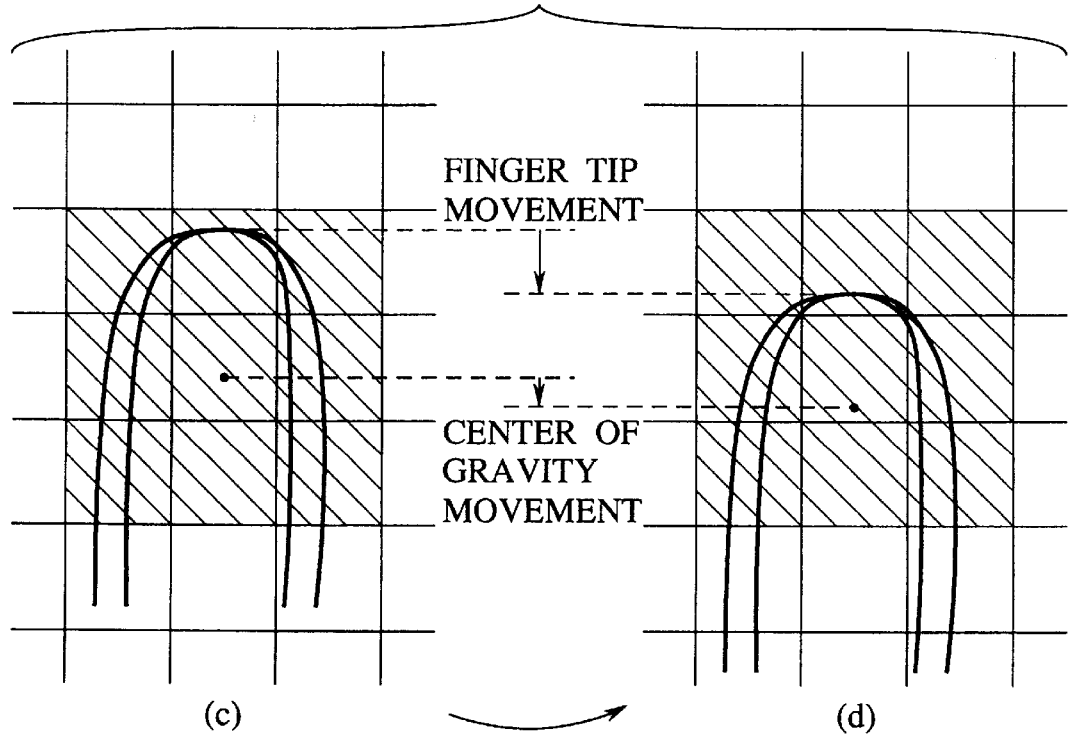

Suppose that the finger tip position is to be determined by calculating the center of gravity using a shaded region indicated in FIGS. 11A and 11B, which starts from the horizontal line where the pixel value becomes locally large up to three pixels part below. In this case, when the finger moves from a state shown in a part (a) of FIG. 11A to a part (b) of FIG. 11A, the change of the position of the center of gravity (xx,yy) becomes larger than the change of the position of the finger tip. On the other hand, when the finger moves from a state shown in a part (c) of FIG. 11B to a part (d) of FIG. 11B, the change of the position of the center of gravity (xx,yy) becomes smaller than the change of the position of the finger tip. In other words, there is no linearity between the actual finger tip position and the calculated center of gravity (xx,yy) in this case.

In contrast, when the center of gravity is calculated by correcting the pixel values so that the pixel value sum of all the pixels remains constant while calculating the center of gravity as described above, the finger tip movement and the center of gravity movement can be smoothly correlated.

Also, it is mentioned above that the sufficient pointing precision can be achieved when the width of the extended finger covers two to three pixels, and on the contrary, when the width of the finger does not even cover one pixel, the sufficient precision cannot be achieved. This is a case shown in FIG. 12, where the calculated x-coordinate of the center of gravity does not change even when the finger tip is moved slightly. In this case, there is also no linearity between the actual finger tip position and the calculated center of gravity (xx,yy).

Now, the operation of the feature data generation unit of this second embodiment in a case of the digital processing will be described with references to FIG. 13 to FIG. 15. Here, some more details of the operation not described above will also be described. By implementing a program according to these flow charts, it is also possible to realize this operation of the feature data generation unit in a form of software. It is obviously possible to realize a hardware configuration for carrying out this operation, and a configuration using both software and hardware is also possible. In a case of using software, the program may be recorded in a recording medium such as FD so that it can be distributed.

Figure 13:
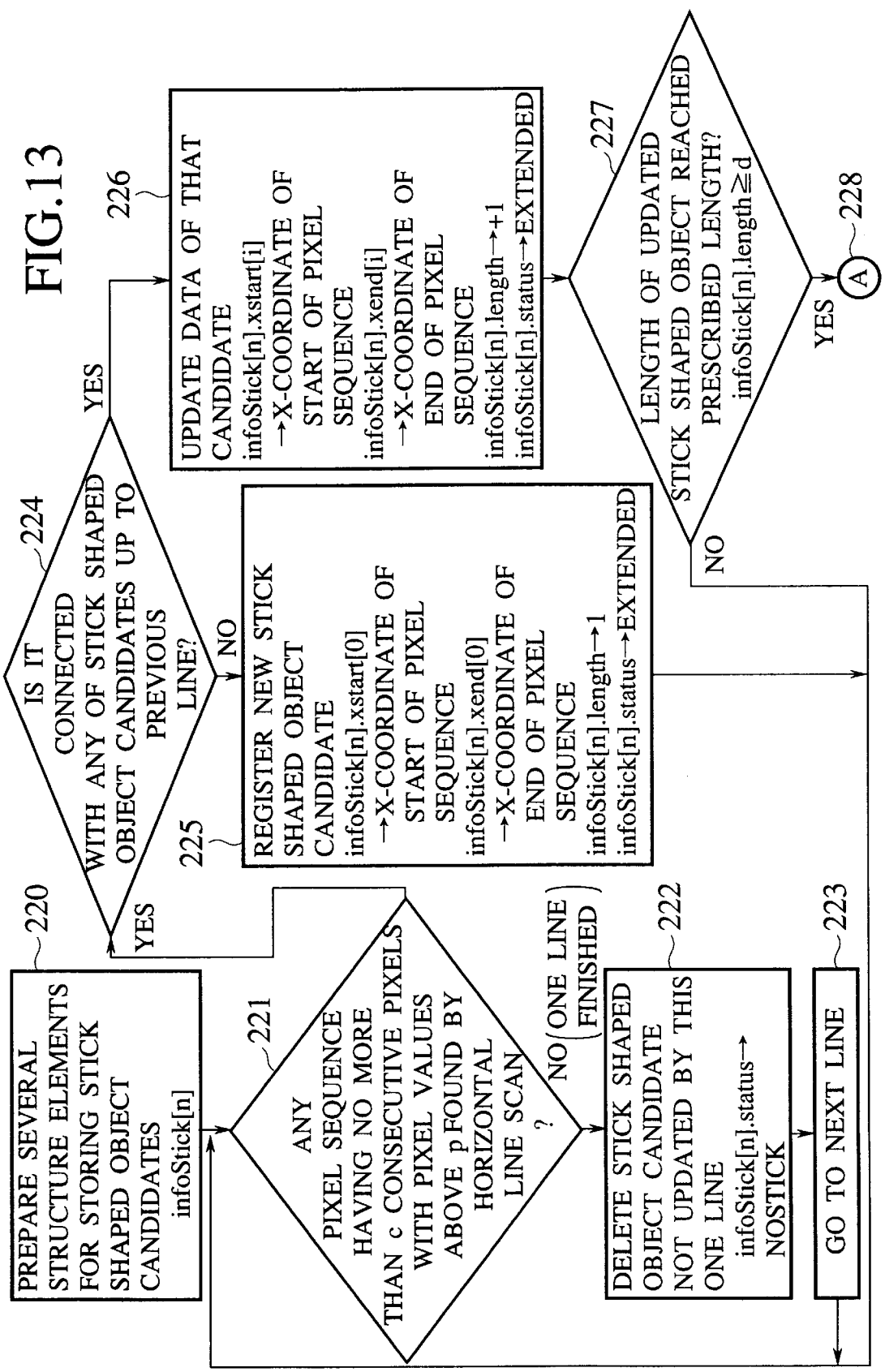
FIG. 13 is a flow chart for a first half of the operation carried out by the feature data generation unit of FIG. 9.

FIG. 13 shows the processing of the stick shaped object detection unit 213. As described above, in this stick shaped object detection unit 213, the reflected light image is scanned along the horizontal direction, and a portion where the pixel value becomes locally large is found. When such a portion appears in several lines at close positions, it is judged that the stick shaped object is present. This portion where the pixel value becomes locally large will be referred to as a partial pixel sequence. Also, a set of a plurality of partial pixel sequences which is not yet judged as a stick shaped object but which has a possibility of being judged as a stick shaped object will be referred to as a stick shaped object candidate. During the scanning along the horizontal direction, the stick shaped object candidates can be found, and as the scanning proceeds the stick shaped object can be detected from them.

More specifically, a plurality of structure elements for storing information of the stick shaped object candidates are prepared (step 220). Here, this structure element is denoted as "infoStick[n]" where [n] is a label for distinguishing the plurality of structure elements. Here, a plurality of structure elements are prepared because there may be more than one stick shaped object candidates.

This structure element has five members, of which two are arrays. As indicated by a reference numeral 235 in FIG. 15, the members include: "ystart" indicating a y-coordinate of a line at which the stick shaped object started; "xstart[i]" indicating an x-coordinate at which the partial pixel sequence starts on the i-th line (where the uppermost line is the 0-th line) from the top of the stick shaped object candidate; "xend[i]" indicating an x-coordinate at which the partial pixel sequence ends on the i-th line (where the uppermost line is the 0-th line) from the top of the stick shaped object candidate; "length" indicating a length in the vertical direction of the stick shaped object candidate (that is, a number of partial pixel sequences); and "status" indicating a current status (which takes three values of STICK, NOSTICK, and EXTENDED as will be described below). The starting x-coordinate and the ending x-coordinate are to be indicated for each of a plurality of lines, so that they are given in forms of arrays.

Now, this processing of FIG. 13 will be described with reference also to FIG. 15 for the sake of clarity. In FIG. 15, a reference numeral 234 indicates the reflected light image, where the density of each pixel indicates the size of the pixel value. The numbers on the upper side and the left side indicate the x-coordinate and the y-coordinate, respectively. A reference numeral 235 indicates the structure element described above in outline. A reference numerals 236 to 238 shown in the right half indicate the contents of the structure element during the processing.

While scanning the horizontal line, when a partial pixel sequence that satisfies a given condition (which is assumed to require the partial pixel sequence to have no more than c consecutive pixels with the pixel values above p) is found (step 221), it is either integrated with the already found stick shaped object candidate (step 226) or registered as a new stick shaped object candidate (step 225). The partial pixel sequence that is found first will always be registered as a new stick shaped object candidate.

For example, in FIG. 15, while the y=3 line is scanned, the partial pixel sequence is found for the first time, and this is registered as a new stick shaped object candidate (as indicated by 236). Namely, the y-coordinate value "3" of this line is entered into "infoStick[0].ystart". Also, the same value "6" is entered into the "infoStick[0].xstart[0]" and "infoStick[0].xend[0]" because the length of this partial pixel sequence is "1". Also, a value "1" is entered into "infoStick[0].length" and a value "EXTENDED" is entered into "infoStick[0].status" because this is a new stick shaped object candidate. Here, a value "EXTENDED" is also used in a case of registering a new stick shaped objected candidate for the reason explained below.

Next, the partial pixel sequence found by scanning the y=4 line can be connected with the already found stick shaped object candidate. Here, whether it can be connected with the already found stick shaped object candidate or not can be determined from a positional relationship in the x-direction between the partial pixel sequence in the last line of the already found stick shaped object candidate and this new partial pixel sequence. In this case, "infoStick[0].xstart[0]=6" and "infoStick[0].xend[0]=6", while the x-coordinates of the new partial pixel sequence are "5" to "7", so that they are judged as being connected.

Then, the information of the stick shaped object candidate that was judged to be connected with this new partial pixel sequence is updated (as indicated by 237). Namely, the positions (in the x-direction) of the new partial pixel sequence are entered as "infoStick[0].xstart[1]=5" and "infoStick[0].xend[1]=7" and the length of the stick shaped object candidate is increased by 1 as "infoStick[0].length=2".

Next, the partial pixel sequence found by scanning the y=5 line is also connected, as indicated by 238. Here, assuming that a prescribed length d is equal to "3", the condition of the step 227 in FIG. 13 holds, so that the stick shaped object is determined and the processing proceeds to the next step 238. The above processing is repeated until this condition is satisfied, and when the scan of one image field is finished before this condition is satisfied, it is judged that no stick shaped object was detected.

Now, the use of "infoStick[n].status" will be described in further detail. This takes three values of STICK, NOSTICK, and EXTENDED. NOSTICK indicates that this structure element is not a stick shaped object candidate (so that the "status" member of all the structure elements are initially set to be NOSTICK). STICK indicates that this structure element is a stick shaped object candidate. EXTENDED is also used for a stick shaped object candidate but its usage is somewhat different. Namely, when the scan of a new horizontal line begins, all the stick shaped object candidates have values STICK. Then, a value of a stick shaped object candidate which is connected with a newly found partial pixel sequence during the scan of one line will be changed to EXTENDED. When the scan of this one line is finished, the stick shaped object candidate that still has a value STICK is not connected with any partial pixel sequence on that line, so that it will be regarded as no longer a stick shaped object candidate.

Consequently, when the scan of one line is finished, a value of the stick shaped object candidate which remains to be STICK will be changed to NOSTICK, and a value of the stick shaped object candidate which has been changed to EXTENDED will be changed to STICK again. By this processing, as indicated by 239 in FIG. 16, the floating partial pixel sequence (that may possibly be noise) will be registered into "infoStick[0]" as the stick shaped object candidate once (as indicated by 241 in FIG. 16), but when the pixel sequence becomes discontinuous, it is removed from the stick shaped object candidates (actually deleted by the processing of step 222) (as indicated by 242 in FIG. 16). The real finger tip portion is registered in "infoStick[1]" as indicated by 243 in FIG. 16. Here, the "status" is changed to NOSTICK simply for the purpose of removing it from the stick shaped object candidates.

By means of this, at a time of judgement of the step 224 in the next scan, only the structure elements having the value STICK will be referred, and the structure elements having the value NOSTICK will be ignored. Also, in this manner, the once used structure element can be used for a registration of a new stick shaped object candidate again by changing its value to NOSTICK, so that a memory can be saved. By carrying out this processing, it is possible to reduce the influence of the noise.

At the step 224, the judgement as to whether it can be connected or not is made only for those structure elements which have a value STICK. Also, at a time of registering a new stick shaped object candidate, the structure element having a value NOSTICK is searched and the new information is stored there.

Figure 14:
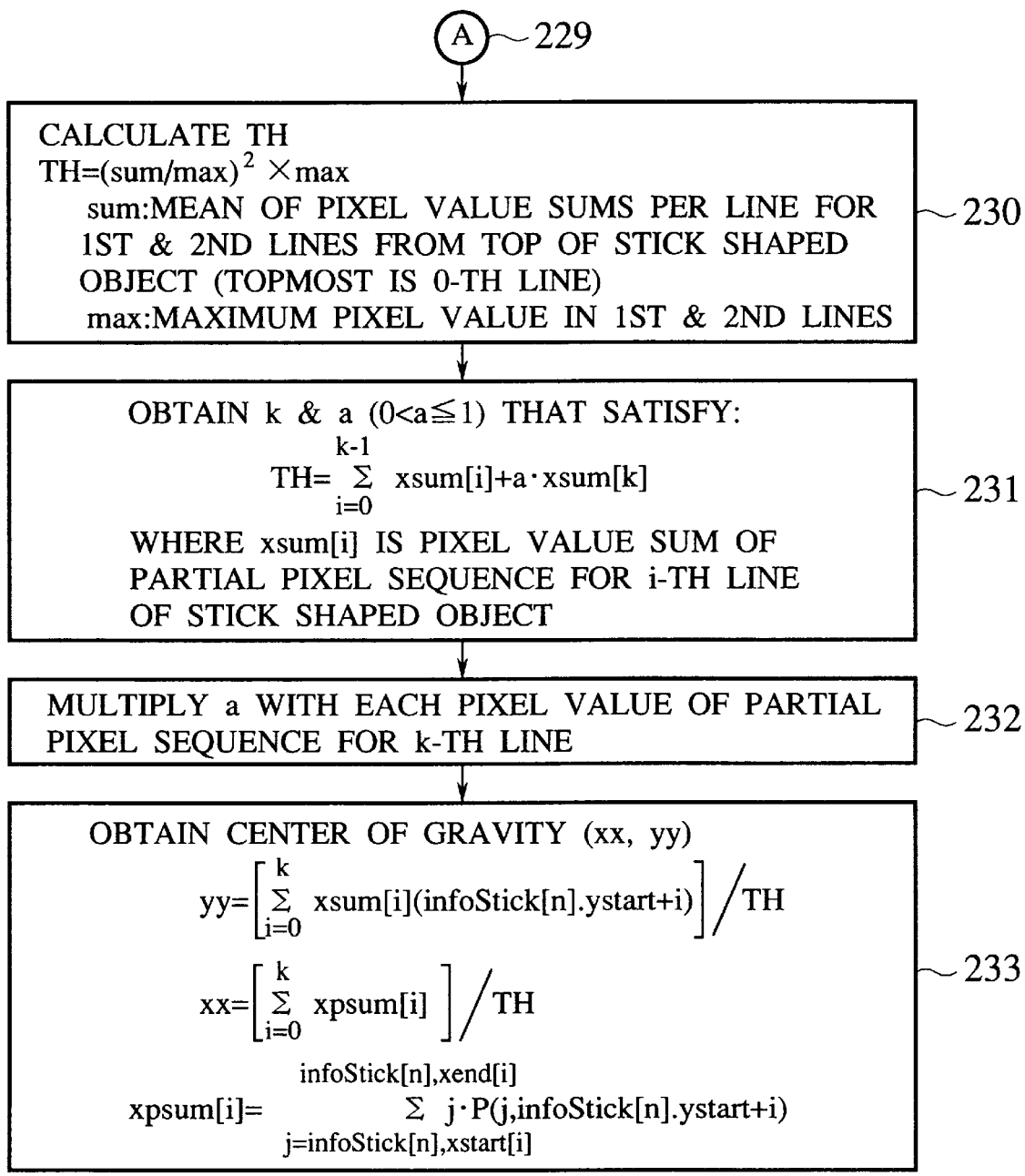
FIG. 14 is a flow chart for a second half of the operation carried out by the feature data generation unit of FIG. 9.

FIG. 14 shows the processing of the stick shaped object tip end extraction unit 214 and the center of gravity detection unit 215. When the condition of the step 227 of FIG. 13 is satisfied, the processing proceeds to the step 229 of FIG. 14.

At the step 230, a parameter TH for the purpose of extracting the tip end of the stick shaped object is obtained. This threshold may be a fixed one, but it can also be determined according to the size and the pixel values of the tip end portion of the stick shaped object as in the step 230. When the formula shown in the step 230 is used, a difference between the lengths of the extracted tip end portion in the vertical and horizontal directions does not become so large even when the pixel values are changed as a result of different finger thicknesses or different distances. A first ratio of a thickness of a stick (i.e. the pixel value sum in one line, where the 0-th line is excluded from the calculation because it is at the tip end which often has no thickness) and the maximum pixel value for one pixel is obtained, and a second ratio of TH (i.e. the pixel value sum of the extracted portion) and the maximum pixel value is set to be a square of the first ratio. It is also possible to obtain TH by the calculation method other than this.

Figure 17:
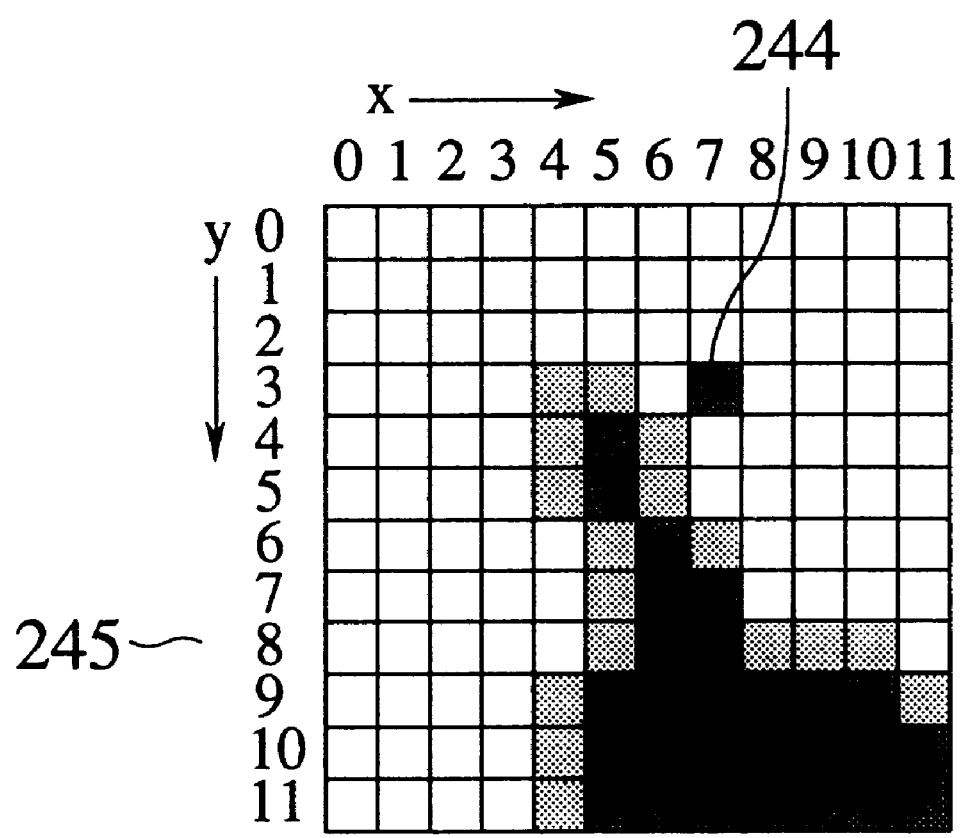
FIG. 17 is a diagram showing another exemplary reflected light image that can be used in the second embodiment of the present invention.

At the step 231, the value a and k described above are obtained according to the above equation (1) by using TH obtained by the step 230. In the above equation (1), the calculation is made by using a rectangular region, but in the step 231, the calculation is made by using only the partial pixel sequence of each line. In this manner, the influence of the noise at the position unrelated to the stick shaped object within the rectangular region can be reduced. For example, when the finger is pointing to an oblique direction as shown in FIG. 17, the influence of a noise 244 can be avoided.

At the step 232, a value a obtained at the step 231 is multiplied with each pixel value of the k-th line.

These steps 230 to 232 constitute the processing of the stick shaped object tip end extraction unit 214.

Then, at the step 233, the center of gravity is calculated by using the values a and k and the corrected pixel values. In principle, the x-coordinate of the center of gravity is given by a sum of the products of respective pixel values and x-coordinate values in the partial pixel sequences up to the k-th line divided by TH (which is equal to a total sum of the pixel values), and the y-coordinate of the center of gravity is given by a sum of the products of respective pixel values and y-coordinate values in the partial pixel sequences up to the k-th line divided by TH (which is equal to a total sum of the pixel values). Here, xsum[i] is known, so that the y-coordinate of the center of gravity is obtained as a product of this xsum[i] and the y-coordinate (infoStick[n].ystart+i) divided by TH. Here, of course, xsum[k] is re-calculated by the corrected pixel values. xpsum[i] is a sum of products of respective pixel values and x-coordinate values in the partial pixel sequence of the i-th line, and the x-coordinate of the center of gravity is calculated by using this xpsum[i] in the formula shown in FIG. 14.

Up to this point, the processing has been described for a case of dealing with an image in which the finger is extended in the direction perpendicular to the optical axis of the photo-detection sensors. In practice, however, the finger is often also pointed along the direction of the optical axis of the sensors. In the following, the method for obtaining the position of the finger tip which is pointing toward the sensors will be described.

Figure 18:
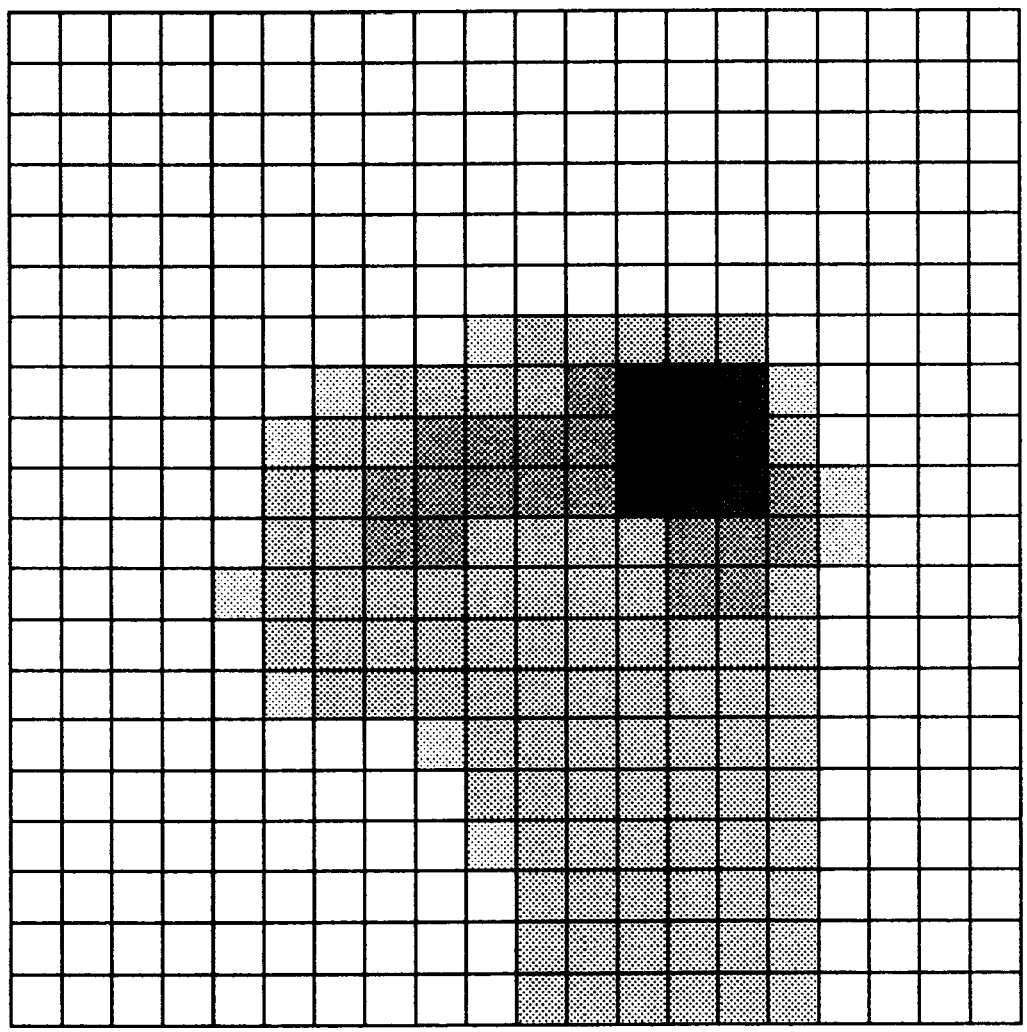
FIG. 18 is a diagram showing another exemplary reflected light image that can be used in the second embodiment of the present invention.

In a case where the finger is extended along the optical axis direction (toward the sensors), the reflected light image appears as shown in FIG. 18, where a portion corresponding to the finger tip has the pixel value that is abruptly increased. In FIG. 18, the blacker pixel indicates the pixel with the larger pixel value. Here, it is possible to merely find the extremum point of the pixel values and use it as the pointing position. The calculation processing in such a case will be very simple. However, in such a method, it is impossible to obtain the finger tip position at the precision better than the resolution of the image. Here, similarly as in a case of extending the finger upwards (toward the direction perpendicular to the optical axis direction), a method for obtaining the finger tip position at the precision better than the resolution of the image will be described.

First, a pixel where the pixel value is the maximum is found. This can be done easily by the comparison of the pixel values. Then, for a surrounding small region $\Gamma$ of this pixel, the coordinate of the finger tip position is determined by the following expression (5).

$$\left( \frac{\sum_{\Gamma} x \cdot P(x, y)}{\sum_{\Gamma} P(x, y)}, \frac{\sum_{\Gamma} y \cdot P(x, y)}{\sum_{\Gamma} P(x, y)} \right) \quad (5)$$

This can be regarded as the center of gravity of the pixels within the small region. As for the surrounding small region $\Gamma$, it is customary to set it to be a rectangular region such as 3×3 or 5×5, but it is not necessarily limited to this, and it can be non-rectangular region. By using this formula, not just the pixel at the maximum point but its surrounding pixels are also taken into account.

Figure 19:
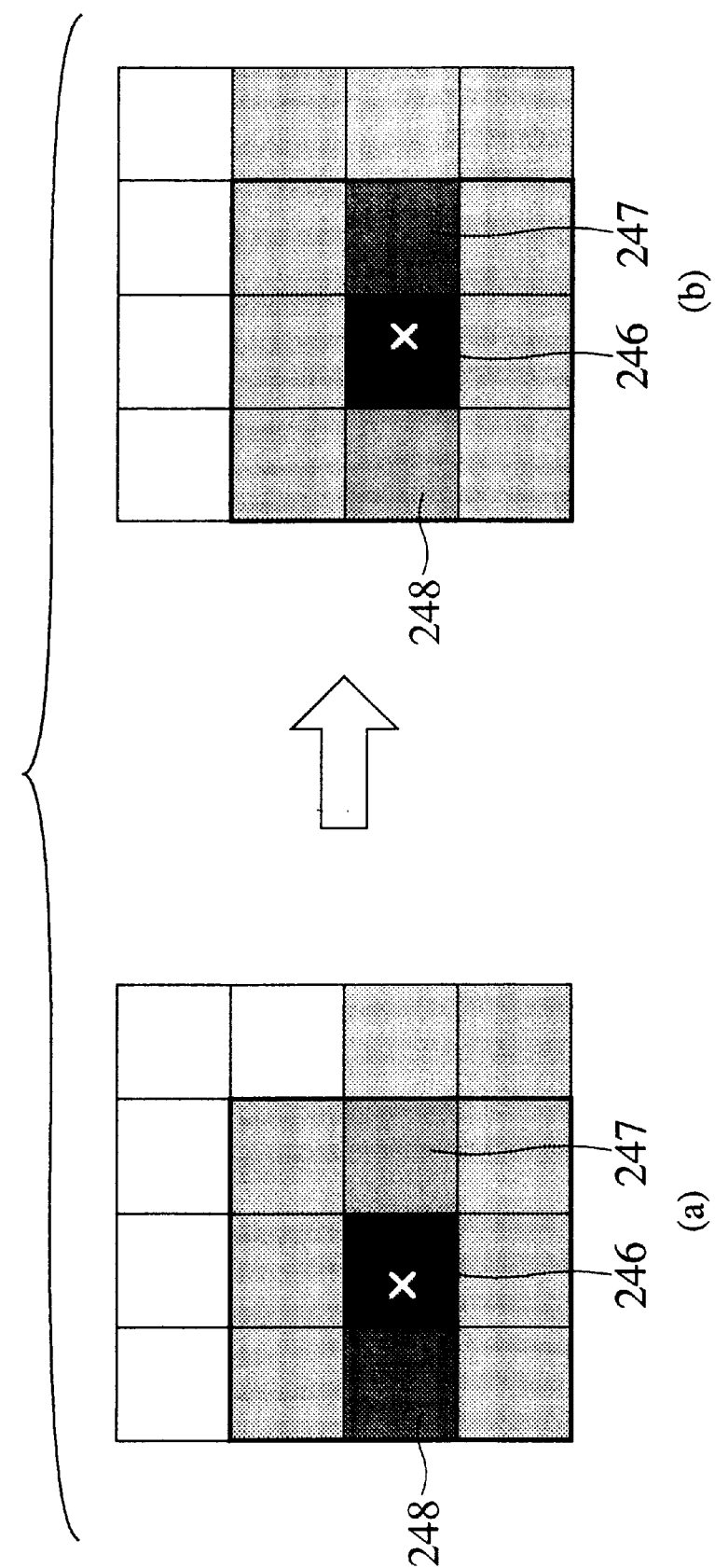
FIG. 19 is a diagram for explaining additional aspect of the operation carried out by the feature data generation unit of FIG. 9.

For example, consider a case where the finger tip position has slightly changed, as from a state shown in a part (a) of FIG. 19 to a state shown in a part (b) of FIG. 19, where a region enclosed by the bold line is the small region $\Gamma$. Here, the change is so small that the coordinates of the maximum point 246 is unchanged. However, the pixel values of the surrounding pixels are changed, in such a manner that the pixel value of the surrounding pixel 247 on one side become slightly larger while the pixel value of the surrounding pixel 248 on the other side becomes slightly smaller, for example. This change can be taken into account by using the above formula, as shown in FIG. 19 where the center of gravity position indicated by the X mark is slightly changed accordingly.

Thus, it is possible to detect the finger tip position at the precision better than the resolution of the reflected light image in this manner. This calculation can also be realized by the formula other than that of the above expression (5). For example, the following expression (6) may be used instead.

$$\left( \frac{\sum_{\Gamma} x(P(x, y) - Pmin)}{\sum_{\Gamma} (P(x, y) - Pmin)}, \frac{\sum_{\Gamma} y \cdot (P(x, y) - Pmin)}{\sum_{\Gamma} (P(x, y) - Pmin)} \right) \quad (6)$$

where Pmin is the minimum pixel value in the small region $\Gamma$. The effect of using this expression (6) is as follows.

For example, consider a case where the finger tip position has moved so that a portion of the reflected light image has changed as in states shown in parts (a) to (c) of FIG. 20, where a region enclosed by the bold line is the small region $\Gamma$, and the X mark shown in the small region indicates the center of gravity position calculated by the above expression (5).

In the change from a state (a) to a state (b), the finger tip has slightly moved to the right. Accordingly, the value of the pixel 249 is slightly decreased while the value of the pixel 250 is slightly increased. The center of gravity position (X mark) is also moved slightly to the right. In this case, the center of gravity position also changes according to the movement of the finger.

In the change from a state (b) to a state (c), the coordinates of the maximum pixel is changed, so that the position of the small region Γ is also changed.

Now, consider states immediately before and after the maximum pixel position change. Immediately before the maximum pixel position change, the values of the pixels 249 and 250 in a state (b) are almost the same. Nevertheless, when the above expression (5) is used, the center of gravity position is displaced from a middle point between the pixels 249 and 250, toward the left side, because of the weights of the surrounding pixels. On the other hand, immediately after the maximum pixel position change, the values of the pixels 249 and 250 are also almost the same, but the center of gravity position is displaced toward the right side this time, also because of the weights of the surrounding pixels. This implies that the center of gravity position does not move smoothly between immediately before and after the maximum pixel position change. In other words, it is difficult to point a middle point between the pixels 249 and 250 in a case of using the above expression (5).

In contrast, in a case of using the above expression (6), the minimum pixel value within that small region is subtracted from the pixel value sum within the small region, so that the influence due to the surrounding pixels becomes smaller, and the center of gravity position immediately before and after the maximum pixel position change can be located near the middle point between these two pixels.

Which one of these expressions (5) and (6) is to be used in the pointing position calculation can be determined according to the factors such as a relationship between a size of a region occupied by a single pixel and a size of the finger, the required precision for the pointing position, etc. When a region occupied by a single pixel is small (i.e. when the resolution of the reflected light image is relatively high), or when the required precision is low, the requirement on the center of gravity calculation is not severe.

It is also possible to provide the hysteresis characteristic to the pointing positions, so as to realize the satisfactory pointing operation. For example, in a case of obtaining the pointing position in 0.1 pixel unit (with respect to the pixel of the reflected light image) by rounding it to the one decimal, when the coordinate value near 10.05 is obtained, values 10.0 and 10.1 will appear unstably or alternately so that a cursor will be fluttered if a cursor is displayed. In such a case, it is possible to avoid calculating such an unstable pointing coordinate by giving a hysteresis characteristic in which the increase of the coordinate value over 0.07 is rounded to the increase by 0.1 and the decrease of the coordinate value below 0.03 is rounded to the decrease by 0.1 when the change of the calculated coordinate value is small.

In the above described processing, the maximum pixel value within the small region indicates the distance to the finger tip, so that it is possible to carry out the three-dimensional pointing by using it. Also, when the motion of pushing by the finger can be captured as a motion in the depth direction as in the example described above, it is possible to realize the clicking by using it.

In the above, the method for detecting the finger tip position at the precision better than the resolution of the reflected light image has been described for two cases including a case where the finger is extended upwards (along the direction perpendicular to the optical axis of the photo-detection section) and a case where the finger is extended forward (toward the photo-detection section). In the practical use, it is often difficult to determine the direction of the extended finger as either one of these two, because the direction for extending the finger may be different for different users or may be changed by the same user at different occasions. Consequently, by judging the direction to which the finger is currently extended, and using the detection method suitable for the judged direction, it becomes possible to obtain the finger tip position stably regardless of the direction to which the finger is pointing.

Now, by using the finger tip position obtained in the above, the cursor on the screen can be controlled. When the finger tip position is set in correspondence to the cursor position within the screen, the cursor is displayed at the corresponding position when the finger is extended. Also, when the finger is moved, the cursor is also moved. When the finger is withdrawn, the cursor disappears. However, these functions alone cannot provide an equivalent of the mouse button. To this end, instead of pushing the mouse button (clicking), the cursor is set to be stationary in this embodiment.

Figure 21:
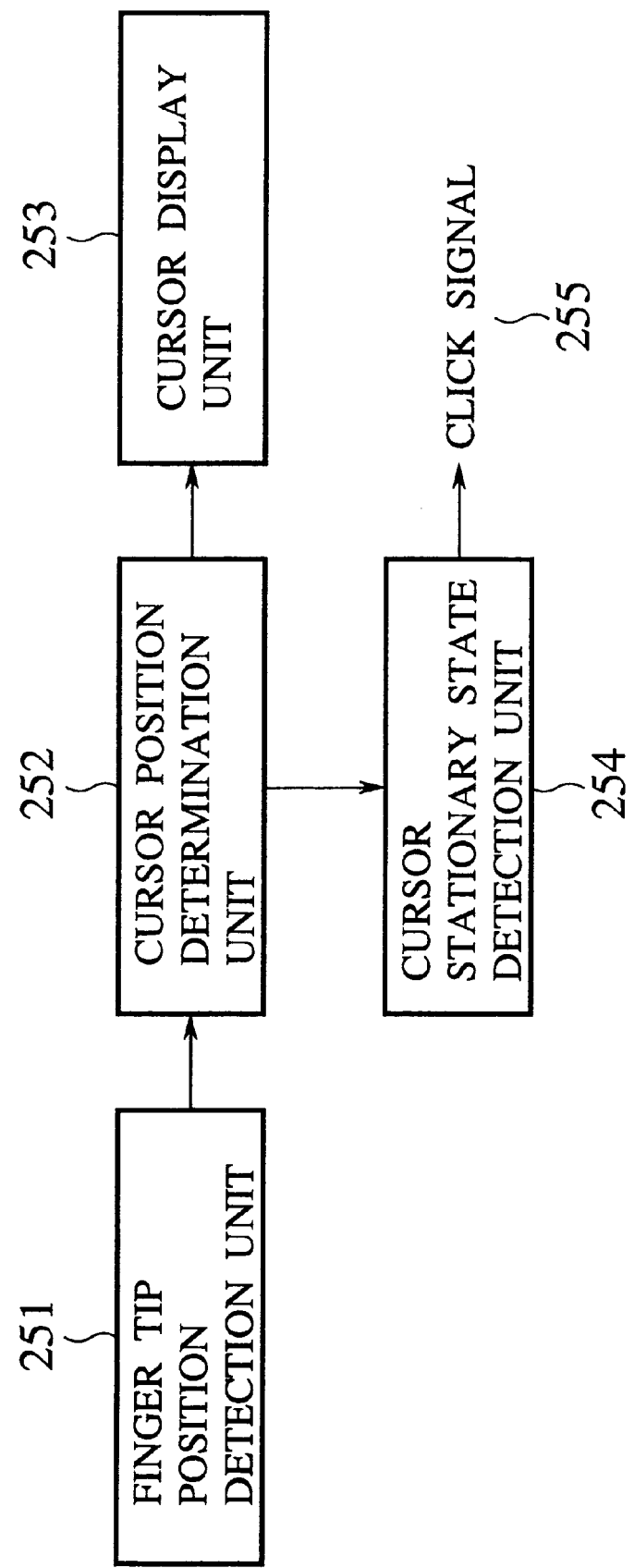
FIG. 21 is a block diagram showing another exemplary configuration of a feature data generation unit according to the second embodiment of the present invention.

FIG. 21 shows a configuration for realizing these functions. In FIG. 21, a finger tip position detection unit 251 obtains the finger tip position at the precision higher than the resolution of the reflected light image as explained above.

A cursor position determination unit 252 determines a position to display the cursor according to the finger tip position. The simplest method for this this is to set the finger tip position and the cursor position in one-to-one correspondence. However, the obtained finger tip position may contain noises or minute vibrations of the human hand, so that the cursor would be minutely vibrating if the cursor position is uniquely determined from the finger tip position. It is possible to quantize the cursor positions to such a level that the minute vibrations can be eliminated, but then the precision will be lowered.

These minute vibrations can be suppressed by applying a low pass filter using the finger tip positions over the past several frames. For example, when the latest finger tip position is (x0, y0) and the finger tip position in n frames earlier time is (xn, yn), the cursor position (x, y) can be determined by the following equation (7).

$$(x, y) = \left( \sum_{i=0}^{k} a_i \cdot xi, \sum_{i=0}^{k} a_i \cdot yi \right) \quad (7)$$

Here, k indicates the finger tip positions of how many previous frames should be taken into account, and when this is too large, the cursor movement tends to react with delay in response to the finger movement. Also, ai is a weight for each finger tip position in the past.

It is also possible to consider the processing in which, after the cursor position at some point is determined, the original position is retained stationary until the new position is separated from the original position by more than a prescribed distance. In this manner, even when there are minute vibrations, the cursor position will remain unchanged and the cursor only moves when the finger is moved largely.

It is also possible to utilize the fact that the direction of the movement is unstable in a case of the minute vibrations, such that the cursor is kept stationary until the movements into the same direction are made for more than a prescribed number of times, and the cursor position is updated only when the movements into the same direction are made for more than a prescribed number of times.

A cursor display unit 253 displays the cursor on the screen according to the cursor position determined by the cursor position determination unit 252.

A cursor stationary state detection unit 254 monitors a change in time of the cursor position, and when the cursor is detected to be in the stationary state (or moving little) for over a prescribed period of time, a click signal 255 is generated. Using this configuration, it is possible to move the cursor by the finger, and carry out the click operation by setting the cursor stationary.

In a case of using the mouse, the click operation is carried out explicitly by the operator by pushing the mouse button. However, when the click signal is to be generated by setting the cursor stationary, there can be cases where the click is made without being noticed by the operator, and this may cause some inconvenience in some cases. In this regard, the cursor display unit 253 can monitor the click signal generation and changes the shape of the cursor when the click signal is generated, so that it is possible to provide a feedback to the operator indicating the occurrence of the click.

For example, consider a case of carrying out the operation to select one option from the pull down menu. First, the cursor appears as the finger is extended, so that the operator moves the finger in order to move the cursor to a position of the menu item. When the cursor is set stationary for a prescribed time after it has been moved on that menu item, the pull down menu appears. Then, when the finger is further moved downwards, the cursor moves while reversing the menu display. Then, when the cursor is set stationary at a desired menu option, that menu option command is activated.

Note that this method may seem to introduce many erroneous operations, because when the mouse is used the cursor always remain stationary while the mouse is not operated. However, in this method, the cursor disappears when the finger is not extended, and the finger is extended only purposefully (in order to select some menu option, for example), so that it is highly unlikely for the cursor to be set stationary before the cursor reaches to the target position. Consequently, it is quite natural in this embodiment to replace the usual click operation by the operation to set the cursor stationary.

In the above described example, only the tip end portion is extracted from the image of the finger tip and its center of gravity is obtained. By means of this, it is possible to realize the two-dimensional pointing such as the pointing on the computer screen. By capturing the feature quantity indicating the motion in the depth direction (approaching to or moving away from the photo-detection section) in addition, it also becomes possible to input more than just the two-dimensional information, or the three-dimensional information.

For example, when the motion of "approaching a little and then moving back" is detected, it is possible to generate a signal corresponding to the mouse click. By means of this, it becomes possible to move the cursor by the finger and make a selection from the menu by making an action of "pushing".

Also, although it is not possible to input the distance to the finger rigorously, it is still possible to detect "approaching" or "moving away" in the relative sense, so that it is possible to combine this information with the feedback by the display so as to realize the input of the three-dimensional position information. Namely, in a case where the finger is extended upwards, when the finger moves in the depth direction, the received light amount at the photo-detection element which is photo-detecting the reflected light from the finger increases or decreases. Also, apart from the output of each photo-detection element, a number of pixels occupied by the finger also increases or decreases. When the finger approaches, the width of the extended finger becomes larger, from 1.5 pixel part to 2 pixel part, for example.

In the above described example, in a case of detecting, the stick shaped object by scanning the horizontal lines, the stick shaped object is judged to be present when there are consecutive lines in which the partial pixel sequence appear at the same position. Here, the pixel value sum in the partial pixel sequence on one line can be utilized as a quantity corresponding to the distance. When the finger is extended forward, the pixel value sum in the small region $\Gamma$ described above can be used as a quantity corresponding to the distance.

Also, apart from extracting the distance information, it is also possible to utilize it as an information for determining an appropriate size of the small region. For example, when the finger tip is too large with respect to the small region $\Gamma$, all the pixels within the small region $\Gamma$ have equally high values. In such a case, there are too many candidates for the maximum point and the maximum point position cannot be obtained stably, so that the small region is enlarged. Also, in such a case, instead of simply setting the maximum point at the center of the small region, a center of a group of pixels having pixel values above a certain value can be set at a center of the small region $\Gamma$ and the size of the small region $\Gamma$ can be enlarged such that pixels having pixel values smaller than that certain value will be included at the peripheral portion.

Figure 22:
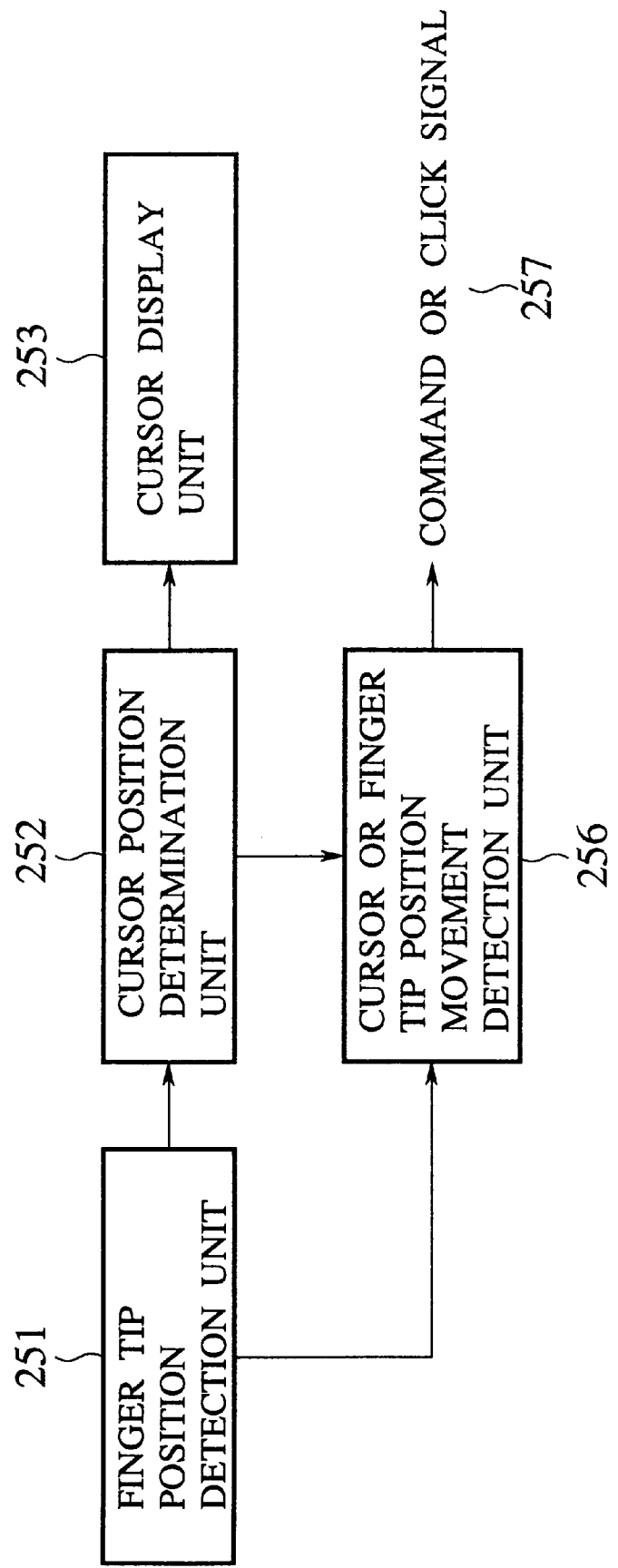
FIG. 22 is a block diagram showing another exemplary configuration of a feature data generation unit according to the second embodiment of the present invention.

It is also effective to utilize various finger tip gestures as commands, in addition to a case of "pushing" described above. FIG. 22 shows a configuration which can recognize the operator's finger action and utilize it as the input information. For example, when the cursor is moved above some icon, and then the finger action in a form of "=" is made, a command related to that icon can be activated. Also, when the finger action drawing a circle is made, an object within the circle is selected. In FIG. 22, a cursor or finger tip position movement detection unit 256 monitors the movement of the finger tip or the cursor, and when there is a movement matching with the pre-registered one, a corresponding command or the click signal 257 is outputted.

It is also possible to utilize the cursor position in relation to the button state as the input information. For example, the cursor is moved above some menu option by moving the finger, and then a button is depressed to select that menu option. Also, when the finger is moved while the button is depressed on some icon, the icon can be moved. In this manner, the operations such as click and drag of the mouse can be realized by using the button similarly as the mouse button. Here, the button should preferably be provided at such a position where the operator extending one hand for the purpose of controlling the cursor can conveniently depress the button by another hand. In this manner, it is possible to realize a quicker click operation than a case of setting the finger stationary or a case of making the "pushing" action. It is also possible to give the operator a real impression of having done some operation. This is effective when both hands can be freely used.

In contrast, it is preferable to be able to carry out the click operation by one hand when the cursor is to be operated by one hand with respect to a wrist watch like very compact portable information device worn on another hand, or with respect to a compact portable terminal held by another hand.

As described, according to this second embodiment, it becomes possible to realize the pointing without requiring the user to wear anything special, so that the burden on the user can be reduced significantly.

<Third Embodiment>

Referring now to FIG. 23 to FIG. 34, the third embodiment of the present invention will be described in detail.

This third embodiment is directed to another exemplary case of the feature data generation unit of the first embodiment, which realizes a gesture camera for recognizing the hand action easily and its application as a pointing device in the three-dimensional space.

Figure 23:
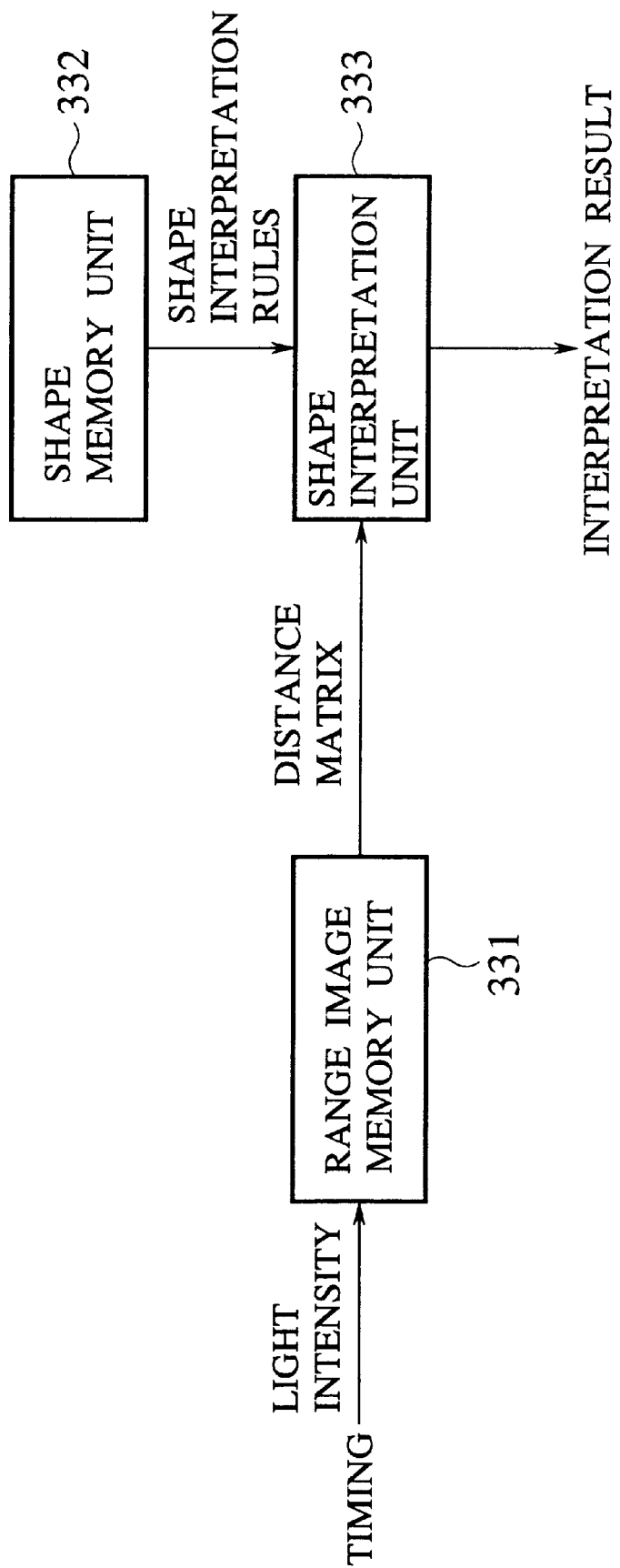
FIG. 23 is a schematic block diagram showing an exemplary configuration of a feature data generation unit according to the third embodiment of the present invention.
Figure 24:
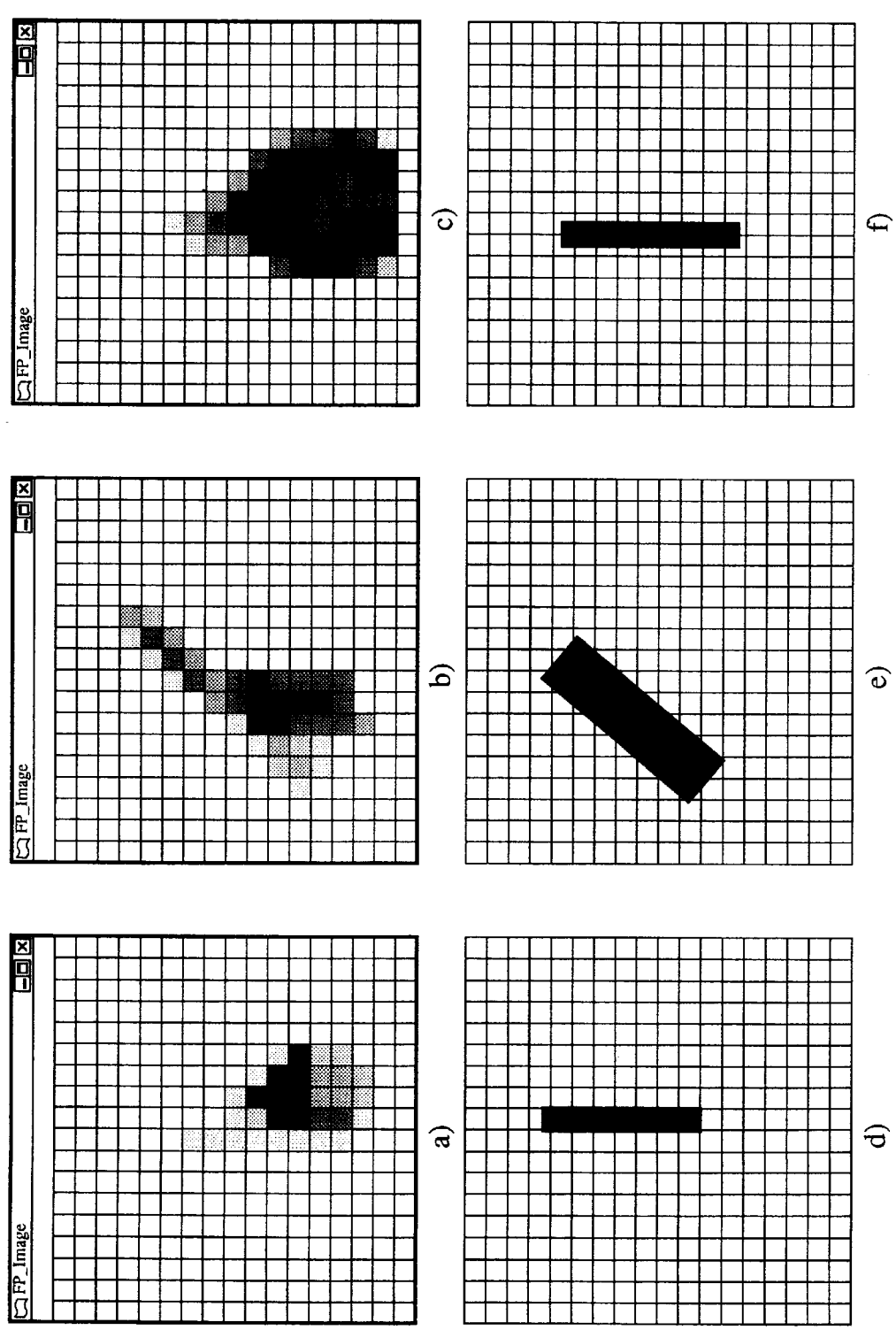
FIG. 24 is a diagram showing exemplary reflected light images and rectangles extracted therefrom used in the feature data generation unit of FIG. 23.

FIG. 23 shows an exemplary configuration of the feature data generation unit according to this third embodiment, which comprises: a range image memory unit 331 for storing the distance information extracted by the reflected light extraction unit in a form of N×N matrix as shown in FIG. 24, for example; a shape memory unit 332 for storing shape interpretation rules; and a shape interpretation unit 333 for interpreting a shape of the distance matrix stored in the range image memory unit 331 according to the shape interpretation rules stored in the shape memory unit 332.

Figure 25:
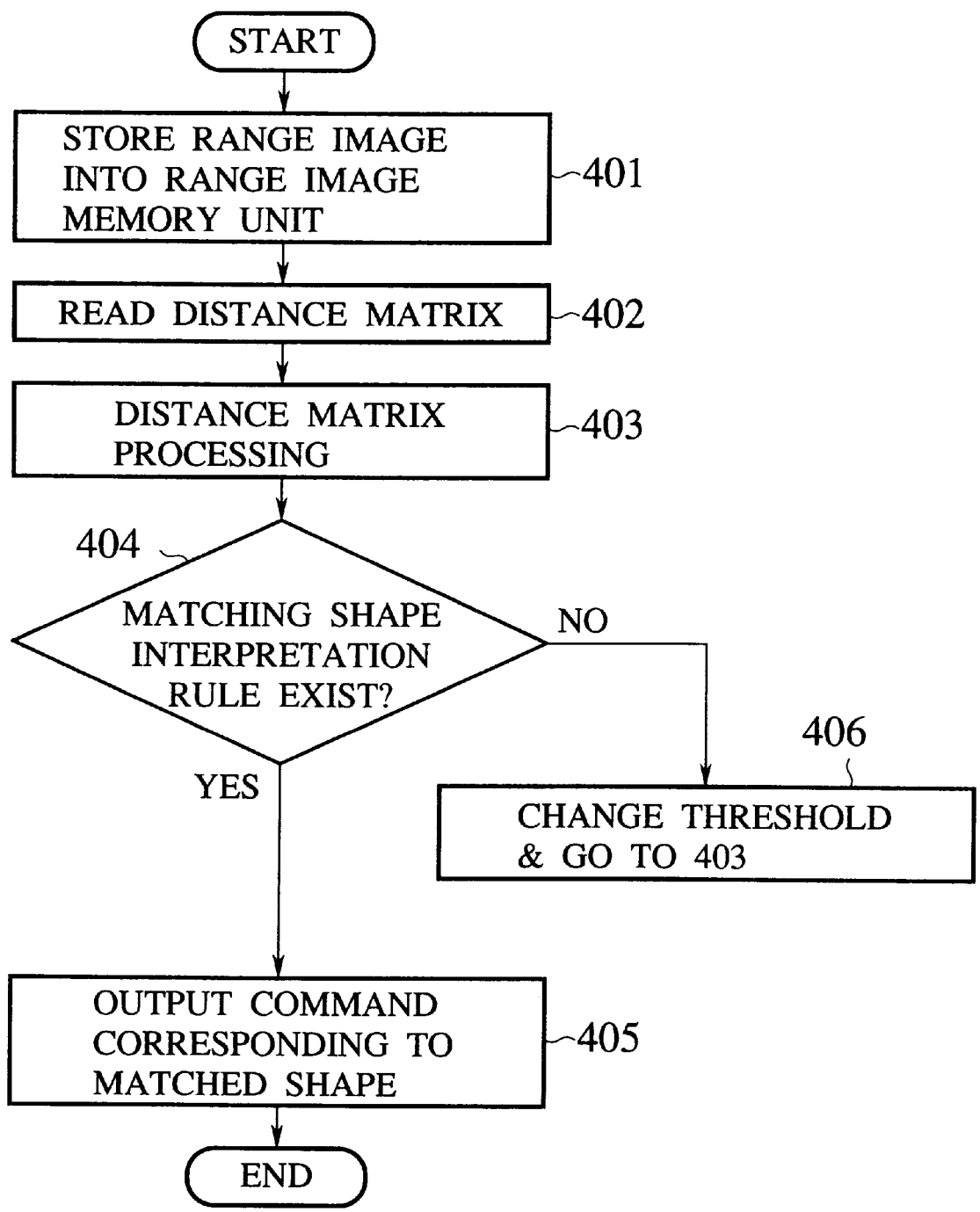
FIG. 25 is a flow chart for the operation carried out by the feature data generation unit of FIG. 23.

FIG. 25 shows the flow chart for the shape recognition processing carried out by this feature data generation unit of FIG. 23.

First, the range image extracted by the reflected light extraction unit is registered into the range image memory unit 331, in 256 step gradation, for example (step 401). The registered range image is then read out to the shape interpretation unit 333 in a form of N×N matrix (where N is 16, for example) as shown in FIG. 24, for example (step 402). The shape interpretation unit 333 carries out the processing for extracting only those cells which are reaching to a prescribed threshold, from the distance matrix (step 403). In addition, the processing necessary for the matching at the step 404 is also carried out here. There are many matching schemes, and accordingly there are many types of processing that can be carried out here, such as a vectorization for extracting a vector from an image, an extraction of a deformation state of a shape according to a shape model, a spectrum analysis based on the distance value on the scanning line, etc.

Here, for the sake of simplicity, a case of using the matching scheme according to a rectangle extracted from the shape will be described. For example, parts (a), (b) and (c) of FIG. 24 show the range images when the index finger is pointed upwards, towards the right, and obliquely upwards, respectively. With respect to each of these range images, a rectangle is formed by joining midpoints of cells with high intensities (the intensity is higher for a darker cell in FIG. 24). The resulting rectangles for the range images of parts (a), (b) and (c) of FIG. 24 are as shown in parts (d), (e) and (f) of FIG. 24, respectively. As a result, according to the obtained normalized distance matrices, the rectangles as shown in parts (d), (e) and (f) of FIG. 24 are extracted in this example, and the matching, with the shapes stored in the shape memory unit 332 is carried out (step 404).

FIG. 26 shows an example of the shape interpretation rules stored in the shape memory unit 332. For example, for each of the range images of parts (a), (b) and (c) of FIG. 24, there is only one rectangle so that the first RULE-1 of FIG. 26 is matched. The matching result of this RULE-1 is the pointing, so that next the matching with respect to the pointing rule is made. In the pointing rule, the vertical and horizontal check is carried out first. A part (a) of FIG. 24 matches with a rule that vertical/horizontal ratio is greater than 1, for example. As a result, the slope check-2 is carried out next. In the slope check-2, the slope is nearly equal to 0 and parts at closer distances (darker cells) are present at the upper section, i.e., the center of gravity is located in the upper section in this case, so that the first rule is matched, and therefore the matching result is a command for turning upward. When the matching shape is found, a command corresponding to that shape is outputted (step 405). If there is no matching shape, the threshold is changed (step 406), and the matching processing is carried out again.

In a case of utilizing this third embodiment as a pointing device in the three-dimensional space, it is necessary to provide the depth coordinate.

Figure 27:
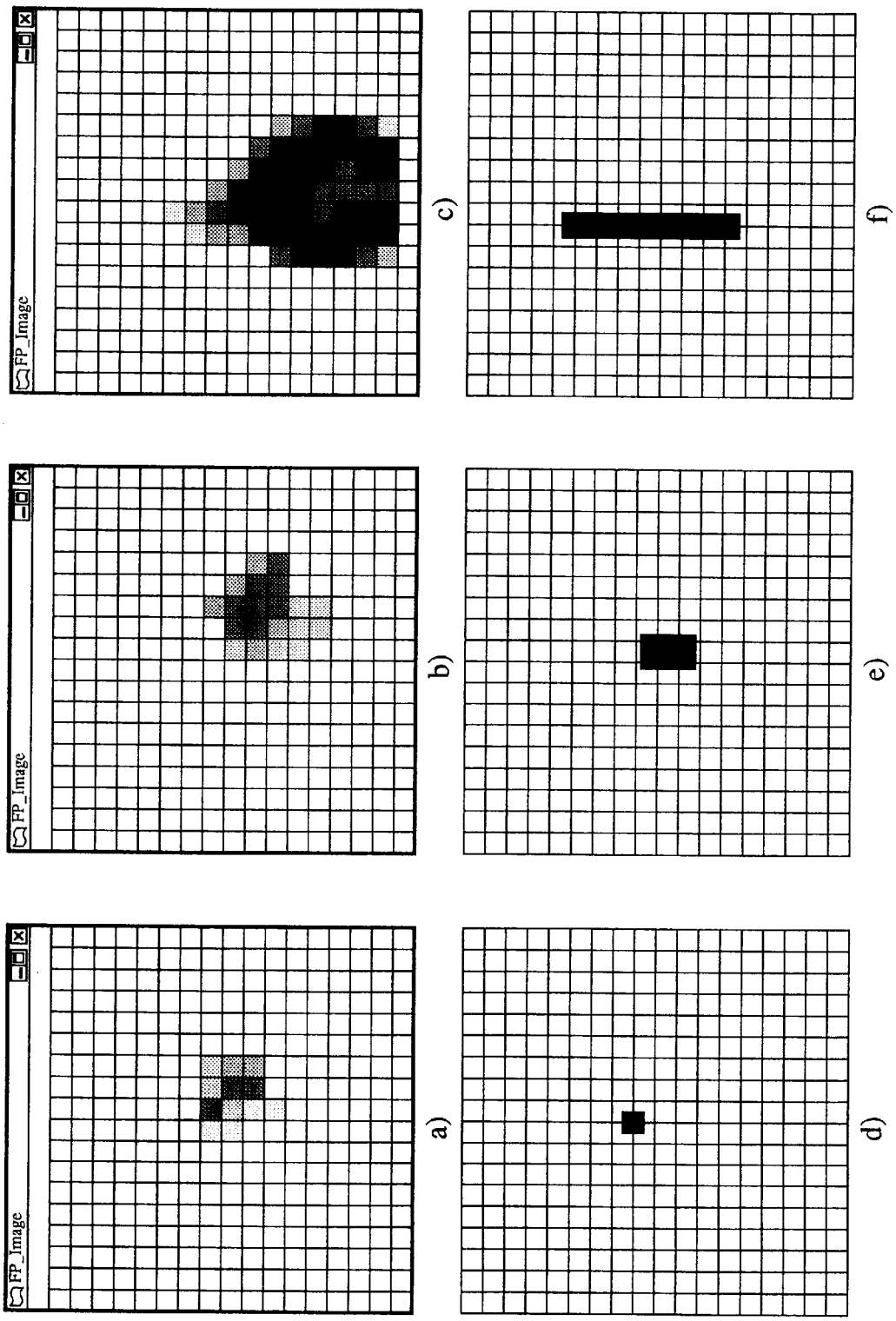
FIG. 27 is a diagram showing another exemplary reflected light images and rectangles extracted therefrom used in the feature data generation unit of FIG. 23.

FIG. 27 shows the distance matrices in a case of using the finger as the three-dimensional pointing device. A part (a) of FIG. 27 shows a state in which the index finger is extended and the other fingers are turned in. Parts (a) and (b) of FIG. 27 shows the same hand action but the distance of the closest part is closer in the part (b) than the part (a) of FIG. 27. According to the shape interpretation rules of FIG. 26, both parts (a) and (b) of FIG. 27 match with the RULE-1, and in the vertical and horizontal check, the vertical/horizontal ratio is nearly equal to 1 so that the first rule is matched, so that it is an object select/move forward command.

In the two-dimensional space, it is impossible to move forward toward the screen, so that it is an object select command. In the object select, when the transition time from the part (a) to the part (b) of FIG. 27 is over a prescribed time, it is interpreted that an object on which the cursor is located is selected. In a case of the three-dimensional space, it is possible to move forward into the depth direction, so that it is an object select or move forward command.

In a case of the object select, similarly as in the two-dimensional case, the judgement is made according to the transition time from the part (a) to the part (b) of FIG. 27. On the other hand, in a case of the move forward, the distance becomes closer from the part (a) to the part (b) of FIG. 27, so that an adjustment to make the moving forward speed faster can be made. Else, the actual moving forward is not made in the state of the part (a) of FIG. 27, and the moving forward as much as the distance that becomes closer is made when the hand action of the part (b) of FIG. 27 is made.

In this manner, the viewpoint can be controlled as if the viewpoint is actually located at the finger tip, so that the natural operation can be realized.

In this third embodiment, it becomes possible to easily realize the recognition of the hand action, that has not been possible conventionally unless some special device such as the data glove is worn. Also, in the conventional image processing, the recognition has been difficult as the extraction of the hand image has been difficult, but in this third embodiment, there is no need for the extraction, so that the hand action recognition accuracy can be improved and the processing speed can be increased considerably. It is experimentally confirmed that the processing for 30 times per second is actually possible. This is faster than 0.1 second which is the condition for the human interface with the ideal response speed. Consequently, it is possible to carry out the truly natural operations and its effect is enormous.

Note that the shape interpretation rules of FIG. 26 are just an example, and various modifications are possible. Also, for the sake of simplicity, the matching scheme using the rectangular division is described, but this is also just an example. The shape interpretation rules should be changed according to the matching scheme, and the shape interpretation result should be changed according to the intended application. Also, the 16×16 distance matrix is used in the above description, but the present invention is not limited to this arrangement. If the photo-detector elements can be arranged densely, it is also possible to use the arrangement such as 64×64 or 256×256. The matching scheme and the shape interpretation rules obviously should be changed when the precision of the matrix in increased.

Also, this third embodiment has been described for a case of using the hand jesture recognition as the means for inputting the command in the three-dimensional space and the like into the computer, but the present invention is not necessarily limited to this case. For example, it is also possible to utilize this third embodiment as the means for instructing the power ON/OFF of the TV, the lighting equipment, etc.

Figure 28:
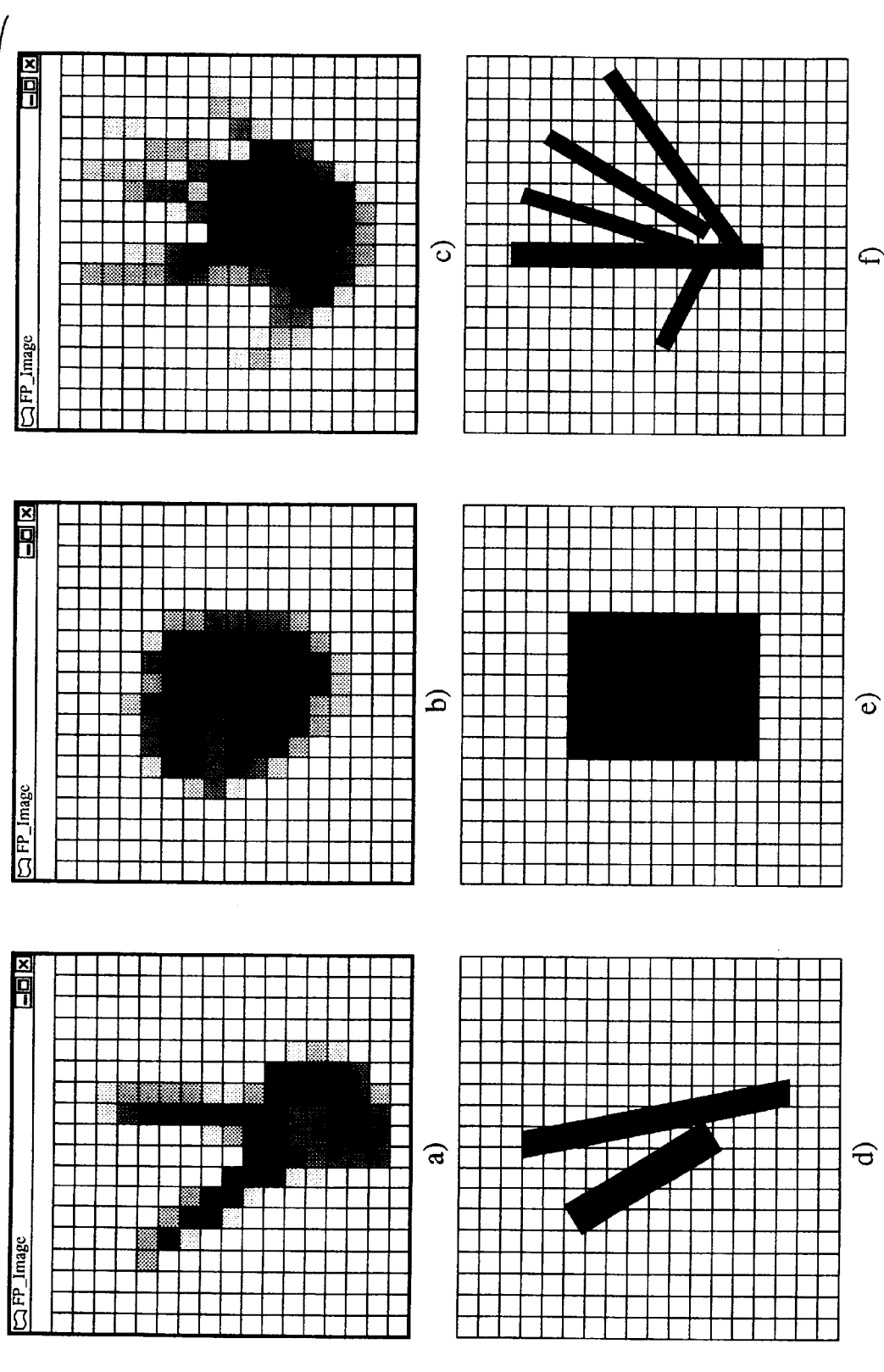
FIG. 28 is a diagram showing another exemplary reflected light images and rectangles extracted therefrom used in the feature data generation unit of FIG. 23.

In such a case, there is a possibility for erroneously recognizing even those jestures which are not intended as commands. In order to prevent an occurrence of such an erroneous commanding, the command input can be given by a combination of a plurality of shapes. For example, the command input is given by alternating the hand opened state and the hand closed state. Parts (a), (b) and (c) of FIG. 28 show exemplary range images of the hand jestures using two fingers, fist, and five fingers, respectively. It is possible to make a setting such that the power is turned ON when the hand jestures of the parts (a), (b) and (c) of FIG. 28 are made in this order, and the power is turned OFF when these hand jestures are made in the reverse order. In this manner, even when the hand or the person moves in front of this device, it is possible to prevent the power from being turned OFF as a result of the erroneous recognition.

The shape interpretation rules to be used by the shape interpretation unit 333 in such a case of giving a command by a combination of a plurality of gestures is as shown in FIG. 29, for example. Here, the interpretation specialized for a case of the power ON/OFF is considered for the sake of simplicity. It is impossible to judge whether it is a single finger or a fist according to a number of rectangles, so that it is judged as a fist here when the area largely exceeds a threshold $\alpha$.

By combining a plurality of gestures in such a manner, it is possible to realize the natural operations for the power ON/OFF of the lighting equipment and the like, without the erroneous operation and without requiring any special tool. Apart from the switch ON/OFF for the home electronic appliances such as lighting equipment and TV, it is also possible to apply this third embodiment as an input device for the bank cash dispenser (automatic teller machine), the automatic ticket vending machine at the station, etc.

Also, this third embodiment has been described for a case of interpreting the shape of the hand, but the present invention is not necessarily limited to this case. For example, it is also possible to control the viewpoint information by recognizing the orientation of the face.

Figure 30:
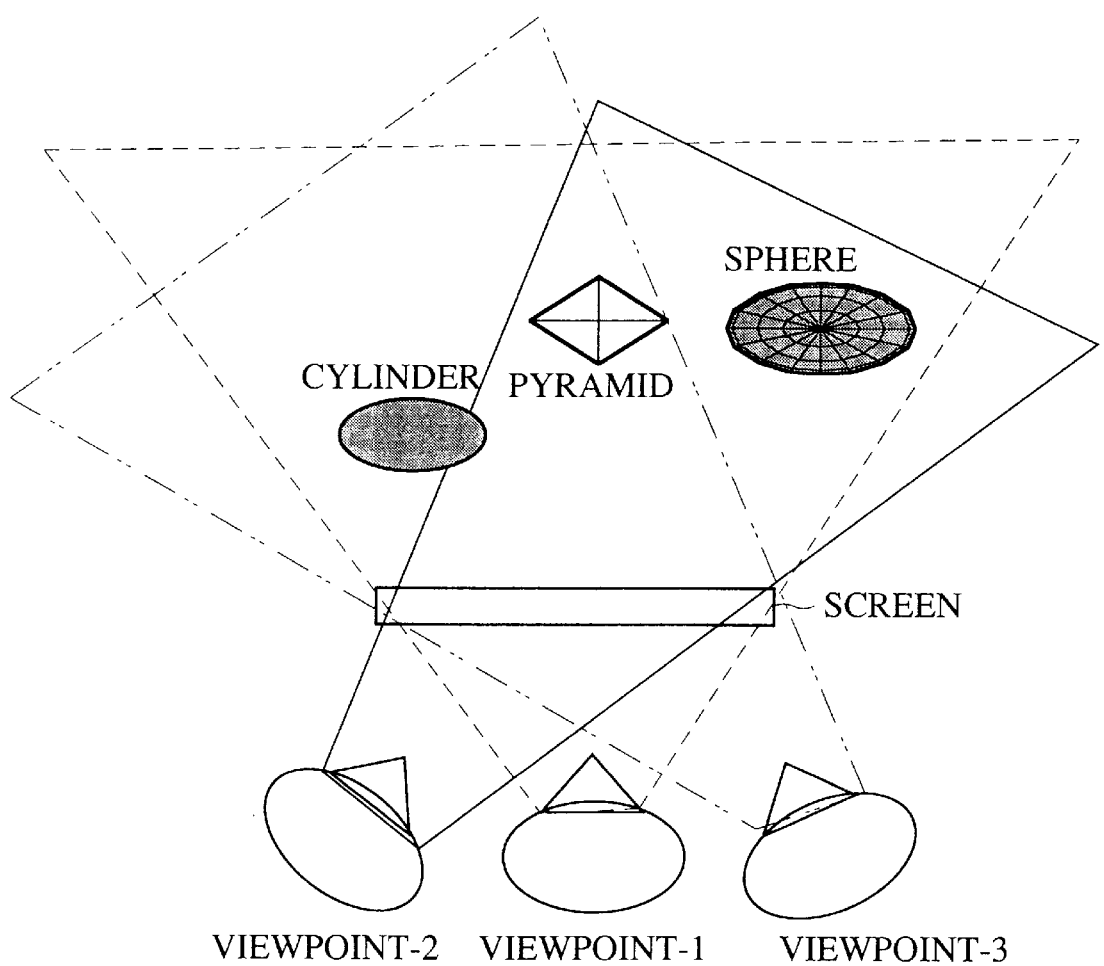
FIG. 30 is a diagram for explaining a viewpoint extraction operation that can be realized by the feature data generation unit of FIG. 23.

FIG. 30 shows a screen and the person facing to this screen along with the three-dimensional objects (cylinder, pyramid, sphere) displayed on this screen, which are viewed from the above, for the purpose of explaining a case where the orientation of the face (that is, the direction of the viewpoint) changes. The viewpoint-1, viewpoint-2 and viewpoint-3 indicates the orientations of the person's face with respect to the screen. The viewpoint-1 is a case where the face is oriented straight toward the screen. The viewpoint-2 is a case where the face is oriented toward the right direction with respect to the screen (an orientation in which the left cheek comes closer to the screen). The viewpoint-3 is a case where the face is oriented toward the left direction with respect to the screen (an orientation in which the right cheek comes closer to the screen).

The three-dimensional objects actually seen from these three viewpoints are as shown in parts (a), (b) and (c) of FIG. 31. Namely, in the viewpoint-1, all three objects can be seen completely, but in the viewpoint-2, a part of the cylinder along the left edge is out of view, whereas in the viewpoint-3, the sphere along the right edge is completely out of view.

It is possible to make a change of these viewpoints by using a finger. For example, it is possible to set a state of pointing the finger vertically with respect to the screen (as in a part (a) of FIG. 27) as a command for the viewpoint-1, a state of pointing the finger toward the right with respect to the screen (as in a part (b) of FIG. 24) as a command for the viewpoint-2, and so on.

The problem with this scheme of controlling the viewpoint by the hand is that the handling is largely different from the viewpoint control in the real world. In the real world, the viewpoint is controlled by the orientation of the face (normally unconsciously) in such a manner that the objects present on the right side are viewed by turning toward the right, and the objects present on the left side are viewed by turning toward the left, and the finger is used for the purpose of pointing a specific object among the visible objects, not for changing the viewpoint. In this regard, the data glove or the space mouse utilized in the conventional VR technology are also associated with the problem that the natural handling cannot be realized.

Figure 32:
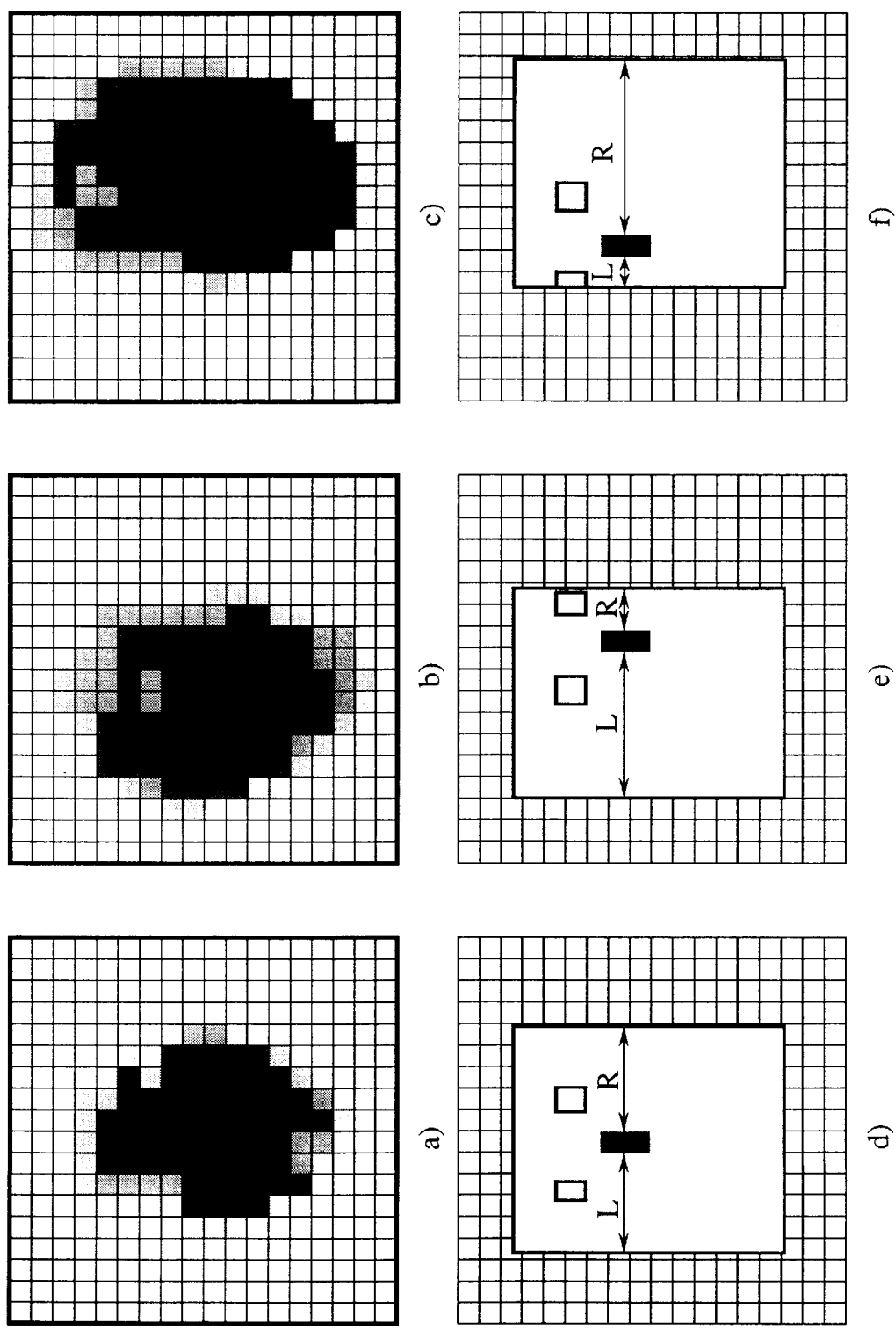
FIG. 32 is a diagram showing exemplary reflected light images and rectangles extracted therefrom used in the viewpoint extraction operation by the feature data generation unit of FIG. 23.

In contrast, according to this third embodiment, the natural handling can be realized as follows. FIG. 32 shows exemplary range images of the face orientations as acquired by the information input generation apparatus of the present invention. A part (a) of FIG. 32 shows a state of the viewpoint-1 in which the face is oriented straight toward the screen, a part (b) of FIG. 32 shows a state of the viewpoint-2 in which the face is oriented toward the right direction, and a part (c) of FIG. 32 shows a state of the viewpoint-3 in which the face is oriented toward the left direction.

Parts (d), (e) and (f) of FIG. 32 shows rectangles extracted from the range images of parts (a), (b) and (c) of FIG. 32, respectively. Here, in order to extract a rectangle corresponding to the nose, three types of rectangles are extracted from the farthest cells (the palest cells, corresponding to the contour portion of the entire face) and the closest cells (the darkest cells, corresponding to the nose) and the farther cells right above the farthest cells (the paler cells, corresponding to the eyes).

FIG. 33 shows one example of the shape interpretation rule for the moving object parallax. Here, for the sake of simplicity, an exemplary shape interpretation rule specialized for a case of recognizing the face orientation is shown.

The RULE-1 checks whether two rectangles corresponding to the entire face and the nose are extracted or not. If not, no particular processing is carried out here (NULL) according to the RULE-2. When these two rectangles are present, according to the face check rule, whether there is a relationship of having the larger rectangle farther and the smaller rectangle nearer or not is checked. If not, it is interpreted that something other than the face is imaged, so that no particular processing is carried out here (NULL). Only when these two rectangles are in the right relationship, the viewpoint direction calculation is carried out according to the following formula (8).

$$L \neq 0 \rightarrow \text{Viewpoint Direction} = arcsin((L-R)/L)$$

$$L=0 \rightarrow \text{Viewpoint Direction} = -90° \quad (8)$$

Here, when L=0, it is interpreted that the face is oriented toward the left direction at 90° so that the nose is present along the left edge, and therefore the viewpoint direction becomes −90°. When the face is oriented straight, L and R are equal so that the numerator becomes 0 and the viewpoint direction becomes 0°. When L is greater than R, the face is oriented toward the right direction as much. When R=0, the viewpoint direction becomes 90° and the nose is present along the right edge so that the face is oriented toward the right direction completely.

In this example, the viewpoint shift between left and right has been described, but the viewpoint control between the viewpoint for looking down from the above and the viewpoint for looking up from the below can also be realized similarly. In such a case, it suffices to recognize whether the position of the nose is upper side or lower side with respect to the face.

By means of the interpretation as described above, it becomes possible to realize the viewpoint change according to the face orientation, and it is possible to realize the natural operations.

Figure 34:
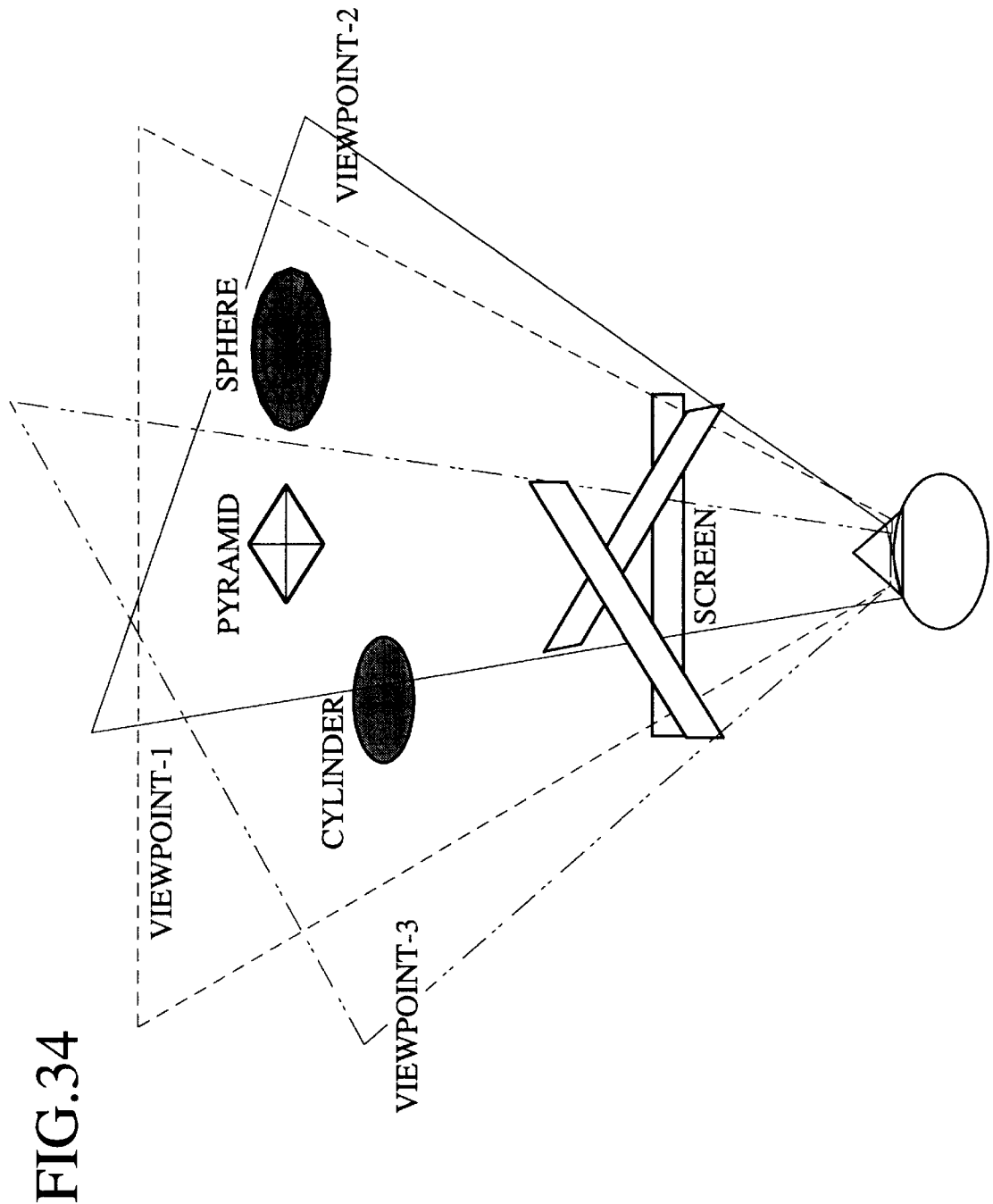
FIG. 34 is a diagram for explaining an alternative way of realizing the viewpoint extraction operation by the feature data generation unit of FIG. 23.

When the information input generation apparatus of the present invention is implemented in a compact size, it can be utilized as an input device for the portable information terminal. In such a case, it is possible to change the position of the portable information terminal with respect to the face, as indicated in FIG. 34. Namely, instead of moving the face, the terminal can be moved by the hands. In this manner, the face orientations in the viewpoint-1 to viewpoint-3 become similar to those shown in FIG. 32, and therefore the viewpoint control similar to a case of FIG. 31 can also be realized. The same also applies to the up and down directions.

In this manner, the true moving object parallax can be realized. In other words, it is possible to realize the truly direct handling for the user as if the large three-dimensional space is seen through a window in a form of the screen of the portable information terminal.

<Fourth Embodiment>

Referring now to FIG. 35 to FIG. 45, the fourth embodiment of the present invention will be described in detail.

The third embodiment described above recognizes a shape and converts it into a command for a computer, which is convenient for such operations as the power ON/OFF, but it is regrettably not suitable for such operations as an operation for giving a motion to a character or changing a speed of the motion in the animation. When such operations are to be handled by the shape recognition alone, it is necessarily in a form of operating a slider and the like for the purpose of adjusting the speed, and it is impossible to manipulate the motion directly. In order to resolve this problem, this fourth embodiment is directed to another exemplary case of the feature data generation unit; of the first embodiment, which realizes a motion input.

Figure 35:
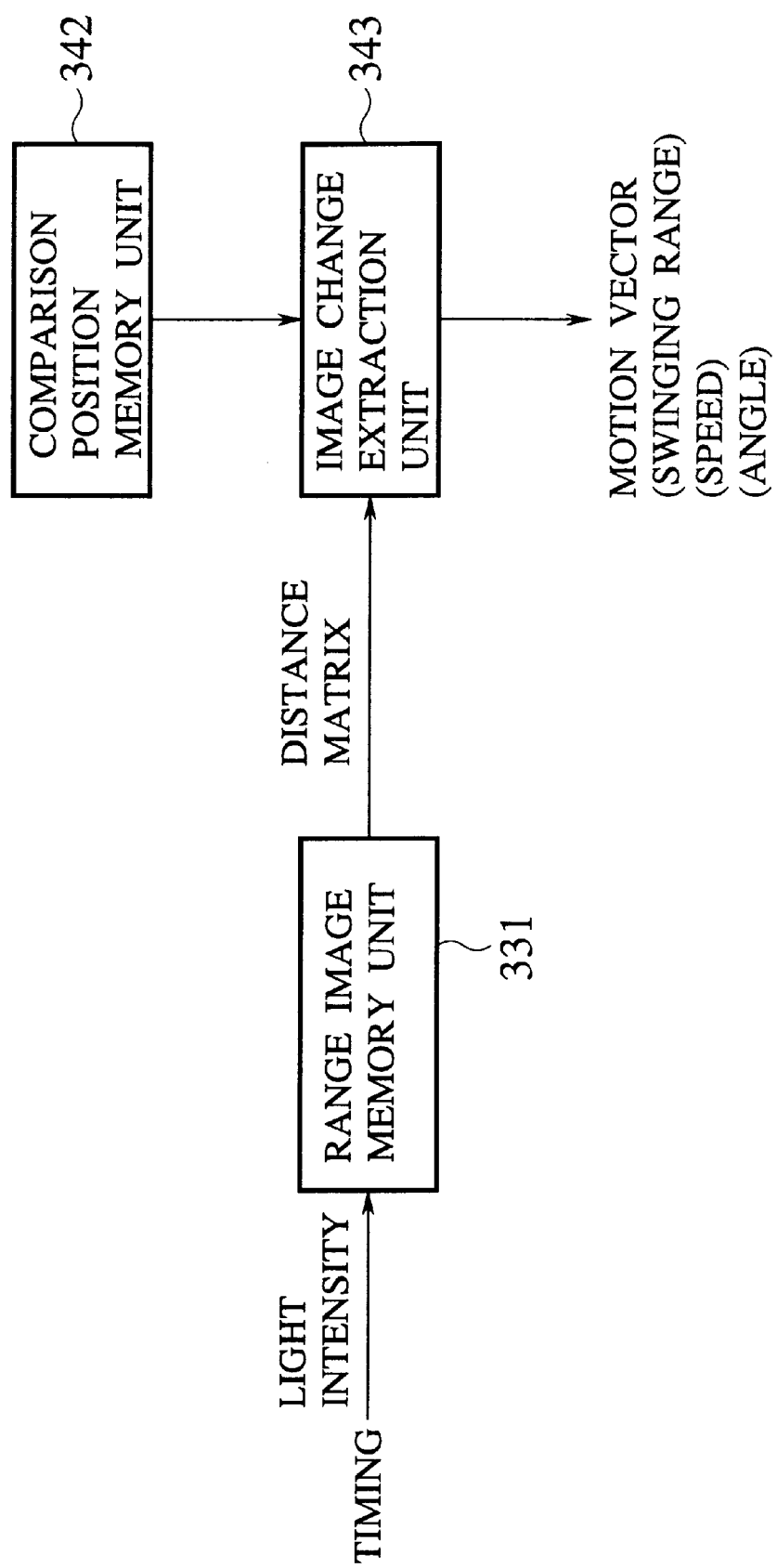
FIG. 35 is a schematic block diagram showing one exemplary configuration of a feature data generation unit according to the fourth embodiment of the present invention.

FIG. 35 shows an exemplary configuration of the feature data generation unit according to this fourth embodiment, which differs from that of FIG. 23 in that an image change extraction unit 343 is provided in place of the shape interpretation unit 333 of FIG. 23, and a comparison position memory unit 342 is provided in place of the shape memory unit 332 of FIG. 23.

The comparison position memory unit 342 stores positions in the past which are to be compared with current position, such as the positions calculated by the image change extraction unit 343 including the center of gravity position or the closest position for M frames previous case, for the purpose of calculating the motion vector.

The image change extraction unit 343 analyzes the distance matrix and extracts the motion vector from the changes of the center of gravity position, the closest position, etc., for example. As for the calculation of the center of gravity position, the closest position, etc., the error due to the minute vibration of the hand action is cancelled out by taking an average over M frames. In other words, the center of gravity position (Xn,Yn) in the i-th frame is given by the following equations (9).

$$Xn = \sum_{j=0}^{j=M-1} Xi - j/M \qquad (9)$$

$$Yn = \sum_{j=0}^{j=M-1} Yi - j/M$$

Figure 36:
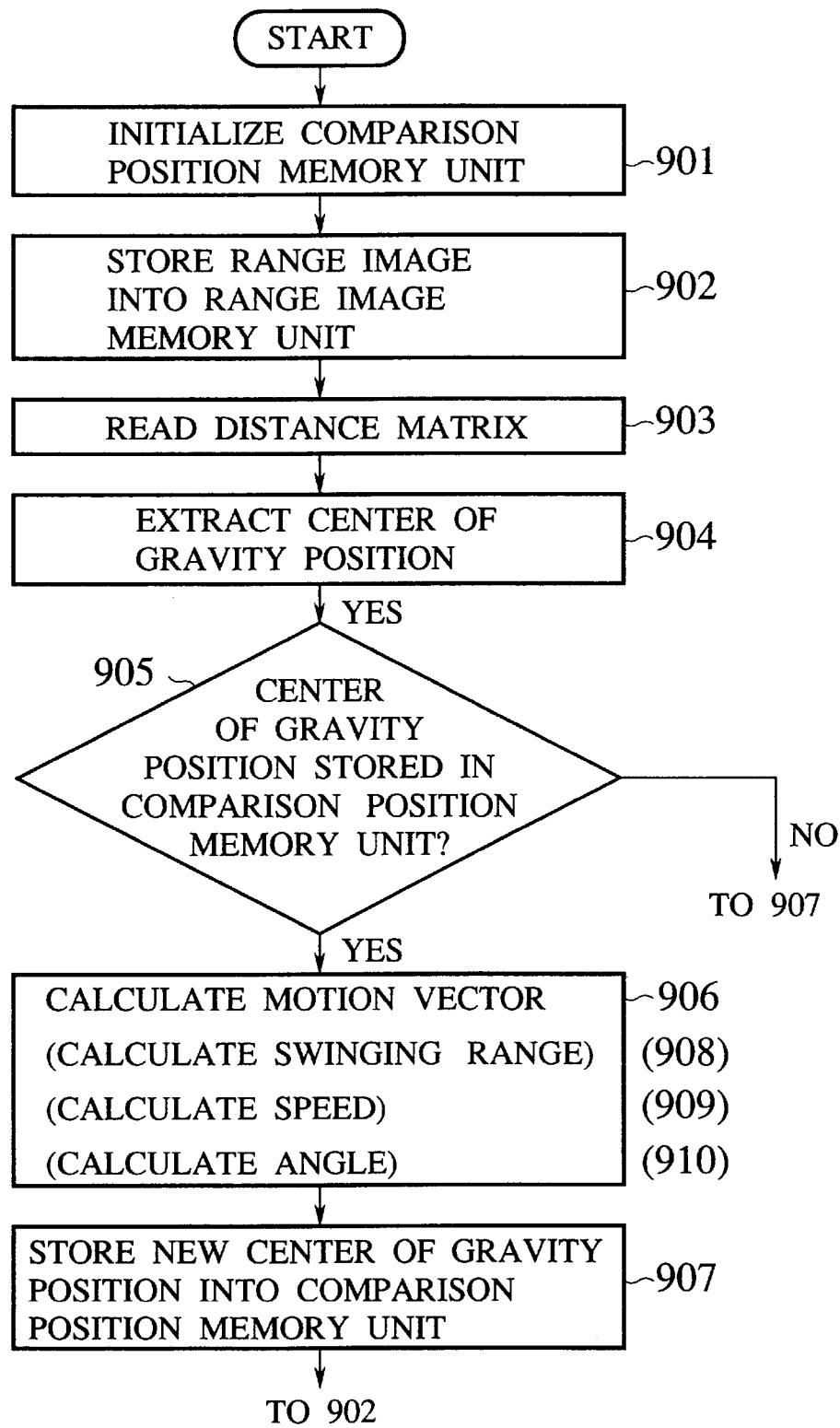
FIG. 36 is a flow chart for the operation carried out by the feature data generation unit of FIG. 35.
Figure 37:
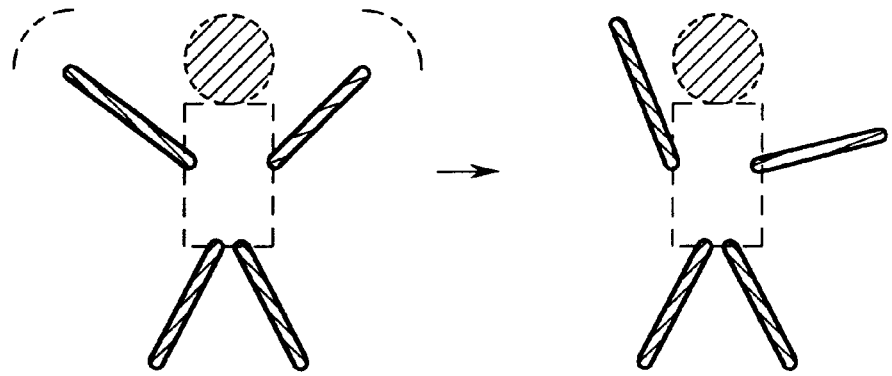
FIG. 37 is a diagram showing an exemplary character motion to be handled by the feature data generation unit of FIG. 35.

FIG. 36 shows the flow chart for the processing by the feature data generation unit of FIG. 35. First, prior to the processing, the content of the comparison position memory unit 342 is initialized to an empty state at the step 901. Then, the range image is stored into the range image memory unit 331 (step 902). Then, the distance matrix is read out (step 903), and the center of gravity position, for example, is calculated (step 904). The calculation of the center of gravity position is carried out as follows, for example. In the first time, the center of gravity position (Xn−1,Yn−1) is not stored in the comparison position memory unit 342 (step 905 NO) so that it is stored into the comparison position memory unit 342 (step 907).

Next, when the center of gravity position (Xn,Yn) is calculated, (Xn−1,Yn−1) of the M frames previous case is stored in the comparison position memory unit 342, where the time required in changing from (Xn−1,Yn−1) to (Xn,Yn) is M·1/30=M/30 sec. Consequently, the motion vector is given by the changed part ((Xn,Yn)−(Xn−1,Yn−1)) divided by this time. That is, the motion vector v is calculated by the following equation (10) (step 906).

$$v=((Xn,Yn)-(Xn-1,Yn-1))/M\cdot 30 \qquad (10)$$

Now, an exemplary case of giving the motion to the animation by using the extracted motion vector will be described. In a character of a doll as shown in a left side of FIG. 37, when the positions of both hands are moved, this character appears as shown in a right side of FIG. 37. When the value of the motion vector v is large, the motion becomes fast and the movement of the hands of the doll becomes large so that it becomes a violent motion. On the other hand, when the value of the motion vector v is small, the movement becomes slow so that it becomes a gentle motion.

Figure 38:
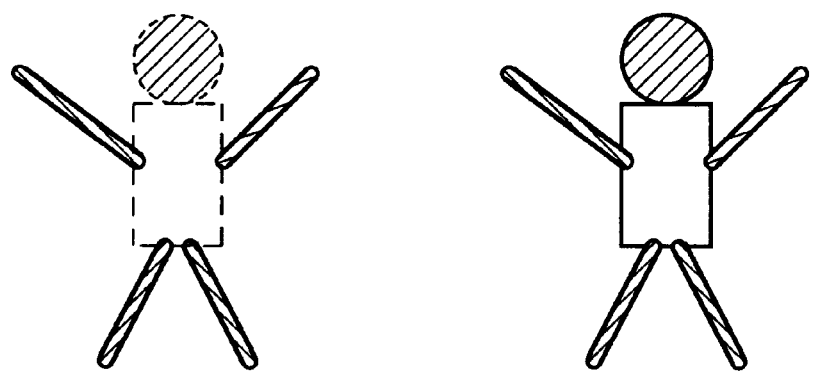
FIG. 38 is a diagram showing another exemplary character motion to be handled by the feature data generation unit of FIG. 35.
Figure 39:
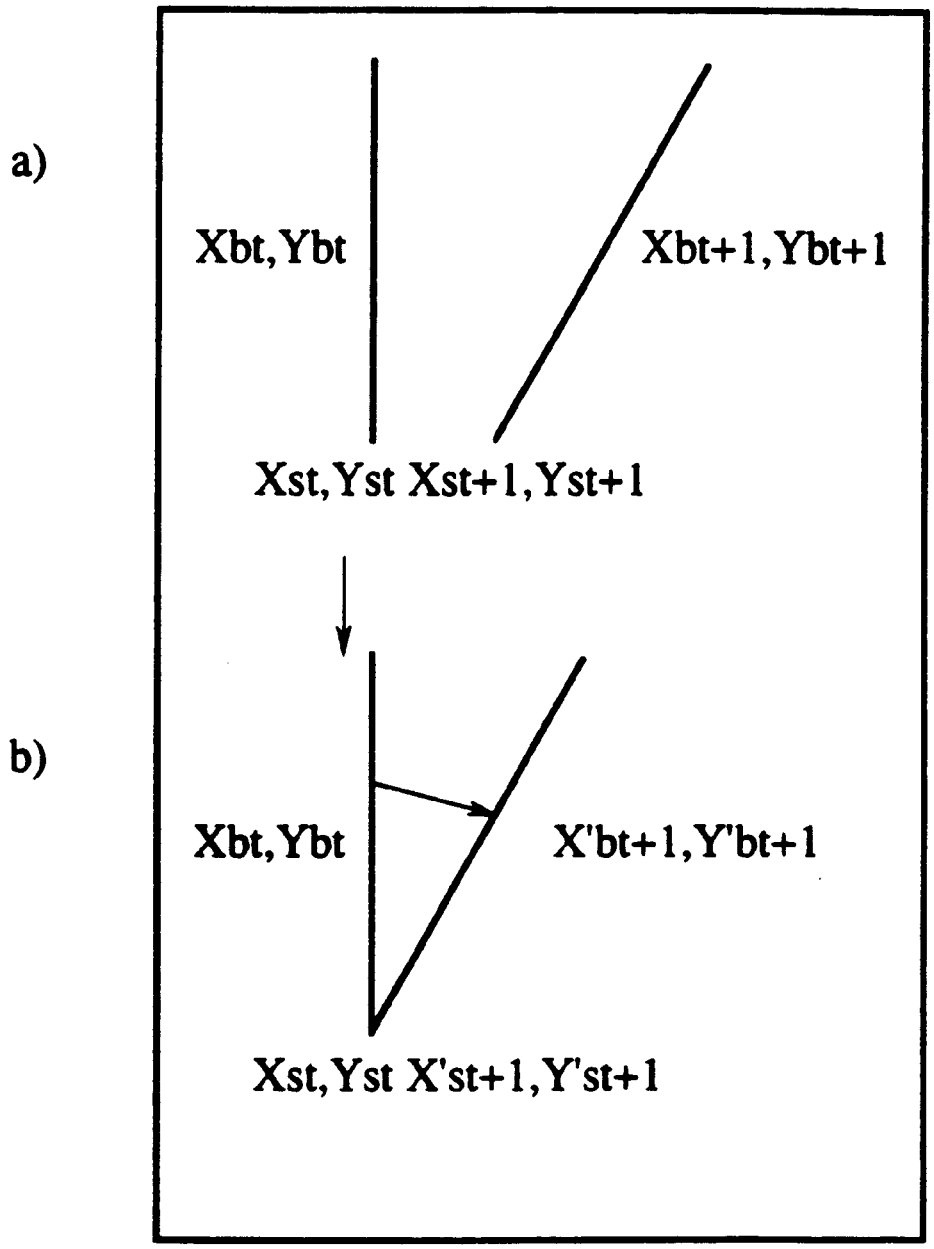
FIG. 39 is a diagram for explaining the operation of the feature data generation unit of FIG. 35.

In the above example, a case where the image change extraction unit 343 calculates the motion vector has been described, but the present invention is not necessarily limited to this case, apart from that case, it is also possible to calculate the swinging range alone, or the speed alone, or also the angle, from the motion vector. In these cases, the step 906 in the processing of FIG. 36 should be replaced by the step 908, 909 or 910. For example, it is also possible to extract the change in the X-direction as the swinging range and the motion in the Y-direction as the speed, in such a manner that the position of the doll is controlled by the swinging range while the motion speed of the doll is controlled by the speed as shown in FIG. 38.

Alternatively, it is also possible to control the swinging angle of the head of the doll by the swinging angle of the finger. In this case, the simple calculation of the center of gravity cannot provide an accurate center of gravity. Namely, as shown in a part (a) of FIG. 39, between the finger at time t and the finger at time (t+1) resulting from the swinging of the finger at the time t, the pivotal point of the finger is displaced so that the angle becomes larger than the actual angle. When it is tolerable to have somewhat exaggerated motion than the actual swing of the finger, there is no problem in using this swinging angle directly. However, when it is desired. to give a sophisticated motion, this is inconvenient.

In order to avoid this problem, it is necessary to calculate the center of gravity after the pivotal points of the finger at the time t and at the time (t+1) are set to coincide with each other. More specifically, denoting the pivotal point of the finger at the time t as (Xst,Yst), the center of gravity of the finger at the time t as (Xbt,Ybt), the pivotal point of the finger at the time (t+1) as (Xst+1,Yst+1), and the center of gravity of the finger at the time (t+1) as (Xbt+1,Ybt+1), the pivotal point (X'st+1,Y'st+1) and the center of gravity (X'bt+1,Y'bt+1) of the finger at the time (t+1) as corrected by the pivotal point of the finger at the time t can be given by the following equations (11).

$$X'_{st+1} = X_{st+1} - X_{st}$$

$$Y'_{st+1} = Y_{st+1} - Y_{st}$$

$$X'_{bt+1} = X_{bt+1} - X_{st}$$

$$Y'_{bt+1} = Y_{bt+1} - Y_{st}$$

By using them, the swinging angle α can be calculated as the following equations (12).

$$\text{Swinging Angle } \alpha = 2\arcsin(r/2l)$$

$$r = |(X'_{bt+1}, Y'_{bt+1}) - (X_{bt}, Y_{bt})|$$

$$l = |(X_{bt}, Y_{bt}) - (X_{st}, Y_{st})|$$

Figure 40:
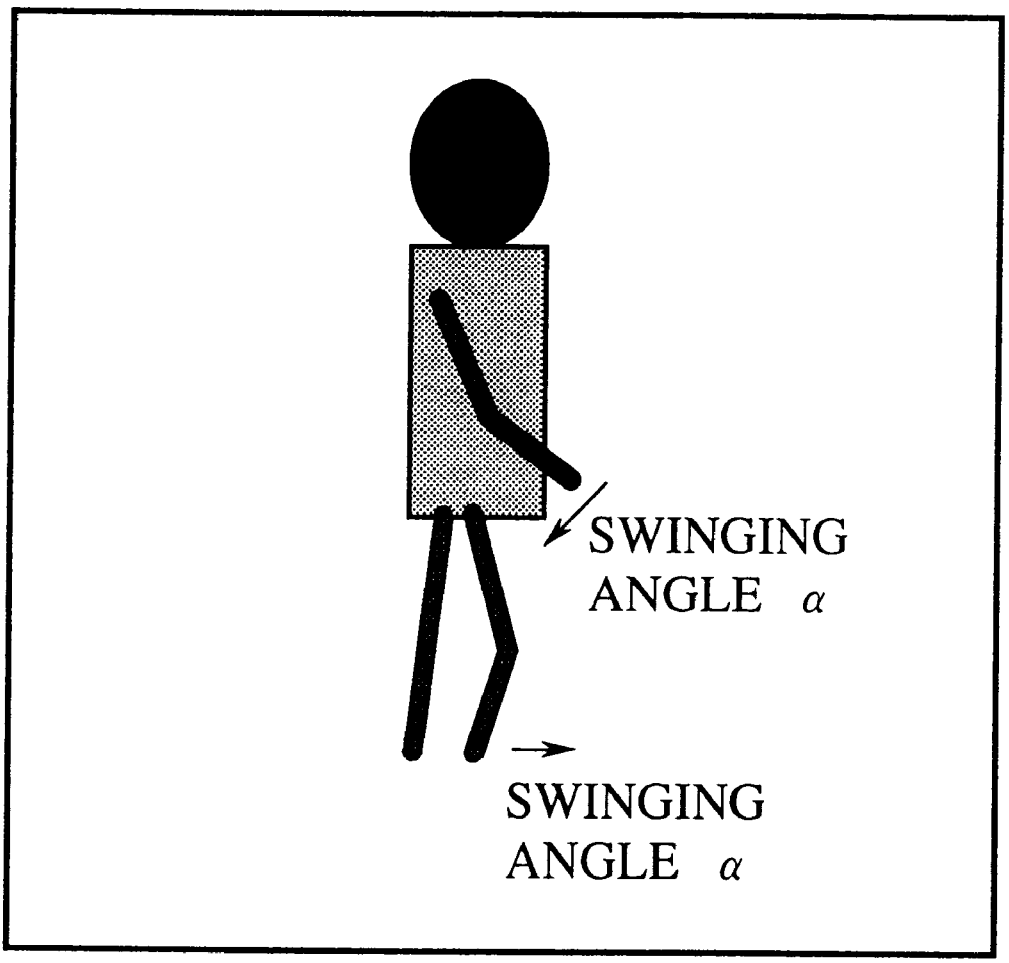
FIG. 40 is another diagram for explaining the operation of the feature data generation unit of FIG. 35.
Figure 41:
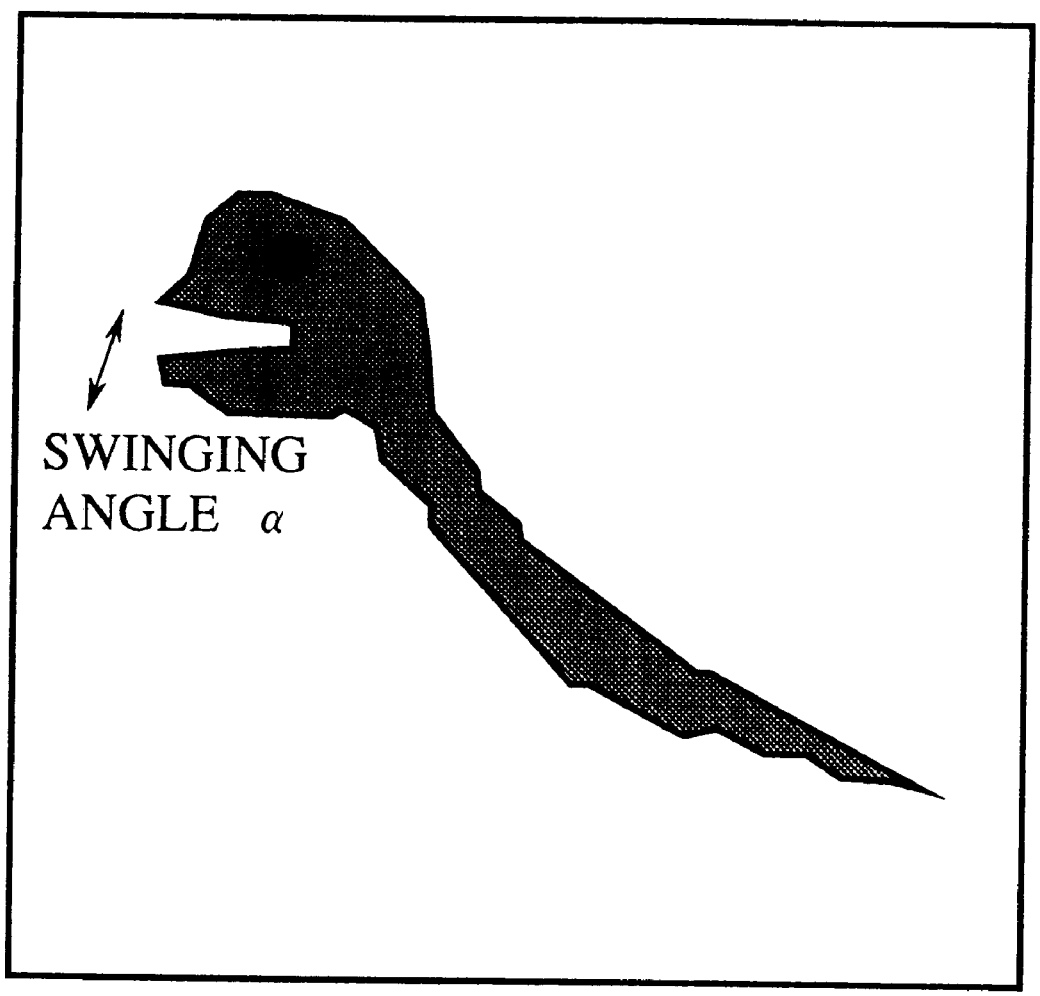
FIG. 41 is another diagram for explaining the operation of the feature data generation unit of FIG. 35.

When the swinging angle so obtained is used, as shown in FIG. 40 for example, it becomes possible to give an arbitrary walking motion by swinging the forearm part and the lower leg part in this swinging angle. Also, as shown in FIG. 41 for example, it becomes possible to give a gasping motion at the mouth of a snake character by moving the mouth of this snake character at this swinging angle. By changing the manner of swinging the finger, it is also easily possible to give a mouth motion in relation to the words so as to make this character looks like talking.

It Is also possible for the user to make the mouth motion by himself and move the mouth of the snake character similarly. For example, parts (a), (b) and (c) of FIG. 42 shows the range images of the mouth motion of the user, where parts (a) and (c) show states in which the mouth is opened, and a part (b) shows a state in which the mouth is closed. The size m by which the mouth is opened is obtained from the range images of FIG. 42. Using an average value for the size of the mouth (denoted as β), the swinging angle can be obtained by the following equation (13).

$$r = \arctan(m/2\beta) \quad (13)$$

Then, using this swinging angle, the mouth of the snake character can be moved. It is also possible to use the size m of the opened mouth directly for controlling the opening and closing of the mouth of the snake character.

Conventionally, this type of operation has been realized by an indirect operation in which a slider for controlling the motion is operated, so that it has been extremely difficult for the inexperienced user to give a motion exactly as intended.

In contrast, according to this fourth embodiment, it is possible to realize the completely direct operation in such a manner that, when the user makes the action while watching the animation character, the character moves according to that action, so that its effect is enormous.

In FIG. 36 described above, the processing has been described for an exemplary case of extracting the center of gravity position, but the present invention is not necessarily limited to this case. It is also possible to use various other positions such as the closest position, the position where the distance is less than a certain distance in the range image and which is the highest in the X-direction, the position which is rightmost in the Y-direction, etc.

Also, instead of extracting only one type of change as described above, the image change extraction unit may extract plural types of changes. For example, the center of gravity position and the area can be extracted. In this case, the area can be obtained from the distance matrix by counting a number of cells above a certain threshold. At that point, in order to reduce the error, an average over M frames should be taken. Then, the center of gravity position can be used to give a displacement to the both hands while the area can be used to specify a size of the character as a whole. In this manner, when the user alternately opens and closes the hand while changing the hand position, it is possible to realize the animation in which the character moves both hands while changing its size.

As described, according to this fourth embodiment it is possible to realize the natural handling at high speed and low cost while improving the recognition accuracy by using the information (such as the area) other than the distance information. By means of this, it is also possible to realize the operations to give plural commands to the character without requiring the user to remember any sort of difficult operational procedures.

In the third and fourth embodiments described above, the operations using the finger, hand, or face have been described, but the present invention is not necessarily limited to these operations. For example, it is also possible to carry out the operate the character by using both hands and assigning the left hand motion to the left hand and the left leg of the character while assigning the right hand motion to the right and and the right leg of the character, in the manner by which the puppeteer gives motions to the puppet. It is also possible to give a motion to the character by the action for forming and moving a shape of a dog in the shadow picture.

Also, in the above, an exemplary case of operating the two-dimensional animation character has been described, but the present invention is not necessarily limited to this case. For example, by obtaining the depth coordinate for the center of gravity position as well, it is also possible to operate the three-dimensional animation character.

Also, when the present invention is utilized for teaching the rhythmical sense to the children, the change in the X-direction alone may be extracted and the head of the character may be moved by this, so that the child can easily check his own rhythm by watching the character. Also, the motion of the hand of the child can be used not only to give a motion to the character so as to visualize the child's hand motion, but also as a parameter for the media other than computer graphics by generating sound accordingly, for example.

Also, in the above, an exemplary case of giving a motion by using the user's action alone has been described, but it is also possible to use this fourth embodiment in combination with the other input device. For example, while the target object is rotated in correspondence to the right hand motion, it may be desired to stop the motion of the target object temporarily at the current position, reset the right hand motion back, and then rotate the target object from the stopped position further. In such a case, the command for stopping or releasing can be given by pushing a menu button for the stopping or releasing command using the left hand. Else, when some motions are given to the target object, it may be desired to memorize a series of motions, and in such a case, an operation to press the menu button for the storing command can be carried out.

In this manner, the operation for giving motions which cannot be easily realized by the simple menu buttons and the operation that can be easily realized by simply pressing the menu buttons can be carried out in parallel without causing any sense of unnaturalness to the user, so that its effect is enormous.

Figure 43:
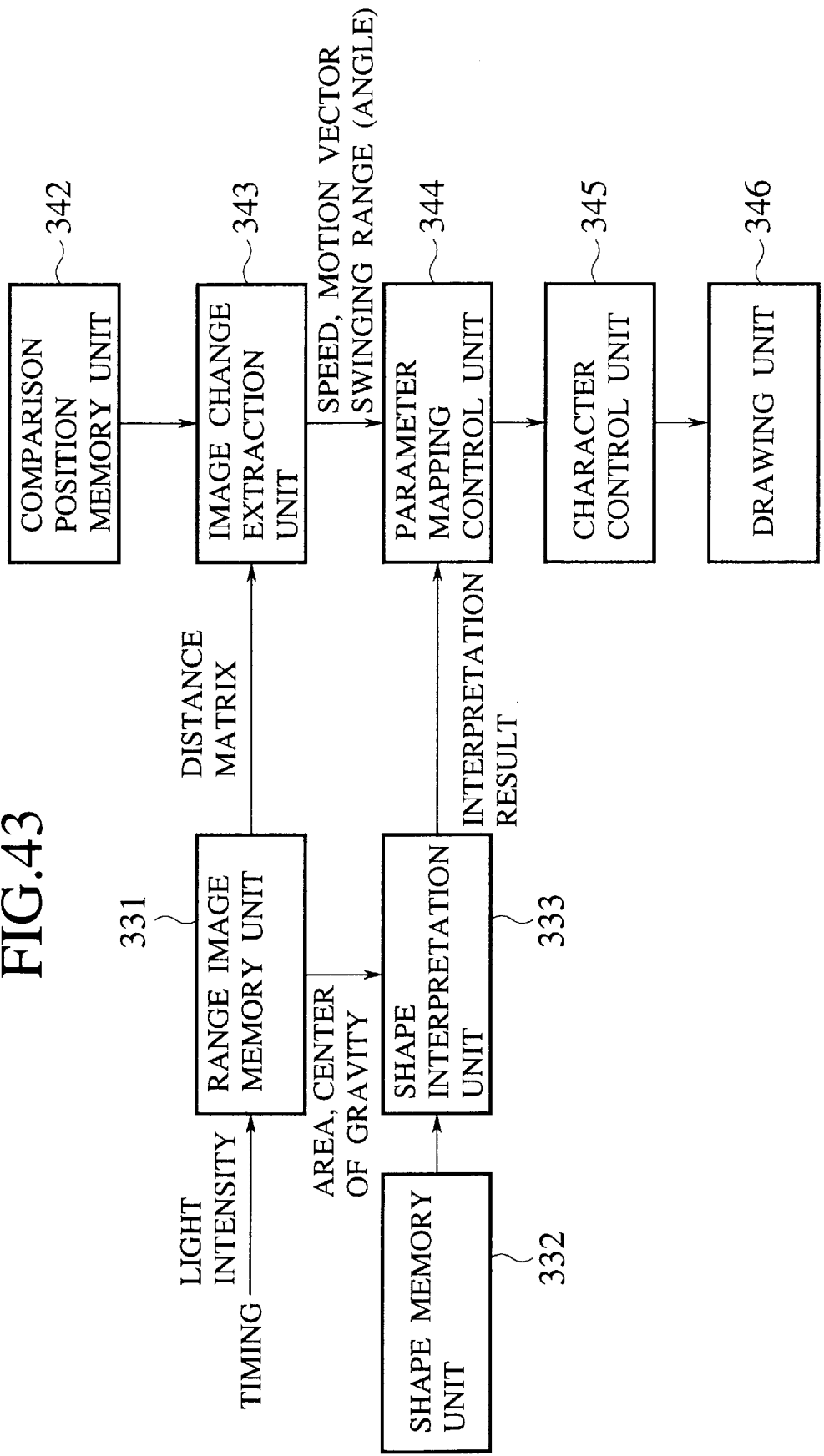
FIG. 43 is a block diagram showing another exemplary configuration of a feature data generation unit according to the fourth embodiment of the present invention.

FIG. 43 shows a modified configuration of the feature data generation unit according to the fourth embodiment.

In the configuration of FIG. 35, only the change of the image such as the motion vector is extracted and used to give a motion to the animation character. On the other hand, in the configuration of FIG. 23, the range image is recognized as a still image, the action is interpreted, and the interpretation result is used as a command. In contrast, the configuration of FIG. 43 is for extracting many parameters from the range image, and mapping them to parameters for controlling complicated character motions.

To this end, the configuration of FIG. 43 includes both the image change extraction unit 343 and the shape interpretation unit 333. Here, of course, it is possible to extract a plurality of parameters by the image change extraction unit 343 alone, so that it is not absolutely necessary to include the shape interpretation unit 333. On the contrary, it is also possible for the shape interpretation unit 333 to extract not only the action interpretation result but also values of area, center of gravity, etc., so that it is possible to extract a plurality of parameters by the shape interpretation unit 333 alone and therefore it is not absolutely necessary to include the image change extraction unit 343.

A parameter mapping control unit 344 determines the mapping of a plurality of parameters extracted by the shape interpretation unit 333 or the image change extraction unit 343 to the character motion control parameters.

A character control unit 345 actually calculates the character motions according to the parameters mapped by the parameter mapping control unit 344. A drawing unit 346 depicts the resulting character with motions.

At the parameter mapping control unit 344, it is possible to control the parameter mapping by using various optimization techniques such as the neural network and GA (Genetic Algorithm), for the purpose of making the user training easier. Else, it is also possible for the parameter mapping control unit 344 to determine the mapping of each parameter in advance. For instance, in an example of the snake character of FIG. 41, it is possible to determine the parameter mapping such that an area corresponds to a size of the snake, a speed corresponds to a speed by which the snake wags its tail, a finger position corresponds to a position of the snake, and so on.

In addition, it is also possible to determine the parameter mapping in advance according to the size of the change of the parameter. Namely, some hand actions are made first, and a parameter for which the change is the largest can be mapped to a speed of the snake's tail, a parameter for which the change is the smallest can be mapped to a size of the snake, and so one. Then, when the hand action is made next, the parameters determined by the initial calibration are used.

In this case, the user can easily learn the operation to give motions to the character by actually moving the finger or the hand while watching the corresponding change in the character, and it becomes possible to give complicated motions to the character.

Also, in the above, the application to the operation for giving motions to an animation character has been mainly described, but the present invention is not necessarily limited to this case. Apart from the animation, it is also possible to apply the present invention to the operation for playing music or the operation for giving special effects to the image. Namely, it is possible to play music by controlling a rhythm by the swinging of the hand, and notes to be played by the gesture of the hand. It is also possible to control the special display effects in the presentation, by controlling a speed for wiping the image by the swinging of the hand, a rotation of letters by the rotation of the hand, etc. As such, the present invention is applicable to a variety of applications, and not limited to the embodiments described herein.

Figure 44:
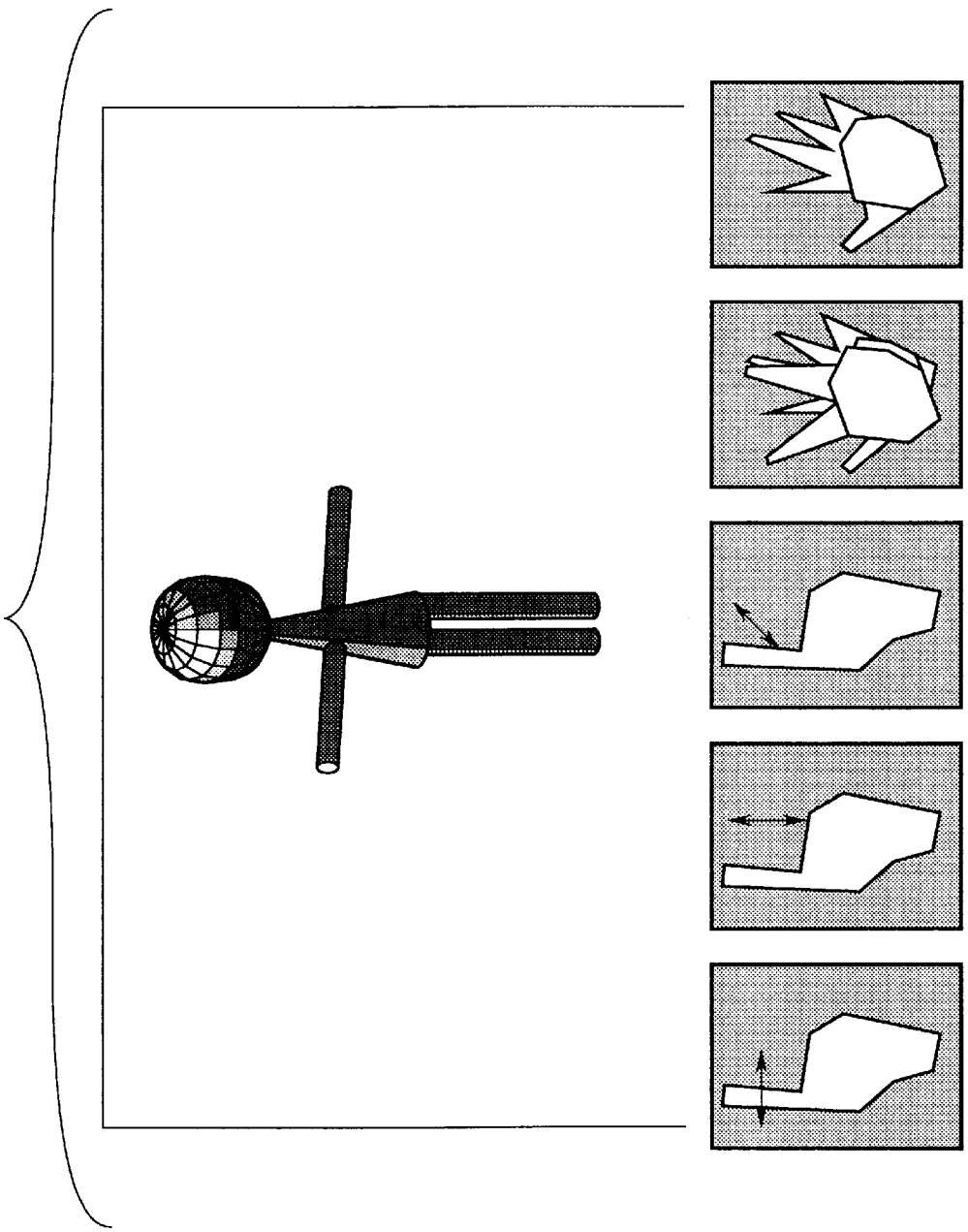
FIG. 44 is a diagram showing an exemplary screen display by a graphical user interface used in the feature data generation unit of FIG. 43.

FIG. 44 shows an exemplary screen display by the GUI (Graphical User Interface) in the configuration of FIG. 43. In this GUI, when it is desired to limit gestures, desired gestures to be limited are to be selected from icons arranged below the screen.

For example, the leftmost icon indicates that a motion in the X-direction can be given by moving the finger tip. Similarly, the second icon from the left indicates that a motion in the Y-direction can be given by moving the finger tip, and the third icon from the left indicates that a motion in the Z-direction can be given by moving the finger tip. On the other hand, the second icon from the right shows shapes of the hand in three states, a state of making a fist, a state of extending two fingers, and a state of extending five fingers. This icon indicates that when this icon is selected the rule stored in the shape memory unit 332 is switched so that these three gestures become recognizable and the corresponding interpretations can be made by the shape interpretation unit 333. Similarly, the rightmost icon shows shapes of the hand in two states, a state of making a fist and a state of extending five fingers, so as to indicate that only these two shapes become recognizable.

In FIG. 44, the icons are displayed in a state where these shaped are shown in overlap, but it is not necessary for these icons to have a static display. For instance, shapes of the hand in three states, a state of making a fist, a state of extending two fingers, and a state of extending five fingers, may be displayed sequentially in a form of animation, so as to indicate that these three shapes are recognizable. Also, a finger may by displayed in motion between left and right so as to indicate that the motion in the X-direction is possible.

Figure 45:
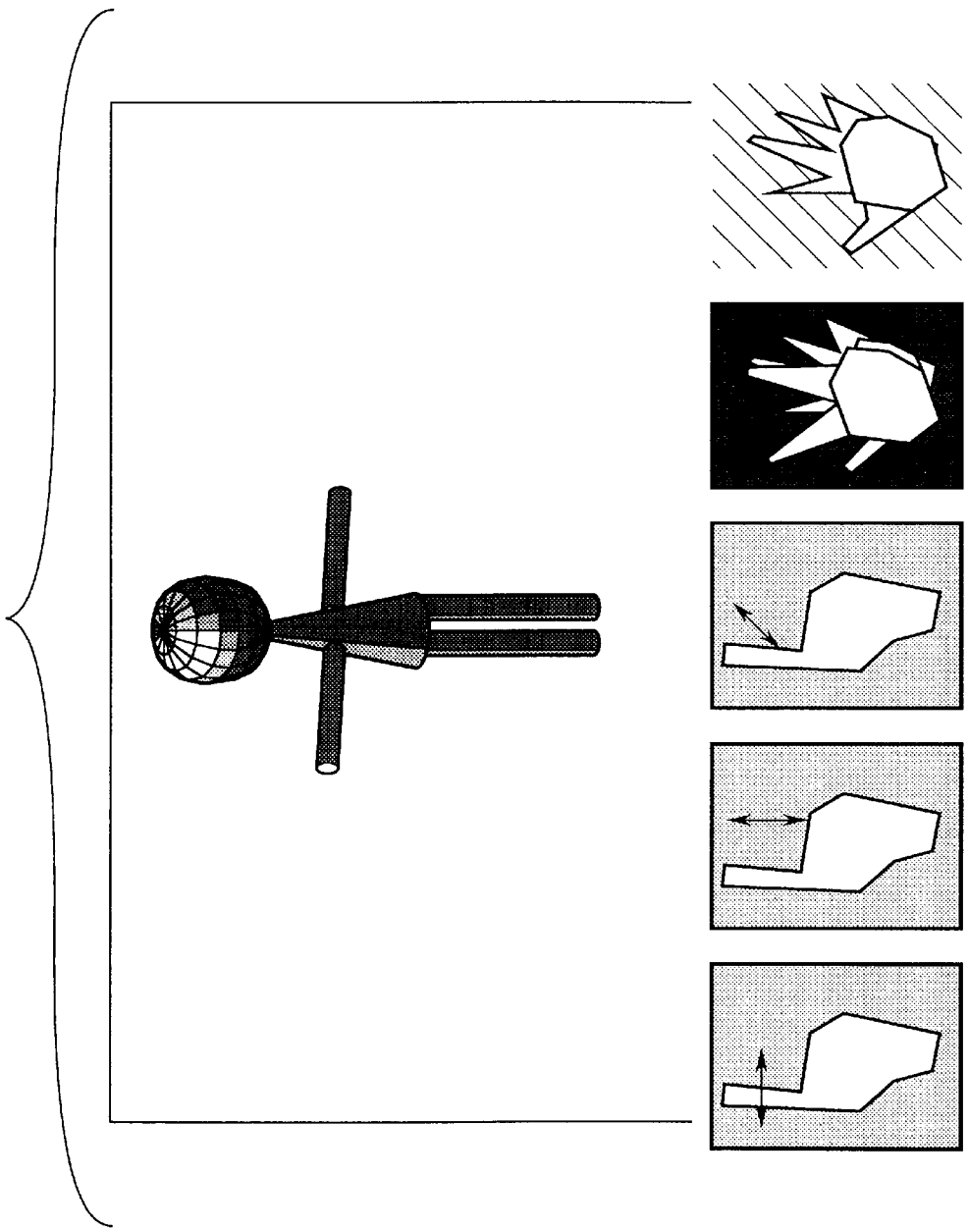
FIG. 45 is a diagram showing another exemplary screen display by a graphical user interface used in the feature data generation unit of FIG. 43.

It is also possible to select more than one of these icons so as to widen the range of limitation. In this case, when some icon is selected and there is another icon which is not compatible with the selected icon, the incompatible icon may be displayed in the fade-out fashion so that it becomes impossible to select this incompatible icon. In FIG. 45, when the second icon from the right is selected, the rightmost icon is incompatible with the selected icon so that it is displayed in the fade-out fashion. Also, in the GUI configuration of FIG. 44, when a user registers a new action, this new action can also be displayed in a form of an icon. In such a case, the icon can display the simplified view of the range image.

In this manner, any other user can also easily try to use the new icon by imitating the action indicated by the new icon upon looking at this icon display. In other words, by means of the GUI of FIG. 44, it becomes possible for the users to easily learn and easily share the knowledge for giving a motion easily, so that its effect is enormous.

<Fifth Embodiment>

Referring now to FIG. 46 to FIG. 53, the fifth embodiment of the present invention will be described in detail.

The video image compression technique has been progressing rapidly, but it is still difficult to display the video at the portable terminal device in a satisfactory fashion. If it is possible to transmit and display only the useful information, it becomes possible to lower the communication cost, and the power consumption and cost of the portable terminal device can also be lowered. To this end, in the TV telephone, for example, it is desirable to extract and transmit only the faces of both sides. Also, in the electronic conference record, there may be a desire to carry out the retrieval only in terms of close-up views of the face of the speaking person.

In view of these, this fifth embodiment is directed to another exemplary case of the feature data generation unit in the first embodiment, which realizes the chromakey camera for extracting only a specific target from such an image.

Figure 46:
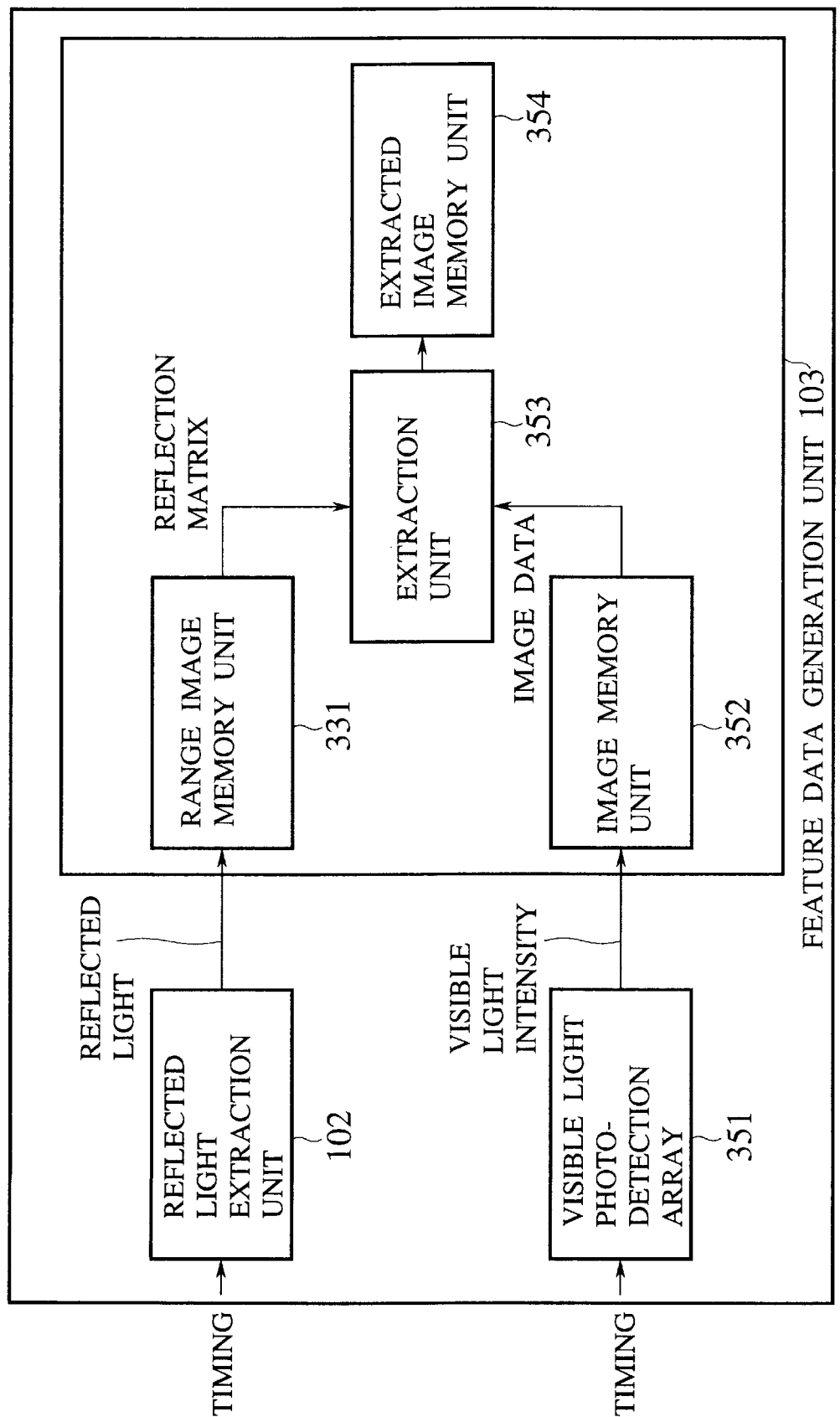
FIG. 46 is a block diagram showing one exemplary configuration of an information input generation apparatus according to the fifth embodiment of the present invention.

FIG. 46 shows an exemplary configuration of the information input generation apparatus according to this fifth embodiment.

Similarly as in the third and fourth embodiments, the feature data generation unit 103 includes a range image memory unit 331 for storing the reflected light image. Here, however, it is not absolutely necessary to store the range image, and it suffices to store a reflection matrix that can be produced by setting a value of each cell to be "1" when the photo-detection is made or "0" when the photo-detection is not made.

In parallel to this, the configuration of FIG. 46 also includes a visible light photo-detection array 351 which is generally used as a CCD camera for taking video images, and an image memory unit 352 for storing the video images.

The configuration of FIG. 46 also includes an extraction unit 353 for extracting an image of only a specific target by comparing the image information stored in the image memory unit 352 and the range image stored in the range image memory unit 331, and an extracted image memory unit 354 for storing the extracted image.

Figure 47:
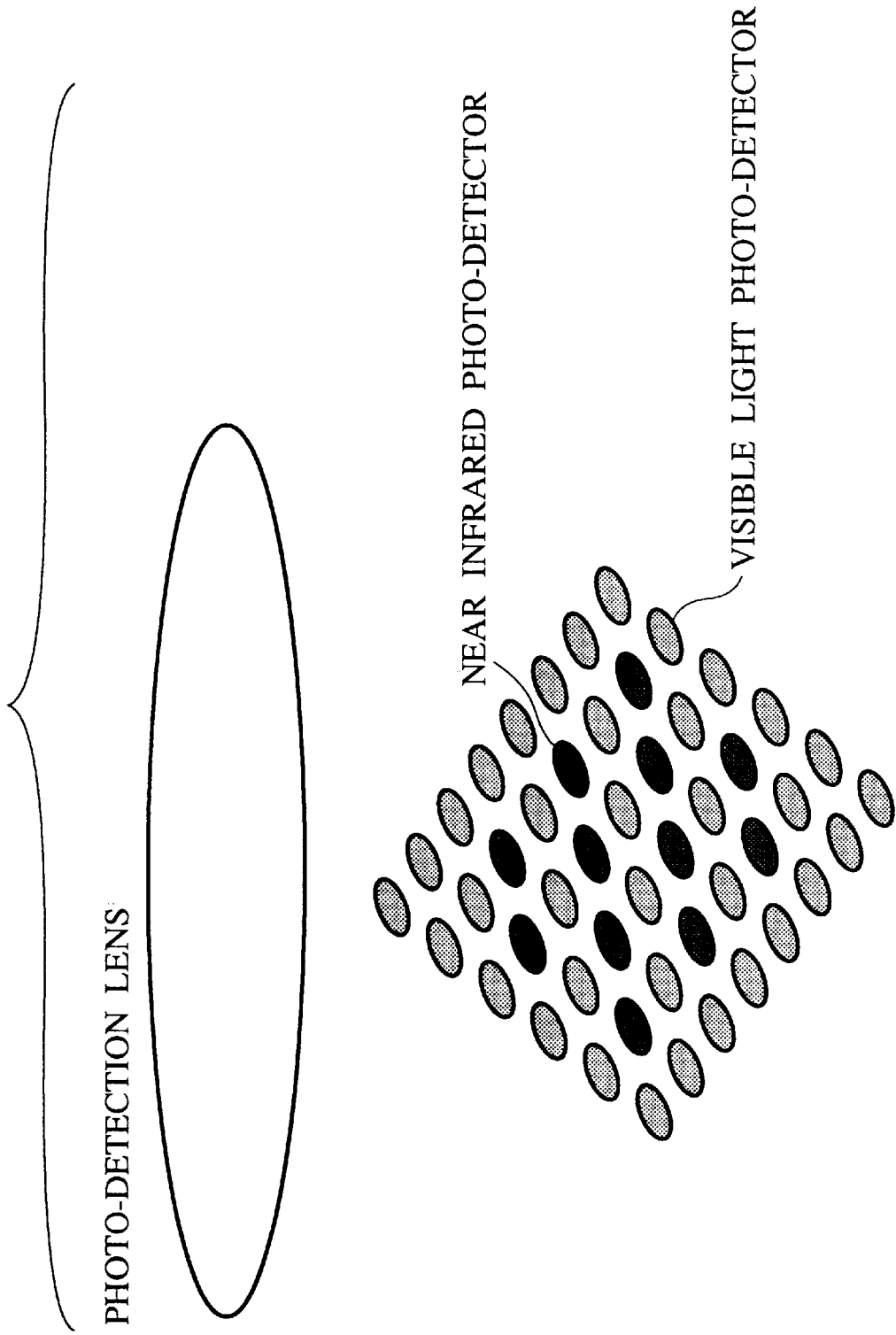
FIG. 47 is a diagram showing an exemplary configuration of a photo-detection array that can be used in the information input generation apparatus of FIG. 46.

In FIG. 46, the visible light photo-detection array 351 and the reflected light extraction unit 102 are arranged in parallel, but the practical implementation is not necessarily limited to this arrangement. For example, as shown in FIG. 47, it is quite possible to arrange near infrared photo-detectors and visible light photo-detectors mixedly within the same photo-detection array, and share a photo-detection lens so as to reduce the size and the weight.

FIG. 48 shows an outline of the extraction processing carried out by the extraction unit 353. In FIG. 48, the original image is an image photo-detected by the visible light photo-detection array 351, which is stored in the image memory unit 352. On the other hand, the mask is a reflected light image photo-detected by the reflected light extraction unit 102, which is stored as a reflection matrix in the range image memory unit 331. The extraction unit 353 superposes the original image and the mask, and leaves only the overlapping portion. This extracted image is stored in the extracted image memory unit 354.

When the photo-detection operations by the reflected light extraction unit 102 and the visible light photo-detection array 351 are carried out completely in parallel, the photo-detection can be carried out 30 times per second (while the frame rate of the usual video is 30 frames per second). When the extraction speed at the extraction unit 353 is sufficiently fast, it is possible to update the extracted image 30 times per second. In such a case, it is possible to update the images stored in the image memory unit 352 and the range image memory unit 331 whenever the photo-detection is made, that is, 30 times per second, so that it is sufficient for each of the image memory unit 352 and the range image memory unit 331 to have a small memory capacity.

On the other hand, when the extraction speed at the extraction unit 353 is not sufficiently fast, it is necessary for each of the image memory unit 352 and the range image memory unit 331 to have a buffer for storing the video image or the range image for an immediately previous frame. However, by carrying out the extraction processing with respect to an average of the previous frame part stored in this buffer and the current frame part, it is possible to compensate for the speed and also improve the S/N ratio.

Next, the manner of utilizing the extracted image will be described. For example, in the conference record system for the electronic conference and the like, the conventional scheme requires to record the video images stored in the image memory unit 352 of FIG. 46 on video tapes, or to record them by using the compression technique such as MPEG2. However, in this conventional scheme, the video image information which is not so important as the conference record such as the image of persons other than the speaking person is going to be recorded so that the wasteful recording is involved and it is impossible to realize the efficient playback such as the playback focused on the uttered contents.

Figure 49:
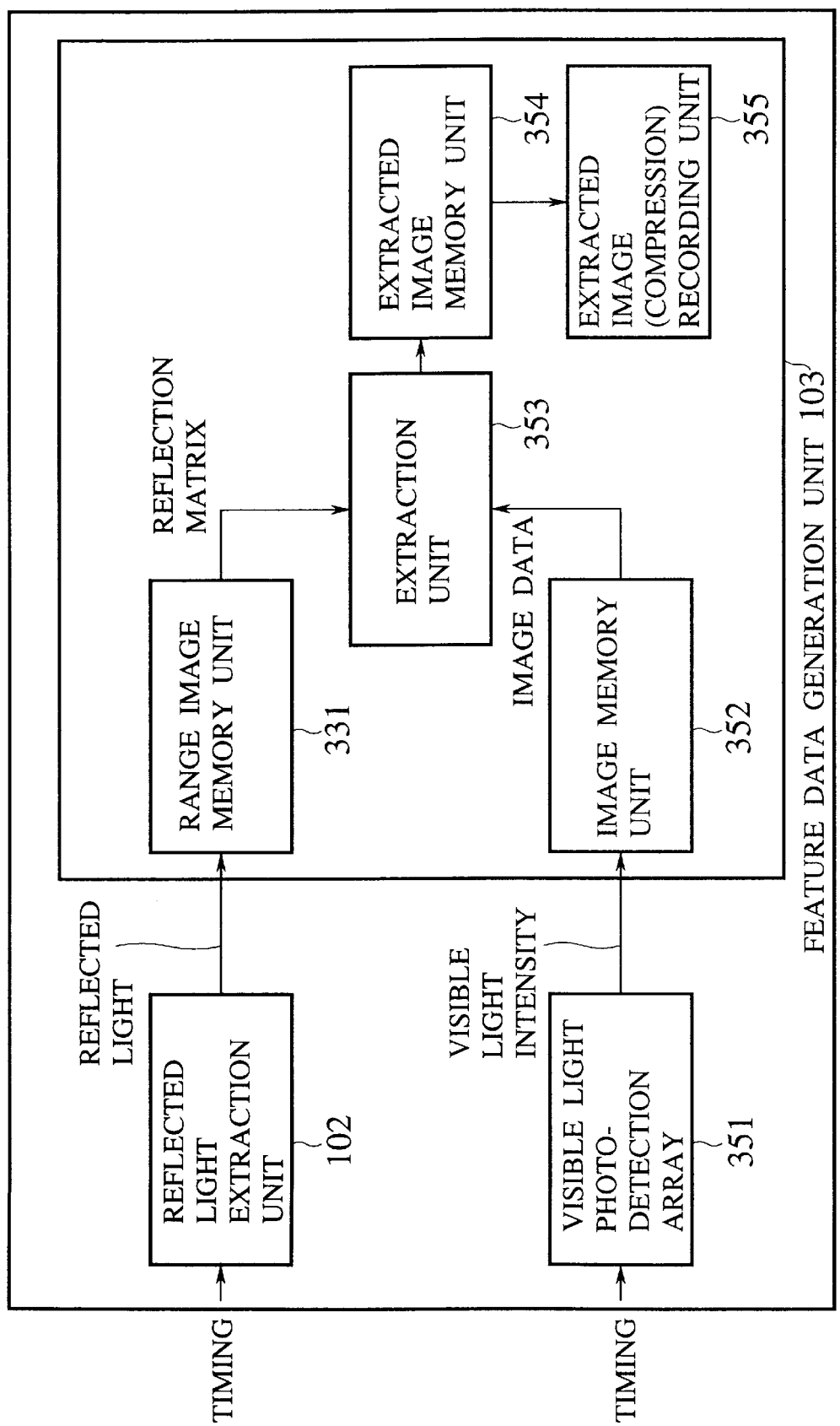
FIG. 49 is a block diagram showing another exemplary configuration of an information input generation apparatus according to the fifth embodiment of the present invention.

In contrast, according to this fifth embodiment, it is possible to extract only a specific target such as the speaking person (the extracted image shown in FIG. 48 corresponds to the speaking person in this context). By recording the extracted image, it is possible to reduce the recording capacity considerably (in an order of one tenth to one hundredth) and it is also possible to realize the wasteless playback. In this case, the apparatus configuration is as shown in FIG. 49, for example, where an extracted image (compression) recording unit 355 records the extracted image either directly as video signals or by compressing it using the MPEG2 encoder and the like.

Figure 50:
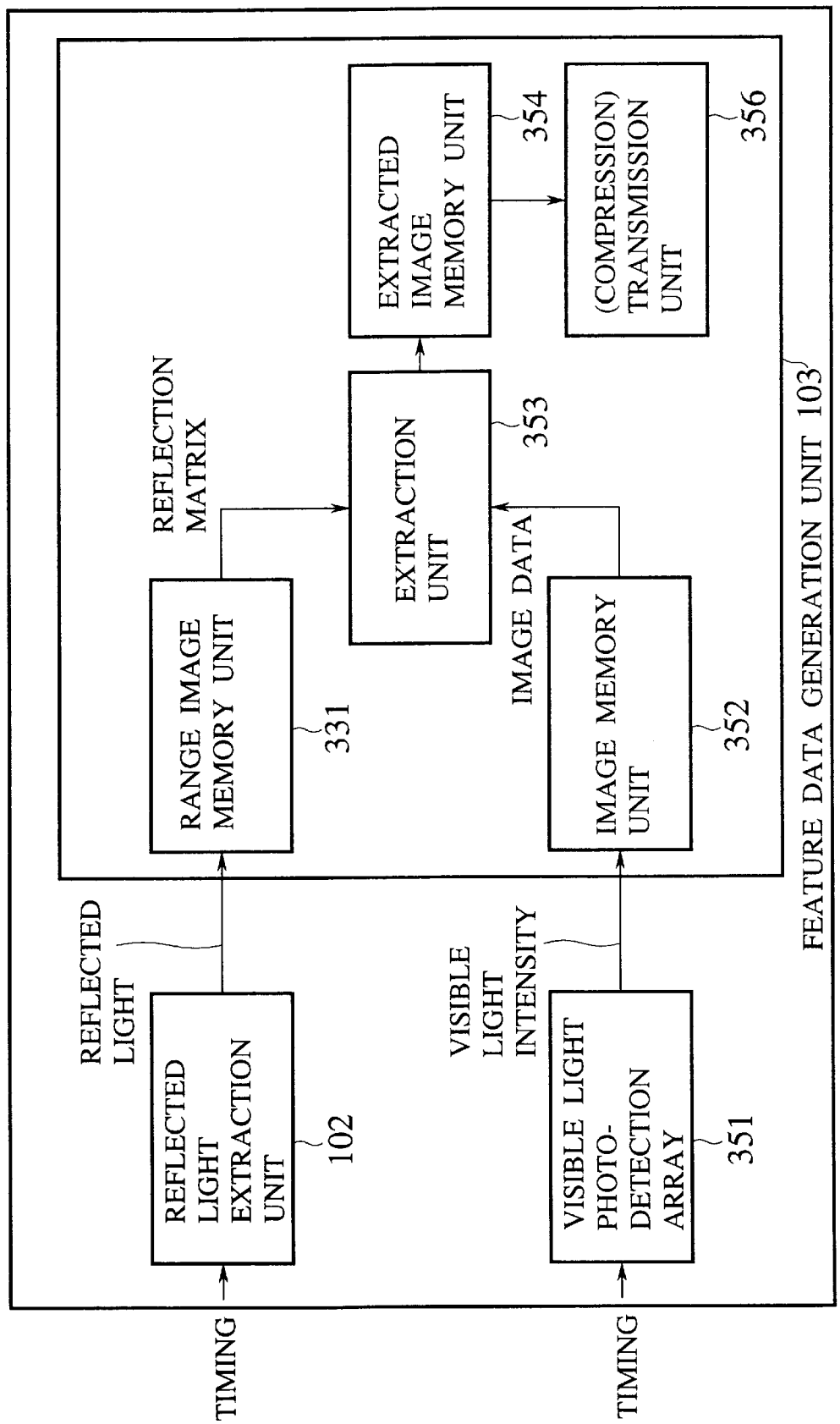
FIG. 50 is a block diagram showing another exemplary configuration of an information input generation apparatus according to the fifth embodiment of the present invention.

It is also possible to transfer the extracted image instead of storing it. In this case, the background image that has conventionally been transferred wastefully can be omitted, so that the amount of transfer data can be reduced considerably. In this case, the apparatus configuration is as shown in FIG. 50, for example, where a (compression) transmission unit 356 transmits the extracted image either directly as video signals or by compressing it using the MPEG2 encoder and the like.

Figure 52:
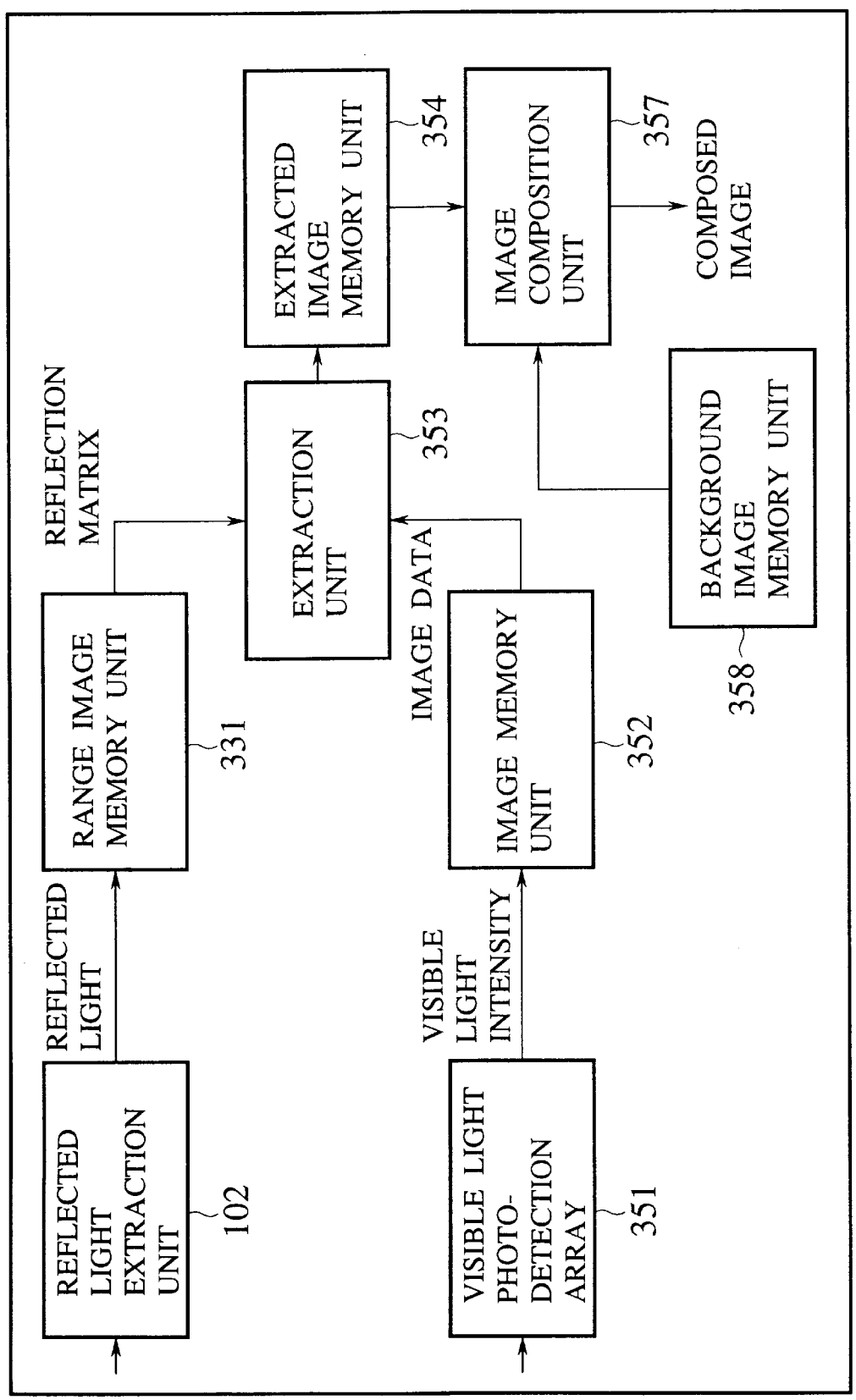
FIG. 52 is a block diagram showing another exemplary configuration of an information input generation apparatus according to the fifth embodiment of the present invention.

By using the extracted image, it is very easy to realize the chromakey for superposing the extracted image with the other background as shown in FIG. 51. In this case, the apparatus configuration is as shown in FIG. 52, for example, where an image composition unit 357 composes the extracted image with the background image such as that of a map as shown in an upper left side of FIG. 51 which is stored in a background image memory unit 358, at a separately specified position as shown in a lower side of FIG. 51, and outputs the composed image. When the background image is stored in a compressed form, the image composition unit 357 carries out the composition after the decoding is carried out. It is also possible to carry out the composition using the extracted image recorded in advance. It is also possible to carry out the composition using a plurality of extracted images.

Conventionally, in order to extract a specific target from the video image, it has been necessary to carry out the manual operation for specifying a target to be extracted so that considerable time and effort have been required. In contrast, according to this fifth embodiment, the mask for a target to be extracted can be easily produced from the reflection matrix, so that the conventionally required time and effort can be reduced considerably and therefore its effect is enormous.

On the other hand, by utilizing this fifth embodiment to the conference record system for the electronic conference and the like which uses the face of the speaking person as an index, it is also possible to considerably reduce the operations for inputting the information necessary for the retrieval.

Figure 53:
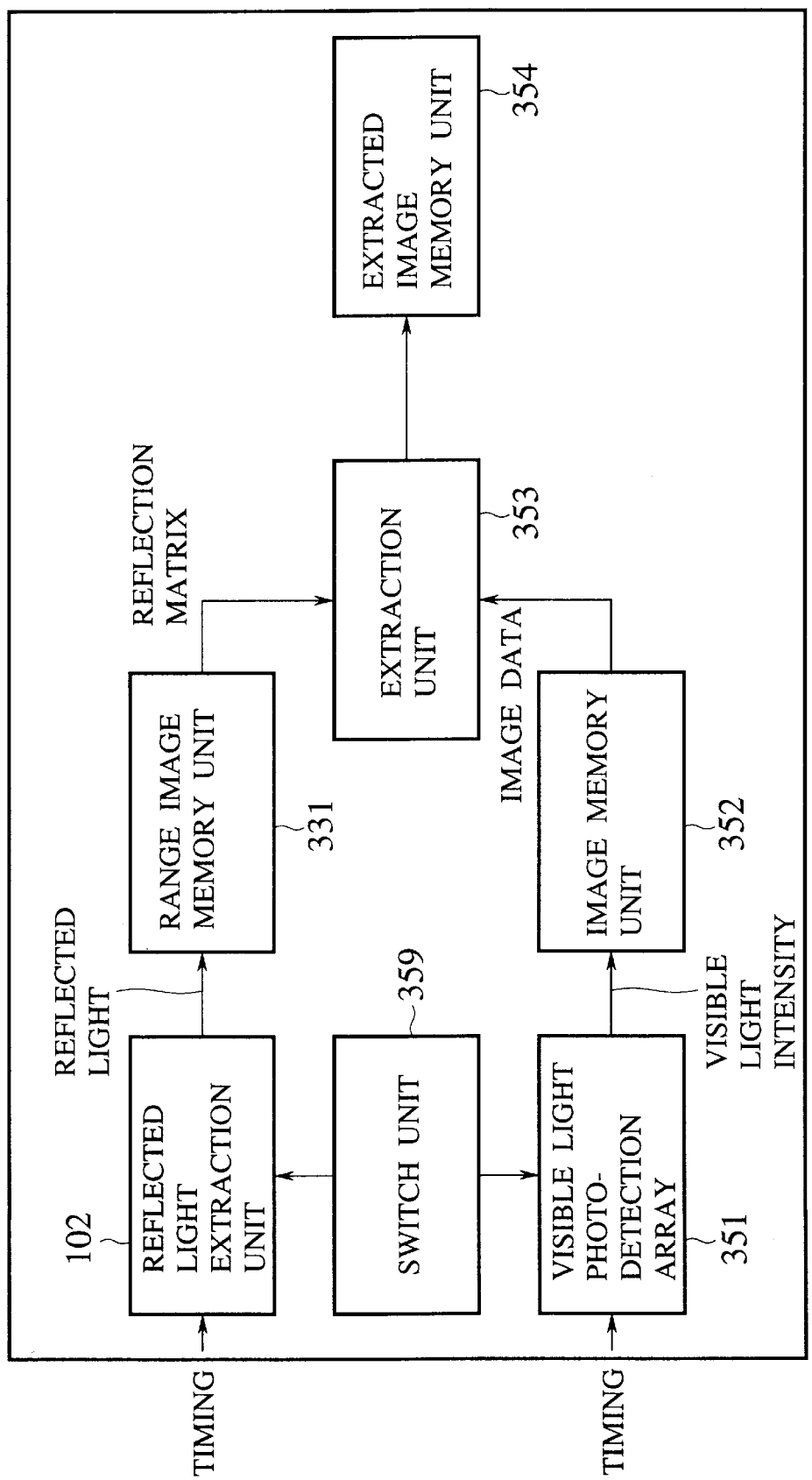
FIG. 53 is a block diagram showing another exemplary configuration of an information input generation apparatus according to the fifth embodiment of the present invention.

In the above, the reflected light extraction unit 102 and the visible light photo-detection array 351 are supposed to photo-detect simultaneously, but the present invention is not necessarily limited to this case. For example, as shown in FIG. 53, it is also possible to carry out the photo-detection switchably according to a switch unit 359. When the switching period is 60 Hz, each of the visible light and the near infrared light can be photo-detected at 30 Hz.

Also, in FIG. 47, the near infrared photo-detector array is arranged among the visible light photo-detector array, but the present invention is not necessarily limited to this case. For example, it may become possible in future to develop an element which can be controlled to photo-detect either the visible light or the near infrared light by changing the applied voltage. When such an element is used, it is possible to realize the configuration of FIG. 53 by switching the applied voltage for this element at the switch unit 359.

Also, at a time of composing the extracted image in the configuration of FIG. 53, a character to be composed is not limited to a single one as shown in FIG. 51. For example, it is also possible to superpose a plurality of extracted images which are separately extracted in advance onto the background image. At this point, it is also possible to carry out the composition by giving different depth coordinates (Z-coordinate values) to these plurality of extracted images. In this manner, it becomes possible to produce the video image with the depth easily. Here, in conjunction with the given depth coordinates, (X/Z, Y/Z, 1/Z) which is the transparent conversion (for which the extinction point is located at the infinite point) can be applied. In this manner, the image becomes smaller as the depth becomes deeper, so that it is possible to produce the video image with the depth perspective very easily.

<Sixth Embodiment>

Referring now to FIG. 54 to FIG. 58, the sixth embodiment of the present invention will be described in detail.

There are several methods for producing the three dimensional model of a character. One method is to produce a model of a character by clay and the like, and to trace the major points on the surface by a device called three dimensional digitizer that inputs the three dimensional coordinates. This method can produce an accurate model so that it is often utilized in the fields of movies and commercial messages that use the non-real time high quality video images. When the three dimensional model of a large target object is to be produced, it is quite cumbersome to input all the points on the surface one by one by using the three dimensional digitizer, so that there are cases where a device called range finder that irradiates the laser beam and measures distances according to the reflection is used instead.

Another method is to produce the model by using the three dimensional CAD. This method is suitable for a case of producing the model of a mechanical structure or a building which involves relatively few curved surfaces.

In either method, in order to give the realistic feeling (genuine feeling), the operation called texture mapping for attaching photographs to the produced three dimensional model is required so as to endow the material quality of the character.

The texture mapping is a two-dimensional coordinate conversion for fitting the square pattern (texture) to a (curved) surface of the three-dimensional object. In the often used modelling software, it is required to specify an attaching target surface and the texture to be attached there. This operation is indispensable for providing the realistic sense to the model but it is also quite cumbersome. In particular, this operation required too much burden on an operator and therefore not suitable for such a usage like an entertainment for children to create the animation at home.

In view of these, this sixth embodiment is directed to another exemplary case of the feature data generation unit of the first embodiment which makes it possible to carry out the operation to produce the three dimensional model and attach the textures to the model easily.

Figure 54:
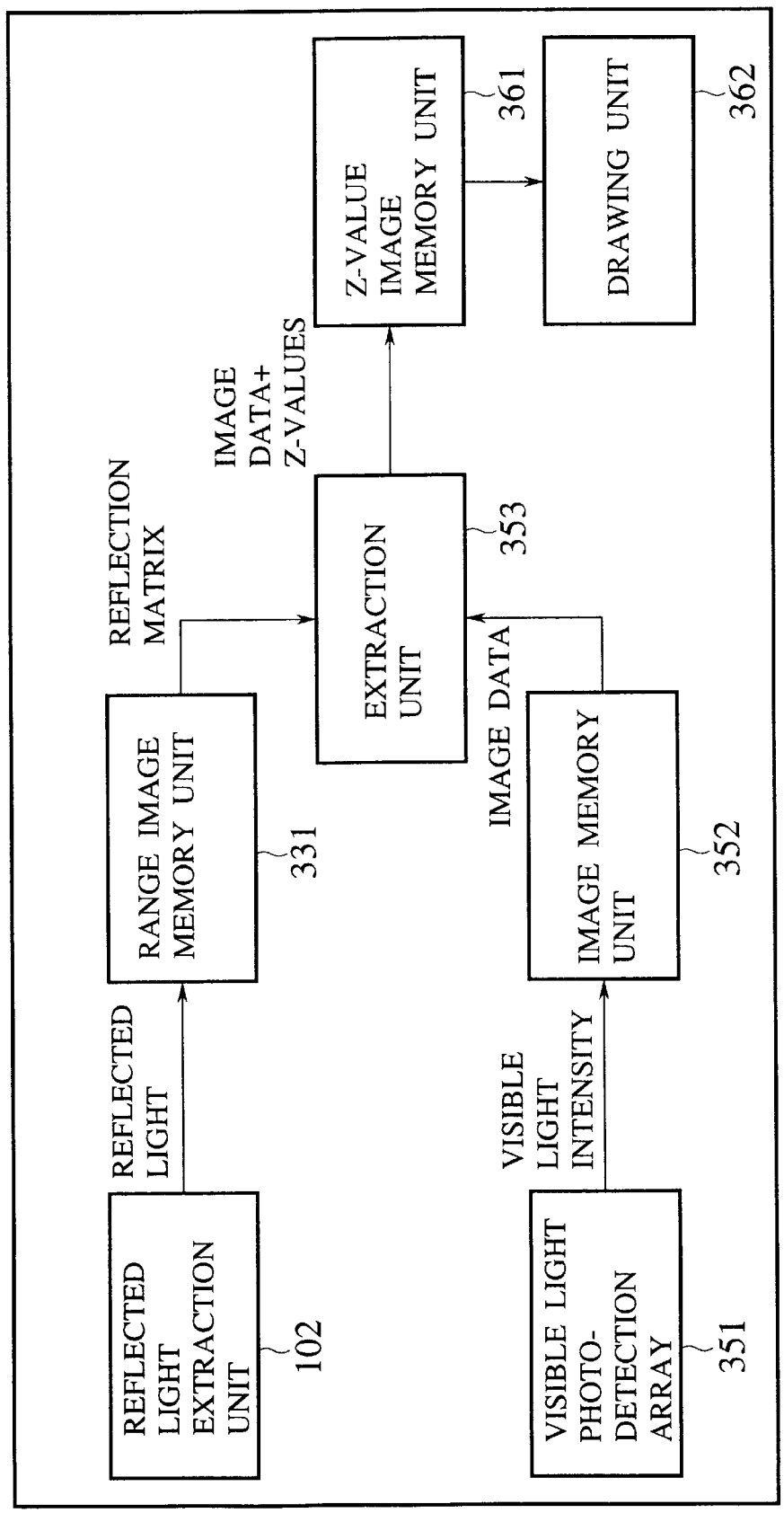
FIG. 54 is a block diagram showing one exemplary configuration of an information input generation apparatus according to the sixth embodiment of the present invention.

FIG. 54 shows an exemplary configuration of the information input generation apparatus according to this sixth embodiment, which differs from that of FIG. 46 in that a Z-value image memory unit 361 for storing the extracted images and the Z-values in correspondence and a drawing unit 362 for carrying out the drawing based on comparison of Z-values are provided instead of the extraction image memory unit 354 of FIG. 46.

Figure 55:
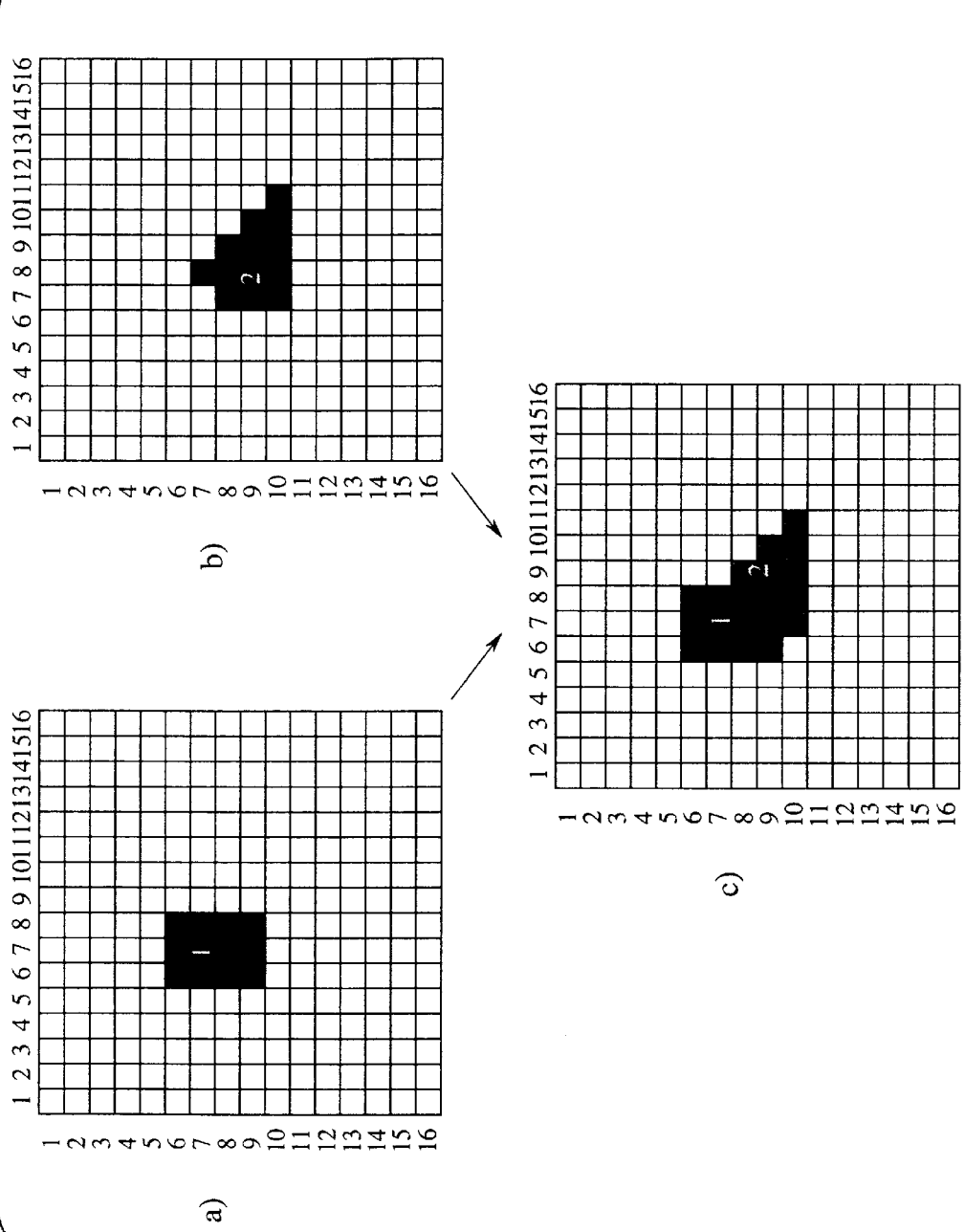
FIG. 55 is a diagram for explaining the operation carried out by the information input generation apparatus of FIG. 54.

FIG. 55 is for explaining the principle of the drawing based on comparison of Z-values used in this sixth embodiment. In FIG. 55, parts (a) and (b) show exemplary Z-value images stored in the Z-value image memory unit 361. This Z-value image is an image obtained by superposing the extracted image as shown in FIG. 48 for example which is stored in the extracted image memory unit 354 in the configuration of FIG. 46 and the range image as shown in a part (a) of FIG. 24 for example which is stored in the range image memory unit 331 in the configuration of FIG. 23. In other words, the Z-value image has an RGB color information and a depth information given by the Z-value, for each pixel.

The Z-value images shown in FIG. 55 are shown as monochromatic images for the sake of explanation. Also, for the sake of simplicity, it is assumed that the Z-value image shown in a part (a) of FIG. 55 has the uniform Z-value of "1" while the Z-value image shown in a part (b) of FIG. 55 has the uniform Z-value of "2" (FIG. 55 indicates these Z-values by numbers written in the respective image regions for the sake of simplicity). Now, a case of composing the Z-value images of parts (a) and (b) of FIG. 55 will be described, Here, the darker part is assumed to be closer in distance, that is, having a smaller Z-value.

Figure 56:
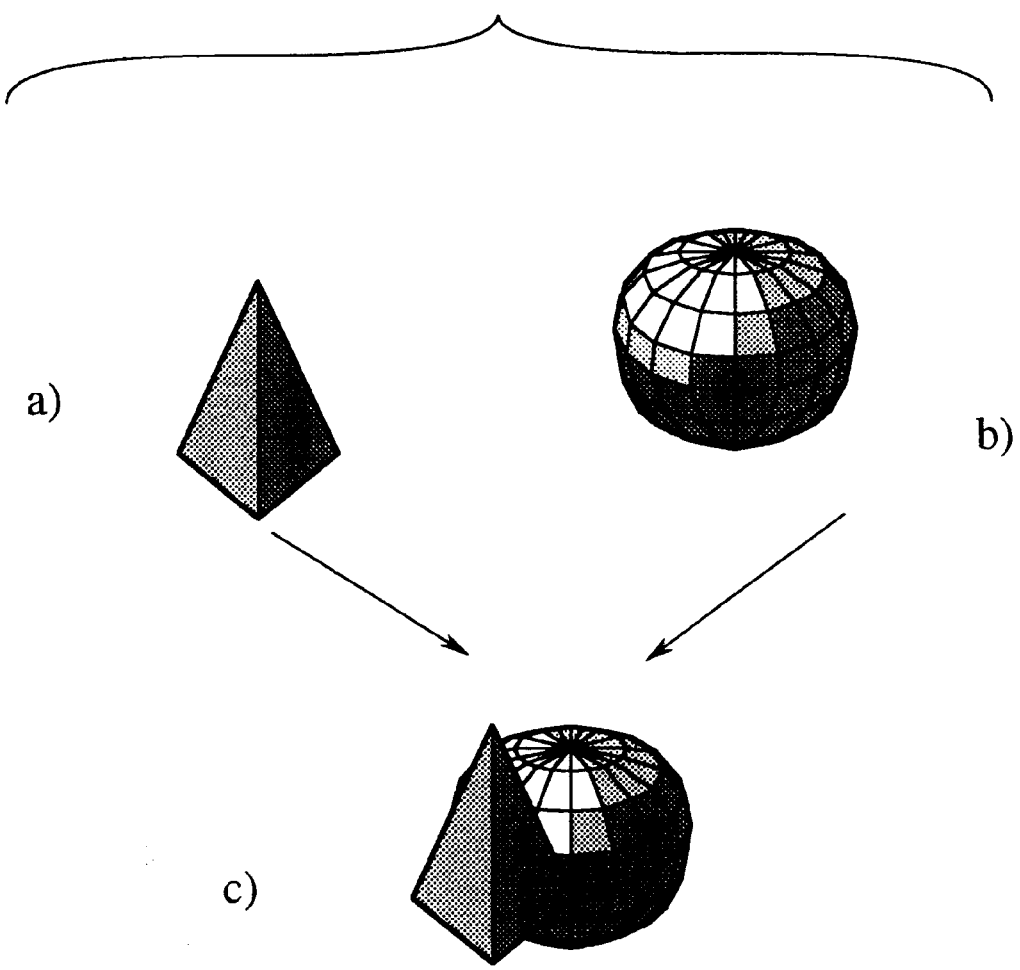
FIG. 56 is another diagram for explaining the operation carried out by the information input generation apparatus of FIG. 54.

At a time of the composition, the Z-value image of the part (a) is directly drawn first, and then the Z-value image of the part (b) is drawn in superposition. At the pixels (6,6), (6,7), (6,8), (7,6), and (7,7), only the Z-value image of the part (a) exists, so that the Z-value image of the part (a) remains unchanged there. At the pixel (7,8), the Z-value images of the parts (a) and (b) both exist, but the already written Z-value is "1" of the part (a) while the Z-value of the part (b) is "2", which implies that the part (b) is located farther and therefore the part (b) is not drawn there. Hereafter, similarly, the shadowed region is processed by comparing the Z-values and retaining only the image with the smaller Z-value (that is, the image with the smaller distance) at each pixel. By the similar processing, the extracted images can be composed according to the Z-values as shown in FIG. 56, for example, so that the image with the depth perspective can be produced easily.

According to this sixth embodiment, there is no need for the cumbersome operation to input the three dimensional model and specify a surface to which the texture is to be attached as required in the conventional scheme, and it is possible to produce the texture mapped three-dimensional model easily, in a manner similar to that of taking photographs. Consequently, unlike the conventional scheme which allows only the professional operators and the sufficiently skilled users to produce the animation, this sixth embodiment makes it possible for anyone to easily enjoy producing the animation based on the three-dimensional model.

In the above, a case of producing the video image with the depth perspective by drawing images directly according to the Z-values has been described, but the present invention is not necessarily limited to this case. For example, it is also possible to produce the three-dimensional model be generating a polygon with a vertex coordinates (x, y, z), and mapping the extracted images on that model.

Figure 57:
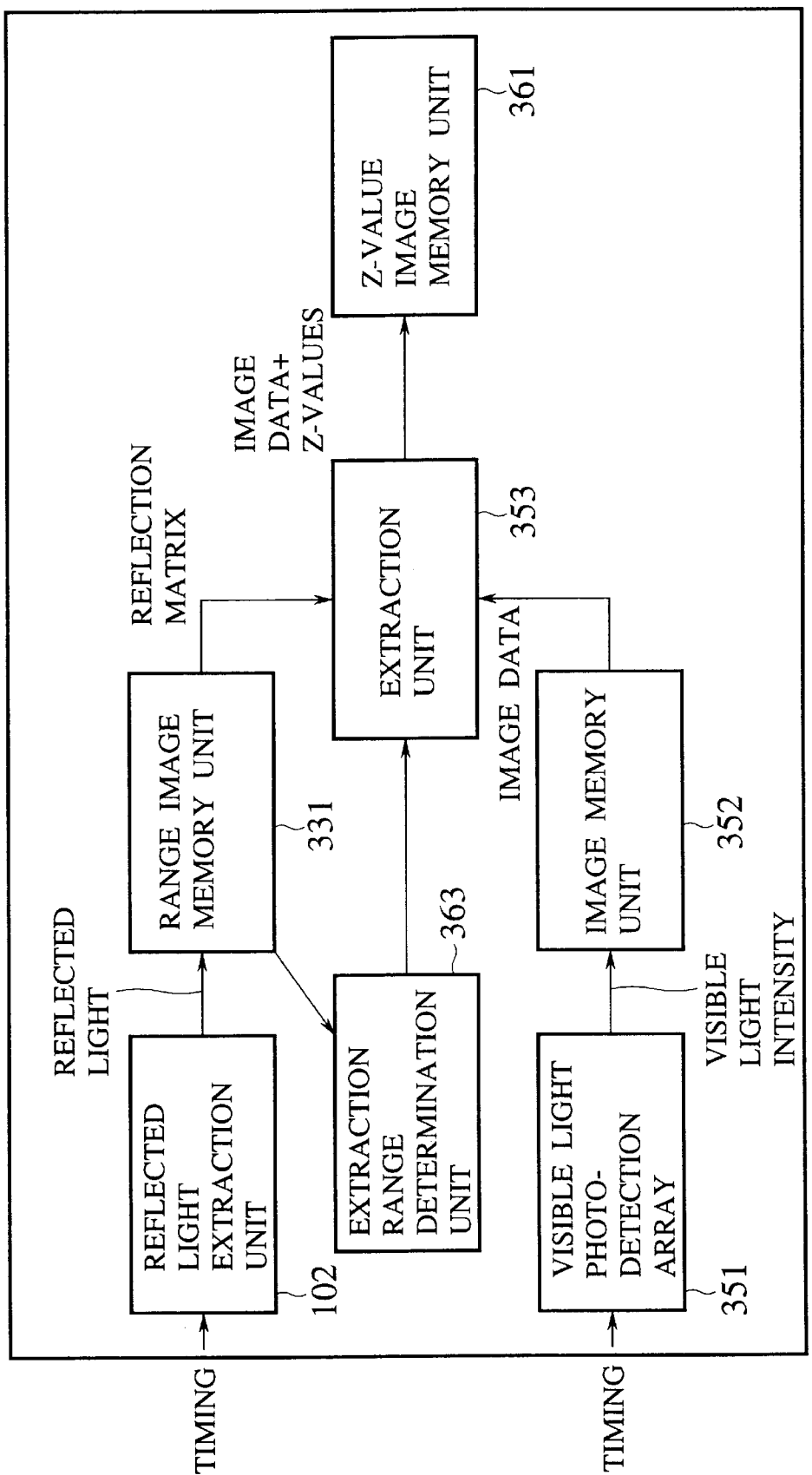
FIG. 57 is a block diagram showing another exemplary configuration of an information input generation apparatus according to the sixth embodiment of the present invention.

In the sixth embodiment as described above, it is rather difficult to extract a plurality of video images. This problem can be resolved by the following modification. In this case, the apparatus configuration is as shown in FIG. 57, where an extraction range determination unit 363 controls a range of the Z-values at a time of extraction, so that a plurality of targets can be extracted. For example, suppose that the obtained range image has a plurality of targets overlapping as shown in a part 8$a$) of FIG. 58. In this case, the extraction range determination unit 363 determines a plurality of central Z-values for extraction. Namely, the extraction range determination unit 363 obtains a histogram (frequency distribution) of the distances as shown in a part (b) of FIG. 58, from the range image of the part (a) of FIG. 58. Then, according to (peak positions in) this histogram distribution, the central Z-values for extraction are determined. In this case, there are two peaks in the histogram of the part (b) of FIG. 58 so that two central Z-values Zc1 and Zc2 can be determined. Then, the extraction is carried out by providing some width (denoted as $\gamma$) around these central Z-values, that is, in ranges of Zc1±$\gamma$ and Zc2±$\gamma$. The resulting extracted range images in this case are as shown in parts (c) and (d) of FIG. 58. Then, the video images corresponding to these extracted range images are extracted as the extracted images.

Figure 58:
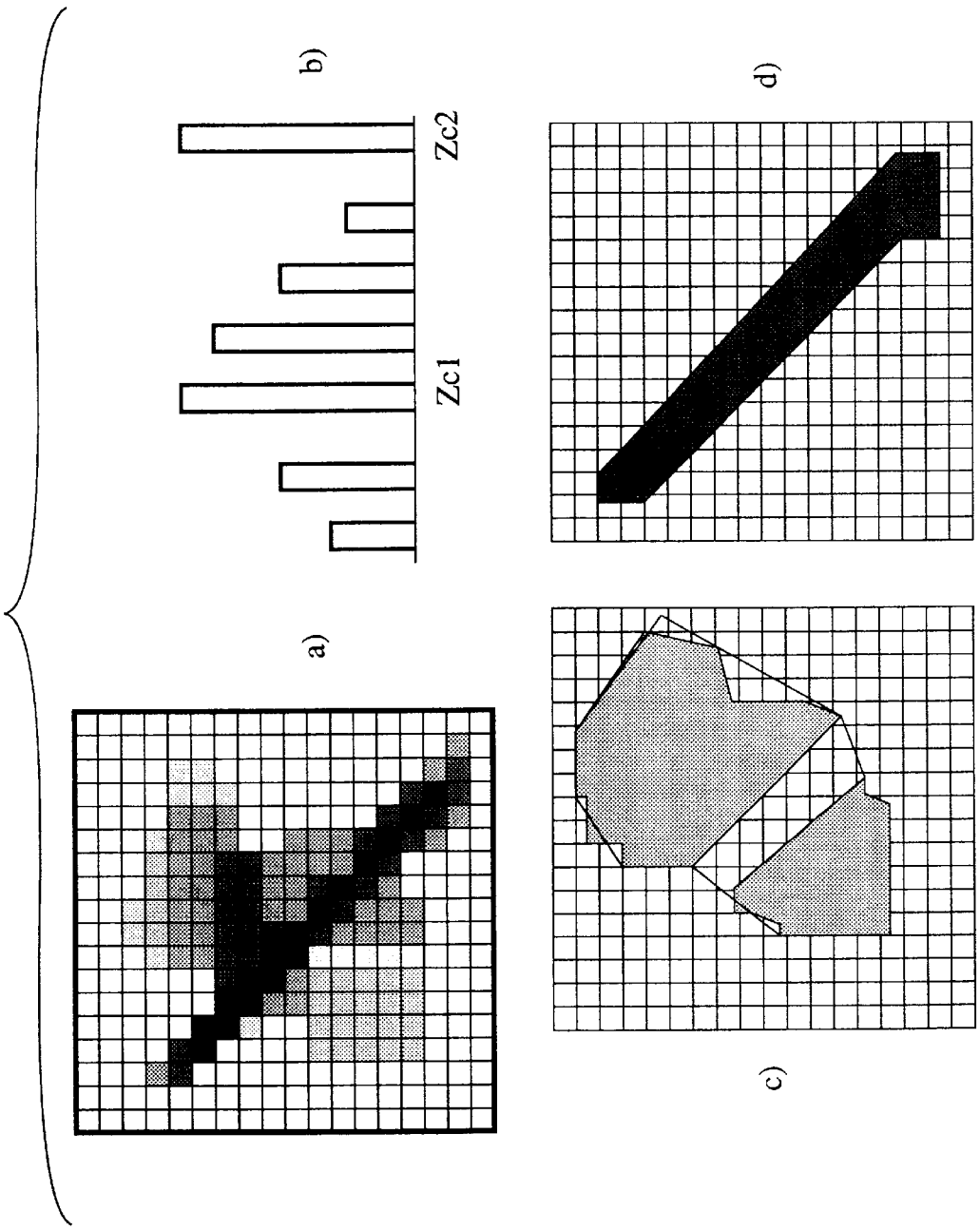
FIG. 58 is another diagram for explaining the operation carried out by the information input generation apparatus of FIG. 57.

In the part (c) of FIG. 58, the extracted region is divided into two parts, so that these two parts are connected by a closed curve as indicated in the part (c) of FIG. 58, to form a single unified target. Here, however, the video image for the connected part (where another target was originally located) is hidden by that another target so that it cannot be extracted. For this reason, the interpolation image is generated according to the already extracted image parts, and the extracted image is compensated by this interpolation image.

With respect to the Z-value images after the extraction, the shadowed region is processed by the drawing according to the respective Z-values similarly as described above, so as to realize the composition with the depth perspective.

In this modified case, it is possible to extract a plurality of targets and produce the video image with the depth perspective easily, so that the children can enjoy producing new video images (arts) at home, and therefore its effect is enormous.

<Seventh Embodiment>

Referring now to FIG. 59 to FIG. 73, the seventh embodiment of the present invention will be described in detail.

In the information input generation apparatus of the present invention, each pixel of the reflected light image indicates an intensity of the reflected light, but the intensity of the reflected light is inversely proportional to the square of the distance to the object. Consequently, the range image can be generated from the reflected light image by using a nonlinear conversion. However, the range image obtained here contains some errors, because the objects at the same distance do not necessary return the same reflected lights depending on their surface orientations and reflection characteristics. Yet, it is still possible to obtain the rough range image, so that errors in the range image due to the object property will be ignored here.

When the ideal reflected light image is obtained, it is possible to obtain a good range image by the nonlinear conversion. However, in practice, the ideal reflected light image cannot be obtained for various reasons. As a consequence, it becomes necessary to provide means for correcting the reflected light image correctly, or means for carrying out the nonlinear conversion and the correction together (both of which will be collectively referred to as correction means). This seventh embodiment describes such correction means in detail.

Here, the cause of the reflected light image distortion will be described first.

To begin with, there is an influence of an imaging lens. The imaging lens is used for focusing the reflected light from the object onto the sensor plane, and generally has a characteristic that its brightness changes according to the incident direction of the light. In general, the brightness is high in the optical axis direction, and becomes lower towards the periphery. In other words, even when the same amount of reflected lights are returned from the same direction, the central portion of the image becomes brighter than the peripheral portion.

The error in the range image is also caused by the non-uniformity of the light emission by the lighting unit. The illumination is generally not completely uniform and the illuminance on the irradiated surface is not uniform. This implies that even when the reflected light image is obtained from the light irradiated onto a flat scattering surface, the obtained reflected light image may not indicate a flat surface.

There is also a non-uniformity in the imaging by the imaging sensor for imaging the reflected light image. The imaging sensor generally comprises a two-dimensional array of cells, each having means for converting the light into charges, means for storing charges, means for transferring charges, and means for amplifying if necessary. The characteristics of these cells are not necessarily identical, and there are individual variations. The error in the range image can also be caused by these individual variations of the cells of the imaging sensor.

Due to various causes as described above, the distortion can be caused in the obtained reflected light image, and this in turn causes errors in the reconstructed range image. For this reason, the image correction becomes necessary.

Figure 59:
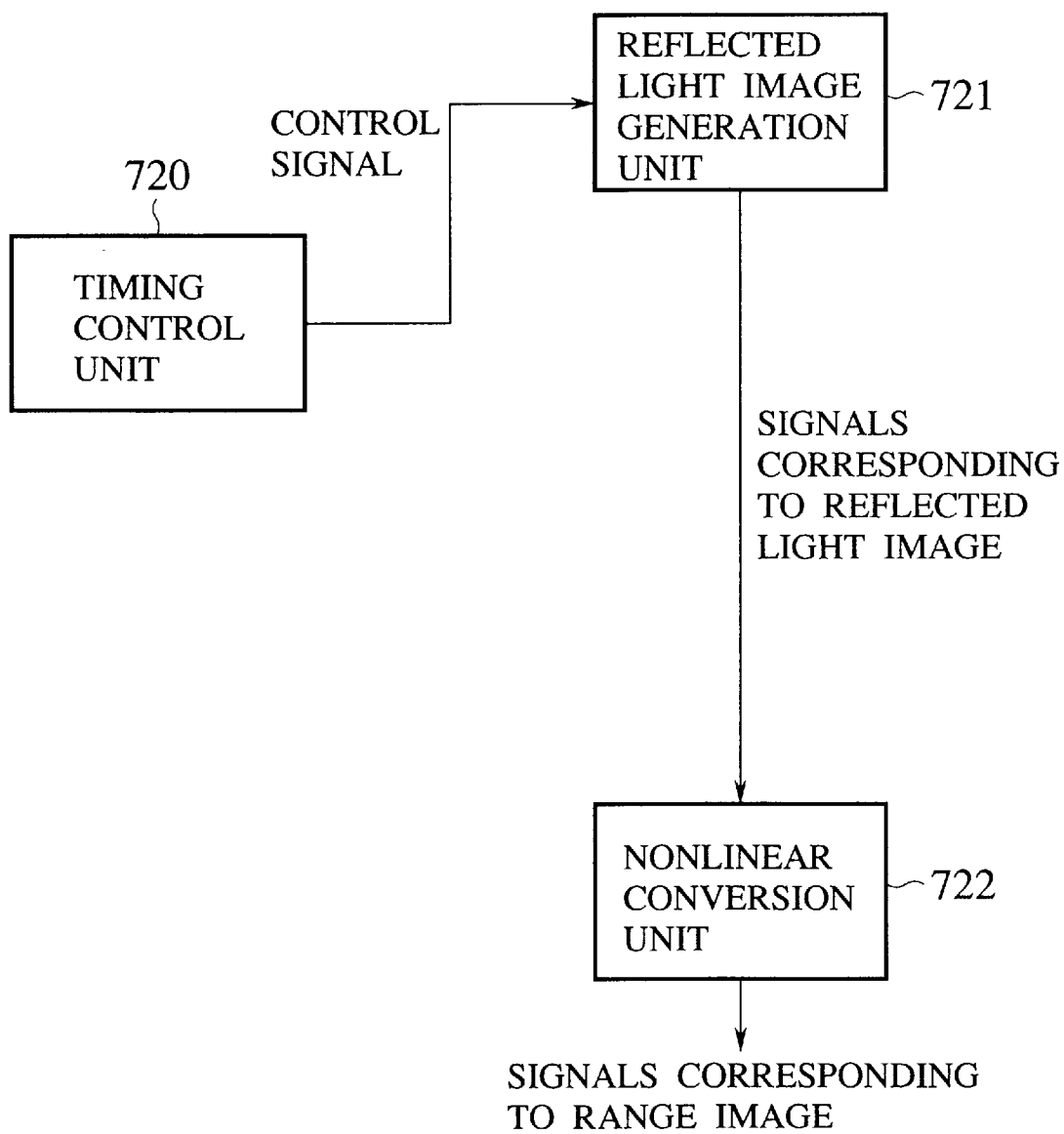
FIG. 59 is a block diagram showing one exemplary configuration of an information input generation apparatus according to the seventh embodiment of the present invention.

FIG. 59 shows an exemplary configuration for converting the reflected light image into the range image by using the nonlinear conversion.

A reflected light image generation unit 721 operates according to a control signal from a timing control unit 720 and outputs signals corresponding to the reflected light image. The lighting unit is assumed to be contained in this reflected light image generation unit 721. The output signals of this reflected light image generation unit 721 are analog signals.

A nonlinear conversion unit 722 is a nonlinear amplifier whose amplification rate is changed according to the input voltage. Ideally speaking, it is preferable to have the following relationship between the input voltage Vi and the output voltage Vo.

$$Vo = \frac{k}{\sqrt{Vi}} \quad (14)$$

where k is a constant. In practice, it is difficult to manufacture a nonlinear amplifier having such a characteristic, so that a nonlinear amplifier or a logarithmic amplifier having approximately similar characteristic may be used. A digital range image can be obtained by A/D conversing the signals outputted from the nonlinear amplifier unit 722.

Figure 60:
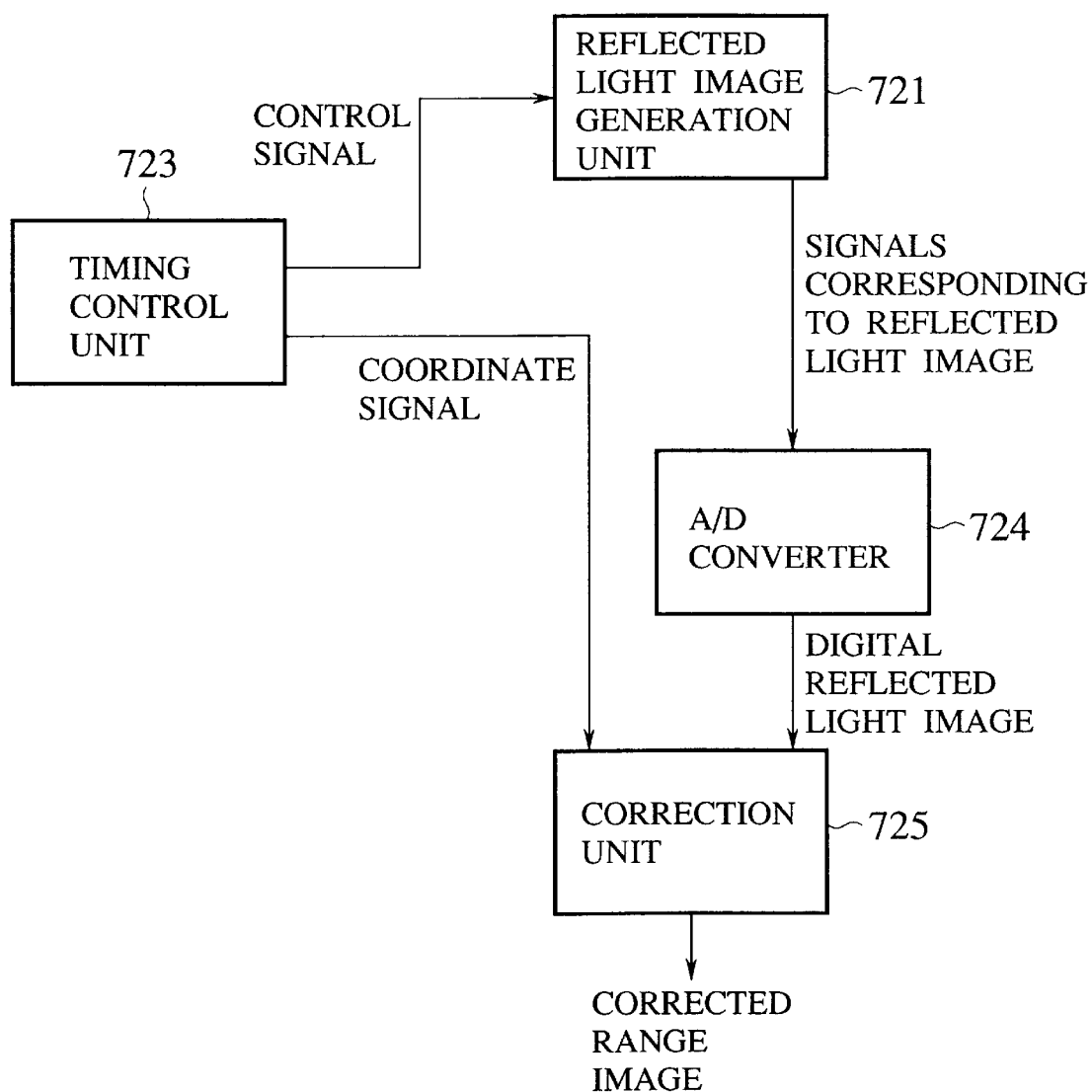
FIG. 60 is a block diagram showing another exemplary configuration of an information input generation apparatus according to the seventh embodiment of the present invention.

The nonlinear conversion unit 722 may not necessarily apply the analog conversion, and may apply the nonlinear conversion on digital signals after the A/D conversion. FIG. 60 shows an exemplary configuration in such a case.

The signals outputted from the reflected light image generation unit 721 are converted into digital data by an A/D converter 724, and this digital reflected light image is converted into the range image by a correction unit 725.

The correction unit 725 uses different correction parameters according to the coordinates in the image so that the coordinate information is obtained by a coordinate signal supplied from the timing control unit 723. In this case, an arbitrary characteristic can be realized by giving the input to an address signal of a ROM and taking the output as the converted value, so that the characteristic of the above equation (14) can be satisfied. However, the conversion of the above equation (14) ha a poor conversion precision when the input signal is large, so that it is preferable to apply the A/D conversion with a number of bits greater than that of the final output. In a case of applying the nonlinear conversion after the A/D conversion, it is possible to combine the nonlinear conversion unit with a unit for correcting the reflected light image as will be described below.

It is also possible to modify this configuration of FIG. 60 such that the image data after the A/D conversion are stored into a memory once and then the correction unit 725 accesses this memory to carry out the correction operation.

Figure 61:
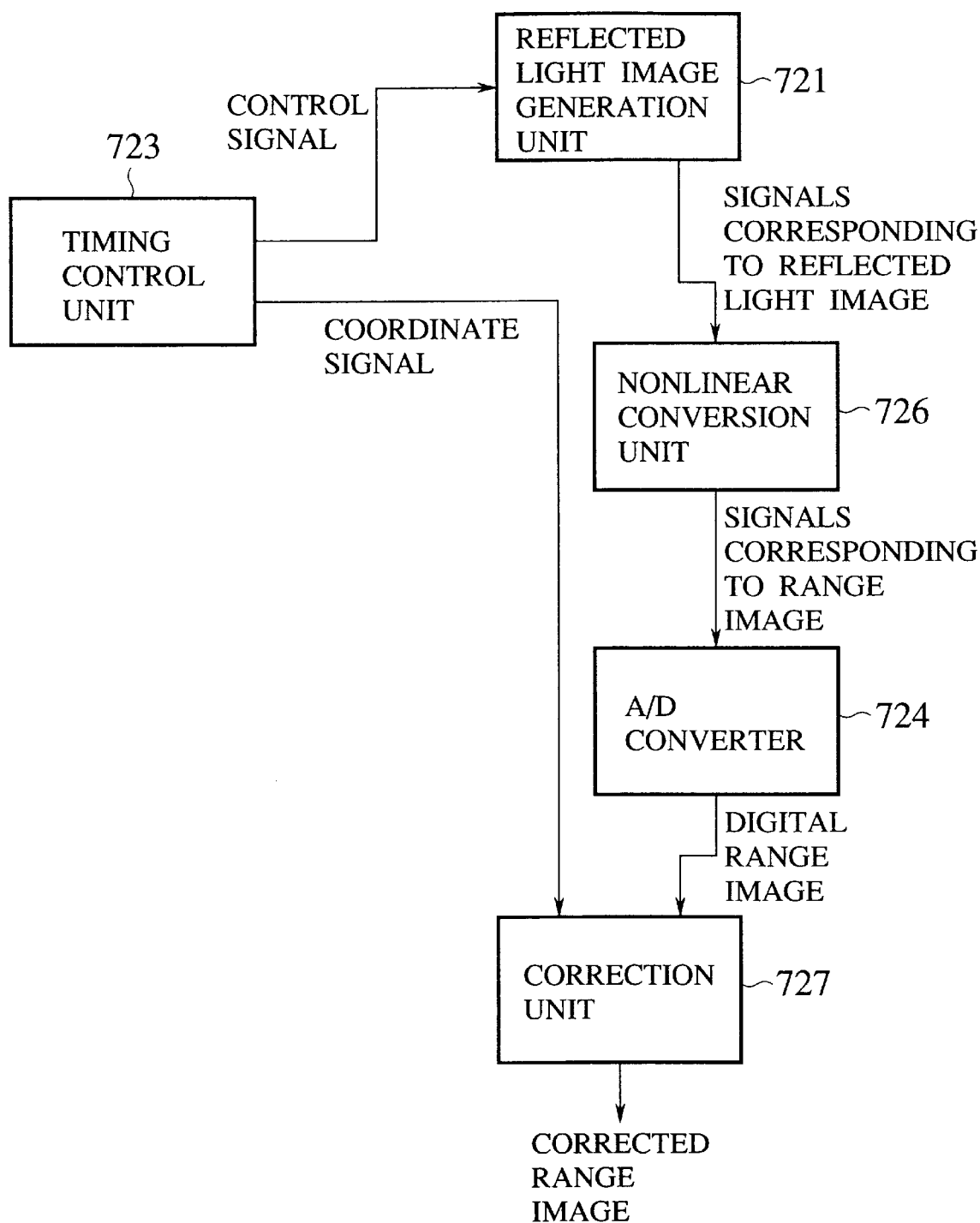
FIG. 61 is a block diagram showing another exemplary configuration of an information input generation apparatus according to the seventh embodiment of the present invention.

FIG. 61 shows an exemplary configuration for converting the reflected light image into the range image while correcting the distortion of the reflected light image, using two step conversion.

First, the output of the reflected light image generation unit 721 is converted into distance information by a nonlinear conversion unit 726. Then, this range image is A/D converted by an A/D converter 724, and this digital range image is further converted into an accurate range image by a correction unit 727. In order to correct the distortion of the reflected light image, it is necessary to make a correction for a two-dimensional image so that it is preferable to make a correction after the conversion into the digital image.

The use of such a two step conversion has the following advantages.

Figure 62:
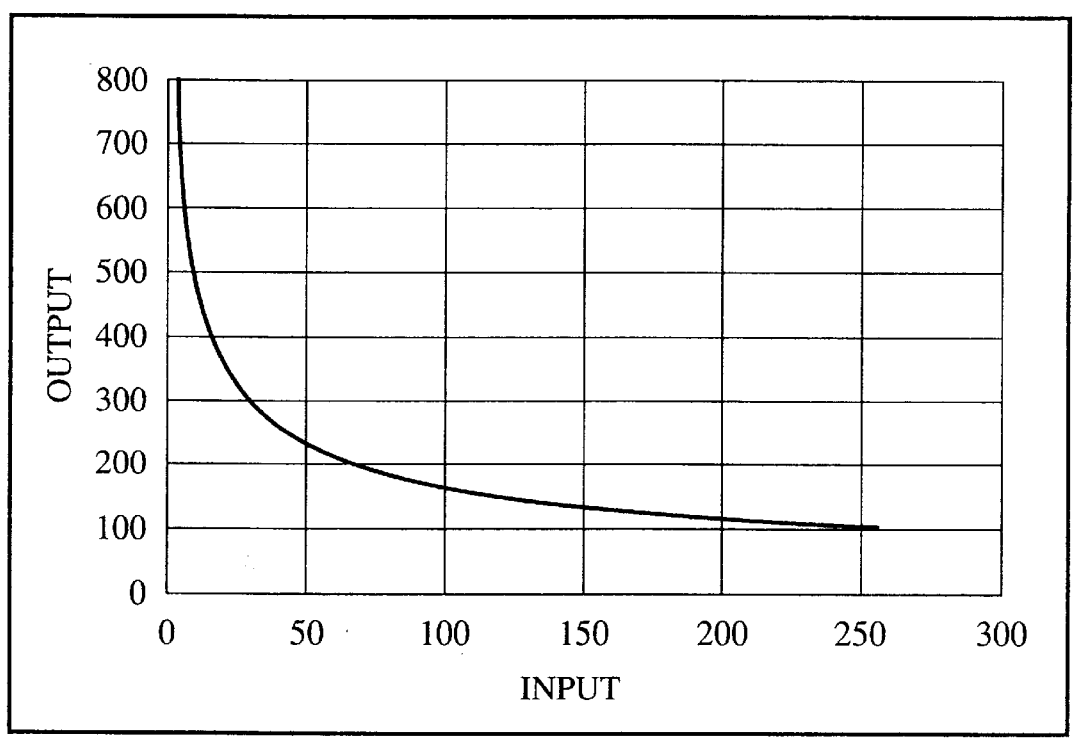
FIG. 62 is a graph showing an ideal characteristic of a nonlinear conversion used in an information input generation apparatus according to the seventh embodiment of the present invention.

When the conversion from the reflected light data to the distance data is carried out after the A/D conversion as in a case of FIG. 60, it becomes necessary for an A/D converter to have many number of bits. The ideal characteristic of the nonlinear conversion for converting the reflected light data into the distance data is a curve as shown in FIG. 62. It can be seen that, when such a nonlinear conversion is applied to the A/D converted image, the conversion precision becomes poor when the input signal is large. In order to avoid this problem, it becomes necessary to apply the A/D conversion with a number of bits greater than the eventually necessary number of bits. When this nonlinear conversion to convert the reflected light data into the distance data is applied before the A/D conversion, a required number of bits of the A/D converter can be less.

Also, the nonlinear conversion before the A/D conversion can have only a rough characteristic. In other words, there is no need to satisfy the characteristic of the above equation (14) completely. This is because, at a time of correcting the distortion of the reflected light image after the conversion, it is possible to make such a correction that the errors left out by the nonlinear conversion can be absorbed. No difficulty or cost increase ill be incurred by correcting the errors of the nonlinear conversion simultaneously at a time of correcting the distortion. In fact, it is possible to reduce the cost because a high precision will not be required to the nonlinear conversion at the analog signal level.

Note that this nonlinear conversion can also be realized by modifying the reflected light image generation unit 721 to output the nonlinear output signals in correspondence to the reflected light intensities.

Figure 63:
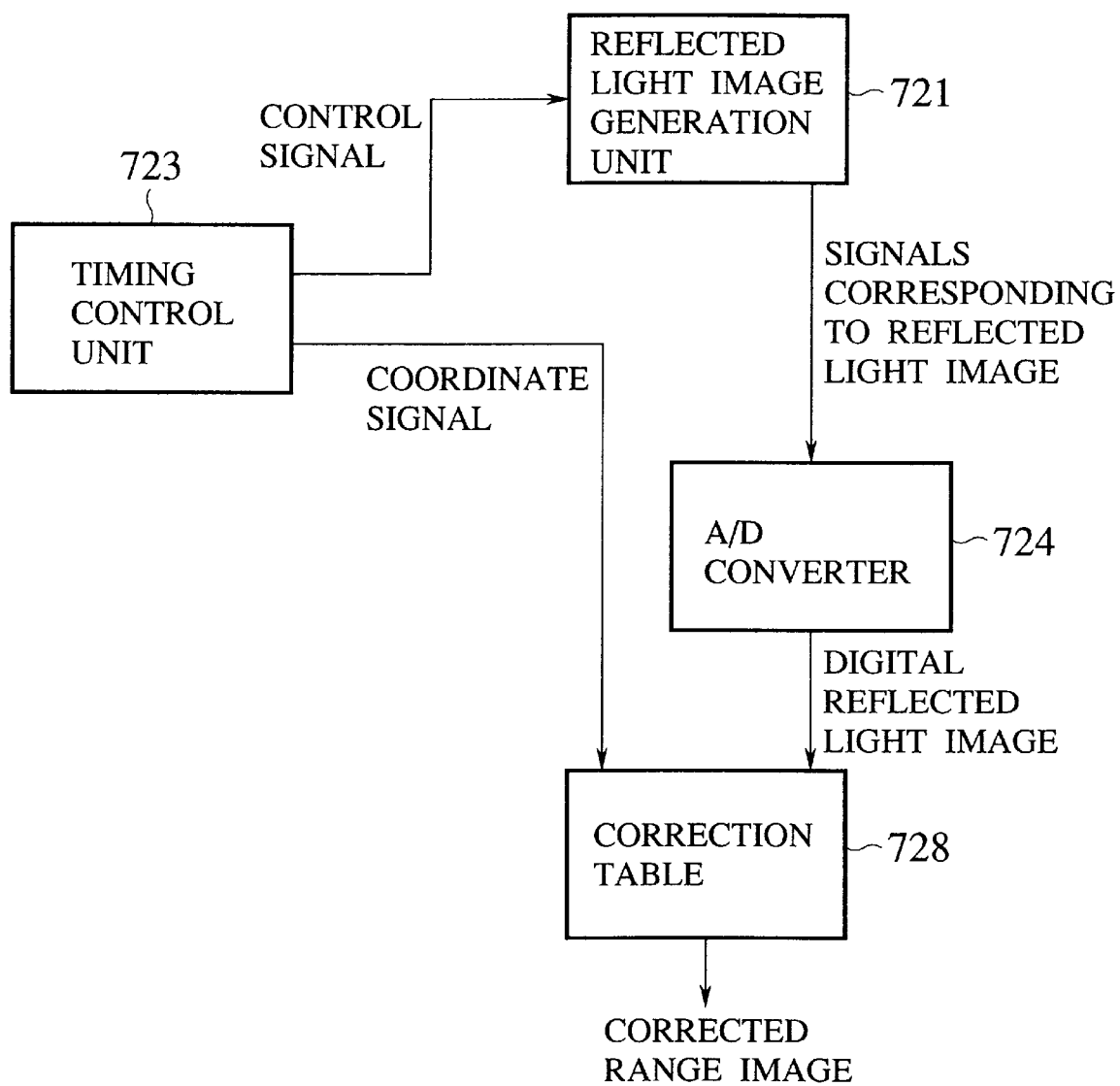
FIG. 63 is a block diagram showing another exemplary configuration of an information input generation apparatus according to the seventh embodiment of the present invention.
Figure 65:
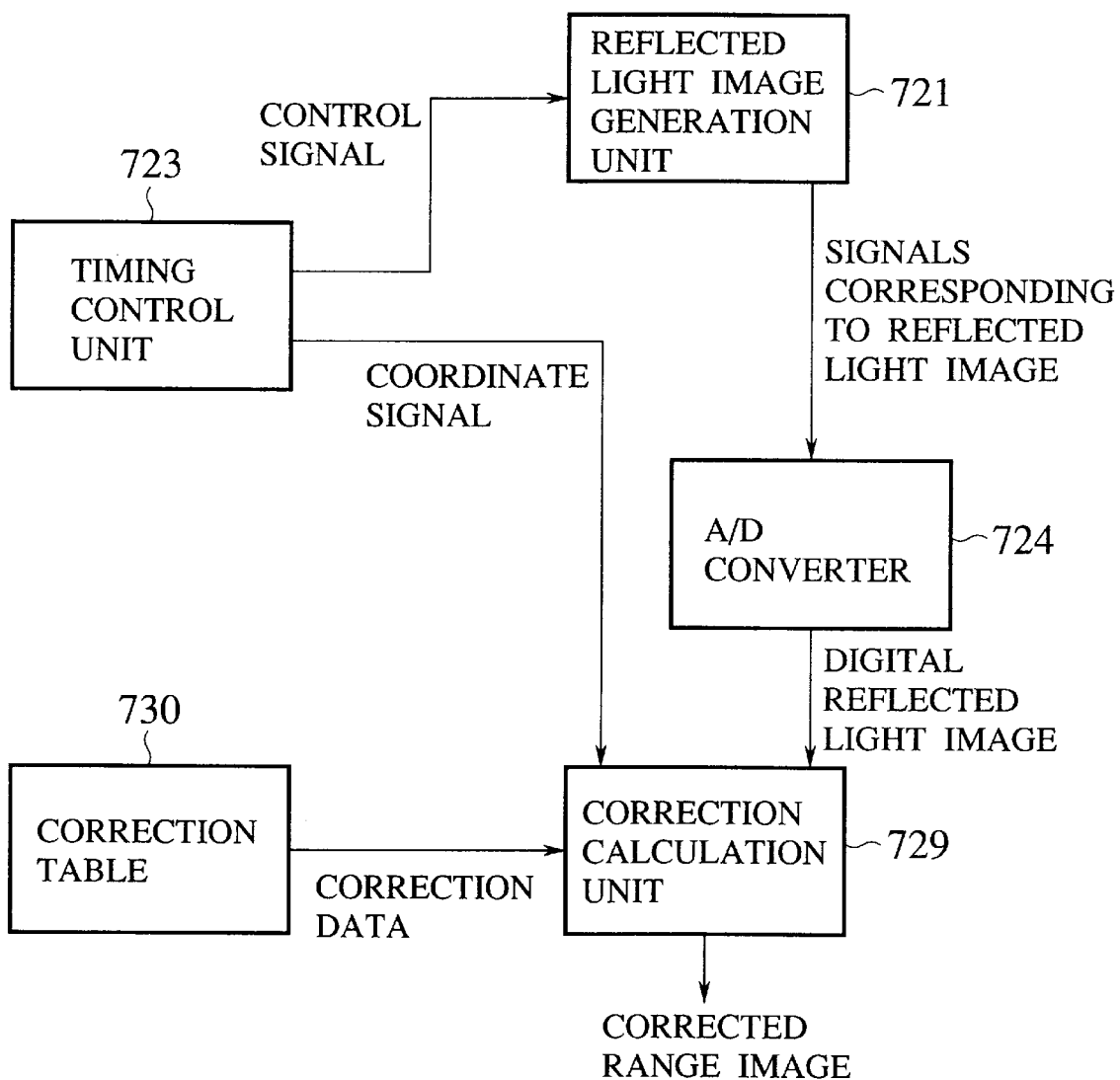
FIG. 65 is a block diagram showing another exemplary configuration of an information input generation apparatus according to the seventh embodiment of the present invention.

Next, the details of the correction unit in this seventh embodiment will be described. FIG. 63 and FIG. 65 show two exemplary configurations incorporating the correction unit in two specific forms.

FIG. 63 is a case of using a correction table 728 indicating one-to-one correspondences between the input and the output. When the number of pixels used is 64×64=4096 pixels, their coordinates can be expressed by 12 bits. Then, when the output data is 8 bits, the output value corresponding to arbitrary value of arbitrary pixel can be determined by using a memory having 20 bits address input. When the output value is 8 bits, this memory can be realized in form of a 1 MByte memory. FIG. 64 shows exemplary table data in this correction table 728. The coordinates expressed by 12 bits are allocated to rows, and the input values expressed by 8 bits are allocated to columns. An intersection point in this matrix indicates the output value corresponding to particular coordinate and input value.

FIG. 65 is a case of using a correction table 730 for only selected points. FIG. 66 shows exemplary table data in this correction table 730. The input values in the 256 gradation steps are partitioned at every 8 gradation steps, and the output value is indicated only for the partitioning input value in the table form. When an input value not registered in this table is entered, the output value is calculated by the linear interpolation from the two table values for two registered input values close to that input value.

For example, this table of FIG. 66 is defined as follows.

$$f(LOC, IN) = OUT$$

LOC=0, 1, . . . , 4095
IN=8n (n: 0, 1, . . . , 32)
OUT=0, 1, . . . , 255

Then, the input value not registered in this table can be expressed as follows.

$$IN = \{8a+b | a=0, 1, \ldots, 31, b=1, 2, \ldots, 7\}$$

In this case, the corresponding output value can be calculated as follows.

$$f(LOC, IN) = \tfrac{1}{8}(8-b)f(LOC, 8a) + b \cdot f(LOC, 8(a+1)))$$

When this scheme is adopted, the memory capacity required for storing the correction table can be reduced to ⅛ of that required in the configuration of FIG. 63.

Note that the correction data for points which are spatially close to each other on the image have close values. Consequently, instead of proving correction data for all coordinates, it is also possible to adopt a scheme in which the correction data are provided only for the selected coordinates and the correction data for the other coordinates are obtained by the calculation based on the correction data for nearby points. In this manner, the memory capacity for storing the correction data can be reduced further.

Figure 67:
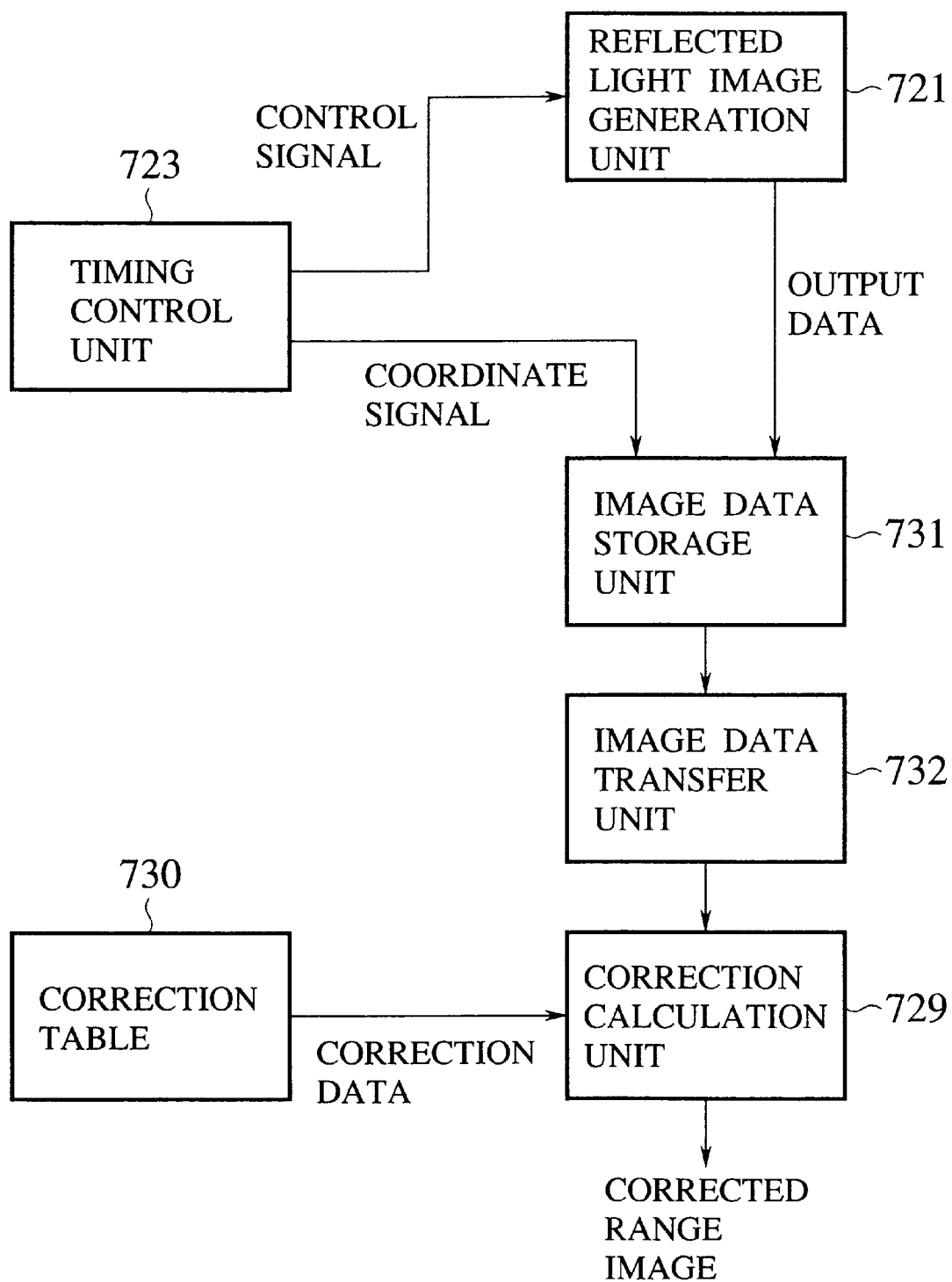
FIG. 67 is a block diagram showing another exemplary configuration of an information input generation apparatus according to the seventh embodiment of the present invention.

When this correction unit is realized in a form of software, the configuration may be modified slightly. FIG. 67 shows an exemplary configuration in such a case.

An image data storage unit 731 temporarily stores the reflected light image A/D converted by an A/D converter (not shown) without correction.

An image data transfer unit 732 then transfers the image data stored in the image data storage unit 731 to a computer for executing the correction processing. More specifically, this image data transfer unit 732 is an interface circuit provided on a hardware configuration including the reflected light image generation unit 721, or a device driver that functions to received data on a computer.

A correction calculation unit 729 is realized by a software executed on the computer. The correction data are stored in the correction table 730 which is also provided on that computer. In this case, the correction calculation unit 729 receives the image data, but these image data also contains coordinate information, so that it is logically equivalent to receiving the output data along with the coordinate information as in a case of FIG. 65.

Next, the method for producing the correction data in this seventh embodiment will be described.

Figure 68:
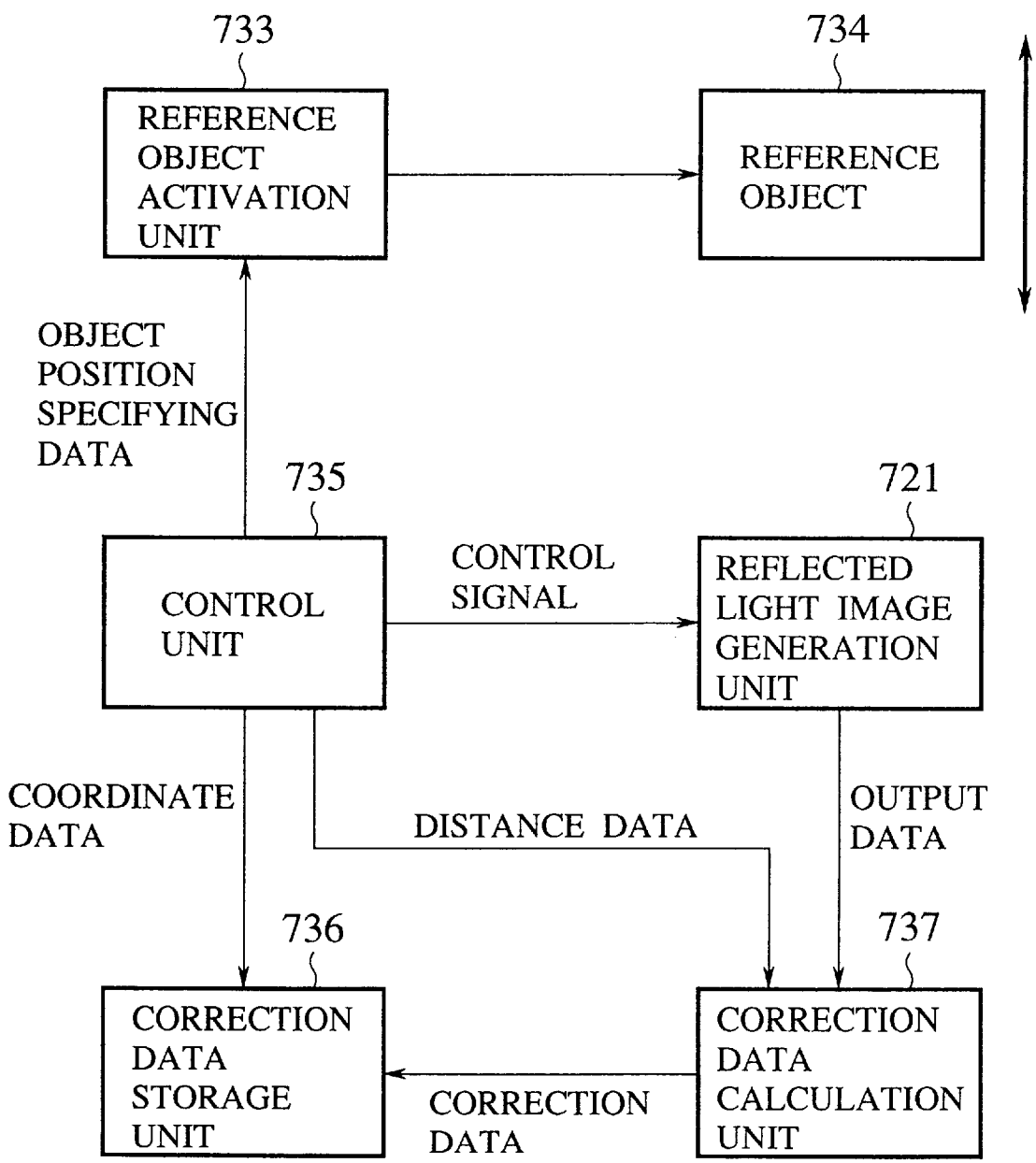
FIG. 68 is a block diagram showing another exemplary configuration of an information input generation apparatus according to the seventh embodiment of the present invention.

FIG. 68 shows an exemplary configuration of an apparatus for automatically producing the correction data. Here, the reflected light image generation unit 721 is the same as already described above. A control unit 735 has the function of the timing control unit 723 already described above, as well as a function for controlling a reference object activation unit 733.

The reference object activation unit 733 moves a reference object 734 according to the control signal from the control unit 735. The reference object 734 is in a form of a flat plate which is perpendicular to the optical axis of the imaging lens, and moved to change its distance with respect to the imaging section. In a case of producing the correction data for capturing a shape of the hand, it is preferable for this reference object 734 to have a reflection characteristic similar to that of the hand surface as much as possible.

The control unit 735 also provides the information on the current distance of the reference object 734 to a correction data calculation unit 737, and the coordinate signal to a correction data storage unit 736.

The correction data calculation unit 737 calculates the correction data from the reflected light image and the information on the current distance of the reference object 734. The calculated correction data are stored in the correction data storage unit 736, in correspondence to the coordinate information given from the control unit 735. Else, it is also possible to modify this configuration of FIG. 68 such that the coordinate information is supplied from the control unit 735 to the correction data calculation unit 737, and the correction data calculation unit 737 stores the correction data and the coordinate information in correspondence into the correction data storage unit 736.

Now, the processing in this configuration of FIG. 68 is carried out as follows.

First, the distance range to be inputted is divided into 256 equal parts, and the distance between the reference object 734 and the reflected light image generation unit 721 is sequentially changed in these 256 steps.

At each step, several reflected light images are captured, and one reflected light image is produced by averaging them. This operation is repeated at each distance, so as to obtain total 256 sets of the reflected light images. In this way, the relationship between the output and the distance at 256 points for each pixel is obtained.

Then, the correction data are produced according to this relationship. In a case of having the correction values with respect to all the output values (inputs of the correction unit), a table is formed from these data. In a case of having correction values discretely, each partition of the obtained relationship between the output and the distance is approximated by a line segment, and the intersections of the line segments are stored as the correction data.

Figure 69:
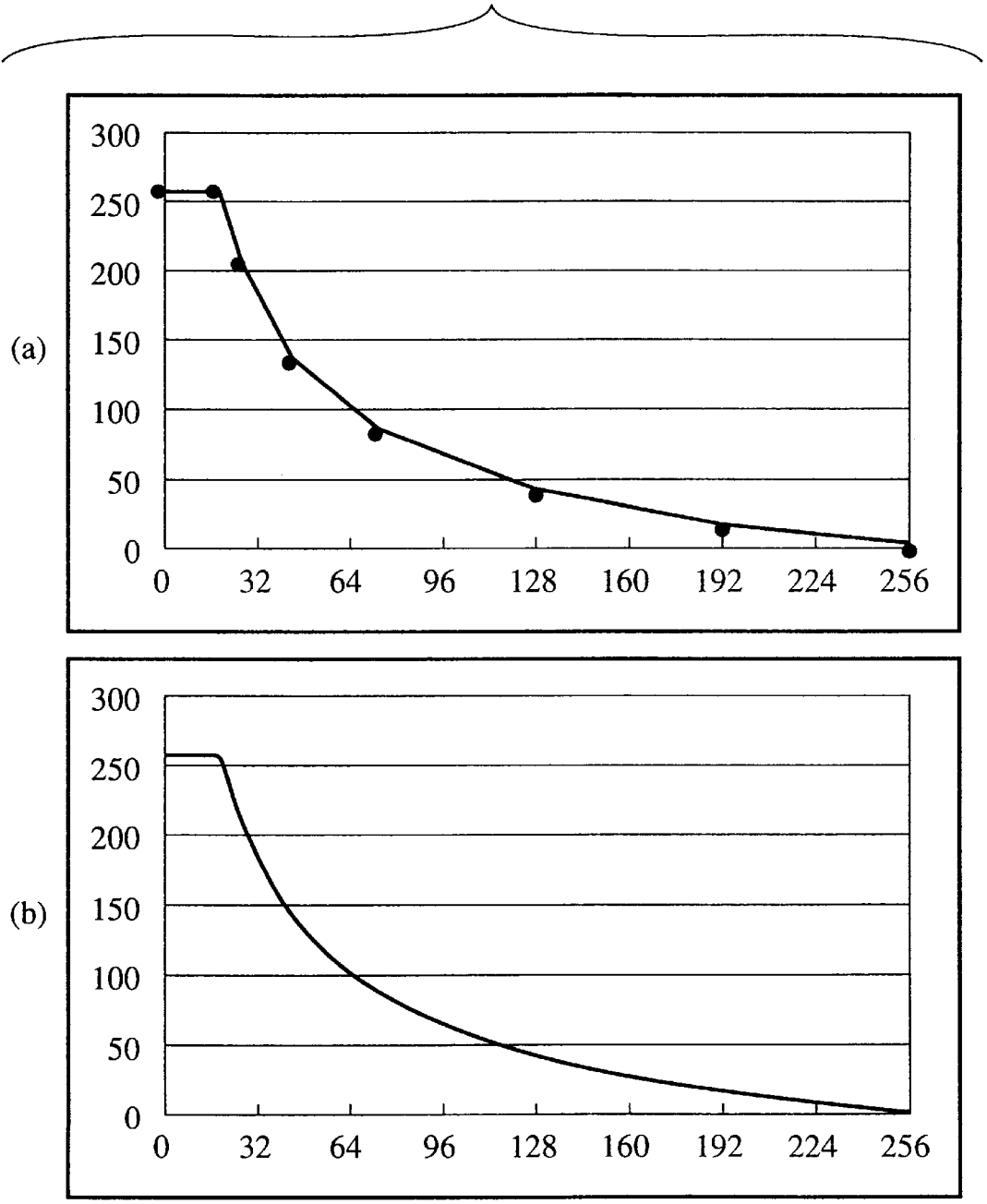
FIG. 69 is a diagram for explaining the operation carried out by the information input generation apparatus of FIG. 68.

For example, a curve shown in a part (b) of FIG. 69 is the relationship between the output and the distance as obtained by sequentially moving the reference object 734, and lines shown in a part (a) of FIG. 69 are the approximating line segments, where joints of these lines are the correction data. In such a case of having the correction data discretely, the correction data may be provided at regular intervals or the correction data may be provided at irregular intervals for an ease of the approximation. For example, a narrower interval can be used at sharply curving section and a wider interval can be used at nearly straight section. Note that, in graphs shown in FIG. 69, the output value has a ceiling because the output is assumed to be in 8 bits (0 to 255) so that any farther distance cannot be expressed.

The correction data as described above are preferably produced in advance and offered in a form of being included in a product, but there can be cases where it becomes necessary to produce the correction data again after the product is purchased by the user. For example, it is possible for the correction data to become inappropriate because of the change of the environment under which they are used, the malfunction of LED, the secular change or LED and sensor characteristic, or some other causes. It is also possible to require the user to produce the correction data from the beginning.

Figure 70:
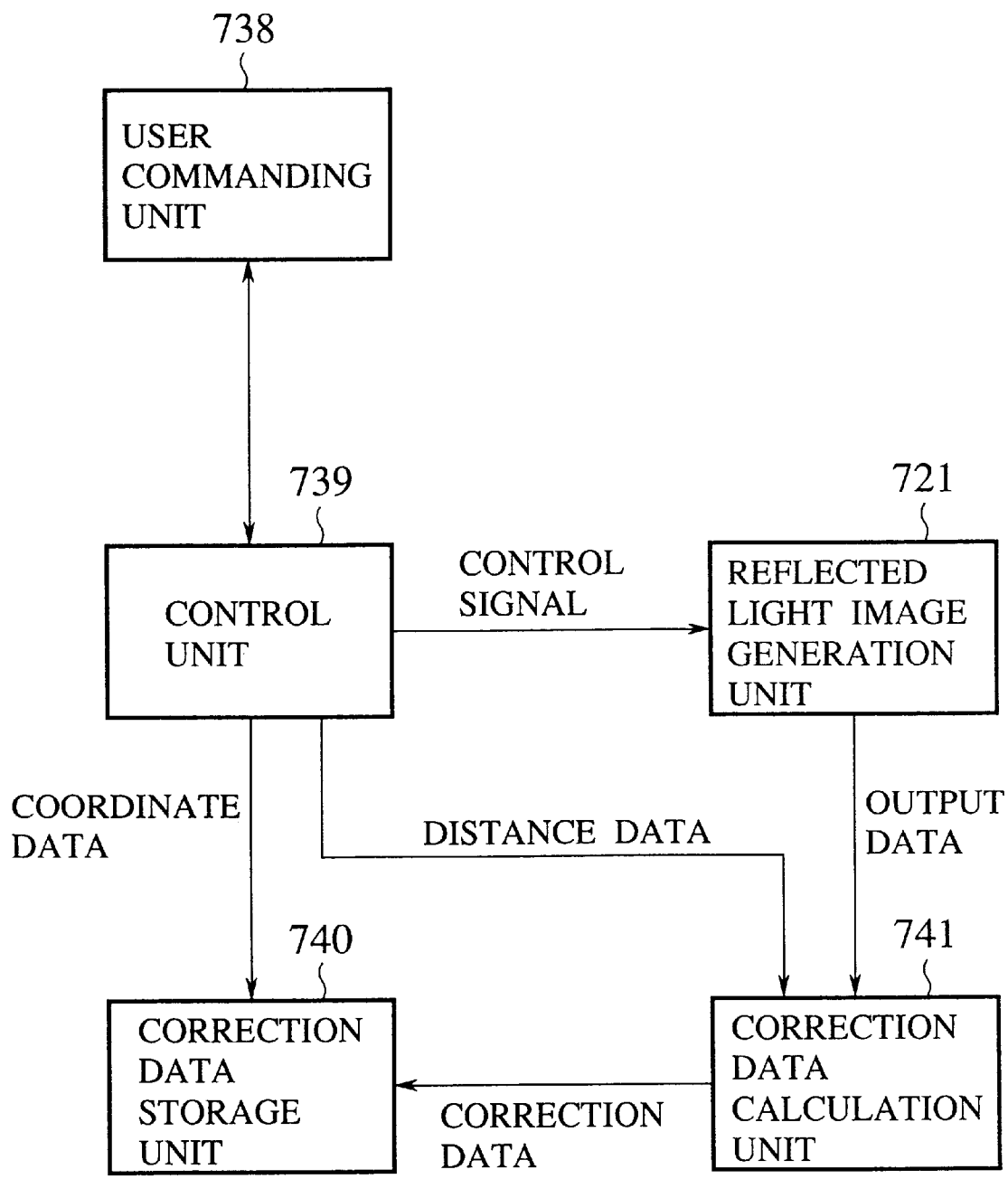
FIG. 70 is a block diagram showing another exemplary configuration of an information input generation apparatus according to the seventh embodiment of the present invention.

In such cases, there is a need to provide a mechanism for producing the correction data by the user operations. FIG. 70 shows an exemplary configuration for realizing this mechanism. Here, the constituent elements other than a user commanding unit 738 are basically similar to those of FIG. 68.

The user commanding unit 738 sequentially commands the user to place a reference object at specified distances. The user only need to carry out the commanded operations according to this command, and the rest of the reference data production processing is carried out automatically. Here the method for producing the correction data is basically the same as described above. Here, however, it is not very appropriate to require the repetitive manual operations to the user too many times at excessively minute intervals. Also, the position and the orientation of the reference object placed by the manual operation are not necessarily very accurate, so that it is important to carry out the calculation by anticipating reasonable errors.

FIG. 71 shows an exemplary dialogue box to be displayed on the screen by the user commanding unit 738.

When the correction data are produced by the user operations, the reliability of the correction data is inevitably lower, because the user places the reference plate at the specified position but the position and the orientation of the placed reference plate are not necessarily accurate. In view of this fact, it is also possible to absorb the inaccuracy by limiting the correction targets to only those factors which can be easily modelled.

One of the major causes of the distortion in the range image reconstructed from the reflected light image is the lowering of the peripheral light amount in the imaging lens which causes the lower brightness at positions farther away from the optical axis. In other words, even when a flat plate is placed, the reflected light amount at the peripheral portion is smaller than that at the central portion. In practice, the further light amount lowering due to the larger distance for the peripheral portion is also added to this effect.

When the non-uniformity of the sensor sensitivity and the non-uniformity of the light emission are within the tolerable range, it suffices to correct only this light amount lowering (including the lowering due to distance difference) of the lens. Since the specification of the lens is known in advance, the characteristic regarding the extent of this peripheral light amount lowering is also known in advance. Consequently, under the assumption that the optical axis passes through the center of the image sensor, the correction data can be easily obtained by the calculation based on this known characteristic. However, the optical axis may not necessarily pass through the center of the image sensor, mainly because of an error in a mounting position of the image sensor introduced at a time of mounting a sensor chip on a sensor package. Yet, the correct correction is still possible by shifting the correction data obtained under the assumption that the optical axis passes through the center of the image sensor, as much as the displacement of the image sensor.

Figure 72:
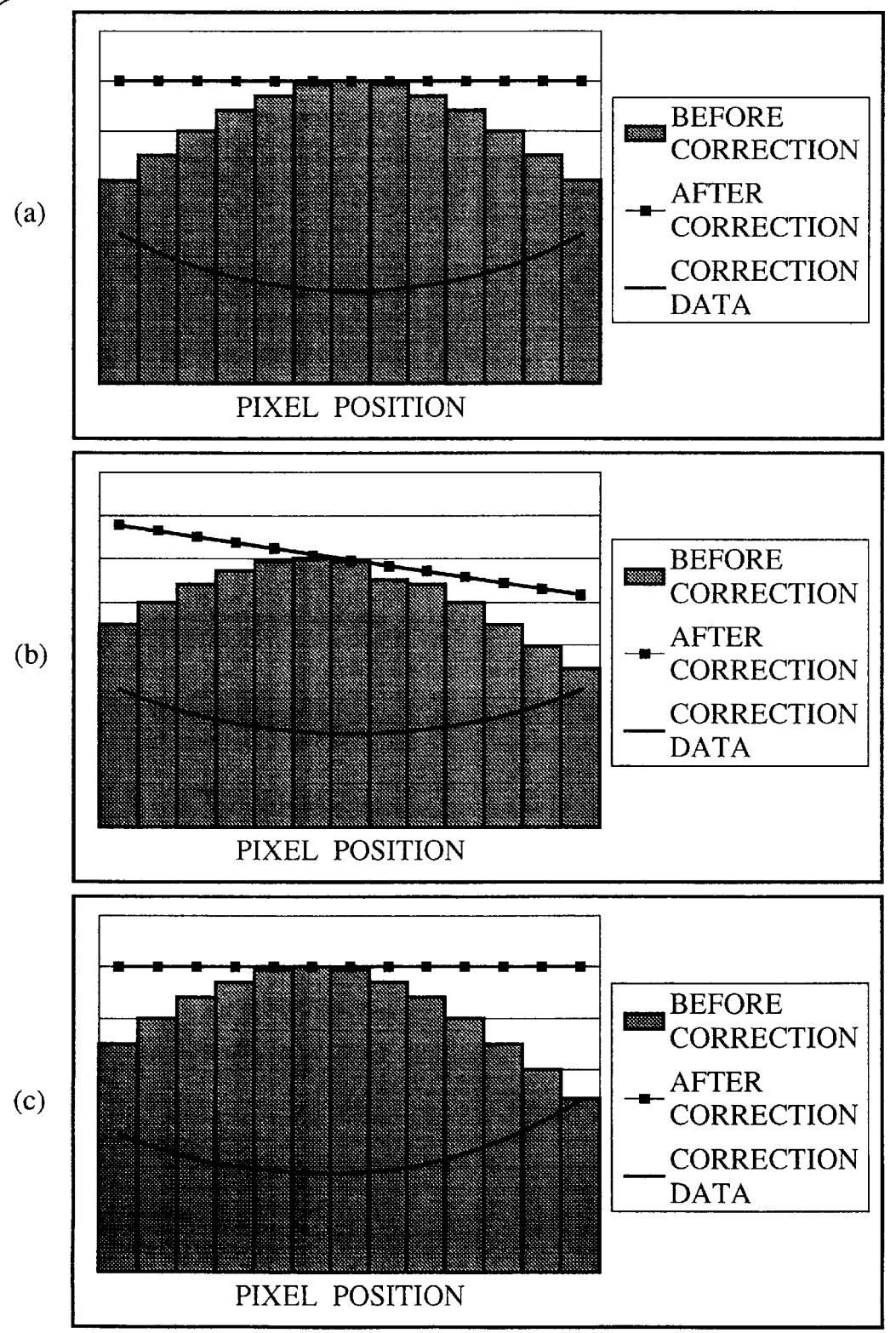
FIG. 72 is a diagram for explaining the operation carried out by the information input generation apparatus of FIG. 70.

FIG. 72 shows an exemplary case of such a shift of the correction data, where bar graph indicates the raw data before correction, a curve graph indicates correction data which are assumed to be values to be multiplied to the raw data, and a line graph with markers indicate corrected data. The image data is actually two-dimensional, but only one dimension part (x-direction or y-direction part) is shown in FIG. 72 for the sake of simplicity.

A part (a) of FIG. 72 shows the reflected light image obtained from a flat surface when the optical axis of the lens passes through the center of the sensor, in which the power decreases smoothly from a peak at the center toward the periphery. In this state, when the correction data as indicated by a curve graph are multiplied, the data values becomes uniform as indicated by a line graph with markers, so that the flat surface can be expressed.

A part (b) of FIG. 72 shows a case where the optical axis of the lens is displaced from the center of the sensor. It can be seen that the corrected data obtained by multiplying the correction data do not indicate a flat surface.

A part (c) of FIG. 72 shows a case where the correction data is shifted from a state shown in the part (b) such that the corrected data obtained by multiplying the shifted correction data now correctly indicate a flat surface.

In this manner, when the peripheral light amount lowering of the lens is dominant, it suffices to provide the correction model for a case where the optical axis of the lens passes through the center of the sensor, and sequentially shift these correction data to find out a position where the correction result is closest to the flat.

Figure 73:
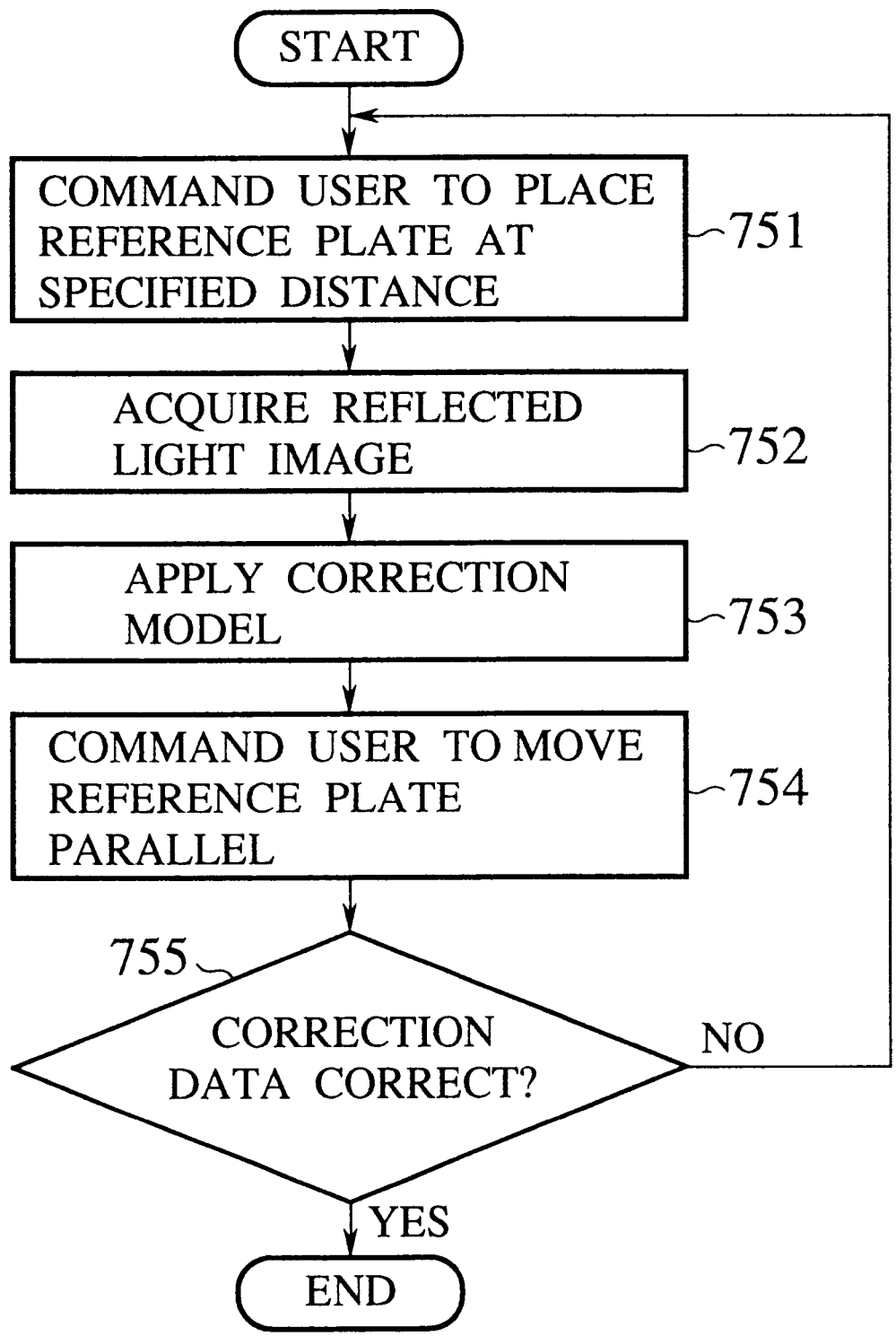
FIG. 73 is a flow chart for the operation carried out by the information input generation apparatus of FIG. 70.

FIG. 73 shows a flow chart for this operation to produce correct correction data by shifting the correction data. In this operation of FIG. 73, the user is commanded to place the reference plate at the specified distance (step 751) and the reflected light image is acquired (step 752). Then, the correction model is applied so that the position of the correction data is shifted horizontally so that the values after the correction indicate a flat surface as in a part (c) of FIG. 72 (step 753), and after the correction data are produced, the user is commanded to move the reference plate parallel (step 754). By moving the reference plate, the reflected light images of the reference plate at many distances are acquired and the corrected images are produced for these reflected light images, and then whether the correction data are correct or not is judged (step 755). Here, whether the correction data are appropriate or not may be judged automatically, or the corrected range image may be shown to the user and the user may be asked to judge whether it is correctly corrected or not.

Note that a case of requiring the user to produce the correction data has been described here, but it is also effective to use this correction model even in a case of automatically producing the correction data by using the reference object moving means.

<Eighth Embodiment>

Referring now to FIG. 74 to FIG. 79, the eighth embodiment of the present invention will be described in detail.

This eighth embodiment is directed to a system configuration incorporating the information input generation apparatus of the present invention as described in the above embodiments.

Figure 74:
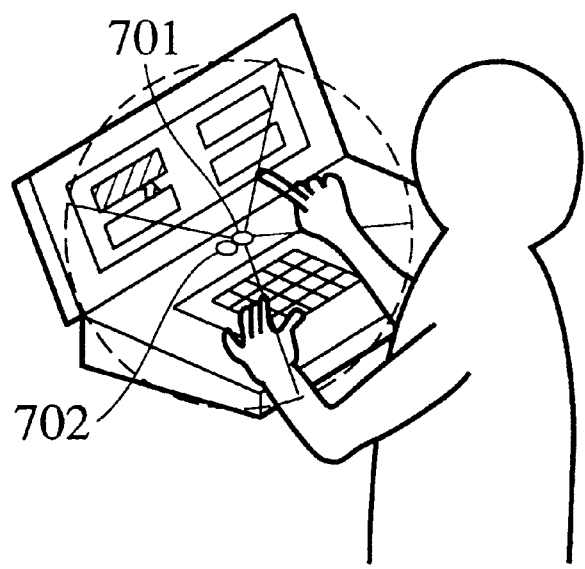
FIG. 74 is a diagram showing an exemplary system configuration incorporating an information input generation apparatus according to the eighth embodiment of the present invention.

FIG. 74 shows a computer equipped with the information input generation apparatus of the present invention. This computer of FIG. 74 is a portable computer generally called note PC in which a keyboard and a display are integrally provided with the computer body. In this computer of FIG. 74, a lighting unit 701 and a photo-detection sensor unit 702 of the information input generation apparatus are provided at positions beyond the keyboard when viewed from an operator side, and arranged to have the optical axis of the photo-detection sections pointing obliquely upward towards the operator side. In FIG. 74, the entire hand of the operator is illuminated, as can be seen from a dashed line circle indicating a range of illumination.

In this configuration, the operator operating the keyboard can make the pointing or gesture input by slightly raising and moving the index finger. The user's convenience is remarkably improved here because the keyboard input and the pointing or gesture input can be made without hardly any shift of the hand position. It is also possible to provide a button for use in conjunction with the pointing or gesture input. The operations such as click and drag for selecting and moving icons on the screen can be carried out by using this button. It is also convenient to use a button in a case of inputting a timing trigger in the gesture input.

It is also possible to make this information input generation apparatus operable only when the button is depressed. Namely, when it is desired to make the pointing or gesture input, the input is made by moving hand while depressing the button. In this manner, it is possible to prevent an erroneous operation due to an accidental entry of the finger into the operation region without an intention for making the pointing or gesture input. This is particularly effective in a case of pointing, because there is no possibility for making an erroneous pointing operation while using the keyboard. The operation region can be set very close the home position of the keyboard so that the pointing operation can be made with the minimum movement of the hand (such as the slight upward pointing of the index finger of the right hand). In addition, the lighting unit emits the light only when the button is depressed so that the power consumption can be saved.

In a case of the note PC, this button can be replaced by a key of the keyboard. For example, in a case of using a space bar, normally this space bar is set to have a function for inputting a space, and when this space bar is depressed while the cursor is displayed by the finger pointing, this space bar is set to have a function for inputting operations such as click and drag.

Figure 75:
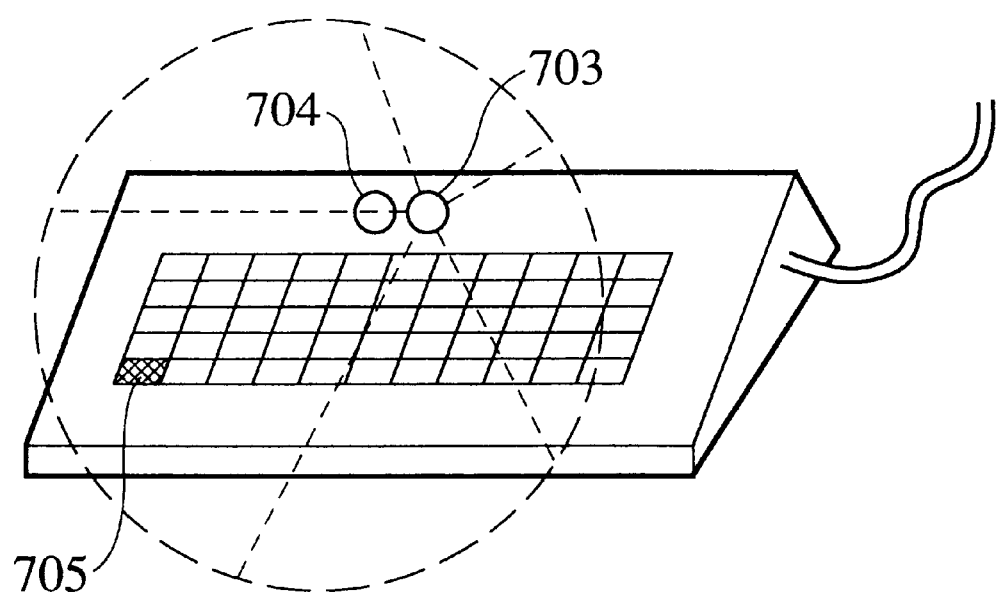
FIG. 75 is a diagram showing another exemplary system configuration incorporating an information input generation apparatus according to the eighth embodiment of the present invention.

In a case of using a separate keyboard, a positional relationship between the keyboard and this information input generation apparatus can be an important factor. FIG. 75 shows a keyboard device equipped with the information input generation apparatus of the present invention. Similarly as in a case of the note PC described above, a lighting unit 703 and a photo-detection sensor unit 704 are provided at positions in such a positional relationship with the keyboard that the light is irradiated onto the hand when the hand is raised from the home position of the keyboard. Here, again, a dashed line circle indicates a range of illumination.

Although not always necessary, a key 705 that can be used in conjunction with the pointing or gesture input is also provided in the keyboard device of FIG. 75. By replacing the existing keyboard with this keyboard device of FIG. 75, it is possible to use the keyboard input and the pointing or gesture input together under the comfortable environment. Two keys like the key 705 may be provided at left and side sides of the keyboard in order to make it equally convenient for the left-handed user and the right-handed user.

Figure 76:
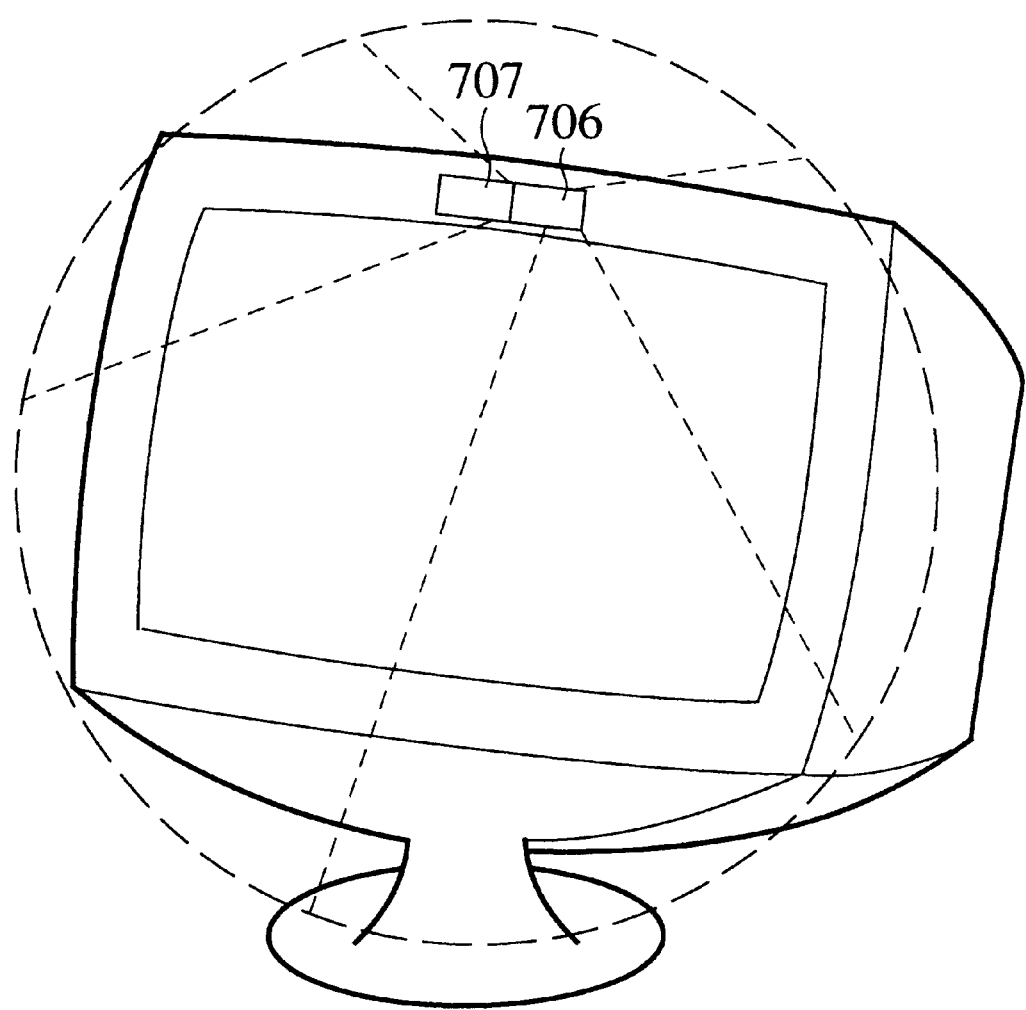
FIG. 76 is a diagram showing another exemplary system configuration incorporating an information input generation apparatus according to the eighth embodiment of the present invention.

FIG. 76 shows a display device equipped with the information input generation apparatus of the present invention. This device is convenient when a positional relationship between the operating hand and the screen is important. A lighting unit 706 and a photo-detection sensor unit 707 are provided above the display screen. The orientation of the light and the photo-detection section is set to be slightly downward so that a range indicated by a dashed line circle can be illuminated. This arrangement is adopted because it is easier for a user to make the operations by positioning the hand at roughly the same or slightly lower height as the screen.

In FIG. 76, the information input generation apparatus is arranged at an upper part of the display device, but it is also possible to arrange the information input generation apparatus at a lower part or a side part of the display device. By arranging one information input generation apparatus on the left side and another information input generation apparatus of the right side, it is also possible to create an environment where the input can be made by both hands simultaneously.

Figure 77:
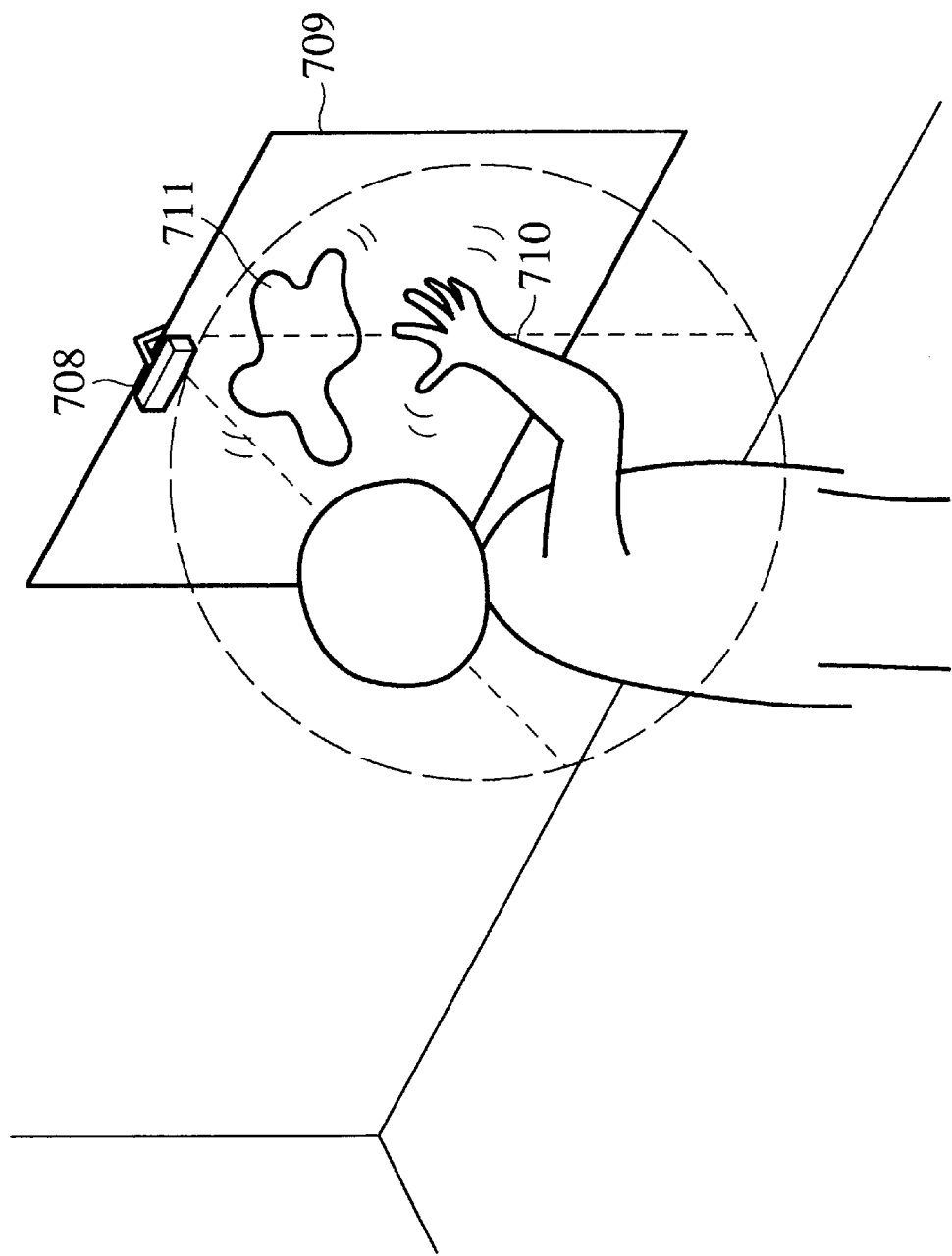
FIG. 77 is a diagram showing another exemplary system configuration incorporating an information input generation apparatus according to the eighth embodiment of the present invention.

FIG. 77 shows a display device embedded on the wall which is equipped with the information input generation apparatus of the present invention. Here, an information input generation apparatus is either attached to or placed nearby an embedding type display 709. The information input generation apparatus may be formed integrally with the embedding type display 709. At least the lighting unit and the photo-detection sensor unit of the information input generation apparatus are provided within a box shaped casing 708 placed above the display 709. The feature data generation unit of the information input generation apparatus may be also provided within this casing 708, or contained inside the display body, or else provided separately. It is preferable for this casing 708 containing the lighting unit and the photo-detection sensor unit to have its orientation adjustable. In FIG. 77, a range indicated by a dashed line circle is illuminated, and an object 711 displayed on the display 709 is operated as an operator moves his hand 710 within this range.

This display device of FIG. 77 is suitable for an information presentation or input terminal at a public location such as a museum or a station. It is also possible to create a preferable environment by using a combination of a compact display embedded on the wall and the information input generation apparatus as an operation unit for the home automation and the like.

Figure 78:
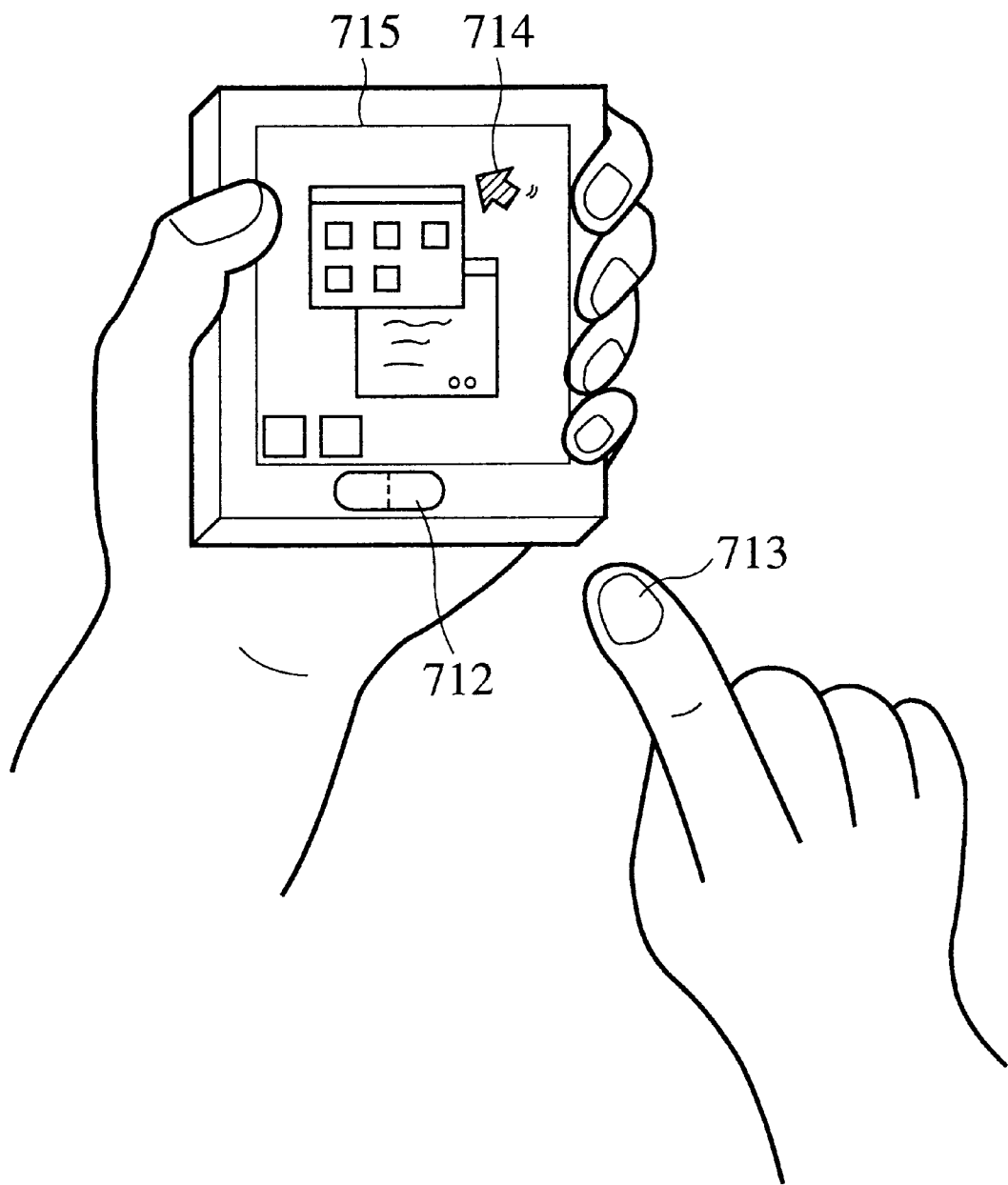
FIG. 78 is a diagram showing another exemplary system configuration incorporating an information input generation apparatus according to the eighth embodiment of the present invention.

FIG. 78 shows a compact portable information device equipped with the information input generation apparatus of the present invention, which is in a size that can be held by one hand. The information input generation apparatus of the present invention only requires to have a window capable of lighting and photo-detecting on an external body, so that a limited space available in this compact portable information device can be utilized efficiently. In FIG. 78, a window 712 is provided for the lighting unit and the photo-detection sensor unit. A position of a cursor 714 on the screen can be controlled by moving a finger 713 in front of this window 712. Here, the window 712 is so small that the remaining space can be used as a relatively large display unit 715 despite of an overall compact size of this compact portable information device.

Figure 79:
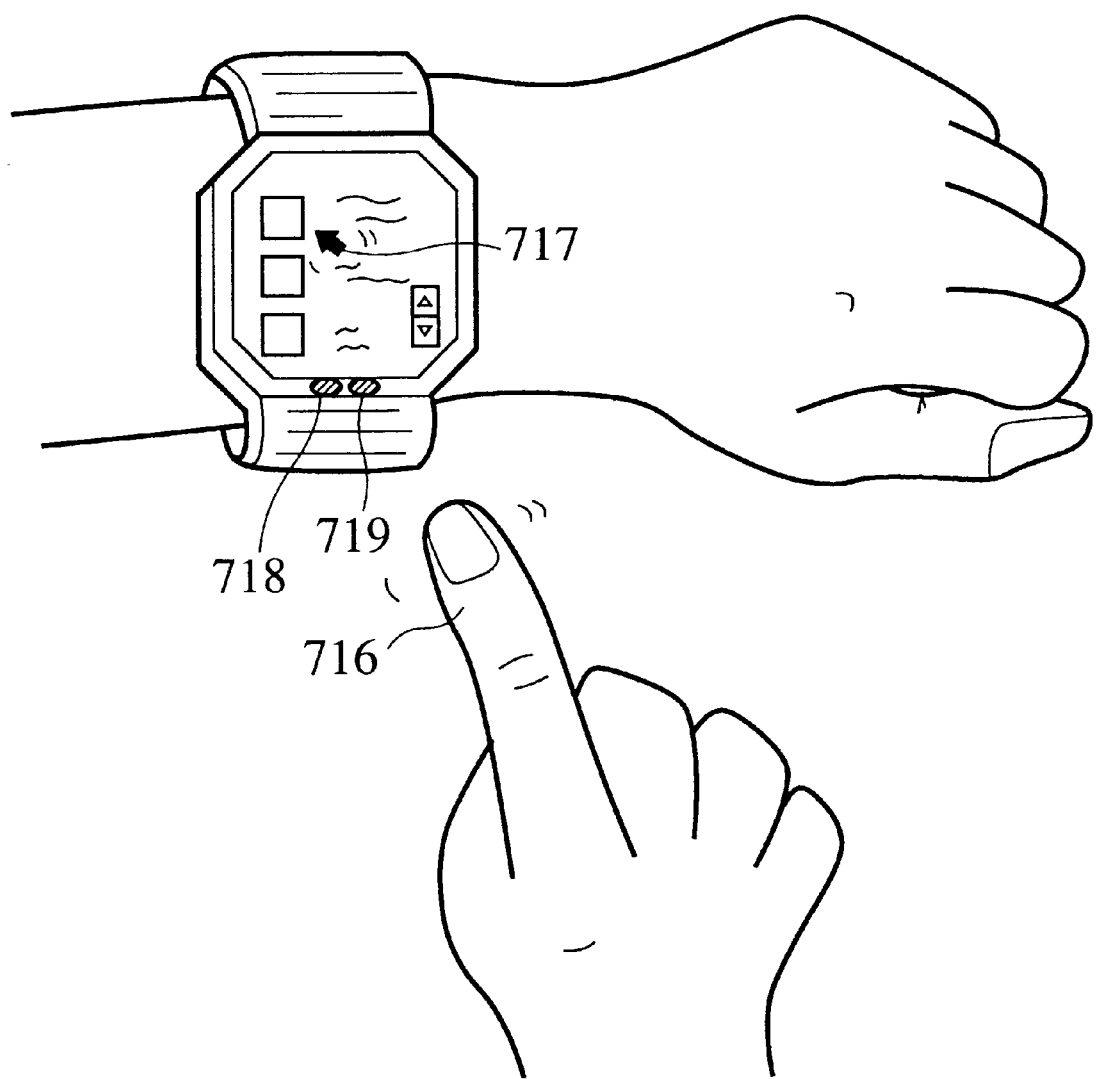
FIG. 79 is a diagram showing another exemplary system configuration incorporating an information input generation apparatus according to the eighth embodiment of the present invention.

FIG. 79 shows a wrist watch like very compact portable information device equipped with the information input generation apparatus of the present invention. Here, again, a cursor 717 can be controlled by moving a finger 716. Windows 718 and 719 are provided for the lighting unit and the photo-detection sensor unit. When the device body is as small as this one, there is not even a space for installing a pen, so that the convenience of the input operations realized by the information input generation apparatus is evident. Also, by placing the operation space at a position displaced from a line between the eyes and a display device, it is possible to prevent the operating finger from obstructing the view of the display.

In a case of installing the information input generation apparatus of the present invention on a portable device like this, it is necessary to make the device less power consuming. The information input generation apparatus requires to emit a considerable amount of lights, so that the control of the lighting currents can contribute to the lower power consumption.

To this end, the light emission timing and the emitted light amount can be controlled to realize the lower power consumption. For example, when there is no object in front of the device, this fact can be detected as all the pixel values of the reflected light image become nearly zero. When this absence of an object is detected, or after a prescribed time elapsed since this absence of an object is detected, the light emission interval can be set longer. For instance, the light emission rate of once in every $\frac{1}{30}$ sec. can be lowered to once in every $\frac{1}{10}$ sec. In this manner, the lighting power can be lowered to $\frac{1}{3}$.

When an object appears in front of the device again, this fact can be detected from a change appearing in the reflected light image, so that the light emission rate can be set back to once in every $\frac{1}{30}$ sec. While actually moving the cursor, there would be an apparent difference in the smoothness of the cursor motion between a case of photo-detecting 30 times per second and a case of photo-detecting 10 times per second. In contrast, a slight delay in an appearance of a cursor since the hand is extended is not so frustrating.

It is also possible to realize the lower power consumption by controlling the emitted light amount rather than the light emission timing. In comparison to a light amount required for detecting the position of the finger tip at high precision, a light amount required for judging whether there is an object in front of the device or not is much smaller. Consequently, when an absence of an object in front is detected, the emitted light amount can be controlled to be smaller, and only whether an object appears again or not Is checked. When the reappearance of an object is detected, the emitted light amount can be set back to the original amount.

The above described light emission timing control and the emitted light amount control may be carried out simultaneously. In such a case, even greater power consumption saving effect can be expected.

Now, in the information input generation apparatus of the present invention as described above, the CMOS sensors are used as the photo-detection means, and as described above, the CMOS sensors have the structural property that it is possible to control the photo-detection (charge storing) and the read out arbitrarily in unit of pixel, and the control time can be as short as about $\frac{1}{10000}$ second or less, but it can also be set to any sufficiently long time, so that it is possible to eliminate the influence of the external light fluctuation by selecting the optimum value according to the fluctuation of the external light. However, there still remains the problem as to how to realize the optimal setting according to the fluctuation state of the external light. In the following, the embodiments directed to this aspect will be described in detail.

The above described information input generation apparatus has the lighting unit and the photo-detection section, and outputs an image formed by the reflected light from an object resulting from the light emitted by the lighting unit, so as to enable the gesture recognition and so on. In this apparatus, the photo-detection section stores the charges generated by the photo-electric conversion element upon photo-detecting images of the object at a time of light emission by the lighting unit and at a time of no light emission by the lighting unit, and cancels the image due to the external light components by taking difference between them, so as to obtain the reflected light image which is the image solely due to the reflected light of the object resulting from the light emitted by the lighting unit, as already described in detail above.

Here, the external lights include not just the sunlight but also the fluorescent light which regularly (periodically) fluctuates even under the stable operation state, and moreover there are various types of fluorescent light such as an ordinary fluorescent light, an inverter fluorescent light, etc., and their fluctuation periods vary.

Also, the same time period is assigned to the image acquisition (charge storing) operation at a time of light emission by the lighting unit and the image acquisition (charge storing) operation at a time of no light emission by the lighting unit, but when the external light fluctuates between these cases, the lowering of the quality of the difference image, that is, the degradation of the obtained reflected light image, may be caused depending on a size of a difference in the external light between these cases.

There are a case where the external light fluctuates irregularly and a case where the external light fluctuates regularly, and how to handle the external light is different in these two cases.

In the case of the irregular fluctuation, the level of degradation cannot be ascertained until the reflected light image is obtained, whereas in the case of the regular fluctuation, the relationship of the timings for the above described two image acquisition operations with respect to the fluctuation period is related to the image quality of the reflected light image.

In particular, when the time difference between a case of light emission and a case of no light emission is close to the fluctuation period of the external light, a difference between the stored charges in these two cases may include the contribution from the fluctuation of the external light.

When the influence due to the fluctuation of the external light remains in the reflected light image, it may not be possible to extracts only the reflected light of the target object under the light irradiation by the lighting unit at high precision, depending on a size of this influence due to the external light fluctuation.

Consequently, it is necessary to deal with the external light fluctuation, and the following embodiments are directed to this aspect.

<Ninth Embodiment>

Referring now to FIG. 80 to FIG. 84, the ninth embodiment of the present invention will be described in detail.

This ninth embodiment is directed to a case of dealing with the irregular external light fluctuation. In this ninth embodiment, a level of the external light alone is detected and the state of the external light is judged from the detected external light level, and then the acceptance or rejection of the reflected light image is determined according to the judged external light state.

Figure 80:
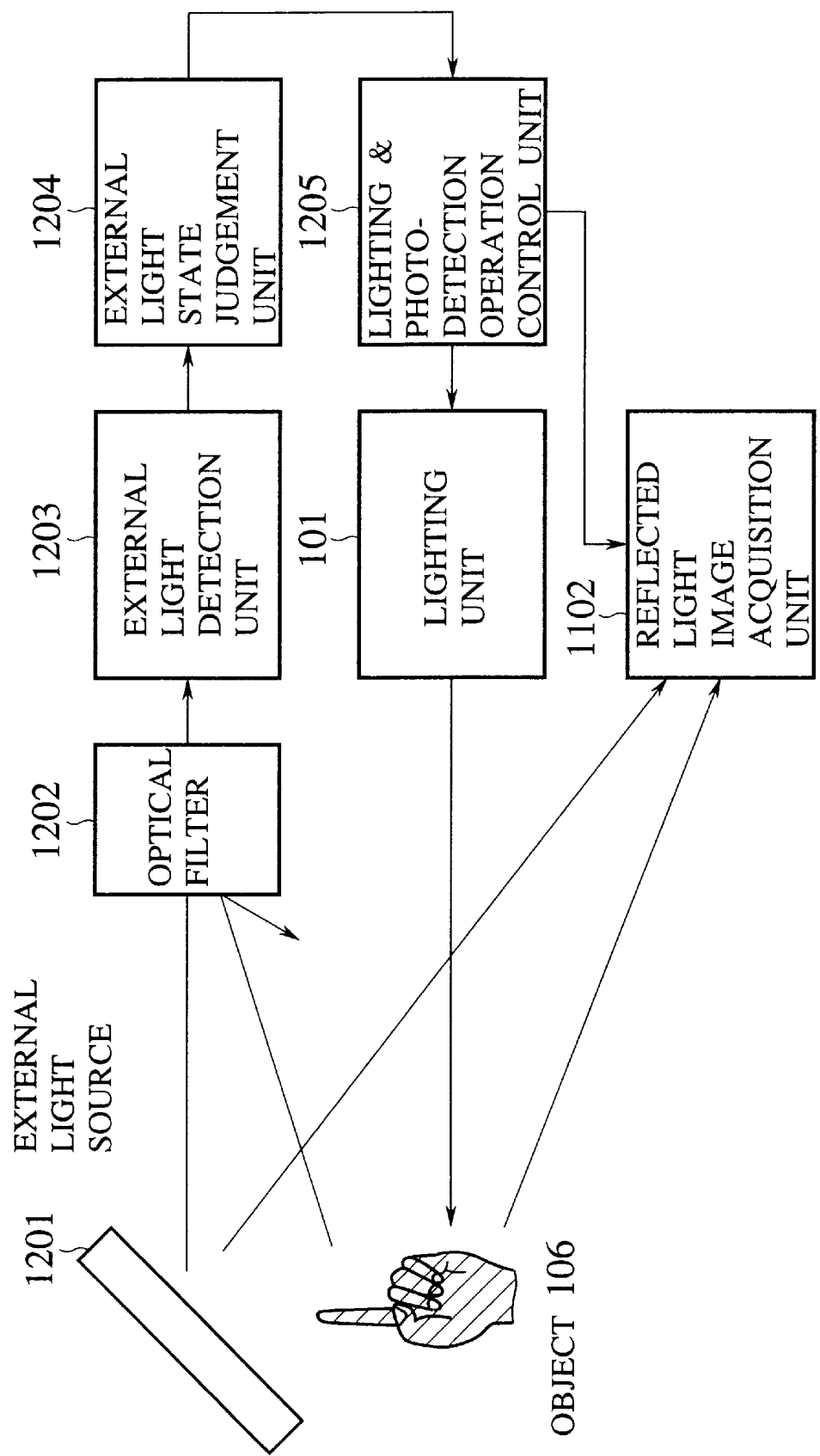
FIG. 80 is a block diagram showing one exemplary configuration of an information input generation apparatus according to the ninth embodiment of the present invention.

FIG. 80 shows an exemplary configuration of the information input generation apparatus in this ninth embodiment, which comprises a lighting unit 1101 (corresponding to the lighting unit 101 of FIG. 1), a reflected light image acquisition unit 1102 (corresponding to the reflected light extraction unit 102 of FIG. 1), an optical filter 1202, an external light detection unit 1203, an external light state judgement unit 1204, and a lighting and photo-detection operation control unit 1205 (corresponding to the timing signal generation unit 104 of FIG. 1). In FIG. 80, a target object 106 placed in front of this information input generation apparatus is constantly illuminated by the external light from an external light source 1201.

The lighting unit 1101 is a light source for illuminating the target object 106, which is the light source of the reflected light image. For this lighting unit 1101, a LED for emitting lights with the wavelength in the infrared range can be used. This lighting unit 1101 is controlled by the lighting and photo-detection operation control unit 1205.

The external light source 1201 is a light source of an indoor or outdoor environment under which the target object 106 is placed. The target object 106 always receives lights from this external light source 1201.

The optical filter 1202 is a filter for blocking illumination lights in the infrared range from the lighting unit 1201, for the purpose of extracting only the external light components.

The external light detection unit 1203 detects a level of the external light received through the optical filter 1202, and outputs a detection output corresponding to the intensity of the entered external light.

The external light state judgement unit 1204 receives the detection output of the external light detection unit 1203, and monitors the level and the fluctuation in time of the external light, so as to detect an external light state that has a possibility of largely affecting the reflected light image and generate an external light state intolerable signal when this state is detected.

The lighting and photo-detection operation control unit 1205 carries out control of various timing signals so as to realize the operations according to the output result of the external light state judgement unit 1204. In this embodiment, when the external light state judgement unit 1204 judges that there is an external light fluctuation that has a possibility for largely affecting the reflected light image, the lighting and photo-detection operation control unit 1205 generates necessary timing signals for controlling the apparatus so that the acquisition of the image by the external light alone and the acquisition of the image in a case of light emission by the lighting unit 1101 are carried out and the reflected light image is extracted as a difference between these images, once again, but after a prescribed time has elapsed, this control is not carried out and instead a signal indicating the poor reflected light image quality is generated and given to the reflected light image acquisition unit 1102.

The reflected light image acquisition unit 1102 acquires the image in a case of light emission by the lighting unit 1101 and the image in a case of no light emission by the lighting unit 1101, obtains a difference component between these images, and outputs it as the reflected light image, in response to the timing signal from the lighting and photo-detection operation control unit 1205. When an external light state intolerable signal indicating the external light state that has a possibility of largely affecting the reflected light image is generated by the external light state judgement unit 1204, the reflected light image acquisition unit 1102 is reset so that the processing for obtaining the reflected light image by carrying out the image acquisition and the difference extraction once again.

In this configuration of FIG. 80, the reflected light image acquisition unit 1102 acquires the image of the target object 106 illuminated by the light emitted by the lighting unit 1101 and the image of the target object 106 illuminated only by the external light without the light from the lighting unit 1101 according to the control of the lighting and photo-detection operation control unit 1205, and obtains the reflected light image as the difference component between these two images.

On the other hand, at the image acquisition timing of the reflected light image acquisition unit 1102, the external light detection unit 1203 detects the level of the light under the environment. In front of this external light detection unit 1203, the optical filter 1202 is provided for blocking the reflected light from the target object 106 resulting from the light emitted by the lighting unit 1101, so that only the external light is detected by the external light detection unit 1203. The detection output of this external light detection unit 1203 is then given to the external light state judgement unit 1204.

The external light state judgement unit 1204 is monitoring the level and the fluctuation in time of the external light according to this detection output, and detects a state which has a possibility of largely affecting the reflected light image. Then, an intolerable signal is generated when the state which has a possibility of largely affecting the reflected light image is detected, whereas this intolerable signal is not generated in cases of the other states.

The reflected light image acquisition unit 1102 acquires the target object images and the reflected light image as a difference component between the acquired target object images, according to the timing signals from the lighting and photo-detection operation control unit 1205 that may include the intolerable signal generated by the external light state judgement unit 1204, and when the output result (intolerable signal) from the external light state judgement unit 1204 is present, the reflected light image acquisition unit 1102 once again repeats the operation to acquire the image of the target object 106 illuminated by the light emitted by the lighting unit 1101 and the image of the target object 106 illuminated only by the external light without the light from the lighting unit 1101 and obtain the reflected light image as the difference component between these two images.

Note that, although not shown in FIG. 80, it is also possible to provide a reflected light image processing unit at a next stage of the reflected light image acquisition unit 1102 so as to determine how to handle the reflected light image according to the output of the external light state judgement unit 1204.

In the present invention, the CMOS sensors are used for the photo-detection section in the reflected light image acquisition unit 1102 to acquire the images of the target object 106 in real time, and the difference component of the acquired images is outputted as the reflected light image in forms of image signals for video image. The operation of the CMOS sensors for one frame is basically repetitions of the photo-detection and charge storing and the charge output.

Figure 81:
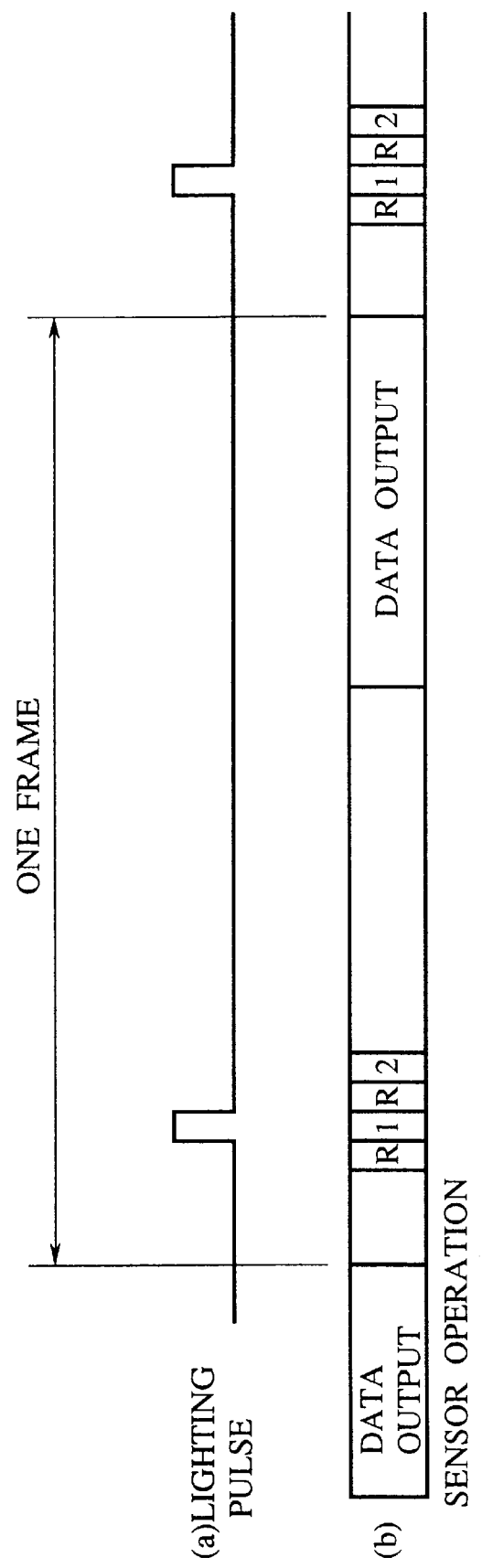
FIG. 81 is a timing chart for explaining the operation carried out by the information input generation apparatus of FIG. 80.

FIG. 81 shows a timing chart for this operation, where a part (a) indicates the lighting pulse (the light emission by the lighting unit 1101, that is, the irradiation of the illumination light) and a part (b) indicates the operation of the CMOS sensors. In FIG. 81, "R", "1" and "2" indicates the "reset of the stored charge", "storing into the first charge storage unit (corresponding to 109 of FIG. 2 or 119 of FIG. 4)" and "storing into the second charge storage unit (corresponding to 110 of FIG. 2 or 120 of FIG. 4)", respectively.

Figure 83:
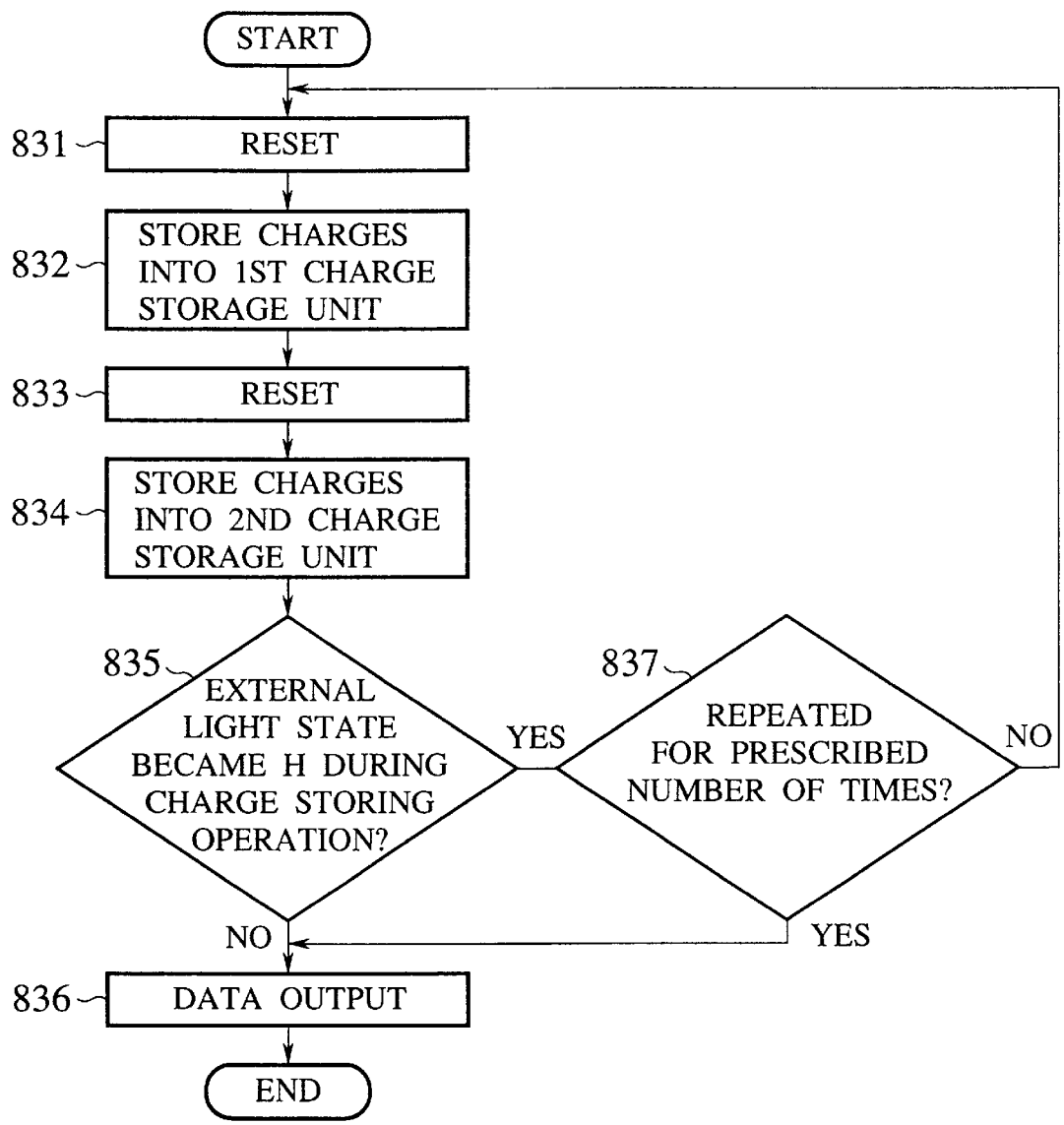
FIG. 83 is a flow chart for the operation carried out by a reflected light image acquisition unit of the information input generation apparatus of FIG. 80.

More specifically, this operation at the reflected light image acquisition unit 1102 is carried out according to the flow chart of FIG. 83 as follows.

Within one frame period, the charges in the first and second charge storage units in the photo-detection section are reset at the timing of "R" (step 831), and then charges are stored for a prescribed period of time into the first charge storage unit at the timing of "1" (step 832) so as to realize the photo-detection of the target object image. At the same time, the lighting unit 1101 emits the light for the same period of time.

Next, the charges of the photo-detection section are reset at the timing of next "R" that appears again (step 833), and then charges are stored for a prescribed period of time into the second charge storage unit at the timing of "2" (step 834) so as to realize the photo-detection of the target object image. At this point, the lighting unit 1101 does not emit any light.

The difference component of the two images so obtained is obtained as a reflected light image, and this reflected light image is outputted to the subsequent stage in the second half of one frame period (step 836). In a case of using the CMOS sensors as in this ninth embodiment, at a time of the reflected light image output, the difference of the stored charges in two charge storage units for each unit pixel is outputted so as to output only the reflected light component from the object resulting from the light emitted by the lighting unit 1101.

While operating according to the timings as indicated in FIG. 81 in which case the reflected light image can be successfully acquired by storing charges into the first and second charge storage units once, the time used for the charge storing is quite short, and there is a time margin before the data output. However, this is not the case in a situation where there is a problem regarding the reliability as many noise components are contained in the reflected light image, that is, in a state where the external light fluctuation is large.

Figure 82:
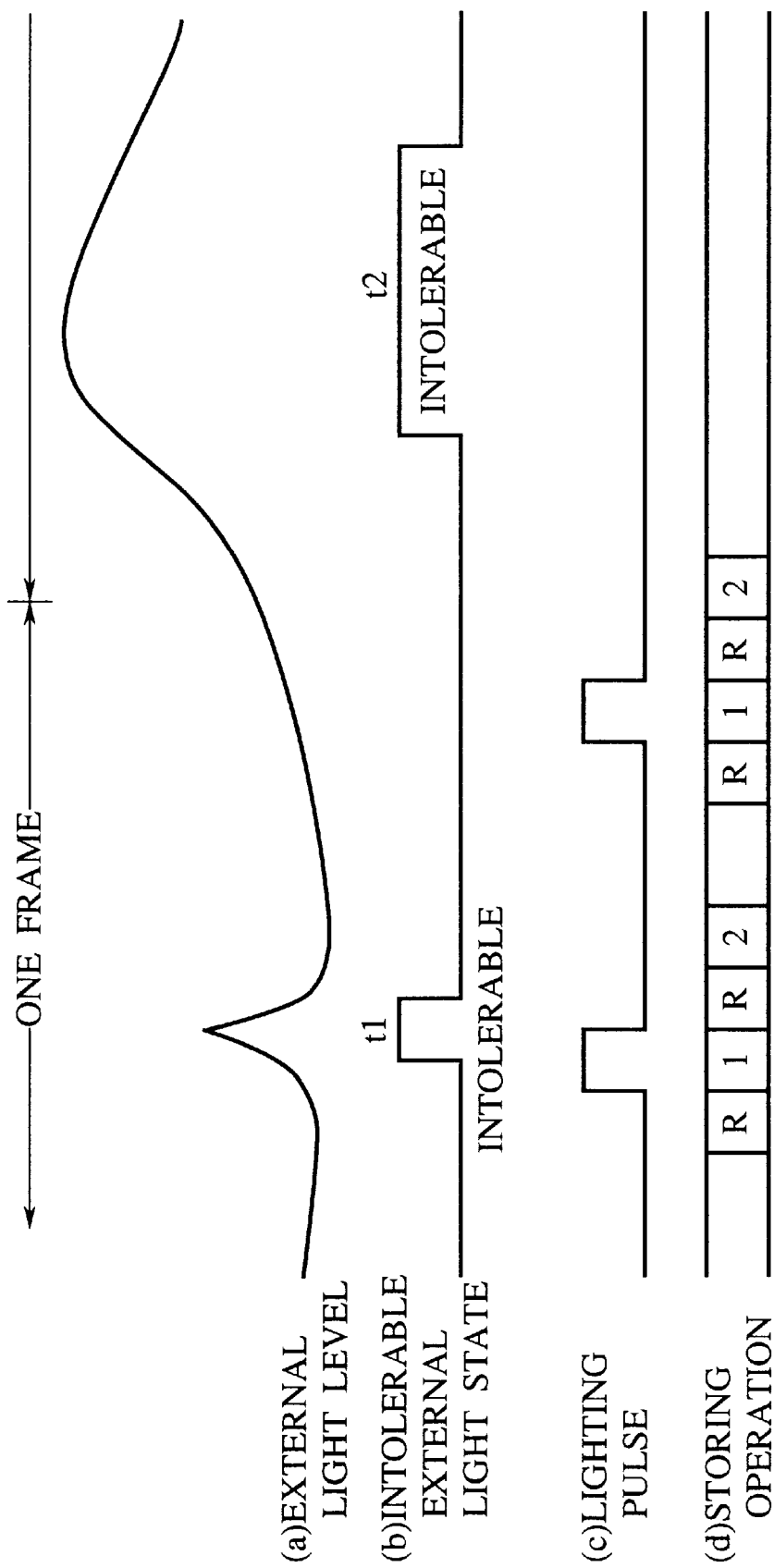
FIG. 82 is another timing chart for explaining the operation carried out by the information input generation apparatus of FIG. 80.

Namely, in this ninth embodiment, in parallel to the reflected light image acquisition operation by the reflected light image acquisition unit 1102, the external light level as indicated in a part (a) of FIG. 82 is detected by the external light detection unit 1203. At this point, when the near infrared LED is used as the light source of the lighting unit 1101, for example, the near infrared light blocking optical filter 1202 is provided in front of (i.e. the input side of) the external light detection unit 1203, so that the reflected light resulting from the light of this light source does not enter into the external light detection unit 1203.

Then, the external light state judgement unit 1204 monitors the external light level according to the detection output of the external light detection unit 1203, and detects a state in which the external light level fluctuation is large so that there is a possibility for largely affecting the reflected light image. When this state is detected, the external light state judgement unit 1204 outputs the external light state intolerable signal as indicated in a part (b) of FIG. 82 to notify this detection result. In this external light state intolerable signal, when the logical level of this is "H (HIGH)", it is indicated that a corresponding region is judged as having a poor external light state (that has a possibility of largely affecting the reflected light image).

This judgement is made, for example, when the external light fluctuation is abrupt (a case of first "H" state in the part (b) of FIG. 82) or when the external light level is very high (a case of second "H" state in the part (b) of FIG. 82).

When the external light fluctuation is abrupt, there is a large difference between the light amounts due to the external light as stored in the first charge storage unit and the second charge storage unit that constitute the reflected light image acquisition unit 1102, so that the difference component between them will contain not just the reflected light component but also a large external light fluctuation part as well.

When it is under the environment where the external light level is very large, the rate of the reflected light with respect to the external light becomes very small, so that S/N (Signal to Noise ratio) becomes poor.

Consequently, when these types of the external light fluctuation is present, the noise components become large and it becomes impossible to extract the target object 106 at high precision.

In an example shown in FIG. 82, the first lighting and storing operation is carried out within one frame period as described above, but by the time this operation is finished, it is ascertained that the external light state was poor during this storing operation (t1 in the part (b) of FIG. 82), so that this operation is cancelled once and retried (step 835 YES).

In other words, the stored charges are reset again ("R"), and the storing into the first charge storage unit ("1") and the storing into the second charge storage unit ("2") are repeated again. During this second storing operation, the external light state was normal (the external light state intolerable signal was in "L" state), so that the obtained difference component (reflected light image) is outputted as it is (step 835 NO).

The extraction of the reflected light image and the output of this extracted reflected light image are to be carried out within a prescribed period of time (one frame period), so that the storing operation would overlap with the data output timing if the storing operation is retried too many times. For this reason, a prescribed number of times for which the retry is permitted at most is determined in advance, and the retry is not repeated beyond this prescribed number of times (step 837).

When the normal reflected light image could not be obtained at the end, that is, when the normal reflected light image could not be obtained before the data output timing comes, the last obtained low reliability data are outputted, and at the same time, a signal indicating that this reflected light image has a lower reliability is also outputted by the separate line.

In the configuration of FIG. 80 described above, the image acquisition and difference (reflected light image) acquisition operation is retried according to the external light fluctuation state by directly controlling the lighting and photo-detection operation control unit 1205 according to the output of the external light state judgement unit 1204.

However, instead of carrying out such a retry, it is also possible to determine the acceptance or rejection of the reflected light image outputted from the reflected light image acquisition unit 1102 according to the output of the external light state judgement unit 1204 at the subsequent stage so that the low reliability reflected light image will not be utilized.

Figure 84:
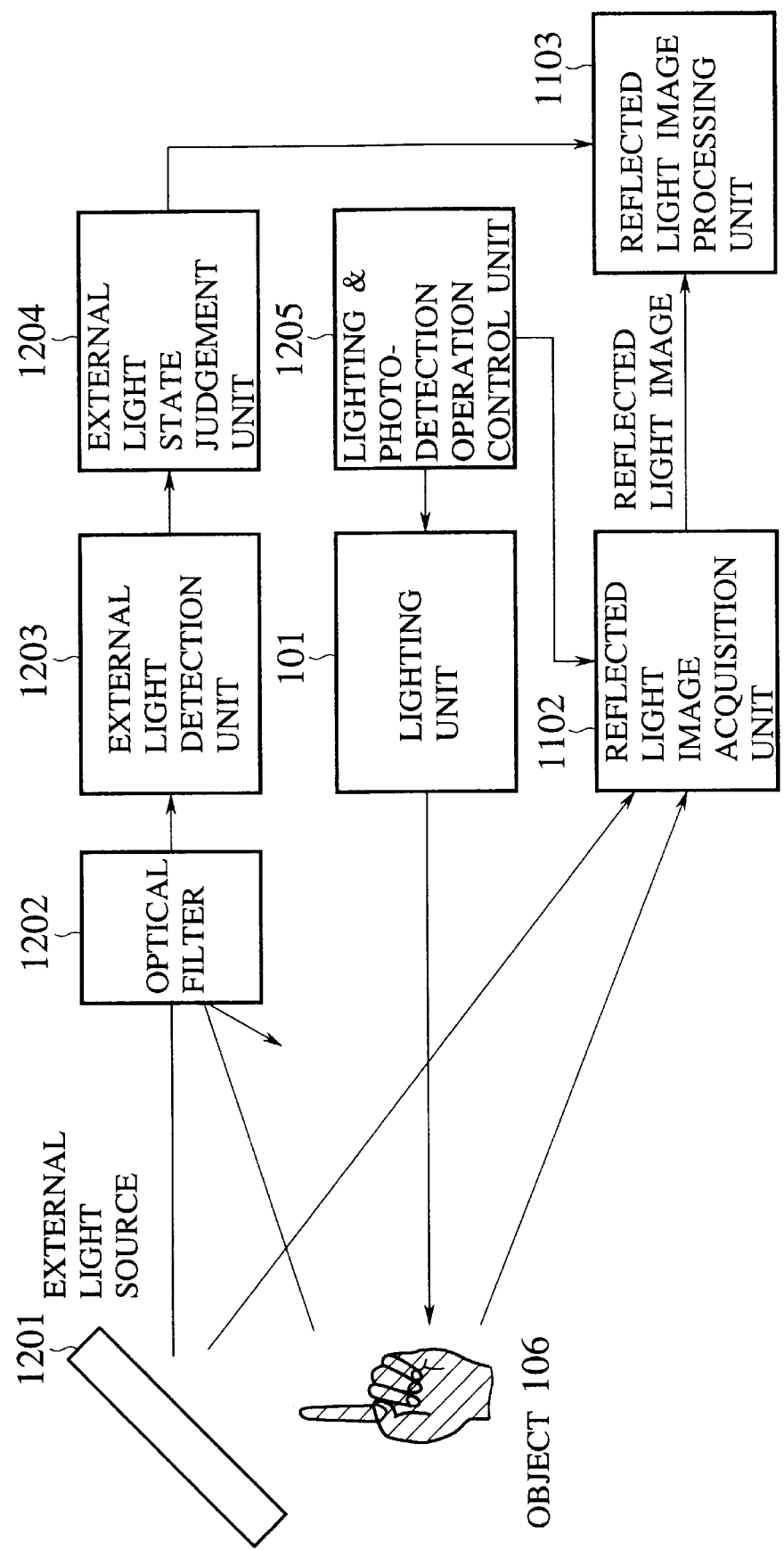
FIG. 84 is a block diagram showing another exemplary configuration of an information input generation apparatus according to the ninth embodiment of the present invention.

FIG. 84 shows an exemplary configuration of the information input generation apparatus in this ninth embodiment for such a modified case.

In the configuration of FIG. 84, the processing for acquiring the image illuminated by the light emitted by the lighting unit 1101, acquiring the image due to the external light alone, and obtaining the reflected light image by obtaining the difference component between these images is carried out only once by the reflected light image acquisition unit 1102 within one frame period, and the obtained reflected light image is outputted within an output period.

The reflected light image obtained by the reflected light image acquisition unit 1102 is received at a reflected light image processing unit 1103, which has a function for determining whether this received reflected light image is to be used or to be discard according to the output of the external light state judgement unit 1204. The reflected light image processing unit 1103 may also have the other functions similar to those of the feature data generation unit 103 of FIG. 1.

Thus, in this configuration of FIG. 84, instead of controlling the reflected light image acquisition unit 1102 and the lighting unit 1101 according to the output of the external light state judgement unit 1204, the reflected light image processing unit 1103 is provided to determine the acceptance or rejection of the reflected light image according to the output of the external light state judgement unit 1204.

This reflected light image processing unit 1103 is basically a unit for further processing the outputted reflected light image, and changes the manner of processing the reflected light image according to the output (which is not necessarily binary) of the external light state judgement unit 1204 supplied thereto.

When the external light state is very poor, the reflected light image is discarded and not utilized, or the current frame is predicted by utilizing the previous frame, for example. In a case of using the prediction, it is preferable to control the procedure for making prediction by using how poor the external light state is as a parameter for indicating how low the reliability of the current frame is.

According to the ninth embodiment as described above, at a time of obtaining the reflected light image of the target object, when the adverse influence of the external light fluctuation is large, the reflected light image acquired in this state will not be used, so that only the high quality image of the target object alone can be easily acquired, and therefore it becomes possible to realize the acquisition of information on gesture or three-dimensional operation made by the target object at high precision.

<Tenth Embodiment>

The ninth embodiment described above is directed to a technique for monitoring the external light level and not utilizing the reflected light image obtained at a timing where the influence of the external light fluctuation is present.

However, in that case, the utilizable reflected light image cannot be obtained under the unstable environment where the external light fluctuation continues indefinitely. Also, under the environment where the light amount is constantly fluctuating in short period as in a case of using the inverter type fluorescent light, there may be cases in which the utilizable reflected light image cannot be obtained forever. Also, in a case where it is necessary to extract the reflected light image at the rate as fast as 30 frames per second as in a case of the TV images, or in a case where it is necessary to extract the reflected light image at the rate even faster than that, there may be cases where the reflected light image cannot be obtained as the flickering of the fluorescent light has a directly influence as the external light fluctuation.

In view of these problems, this tenth embodiment is directed to a technique suitable for use under the environment involving the external light that is fluctuating constantly and periodically, and capable of obtaining the reflected light image in real time.

Figure 85:
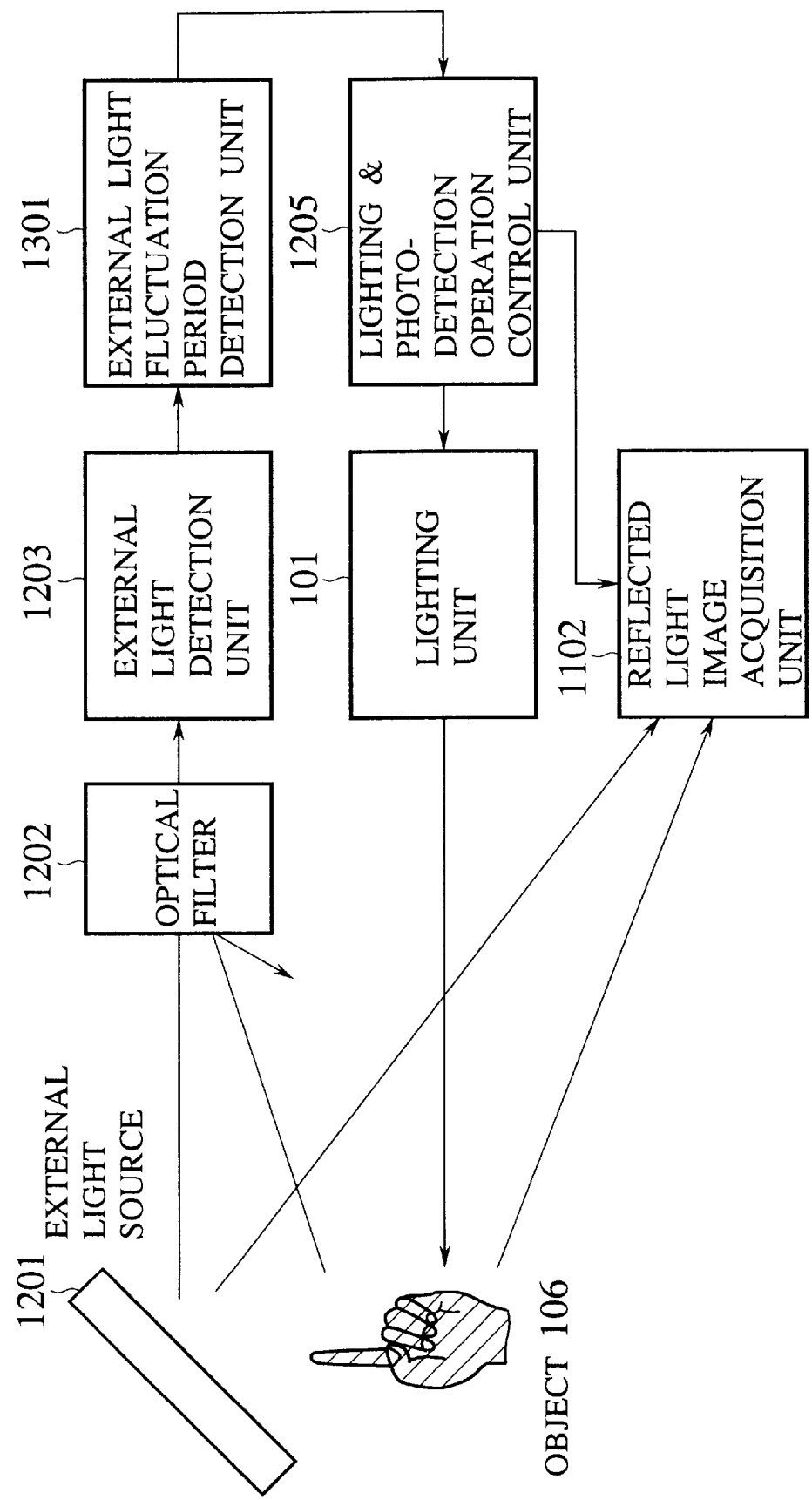
FIG. 85 is a block diagram showing an exemplary configuration of an information input generation apparatus according to the tenth embodiment of the present invention.
Figure 86:
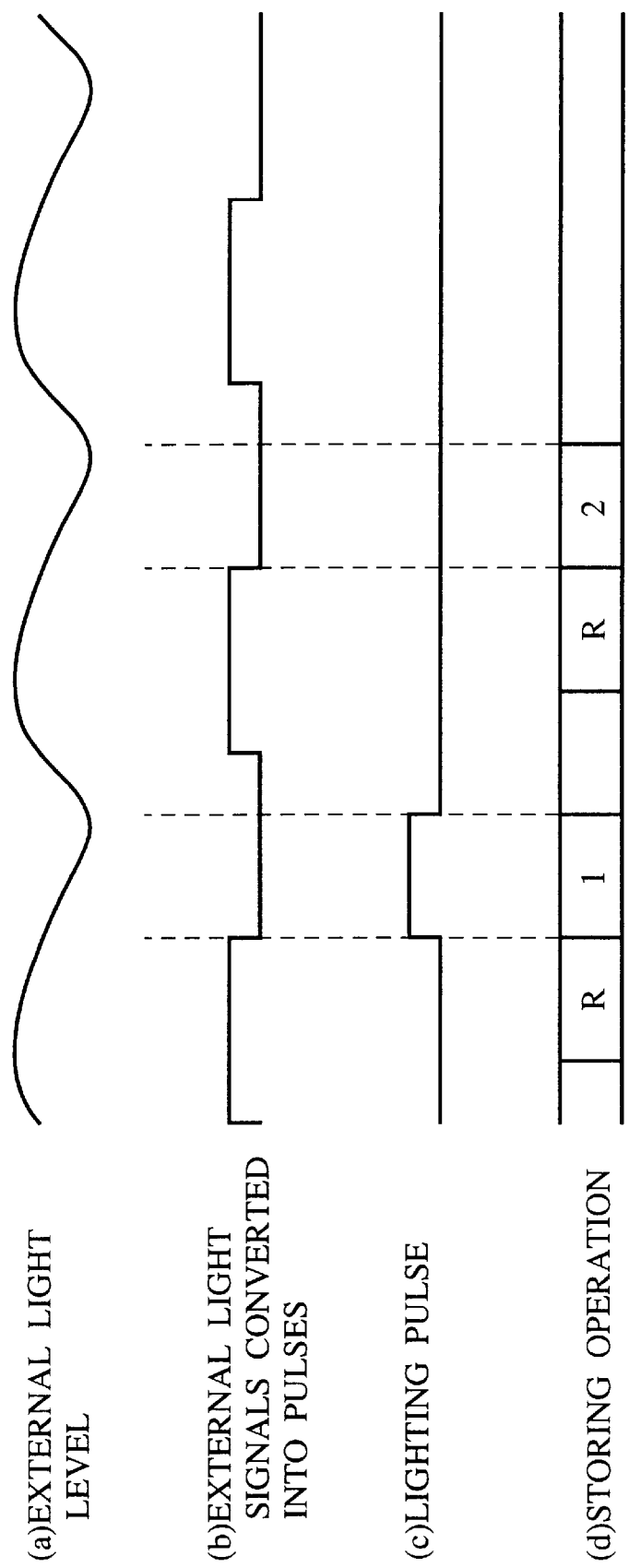
FIG. 86 is a timing chart for explaining the operation carried out by the information input generation apparatus of FIG. 85 in one exemplary case.
Figure 87:
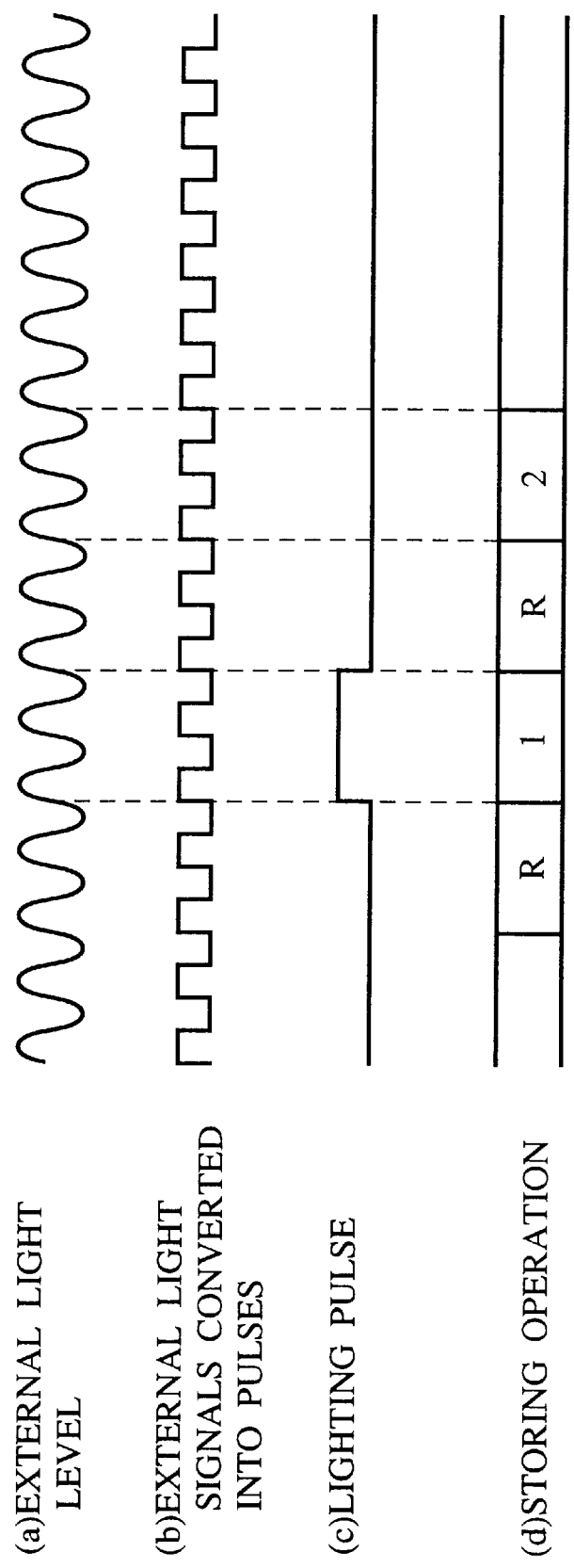
FIG. 87 is a timing chart for explaining the operation carried out by the information input generation apparatus of FIG. 85 in another exemplary case.

Referring now to FIG. 85 to FIG. 87, the tenth embodiment of the present invention will be described in detail.

In this tenth embodiment, a unit for monitoring the fluctuation of only the external light is provided to detect the fluctuation period of the external light, and the lighting and photo-detection operation control is carried out according to the detected external light fluctuation period.

FIG. 85 shows an exemplary configuration of the information input generation apparatus in this tenth embodiment, which comprises a lighting unit 1101 (corresponding to the lighting unit 101 of FIG. 1), a reflected light image acquisition unit 1102 (corresponding to the reflected light extraction unit 102 of FIG. 1), an optical filter 1202, an external light detection unit 1203, an external light fluctuation period detection unit 1301, and a lighting and photo-detection operation control unit 1205 (corresponding to the timing signal generation unit 104 of FIG. 1). In FIG. 85, the target object 106 placed in front of this information input generation apparatus is constantly illuminated by the external light from the external light source 1201.

The lighting unit 1101 is a light source for illuminating the target object 106, which is the light source of the reflected light image. For this lighting unit 1101, a LED for emitting lights with the wavelength in the infrared range can be used. This lighting unit 1101 is controlled by the lighting and photo-detection operation control unit 1205.

The external light source 1201 is a light source of an indoor or outdoor environment under which the target object 106 is placed. The target object 106 always receives lights from this external light source 1201.

The optical filter 1202 is a filter for blocking illumination lights in the infrared range from the lighting unit 1201, for the purpose of extracting only the external light components.

The external light detection unit 1203 detects a level of the external light received through the optical filter 1202, and outputs a detection output corresponding to the intensity of the entered external light.

The external light fluctuation period detection unit 1301 receives the detection output of the external light detection unit 1203, and monitors the level and the fluctuation in time of the external light, so as to detect an external light fluctuation period.

The lighting and photo-detection operation control unit 1205 carries out control of various timing signals so as to realize the operations in synchronization with the external light fluctuation period, according to the fluctuation period information detected by the external light fluctuation period detection unit 1301. In this embodiment, the lighting and photo-detection operation control unit 1205 generates timing signals for controlling the apparatus so that the light emission by the lighting unit 1101 and the first charge storing operation by the reflected light image acquisition unit 1102 are carried out in synchronization with one external light fluctuation period, and the second charge storing operation by the reflected light image acquisition unit 1102 in a state of no light emission by the lighting unit 1101 is carried out in synchronization with a next external light fluctuation period so as to obtain the image due to the external light alone.

The reflected light image acquisition unit 1102 acquires the image in a case of light emission by the lighting unit 1101 (given by charges stored by the first charge storing operation) and the image in a case of no light emission by the lighting unit 1101 (given by changes stored by the second charge storing operation), obtains a difference component between these images, and outputs it as the reflected light image, in response to the timing signal from the lighting and photo-detection operation control unit 1205.

In this configuration of FIG. 85, the reflected light image acquisition unit 1102 acquires the image of the target object 106 illuminated by the light emitted by the lighting unit 1101 and the image of the target object 106 illuminated only by the external light without the light from the lighting unit 1101 according to the control of the lighting and photo-detection operation control unit 1205, and obtains the reflected light image as the difference component between these two images.

On the other hand, the state of the external light is monitored by the external light detection unit 1203. In front of this external light detection unit 1203, the optical filter 1202 is provided for blocking the reflected light from the target object 106 resulting from the light emitted by the lighting unit 1101, so that only the external light is detected by the external light detection unit 1203. When the lighting unit 1101 emits the infrared light, this optical filter 1202 is realized in a form of an infrared light blocking filter.

The detection output of this external light detection unit 1203 is then given to the external light fluctuation period detection unit 1301. In response, the external light fluctuation period detection unit 1301 detects the fluctuation period of the external light according to the supplied detection output. Then, this detected fluctuation period information is given to the lighting and photo-detection operation control unit 1205.

The lighting and photo-detection operation control unit 1205 generates the control signals for the lighting and photo-detection operations so as to carry out these operations in synchronization with the external light fluctuation period detected by the external light fluctuation period detection unit 1301.

FIG. 86 shows an exemplary case where the external light fluctuation occurs regularly. A part (a) of FIG. 86 shows the external light level (the output of the external light detection unit 1203) in this case, while a part (b) of FIG. 86 shows the external light signals converted into pulses (output of the external light fluctuation period detection unit 1301). Also, a part (c) of FIG. 86 shows a lighting pulse signal for the lighting unit 1101, according to which the lighting unit 1101 emits the light, and a part (d) of FIG. 86 shows a signal for controlling the storing operation similar to that shown in FIG. 81.

The pulse signal of the part (c) of FIG. 86 and the storing operation control signal of the part (d) of the FIG. 86 are generated according to the signal of the part (b) of FIG. 86. Namely, the timing at which charges are stored into the first charge storage unit (109 of FIG. 2 or 119 of FIG. 4) and the timing at which charges are stored into the second charge storage unit (110 of FIG. 2 or 120 of FIG. 4) have the same phase with respect to the external light fluctuation period. Consequently, the light amounts due to the external light contained in the charges stored by these two storing operations are going to be equal. Thus, the difference between the stored charges in the first charge storage unit and the second charge storage unit contains hardly any part due to the external light fluctuation, and therefore it is possible to extract the reflected light image at high precision under the regularly fluctuating external light.

FIG. 87 shows an exemplary case where the external light fluctuation period is regular but short with respect to the charge storing time.

In this case, the processing for obtaining the the difference image from the images obtained by the first and second charge storing operations is carried out in synchronization with the external light fluctuation period, and in addition, the storing time of each charge storing operation is set to be n times a single period part of the external light fluctuation. Namely, in an example shown in FIG. 87, the storing operation is always carried out in the storing time which is twice the external light fluctuation period (n=2), when the external light fluctuation period is short with respect to the storing time.

For this reason, similarly as in the previous example, the light amounts due to the external light contained in the charges stored by these two storing operations are going to be equal. Note that the example of FIG. 87 shows a case of setting the storing time as an integer multiple of the external light fluctuation period, but the present invention is not necessarily limited to this case. For example, it is also possible to set the storing time to be 1.5 times, 2.7 times, or 3.3 times the external light fluctuation period, if desired. It is however necessary to have a correct matching of the phases.

Thus, in this tenth embodiment, the external light fluctuation period is detected and the image acquisition is carried out in unit of a prescribed time interval in synchronization with the external light fluctuation period, so that even under the environment in which the external light fluctuations constantly and periodically, it is possible to obtain the reflected light image in real time by eliminating the influence of the external light.

<Eleventh Embodiment>

The tenth embodiment described above is directed to a technique for controlling the acquisition timing of the images from which the reflected light image is to be obtained, with respect to the external light fluctuation. However, there are many cases where the external lights are artificially controllable, as in a case of using the room light.

In view of this fact, this eleventh embodiment is directed to a technique suitable for such a case, in which the light source of the external light is controlled so as to prevent the external light from affecting the reflected light image.

Figure 88:
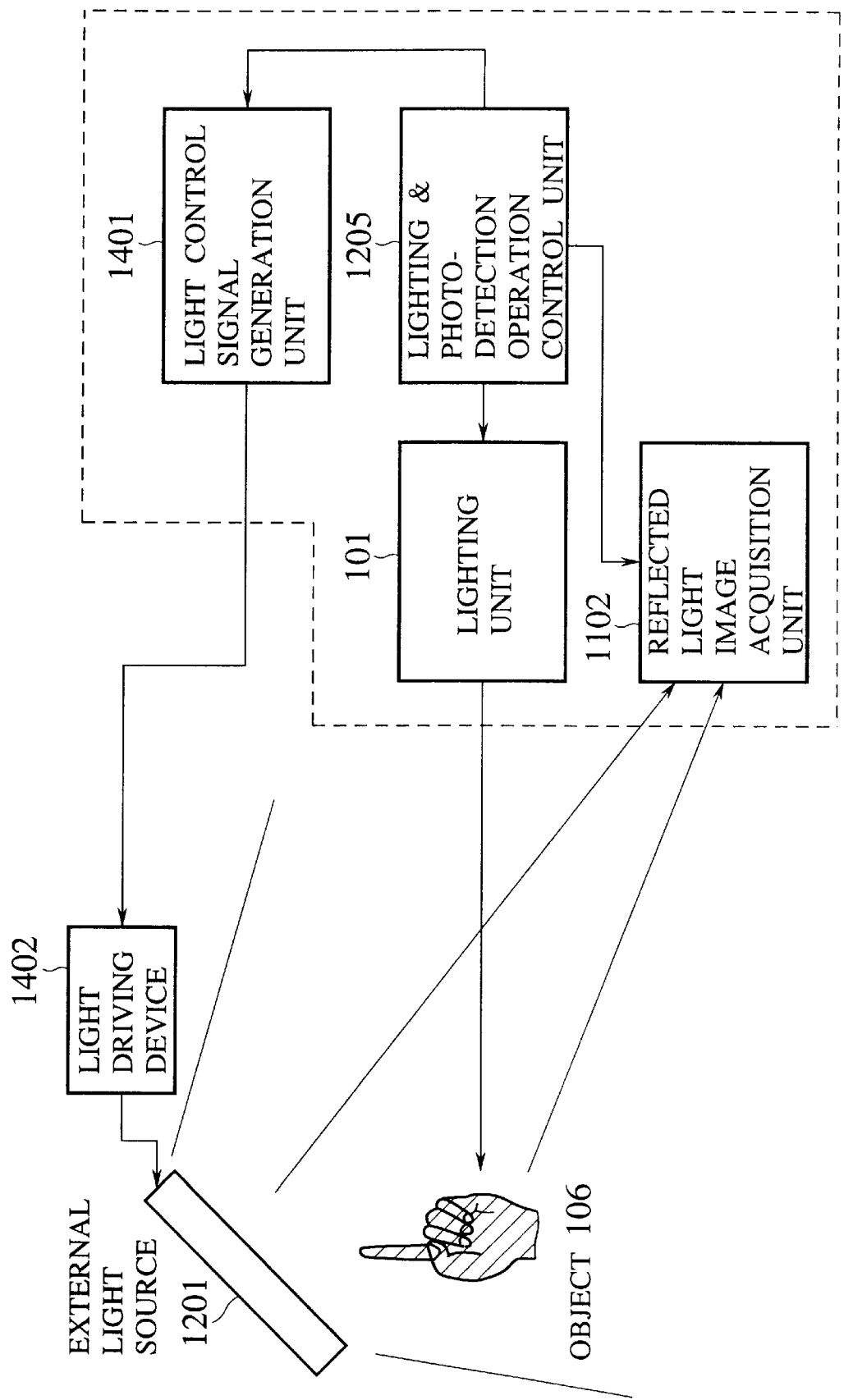
FIG. 88 is a block diagram showing an exemplary configuration of an information input generation apparatus according to the eleventh embodiment of the present invention.
Figure 89:
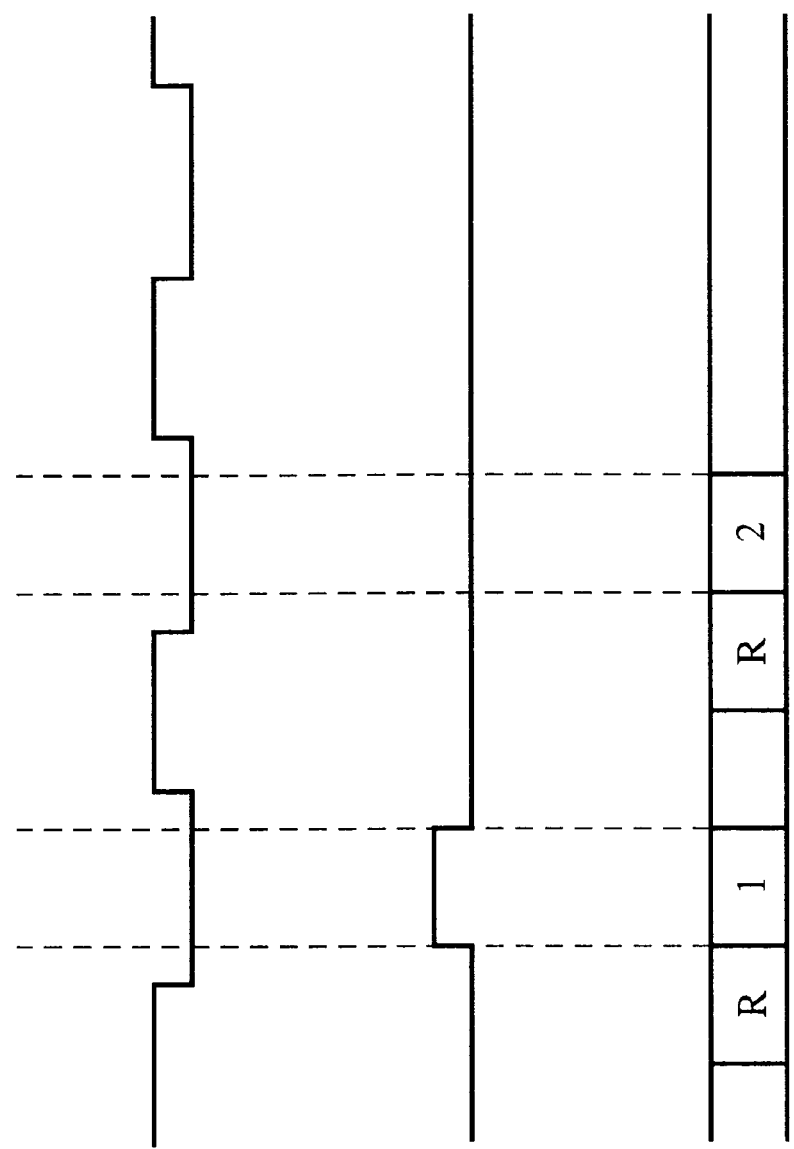
FIG. 89 is a timing chart for explaining the operation carried out by the information input generation apparatus of FIG. 88.

Referring now to FIG. 88 to FIG. 89, the eleventh embodiment of the present invention will be described in detail.

FIG. 88 shows an exemplary configuration of the information input generation apparatus in this eleventh embodiment, which comprises a lighting unit 1101 (corresponding to the lighting unit 101 of FIG. 1), a reflected light image acquisition unit 1102 (corresponding to the reflected light extraction unit 102 of FIG. 1), a light control signal generation unit 1401, and a lighting and photo-detection operation control unit 1205 (corresponding to the timing signal generation unit 104 of FIG. 1). In FIG. 88, the target object 106 placed in front of this information input generation apparatus is constantly illuminated by the external light from the external light source 1201 such as the room illumination light which is driven by a light driving device 1402.

The lighting unit 1101 is a light source for illuminating the target object 106, which is the light source of the reflected light image.

The external light source 1201 is a light source of an environment under which the target object 106 is placed. The target object 106 always receives lights from this external light source 1201.

The light driving device 1402 drives this external light source 1201 to emit the external light, and has a function for controlling the light amount of the external light source 1201 according to a light control signal supplied thereto.

The lighting and photo-detection operation control unit 1205 generates signals for controlling the lighting unit 1101 and the reflected light image acquisition unit 1102.

The light control signal generation unit 1401 generates the light control signal according to which the external light source 1201 is to be driven, such that the received light amounts due to the external light in two charge storing operations (the acquisition of the image under the lighting by the lighting unit 1101 and the acquisition of the image due to the external light alone) by the reflected light image acquisition unit 1102 are going to be equal.

The reflected light image acquisition unit 1102 acquires the image in a case of light emission by the lighting unit 1101 and the image in a case of no light emission by the lighting unit 1101, obtains a difference component between these images, and outputs it as the reflected light image, in response to the timing signal from the lighting and photo-detection operation control unit 1205.

In this configuration of FIG. 88, the lighting unit 1101, the reflected light image acquisition unit 1102, and the light control signal generation unit 1401 are controlled under the lighting and photo-detection operation control unit 1205, in such a manner that the lighting by the lighting unit 1101, and the image acquisition (the first charge storing and the second charge storing) and the reflected light image extraction by the reflected light image acquisition unit 1102 are carried out at specified timings.

On the other hand, the light control signal generation unit 1401 generates the light control signal in such a manner that the received light amounts due to the external light in two charge storing operations (the acquisition of the image under the lighting by the lighting unit 1101 and the acquisition of the image due to the external light alone) by the reflected light image acquisition unit 1102 are going to be equal. According to this light control signal, the light driving device 1402 controls the lighting by the external light source 1201 so that the external light source 1201 is controlled to emit the external light in such a manner that the external light amounts during the above described two charge storing operations become equal.

Consequently, when the reflected light image acquisition unit 1102 acquires the image in a case of light emission by the lighting unit 1101 and the image in a case of no light emission by the lighting unit 1101 according to the timing signal from the lighting and photo-detection operation control unit 1205, the light amounts given to the environment by the external light source 1201 are equal in these cases, so that when the difference component of these images is obtained, the obtained reflected light image is in a high precision.

FIG. 89 shows a timing chart for the operation in this eleventh embodiment, where a part (a) indicates the light control signal for controlling the external light source 1201, a part (b) indicates the control signal (lighting pulse) for the lighting unit 1101, and a part (c) shows an exemplary operation pattern (the charge storing operations) of the reflected light image acquisition unit 1102 in this eleventh embodiment.

The lighting and photo-detection operation control unit 1205 generates the control signals so that the reflected light image acquisition unit 1102 operates according to the operation pattern shown in the part (c) of FIG. 89, while giving the lighting pulse of the part (b) of FIG. 89 to the lighting unit 1101. On the other hand, at the same time, the light control signal generation unit 1401 generates the light control signal of the part (a) of FIG. 89, so that the external light source 1201 is driven according to this light control signal.

For example, the external light source 1201 repeats the external light emission and no external light emission in such a pattern that the external light is emitted when the light control signal has a level "H", and no external light is emitted when the light control signal has a level "L". This operation is obviously repeated at high speed, so that the external light source 1201 appears to be lighting at the constant brightness to the human eyes.

However, the external light fluctuates in such a manner that is brightness is instantaneously lowered while the charge storing operation is carried out, so that at a time of obtaining the reflected light image, it is possible to obtain the reflected light image at high precision without receiving any influence from the external light, The above described example is directed to a case of directly controlling the external light source (such as fluorescent light) whose emitted light amount periodically changes, so as to prevent the external light source from affecting the reflected light image.

On the contrary, there is also a scheme which utilizes the external light source as the light source for the reflected light image. Namely, the external light source itself is used as the light source of the lighting unit, and the reflected light from the target object resulting from the light emitted by the external light source is photo-detected by the photo-detection section. In this case, depending on the positional relationship between the external light source and the photo-detection section, the relationship of the reflected light amount being inversely proportional to the square of the distance may not hold, so that it becomes difficult to obtain the distance information, but there is no problem for the extraction of a shape of the target object. Such a modified scheme will be effective in a case where the entire room can be formed as a communication space as in a case of the amusement park.

<Twelfth Embodiment>

Referring now to FIG. 90 to FIG. 95, the twelfth embodiment of the present invention will be described in detail.

In this twelfth embodiment, a plurality of lighting and charge storing operation patterns are provided in advance and selectively used according to the external light state, so as to make it possible to obtain the reflected light image at high precision regardless of the external light state.

This twelfth embodiment is based on the following principle. Namely, suppose that the photo-detection charge storing operation is carried out twice in a state of having no light emission by the lighting unit 101, and a difference between the stored charges is outputted. In this case, if there was hardly any external light fluctuation between these two photo-detection charge storing operations, the output would be nearly equal to 0, and the resulting reflected light image would be completely dark. Namely, the light source is not emitting the light in this case, so that there is obviously no reflected light image component and therefore the reflected light image (output image) becomes completely dark. However, if there was some external light fluctuation between these two photo-detection charge storing operations, and if that fluctuation was a large one, then a difference between the stored charges for these two photo-detection charge storing operations would not be zero, and therefore the output image would not be completely dark.

For this reason, in this twelfth embodiment, the respective reflected light images are acquired by using a plurality of charge storing operation patterns provided in advance, in a state of having no light emission by the lighting unit 101, and the operation pattern from which the darkest image can be obtained is selected. Then, the lighting operation pattern having a lighting period corresponding to the selected charge storing operation pattern is selected, and the lighting by the lighting unit 101 is controlled by this selected lighting operation pattern.

Figure 90:
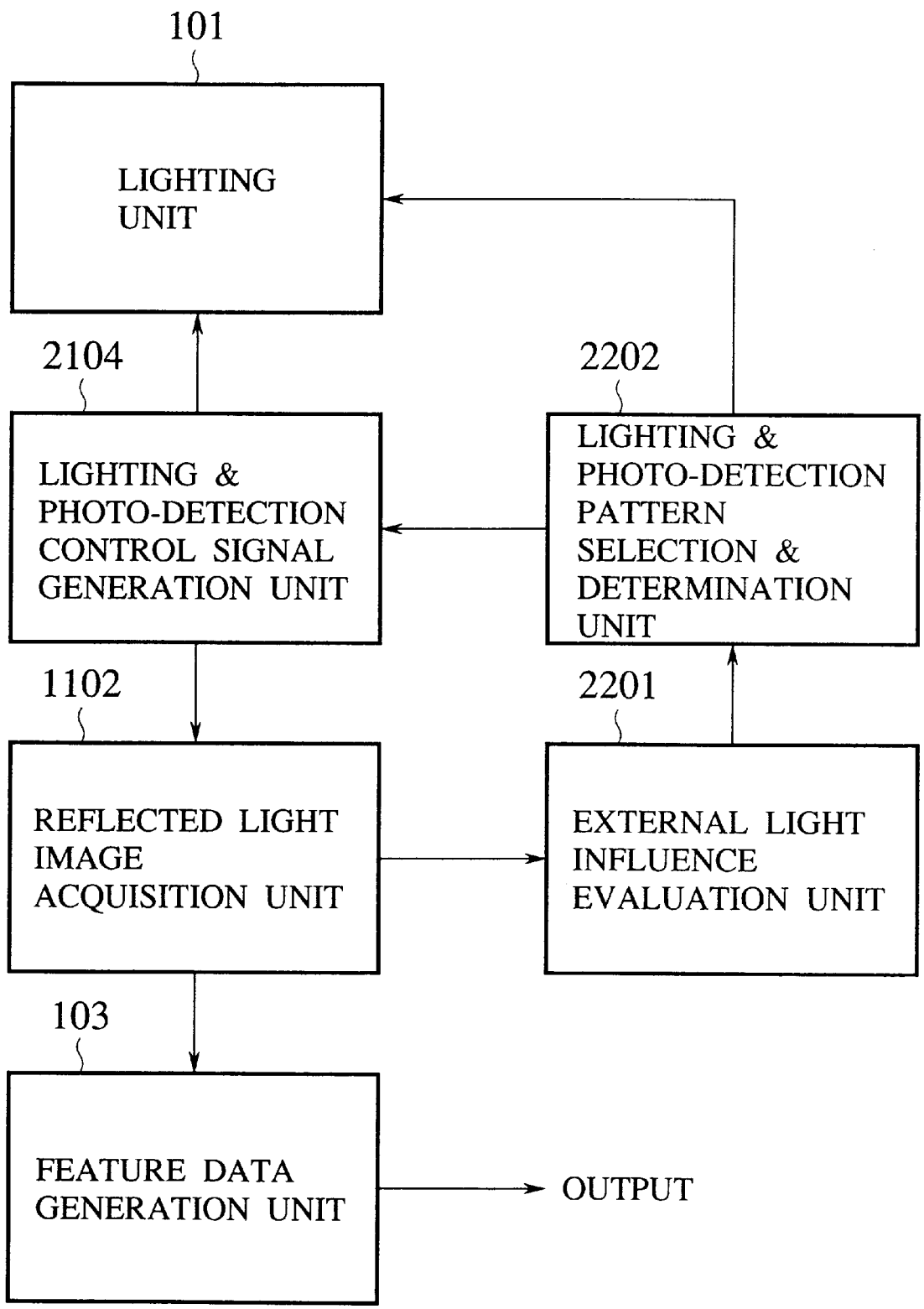
FIG. 90 is a block diagram showing an exemplary configuration of an information input generation apparatus according to the twelfth embodiment of the present invention.

To this end, the information input generation apparatus of this twelfth embodiment has an exemplary configuration as shown in FIG. 90, which comprises the lighting unit 101, the feature data generation unit 103, the reflected light image acquisition unit 1102 (corresponding to the reflected light extraction unit 102 of FIG. 1), a lighting and photo-detection control signal generation unit 2104 (corresponding to the timing signal generation unit 104 of FIG. 1), an external light influence evaluation unit 2201, and a lighting and photo-detection pattern selection and determination unit 2202.

The lighting unit 101 is a light source for illuminating the target object, which is the light source of the reflected light image.

In this twelfth embodiment, two operation modes including an optimal operation pattern selection mode and a normal operation mode are provided in order to make it possible to obtain the optimal photo-detection operation pattern according to the external light fluctuation state. In a case of finding the photo-detection operation pattern which is optimal for the external light, that is, in a case of the optimal operation pattern selection mode, the lighting unit 101 is controlled to stop the light emission, whereas in a case of the normal operation mode, this control is cancelled and the lighting unit 101 is controlled to emit the light at prescribed timing specified from the lighting and photo-detection control signal generation unit 2104 so as to illuminate the target object.

The lighting and photo-detection control signal generation unit 2104 is provided for carrying out the timing control. This lighting and photo-detection control signal generation unit 2104 generates signals for controlling the reflected light image acquisition unit 1102 and the lighting unit 101 according to the setting information supplied from the lighting and photo-detection pattern selection and determination unit 2202.

The lighting and photo-detection pattern selection and determination unit 2202 has two modes including the optimal operation pattern selection mode and the normal operation mode as well as a plurality of photo-detection charge storing operation patterns provided in advance. In a case of the optimal operation pattern selection mode, the lighting and photo-detection pattern selection and determination unit 2202 carries out the setting control with respect to the lighting and photo-detection control signal generation unit 2104 while sequentially using these various operation patterns so as to have the photo-detection carried out in the plurality of operation patterns. Then, the lighting and photo-detection pattern selection and determination unit 2202 receives the evaluation results for the reflected light images obtained by the respective operation patterns from the external light influence evaluation unit 2201, and determines the operation pattern for which the evaluation result is best among these evaluation results, as the optimal operation pattern.

The external light influence evaluation unit 2201 evaluates the reflected light images obtained by the respective operation patterns according to the output images of the reflected light image acquisition unit 1102, and gives the obtained evaluation values to the lighting and photo-detection pattern selection and determination unit 2202, so that the optical operation pattern is determined according to the evaluation values. While the optimal operation pattern is determined, the lighting and photo-detection pattern selection and determination unit 2202 controls the lighting unit 101 to emit no light. After the optimal operation pattern is determined, it becomes the normal operation mode, and the reflected light image acquisition unit 1102 and the lighting and photo-detection control signal generation unit 2104 are controlled to realize a photo-detection charge storing period in accordance with the determined operation pattern.

The external light influence evaluation unit 2201 evaluates how much influence of the external light fluctuation is contained in each reflected light image, where the reflected light image is acquired from the reflected light image acquisition unit 1102.

The reflected light image acquisition unit 1102 outputs a difference between an image photo-detected by the first photo-detection unit 109 and an image photo-detected by the second photo-detection unit 110. The first photo-detection unit 109 outputs the image photo-detected in a state of having the light emission by the lighting unit 101, and the second photo-detection unit 110 outputs the image photo-detected in a state of having no light emission by the lighting unit 101, and in a case of the optimal operation pattern selection mode, the lighting and photo-detection pattern selection and determination unit 2202 sets the lighting unit 101 not to emit any light. Note that it is also alternatively possible to control the lighting and photo-detection control signal generation unit 2104 not to generate any signal for making the lighting unit 101 to carry out the lighting operation.

In this manner, by controlling the lighting unit 101 not to emit any light in a case of the optimal operation pattern selection mode, the reflected light image obtained by the reflected light image acquisition unit 1102, that is, the difference output between the stored charges for the image photo-detected by the first photo-detection unit 109 and the stored charges for the image photo-detected by the second photo-detection unit 110, indicates only the external light fluctuation, so that the brighter reflected light image implies the more influence received from the external light. In order to secure the reliability, the evaluation value is given by an average value obtained by repeating the operation of each operation pattern several times in a case of the optimal operation pattern selection mode. In other words, for each operation pattern, the average brightness over several frames of the reflected light image is obtained and outputted as the evaluation value.

Figure 91:
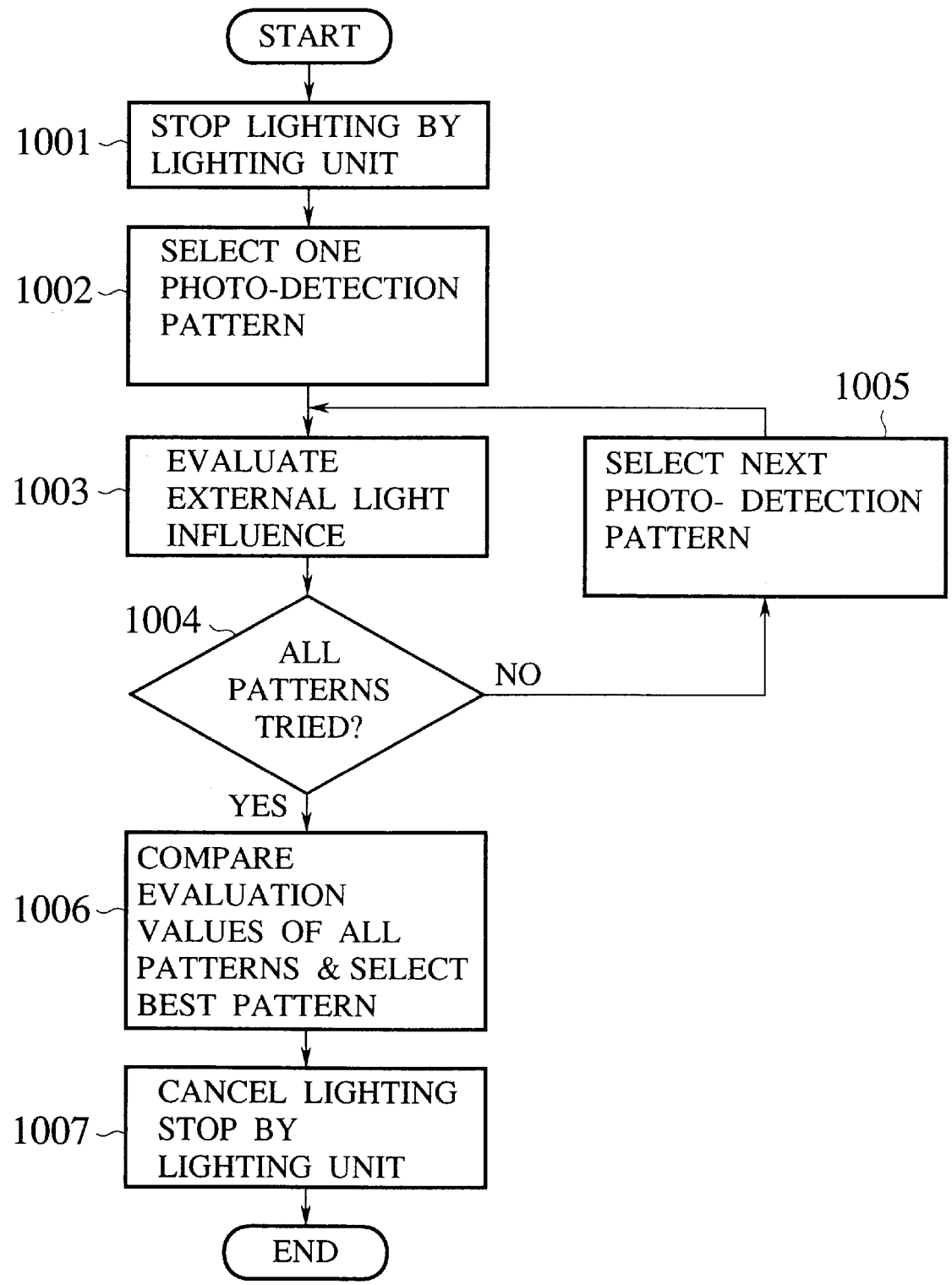
FIG. 91 is a flow chart for the operation carried out by a reflected light image acquisition unit of the information input generation apparatus of FIG. 90.

Next, the operation of this information input generation apparatus of FIG. 90 will be described with reference to the flow chart of FIG. 91.

Initially, this apparatus is set in the optimal operation pattern selection mode. In this mode, the lighting unit 101 is controlled not to emit any light first (step 1001). Namely, the lighting and photo-detection pattern selection and determination unit 2202 sets the lighting unit 101 such that the lighting unit 101 does not carry out the lighting operation even during the second charge storing period, so as to make the acquired reflected light image completely dark.

Then, the lighting and photo-detection pattern selection and determination unit 2202 selects one photo-detection operation pattern from a plurality of operation patterns provided in advance (step 1002), and controls the lighting and photo-detection control signal generation unit 2104 such that the difference component is obtained by carrying out the charge storing operations in the selected photo-detection operation pattern. In response, the lighting and photo-detection control signal generation unit 2104 controls the reflected light image acquisition unit 1102 to carry out the first charge storing operation and the second charge storing operation for the image of the target object in the operation period corresponding to the selected photo-detection operation pattern and obtain the difference component between the stored charges.

Then, according to that, the external light influence evaluation unit 2201 evaluates the external light in this operation pattern (step 1003). Here, the average brightness over several frames of the reflected light image is used as the evaluation value for the external light influence (which is of course smaller when it is darker). In other words, In other words, the above operation for obtaining the difference component is repeated for a plurality of times in one and the same operation pattern, and an average value of the respectively obtained difference component values is obtained as the evaluation value in that operation pattern. This evaluation result is then given to the lighting and photo-detection pattern selection and determination unit 2202.

Next, the lighting and photo-detection pattern selection and determination unit 2202 checks whether all the patterns are tried or not (step 1004), and if there is any pattern that is not tried yet, selects one of the untried patterns as the next photo-detection operation pattern (step 1005). Then, the lighting and photo-detection pattern selection and determination unit 2202 controls the lighting and photo-detection control signal generation unit 2104 such that the difference component is obtained by carrying out the charge storing operations in the selected photo-detection operation pattern. In response, the lighting and photo-detection control signal generation unit 2104 controls the reflected light image acquisition unit 1102 to carry out the first charge storing operation and the second charge storing operation for the image of the target object in the operation period corresponding to the selected photo-detection operation pattern and obtain the difference component between the stored charges. Then, according to that, the external light influence evaluation unit 2201 evaluates the external light in this operation pattern (step 1003). This evaluation result is then given to the lighting and photo-detection pattern selection and determination unit 2202.

Next, the lighting and photo-detection pattern selection and determination unit 2202 checks whether all the patterns are tried or not (step 1004), and if there is any pattern that is not tried yet, selects one of the untried patterns as the next photo-detection operation pattern (step 1005) and the above described operation is repeated in the selected photo-detection operation pattern and the evaluation is made, but when the step 1004 judges that all the patterns are tried, the lighting and photo-detection pattern selection and determination unit 2202 compares the respective evaluation values of all the patterns, and selects one pattern with the best evaluation value as the optimal pattern (step 1006).

Next, the lighting and photo-detection pattern selection and determination unit 2202 gives commands to the lighting unit 101 and the lighting and photo-detection control signal generation unit 2104 such that the lighting operation and the photo-detection operation are carried out in pattern and timing for realizing the charge storing period of that selected photo-detection operation pattern. As a result, the lighting and photo-detection control signal generation unit 2104 is set to generate the lighting command and the photo-detection command in accordance with that selected operation pattern, while the lighting unit 101 is relieved from its lighting stop state (step 1007).

In conjunction with this cancellation, the mode is changed from the optimal operation pattern selection mode to the normal operation mode.

In the normal operation mode, the photo-detection by the first photo-detection unit 109 in a state of having light emission by the lighting unit 101 is carried out for the charge storing period of the selected operation pattern, then the photo-detection by the second photo-detection unit 110 in a state of having node no light emission by the lighting unit 101 is carried out for the same charge storing period, and then the difference between the stored charges is obtained as the reflected light image without the influence of the external light.

In this manner, in this twelfth embodiment, a plurality of operation patterns with mutually different charge storing periods are provided in advance, and the optimal operation pattern selection mode is provided to carry out the photo-detection by the first photo-detection unit and the second photo-detection unit in a state of having no light emission by the lighting unit and obtain the difference output between the photo-detection outputs (image outputs) of these photo-detection units for each operation pattern, and then the operation pattern for which the difference image (reflected light image) is the darkest image is selected as the optimal operation pattern without the influence of the external light and the normal operation mode is carried out in that pattern.

In other words, the difference image is obtained without using the lighting unit for each of a plurality of operation patterns provided in advance and the influence of the external light is evaluated, and then the pattern indicating the best evaluation value is selected. After that, the image due to the external light alone and the image with the illumination by the lighting unit are acquired and the difference between them is obtained as the reflected light image in that selected pattern. As the evaluation value of the influence of the external light, the average brightness over several frames of the reflected light image is used, and this evaluation is tried for all the operation patterns provided in advance and then the operation pattern with the smallest average brightness (which received the least influence from the external light) is selected, so as to select the photo-detection period for the first photo-detection unit and the second photo-detection unit which is least influenced by the external light fluctuation under the current external light fluctuation state.

Consequently, it becomes possible to obtain the reflected light image in the operation pattern for which the influence of the external light fluctuation becomes minimum under the environment in which this apparatus is placed.

Now, the effect of this twelfth embodiment will be described more specifically.

Figure 92A:
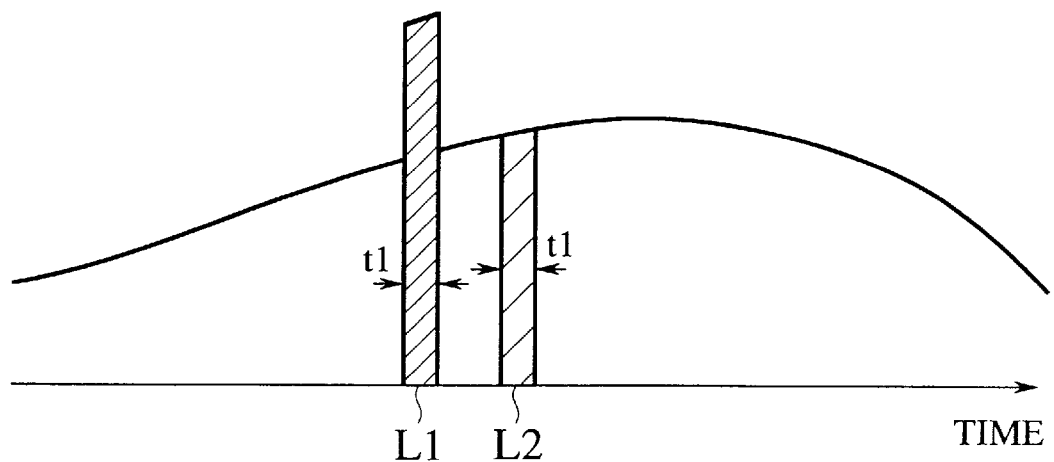
FIGS. 92A and 92B are diagrams for explaining the operation carried out by the information input generation apparatus of FIG. 90 in one exemplary case.
Figure 92B:
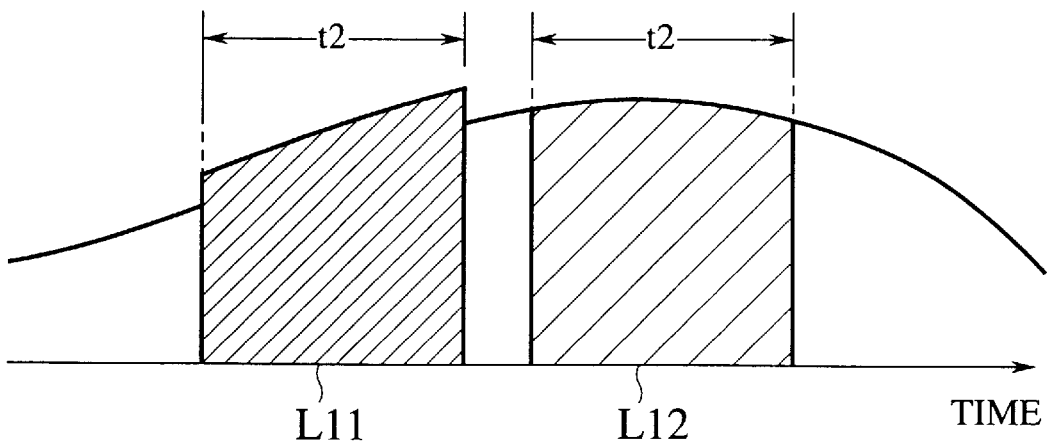
Figure 93A:
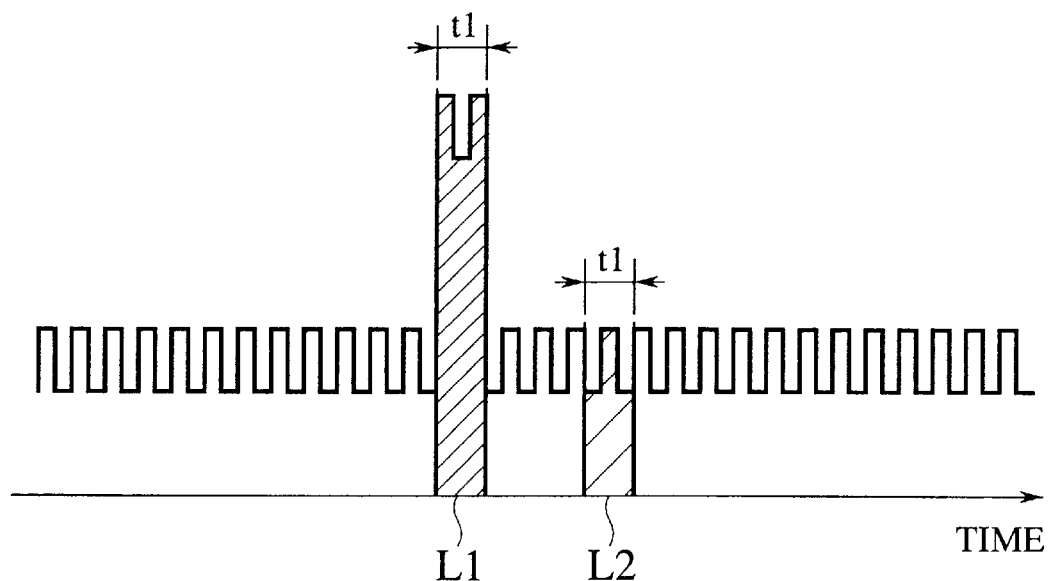
FIGS. 93A and 93B are diagrams for explaining the operation carried out by the information input generation apparatus of FIG. 90 in another exemplary case.
Figure 93B:
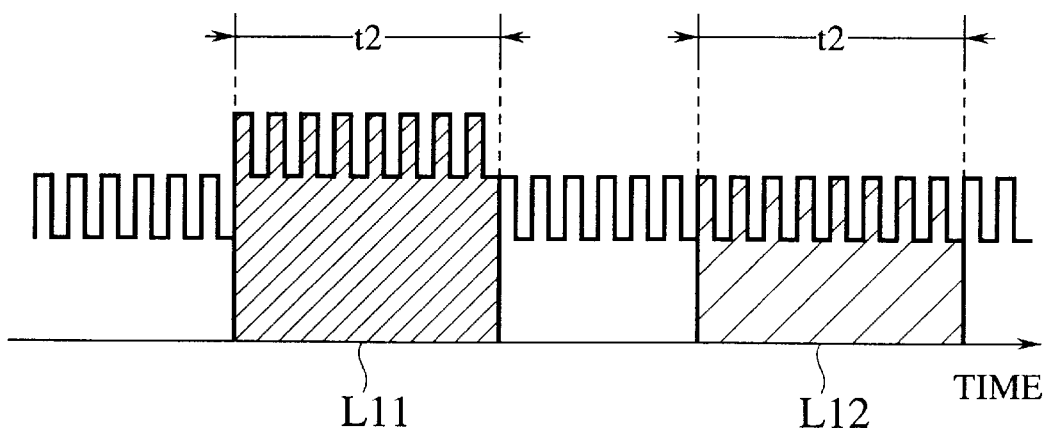

FIGS. 92A and 92B show an exemplary case of the external light (indicated by a solid line) with a long fluctuation period, and FIGS. 93A and 93B show an exemplary case of the external light with a short fluctuation period. In these figures, the horizontal axis represents a time and the vertical axis represents an intensity of the light at the photo-detection plane. When the light is emitted, the output curve increases in proportion to the emitted light amount (that is, a level is increased).

The light intensity integrated over a prescribed period of time (indicated as L1, L2, L11 and L12 in the figures) corresponding to the stored charges. In FIGS. 92A and 93A, L1 is the stored charges of the first photo-detection unit 109 at a time of the light emission by the lighting unit 101, and L2 is the stored charges of the second photo-detection unit 110 at a time of no light emission by the lighting unit 101, for an exemplary case of using the charge storing period t1.

Also, in FIGS. 92B and 93B, L11 is the stored charges of the first photo-detection unit 109 at a time of the light emission by the lighting unit 101, and L12 is the stored charges of the second photo-detection unit 110 at a time of no light emission by the lighting unit 101, for an exemplary case of using the charge storing period t2, where ti is assumed to be sufficiently smaller than t2.

The difference between L1 and L2 and the difference between L11 and L12 can be regarded as the reflected light images. For the light source of the lighting unit 101, an incandescent lamp or LED can be used, but it is more usual to use the LED in recent years. Then, the LED that is usually used for the lighting unit 101 can emit the higher power instantaneously for the shorter light emission time, so that the light intensity goes up higher for the shorter storing time cases in FIGS. 92A and 92B.

Here, when the external light fluctuation is gradual and large as shown in FIGS. 92A and 92B, it is possible to reduce the influence of the external light fluctuation in the difference between the stored charges for a time of light emission and a time of no light emission, by shortening the light emission time of the lighting unit 101, and therefore the reflected light amount can be detected at high precision (FIG. 92A). On the other hand, when the light emission time of the lighting unit 101 is made longer, the external light largely fluctuates during that period and therefore the large influence of the external light fluctuation will be contained in the difference between the stored charges for a time of light emission and a time of no light emission, so that the reflected light amount cannot be detected at high precision (FIG. 92B).

Next, when the external light fluctuation period is short as shown in FIGS. 93A and 93B (for example, when the inverter fluorescent light is used for the indoor lighting, where the light amount of this fluorescent light that functions as the external light fluctuates at the period of about several tens of kHz), suppose that the light emission time of the lighting unit 101 is set as short as the external light fluctuation period and the charges are stored for the duration of this light emission period (ti) as shown in FIG. 93A. In this case, if there is a displacement in phase between the external light fluctuation period and the lighting pulse of the lighting unit 101, the influence of the external light is largely changed and the errors becomes noticeable so that the reflected light image component cannot be detected at high precision.

For this reason, in this case, the light emission time of the lighting unit 101 is made longer instead. In other words, the light emission time is set to be a long time L2 which can contain several external light fluctuation periods as shown in FIG. 93B, and the charges are stored for the duration of this light emission period (t2). In this manner, the influence of the external light fluctuation can be reduced.

In a case where the external light fluctuation period is short, there is also a scheme for controlling the lighting unit 101 to emit the light in the light emission time which is even shorter than the external light fluctuation period. However, in general, when the light emission in an excessively short time is attempted, the driving frequency of the circuit increases, and the cost and the power consumption also increase.

As described, in this twelfth embodiment, the optimal operation pattern selection mode is provided, and a plurality of patterns are tried automatically and the optimal one is determined automatically while operating in this mode. However, the present invention is not necessarily limited to this particular case, and it is also possible to provide a switching button such that the operator can select the operation pattern by depressing this button. In such a case, a complicated processing is not involved so that the low cost realization becomes possible. In this case, it is preferable to display the reflected light image on the screen so that the operator can select the operation pattern with least noises while watching the reflected light image on the screen. Thus, the present invention should be construed as encompassing such a case of not selecting the operation pattern automatically.

By means of this, even when the light fluctuation is present, it becomes possible to obtain the reflected light image at high precision and therefore it becomes possible to extract only the image of the target object at high precision.

When it becomes possible to extract the image of the target object from the image signals, it becomes possible to acquire information on its shape, motion, distance, etc., from the extracted image. For example, the reflected light from a position where the object is existing has some value, while there is hardly any reflected light from the remote background, so that it becomes possible to extract the shape of the object by thresholding the reflected light image at appropriate threshold. It also becomes possible to extract various feature data from that shape. By analyzing the time sequence of the shape, it also becomes possible to capture the motion or the deformation of the object. Since the concavity and convexity of the object can be captures as the difference in the reflected light amount, it also becomes possible to obtain the 3D structure of the target object.

Consequently, it also becomes possible to easily realize the three dimensional operation input or the three dimensional command operation according to such information, and this twelfth embodiment can be the significant contribution to the practical implementation of the present invention.

Note that, in the above description, the phrase like a difference between two images is used frequently, but this is more of a conceptual description, and it does not necessarily imply the two images actually exist. In the general configuration, the first and second charge storage units are provided in the unit photo-detector cell, and one image can be formed by using the stored charges of the first charge storage units of all the cells, while another image can be formed by using the stored charges of the second charge storage units of all the cells. In this sense, the references to "two images" are made, but in practice, each cell outputs the difference of the two charge storage units at a time of output from the photo-detection section, and it is not that these two images are to be extracted as such to the external. Consequently, a phrase "two images" used in the above description does not necessarily imply the output of two images that can be actually seen separately.

Also, a number of times for carrying out the lighting operation per one frame is not necessarily limited to just once. For example, the charge storing into the first charge storage unit 119 with the light emission and the charge storing into the second charge storage unit 120 with no light emission can be repeated for ten times, for example.

Figure 94:
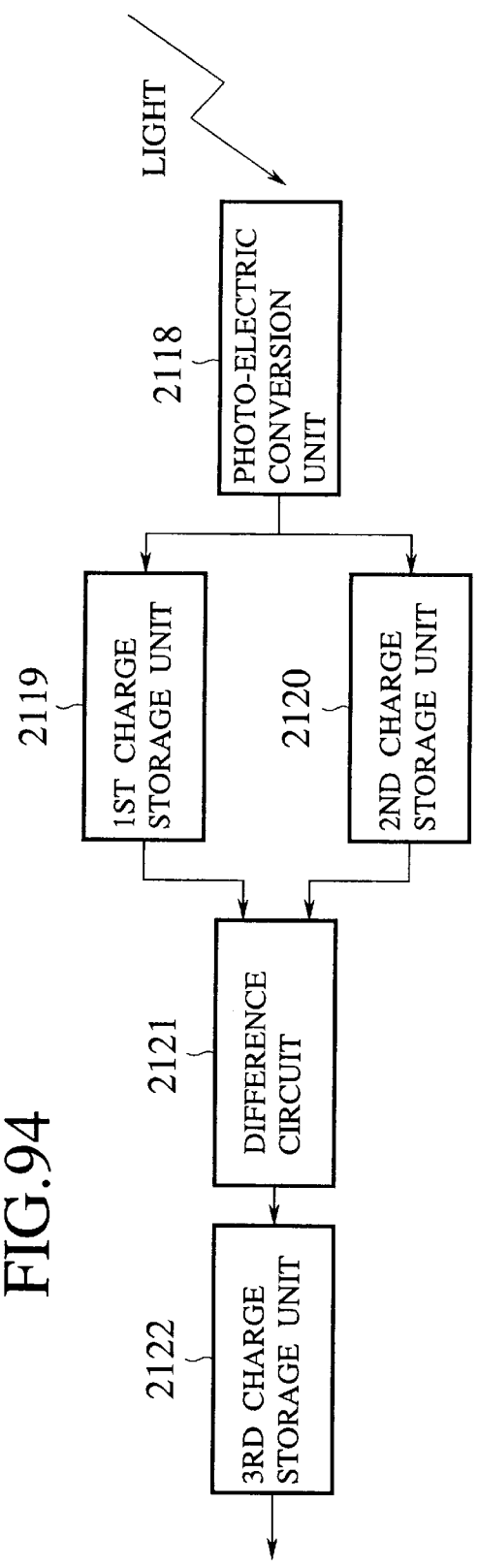
FIG. 94 is a block diagram showing another possible configuration of a photo-detection section in an information input generation apparatus according to the twelfth embodiment of the present invention.
Figure 95:
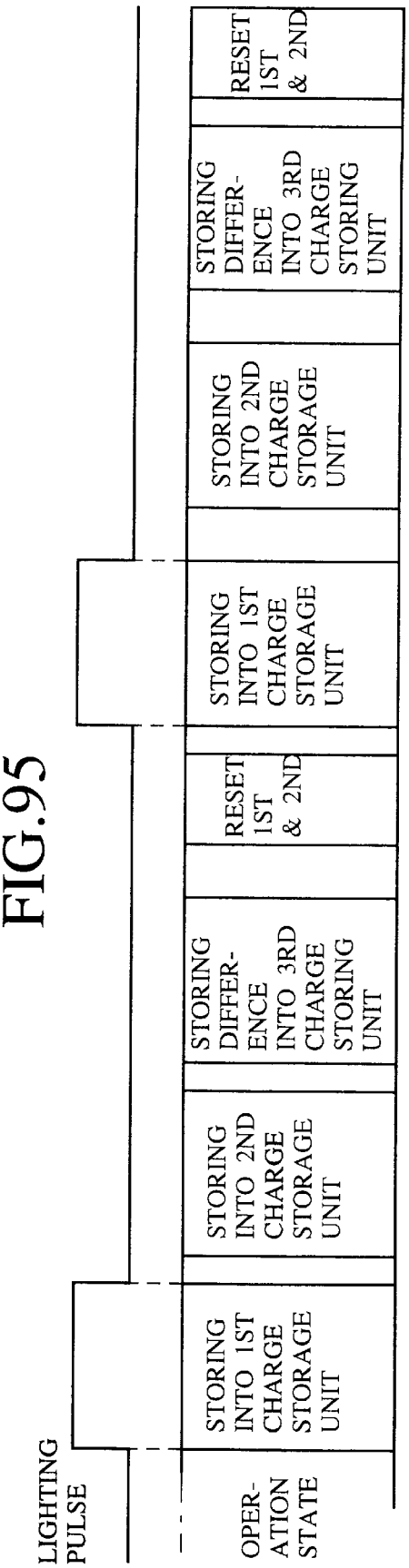
FIG. 95 is a timing chart for explaining the operation carried out by the photo-detection section of FIG. 94.

Also, as shown in FIG. 94, it is possible to further provide a difference circuit 2121 and the third charge storage unit 2122. In this case, the charge storing into the first charge storage unit 119 with the light emission by the lighting unit and the charge storing into the second charge storage unit with no light emission by the lighting unit are carried out, a difference between the stored charges in the first and second charge storage units 119 and 120 is obtained by the difference circuit 2121, and the charges for this difference is transferred to the third charge storage unit 2122, while the first and second charge storage units 119 and 120 are reset only after that, as indicated in FIG. 95. In this case, only a difference is present even within each cell, and it is not quite appropriate to speak of two images.

Including those cases mentioned above, this twelfth embodiment is effective for all the reflected light image acquisition apparatus and method which have the same effect as obtaining the difference between two images.

<Thirteenth Embodiment>

In the above, various techniques for suppressing the degradation of the reflected light image due to the light amount fluctuation under the environment has been described. However, even when the light amount under the environment is stable, if the reflected light amount from the target object is not very large compared with the light amount under the environment, the S/N becomes poor so that the quality of the obtained reflected light image is going to be low.

Such a situation arises, for example, when the dynamic range of the CMOS sensor in the reflected light image acquisition unit 1102 is set to be an optimum state for detecting the reflected light amount from the target object within a prescribed distance range of the photo-detection optics. This is because the intensity of the light is inversely proportional to the square of the distance. Consequently, in a case where the information input generation apparatus of the present invention is to be implemented on a computer such as PC and utilized for the operation input, and when the target object is the hand of a user, it is normal for the user to try to make the operation input according to his own convenience so that the operation input may be made with the position of the hand outside the range intended by a designer.

In view of this problem, this thirteenth embodiment is directed to a technique capable of dealing with such a situation, for suppressing the degradation of the reflected light image by adjusting the emission light amount according to the distance to the target object.

In a case of detecting the reflected light from the target object by the sensor, the reflected light amount that can be detected by the sensor is inversely proportional to the sqaure of the distance to the target object. Consequently, when the target object moves away from the sensor, the reflected light amount from the target object decreases abruptly. For example, compared to a case where the target object is located at the distance of 10 cm from the sensor, the reflected light amount that can be detected in a case where the target object is located at the distance of 30 cm will be decreased to $\frac{1}{9}$.

In other words, when the measurement range is set to be an optimum state for the measurement of the object in a range of the distance up to 10 cm, the measurement precision of the object located at the distance of about 30 cm will be lowered abruptly as the received light amount itself will be decreased to $\frac{1}{9}$.

In order to measure the target object located at the distance of about 30 cm at high precision without changing the measurement range, it is possible to raise the lighting power of the lighting unit so as to increase the reflected light amount from that target object. However, in this case, on the contrary, the reflected light amount from the object at the distance of about 10 cm would be excessively large and could exceed the measurement range, and this can largely affect the image quality degradation in the image to be acquired.

In the information input generation apparatus of the present invention as described above, it is often difficult to take an image of the target object at the optimum position with respect to the sensor position in accordance with its measurement range. This is because, when the target object the hand, the hand will be set in various hand actions with various hand shapes, and when the user's attention is preoccupied by the hand actions, the user tends to forget to keep the distance between the hand and the sensor position (the position of the photo-detection section of the reflected light image acquisition unit) within the intended range.

For this reason, this thirteenth embodiment is directed to a case of dealing with such a situation and making it possible to extract the reflected light image of the target object at high precision even when the located distance of the target object changes.

In this thirteenth embodiment, it is made possible to obtain the reflected light image of the target object at high precision by controlling the emission light amount of the lighting unit according to the distance between the sensor (the photo-detection section of the reflected light image acquisition unit) and the target object.

Namely, it is made possible to measure the distance at sufficient precision regardless of the distance at which the object is located, by means of the control that realizes an appropriate reflected light amount according to the distance at which the object is located.

Now, the basic configuration of the information input generation apparatus in this thirteenth embodiment and its variations will be described.

In the basic configuration, the apparatus includes the following three elements.

(1) A detection unit for detecting information regarding the distance of the object.

(2) A determination unit for determining a level of increase or decrease of the reflected light amount according to the detection result of the detection unit.

(3) A control unit for carrying out the control (the control of the emission light amount, the control of the amplifier, the control of the A/D conversion) for increasing or decreasing the reflected light amount according to the determination made by the determination unit.

In the practical implementation, each of these three elements can be realized in several different forms, including the following.

(1) The detection unit for detecting the distance of the object (or information related to it):

(1-1) The distance of the object is detected from an output (analog signals) of the cell array. The maximum value is then obtained by a maximum value detection circuit.

(1-2) The average signal amount is obtained by entering the signals through a low pass filter.

(1-3) The information is detected from digital data after the A/D conversion. The maximum value is then detected.

(1-4) The maximum value is calculated from the mean and variance.

(2) The determination unit for determining a level of increase or decrease of the reflected light amount according to the result obtained by the detection unit (1), so as to control the emission light amount of the lighting unit according to the determined content (either linearly or by stages).

(2-1) In case of controlling by stages, the control is made such that the reflected light amount changes in stages such as twice, three times, four times, and so on of the reference state.

(2-2) In a case of controlling linearly, the reflected light amount is controlled to be arbitrary x times the current amount.

(3) The control unit for carrying out the control (the control of the emission light amount, the control of the amplifier, the control of the A/D conversion) for increasing or decreasing the reflected light amount according to the determination of the determination unit (2).

(3-1) The lighting by an LED that constitutes the lighting unit is controlled.

(3-2) The lighting power (lighting current) of an LED that constitutes the lighting unit is controlled.

(3-3) A number of lighting pulses for an LED that constitutes the lighting unit is controlled.

(3-4) A pulse length of the lighting driving pulses for an LED that constitutes the lighting unit is controlled.

(3-5) A gain of an amplifier is controlled.

(3-6) An input voltage range of an A/D converter is controlled.

Now, an exemplary specific configuration of the information input generation apparatus in this thirteenth embodiment will be described in detail. This specific example corresponds to a case of using (1-3), (2-1) and (3-3) noted above, in which the detected values of the reflected light amount from the target object are classified into several levels, and the emission light amount is adjusted by changing the number of pulses for driving the lighting unit according to the classified level.

More specifically, assuming that the hand as the target object is placed at the distance of 20 cm in front of the photo-detection section, for example, a state in which the CMOS sensor in this setting outputs the photo-detection output voltage (the stored charge voltage) of 1 [V], ½ [V], or ¼ [V] will be called "state-1", "state-2", or "state-3", respectively.

Then, the emission light amount of the lighting unit is switched according to the state, by changing the number of lighting pulses for driving the lighting unit. For the "state-1", four pulses are used. For the "state-2", two pulses are used. For the "state-3", one pulse is used.

The fine adjustment control is carried out as follows. The image signals (reflected light image) from the CMOS sensor are A/D converted and the maximum value among the pixel values (a position where the reflected light amount is largest, that is, a position which is closest) is obtained from the digital reflected light image. The digital output is given by 8 bits to realize the 256 step gradation, for example.

The digital output is monitored and when the maximum value exceeds "250", the state is lowered to one grade lower one ("state-1" to "state-2", for example). Also, when the maximum value becomes lower than "100", the state is raised to one grade higher one ("state-3" to "state-2", for example). Note however that, when there is nothing that can be identified as the object, the state transition does not occur.

In this specific example, the setting is made so that the reflected light amount are exactly doubled from "state-3" to "state-2 and from "state-2" to "state-1", so that the conversion to the distance can be made easily.

At this point, the property of the reflected light amount and the necessity of the emission light amount control will be explained.

In this apparatus, the light is emitted from the lighting unit to the target object and the reflected light amount from that target object is measured (detected). Then, the distribution of the obtained reflected light amount is obtained in a form of an image, that is, the reflected light image of the target object. When the object surface is a uniform scattering surface, the reflected light amount (a value of each pixel in the reflected light image) indicates the distance. The value of each pixel (reflected light amount) is inversely proportional to the square of the distance to the object. This relationship between the distance to the object and the reflected light amount can be depicted in a form of a graph as shown in FIG. 96.

Figure 96:
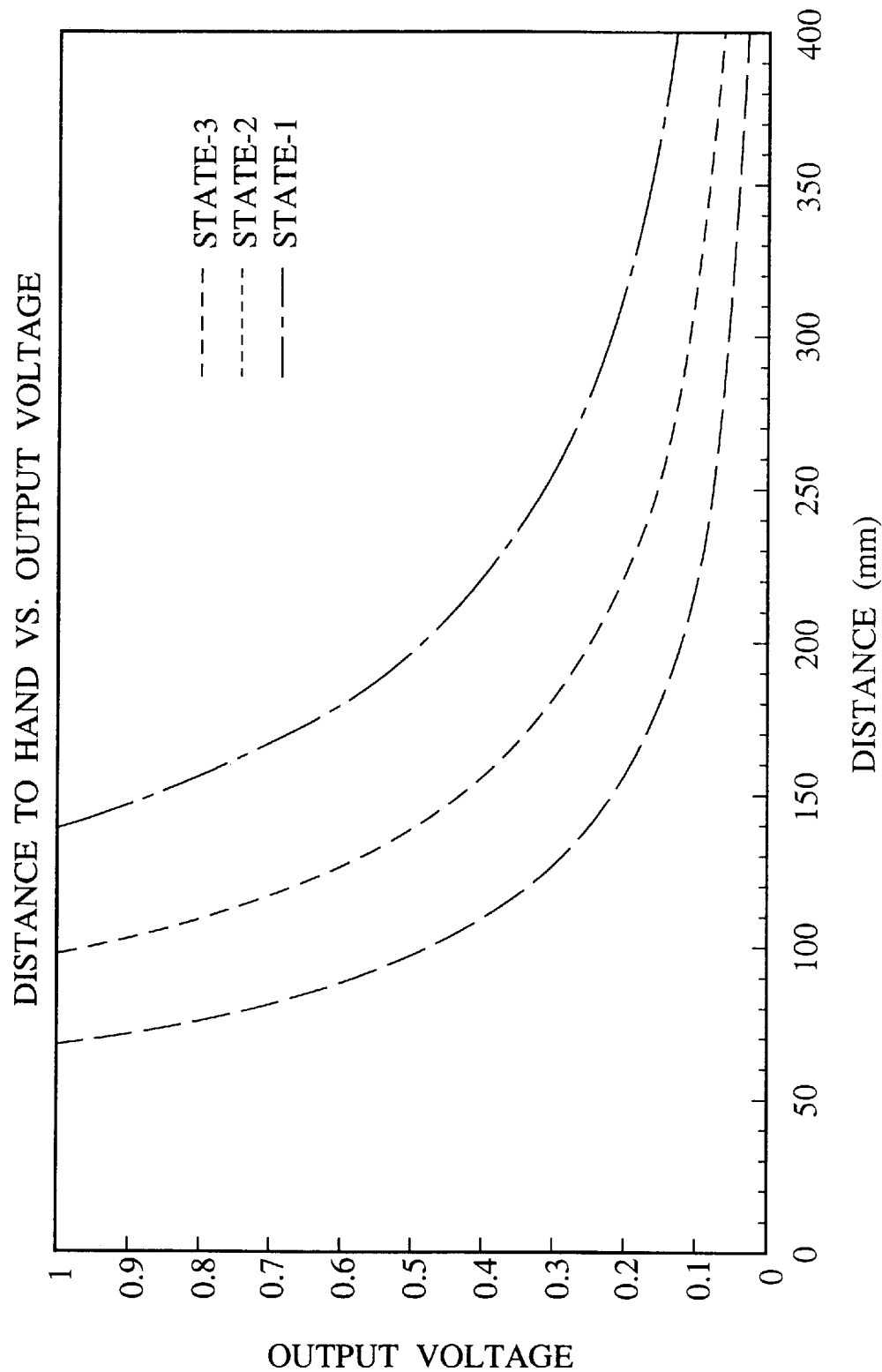
FIG. 96 is a graph showing a relationship of a distance and a reflected light amount in an information input generation apparatus according to the thirteenth embodiment of the present invention.

From this FIG. 96, it can be seen that, when the distance increases, the reflected light amount decreases and the distance resolution is lowered.

In order to make it possible to measure the sufficiently far distance, it suffices to increase the emission light amount of the lighting unit. However, when the emission light amount is increased, the reflected light amount is going to be excessively large when the object is located near on the contrary, so that there arises a problem that the reflected light amount may exceed the measurable range. Consequently, the solution for enabling the measurement of the distance at high precision over wide distance range is to suppress the change of the reflected light amount by controlling the emission light amount of the lighting unit according to the distance of the object.

Figure 97:
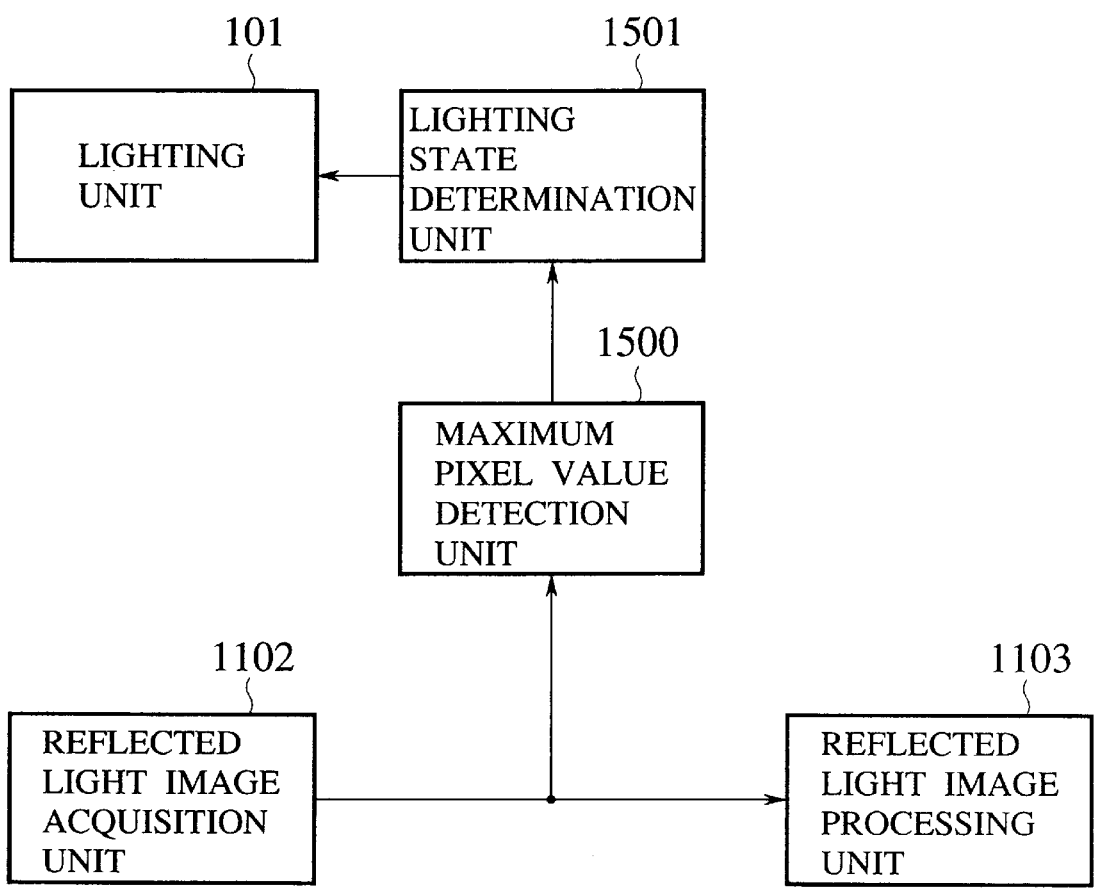
FIG. 97 is a block diagram showing one exemplary configuration of an information input generation apparatus according to the thirteenth embodiment of the present invention.

With this in mind, the information input generation apparatus in this thirteenth embodiment has a configuration as shown in FIG. 97, which comprises the lighting unit 101, the reflected light image acquisition unit 1102, the reflected light image processing unit 1103, a maximum pixel value detection unit 1500, and a lighting state determination unit 1501.

The lighting unit 101 is a device for emitting the light to illuminate the target object placed under the external light.

The reflected light image acquisition unit 1102 detects the reflected light from the target object in a state of having the light emission by the lighting unit 101 by using the CMOS sensor and storing charges into the first charge storage unit, and detects the reflected light from the target object in a state of having no light emission by the lighting unit 101 by using the CMOS sensor and storing charges into the second charge storage unit, and then obtains and outputs the difference between the stored charges as the reflected light image.

The maximum pixel value detection unit 1500 detects the maximum pixel value from data of the reflected light image.

The lighting state determination unit 1501 sets the lighting state of the lighting unit 101 appropriately, which also has a function for determining whether or not to change the lighting state of the lighting unit 101 according to the maximum pixel value obtained by the maximum pixel value detection unit 1500. The lighting state of the lighting unit 101 takes any one of "state-1", "state-2", and "state-3". The lighting state determination unit 1501 selects one of these states according to the maximum pixel value, and controls the lighting unit 101 to carry out the lighting operation by using the number of pulses specified for the selected state.

The reflected light image processing unit 1103 obtains the three-dimensional operation information by analyzing the action or state of the target object according to the reflected light image obtained by the reflected light image acquisition unit 1102, which corresponds to the feature data generation unit 103 of FIG. 1.

In this configuration of FIG. 97, the lighting unit 101 emits the light to illuminate the target object placed under the external light. The reflected light image acquisition unit 1102 detects the reflected light from the target object in a state of having the light emission by the lighting unit 101 by using the CMOS sensor and storing charges into the first charge storage unit, and detects the reflected light from the target object in a state of having no light emission by the lighting unit 101 by using the CMOS sensor and storing charges into the second charge storage unit, and then obtains and outputs the difference between the stored charges as the reflected light image.

The reflected light image acquisition unit 1102 is operated in synchronization with the lighting unit 101, so as to acquire a distribution of the light amount returned by the reflection of the object placed in front of the apparatus resulting from the light emitted by the lighting unit 101, that is, the reflected light image.

The reflected light image acquisition unit 1102 has the photo-detection cells arranged in an array structure. Each photo-detection cell carries out the photo-detection for the same time in a case of the light emission by the lighting unit 101 and in a case of no light emission by the lighting unit 101, stores respective charges, and detects the reflected light amount as the difference between the stored charges. Also, the reflected light image acquisition unit 1102 has an A/D converter for converting the detected reflected light amount into digital data and outputting the obtained digital data.

This A/D converter converts the input voltage in a range of 0 to 1 [V] into 8 bit digital data ranging from "0" to "255". Consequently, the distribution of the reflected light amount, that is, the pixel values of the reflected light image, will be outputted as the digital data from the reflected light image acquisition unit 1102.

The maximum pixel value detection unit 1500 detects the maximum value from a series of reflected light image data, and then gives the detected value to the lighting state determination unit 1501.

Upon receiving this detected value, the lighting state determination unit 1501 determines the optimum state among the three states of "state-1", "state-2" and "state-3", by judging which one of these three lighting states is optimum according to the detected value.

Here, the optimum state is determined as follows. Namely, the lighting state determination unit 1501 determines whether or not to change the lighting state according to the obtained maximum pixel value. Now, there are three states of "state-1", "state-2" and "state-3" that can be the lighting state of the lighting unit 101. Among them, the "state-1" is a mode by which the largest reflected light amount can be obtained, which is set such that the input voltage of the A/D converter becomes approximately 1 [V] when the hand as the target object is located at the distance of 20 cm.

Note however that the absolute distance value cannot be determined from the reflected light amount size alone, so that the above definition is only a standard one. For example, the reflected light amount may vary depending on the color or the surface state (dry or wet) of the hand.

The "state-2" is a mode by which the reflected light amount as much as about a half of that obtained by the "state-1" can be obtained.

The "state-3" is a mode by which the reflected light amount as much as about a quarter of that obtained by the "state-1" can be obtained.

In the following, the change of the state for increasing the reflected light amount to a double of the current value will be referred to as "raising the state by one grade" and the change of the state for decreasing the reflected light amount to a half of the current value will be referred to as "lowering the state by one grade". In other words, the state change is expressed in such a manner as "lowering from "state-1" to "state-2"", "raising from "state-3" to "state-2"", etc.

The lighting state determination unit 1501 controls the lighting state as follows. When the maximum pixel value is "250", the light state is lowered by one grade. In other words, when the hand comes too close for the current state, the reflected light amount is lowered by lowering the emission light amount, so that the input signals of the A/D converter will not be saturated.

Figure 98:
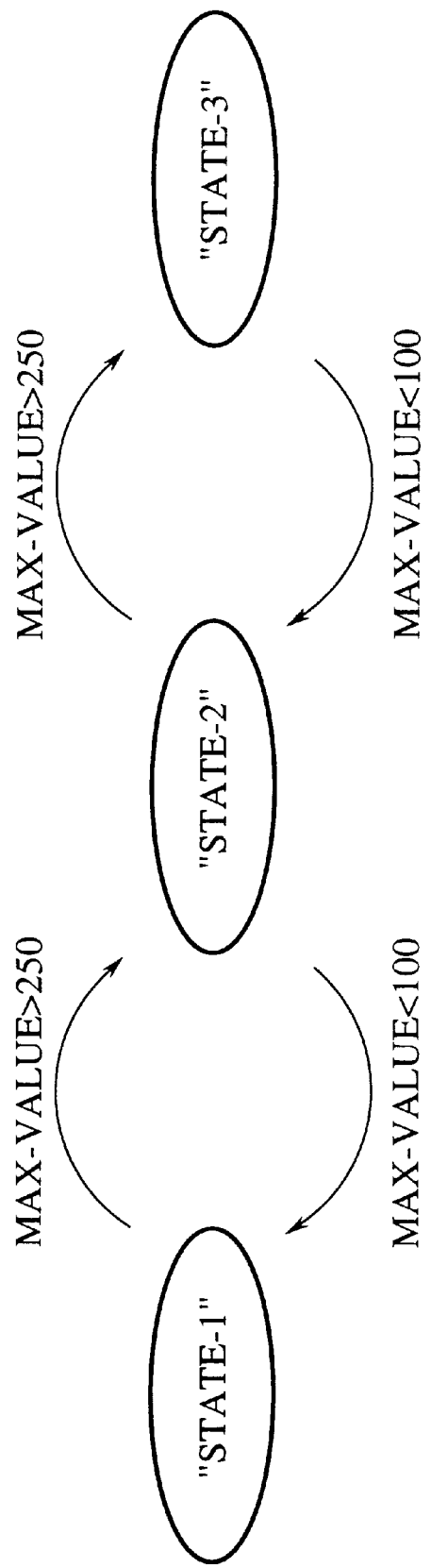
FIG. 98 is a diagram showing a state transition among three stated used in the information input generation apparatus of FIG. 97.

On the other hand, when the maximum pixel value becomes lower than "100", the lighting state is raised by one grade. In other words, when the hand position is too far for the current state so that the reflected light amount is insufficient, the reflected light amount is increased by raising the emission light amount. Here, however, the "state-1" cannot be raised any higher, and the "state-3" cannot be lowered any lower. The state transition among these three states is summarized in a state transition diagram shown in FIG. 98.

Here, a case of lowering the state when the maximum pixel value is greater than "250" and raising the state when the maximum pixel value is less than "100" has been described, but this thirteenth embodiment is not necessarily limited to these values.

The simplest case is to lower the state when the maximum pixel value is "255" (which is the maximum possible value) and raise the state when the maximum pixel value is "127" (a half of the maximum possible value). In this case, however, the input signals of the A/D converter will be saturated once before the state is lowered (that is, the state is lowered after the input signals are saturated). Also, by lowering the state by one grade when the maximum pixel value is "255", the output becomes "128" (or "127"), but if the reflected light amount becomes slightly less by then, the maximum pixel value immediately becomes lower than "127" and the state is immediately raised again.

As such, when the threshold for raising the state is set to be about a half of the threshold for lowering the state, the state is going to be changed frequently in a case where the reflected light amount remains around that threshold for raising the state.

For this reason, by setting the threshold for raising the state to be somewhat less than a half of the threshold for lowering the state so as to provide the hysteresis characteristic to the state transition, it is possible to prevent the frequent changes of the state. In this thirteenth embodiment, the threshold for lowering the state is set to be "250", so that the state is lowered immediately before the input signals of the A/D converter are saturated. Also, when the state is lowered by the threshold of "250", the value is lowered to about "125", and the threshold for raising the state is set to be "100" which is lower than that.

In this thirteenth embodiment, a number of states is set to be three. Then, by changing the state, the reflected light amount is controlled to be doubled or reduced in half. However, it is also possible to realize a somewhat finer controller by increasing a number of states, The difference in the lighting states is controlled by the number of lighting pulses. In this thirteenth embodiment the lighting unit is driven by four lighting pulses in the "state-1" as shown in a part (a) of FIG. 99, by two lighting pulses in the "state-2" as shown in a part (b) of FIG. 99, or by one lighting pulse in the "state-3" as shown in a part (c) of FIG. 99.

Figure 99:
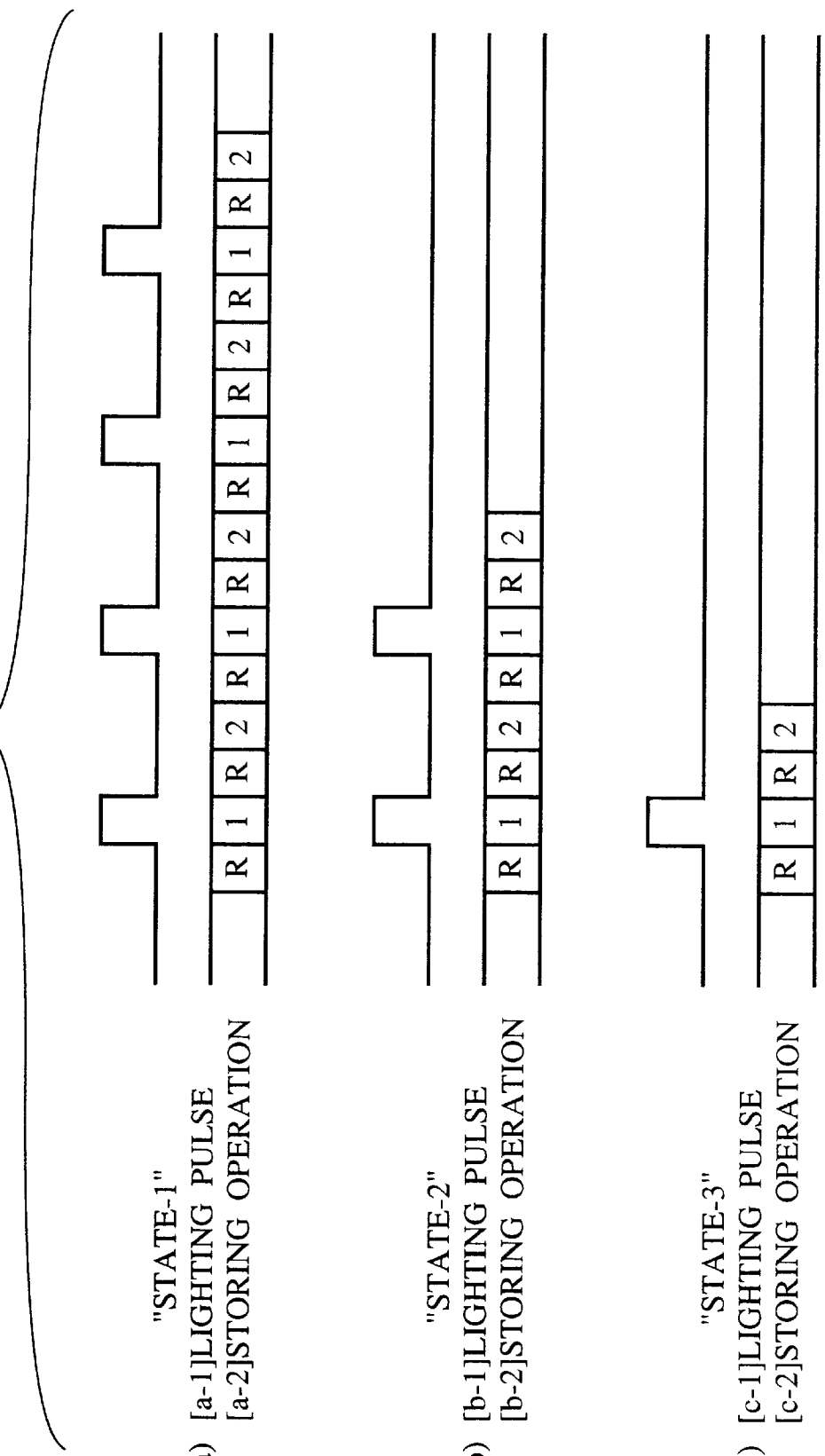
FIG. 99 is a timing chart for explaining the operation carried out by the information input generation apparatus of FIG. 97 for three states in one exemplary case.

As shown in FIG. 99, the length of each lighting pulse a-1, b-1, c-1 is the same, so that the "state-2" can obtain twice as much reflected light amount as the "state-3", and the "state-1" can obtain twice as much reflected light amount as the "state-2". In response to this lighting pulse, the charge storing control is carried out as follows.

In FIG. 99, charts a-2, b-2, c-2 shown directly below the lighting pulses a-1, b-1, c-1 show the respective charge storing operations. In FIG. 99, "1" indicates the charge storing into the first charge storage unit of the CMOS sensor in the reflected light image acquisition unit 1102 utilizing the CMOS sensor in a configuration of FIG. 3 and FIG. 4, "2" indicates the charge storing into the second charge storage unit, and "R" indicates the reset for releasing the generated charges to the power source.

Namely, as described in relation to FIG. 3 and FIG. 4, the CMOS sensor has a configuration in which the unit photo-detector cells PD are arranged in n×n pixel array, where each unit photo-detector cell PD has one photo-electric conversion unit 118 and two charge storage units 119 and 120. Between the photo-electric conversion unit 118 and the charge storage units 119 and 120, several gates (122 and 123 in this example) are provided, so that the charges generated at the photo-electric conversion unit 118 can be selectively lead to either one of the two charge storage units 119 and 120 by controlling these gates. Here, the control signal for these gates and the lighting control signal for the lighting unit 101 are synchronized. Then, the difference between the stored charges of the two charge storage units is obtained as a component of the reflected light image at the corresponding pixel.

In the charge storing operation in the "state-3" shown in a part (c) of FIG. 99, after the reset is made first, the generated changes of the photo-electric conversion unit 118 are stored into the first charge storage unit of the CMOS sensor in synchronization with the lighting pulse.

Next, after the reset is made once again, the generated charges of the photo-electric conversion unit 118 are stored into the second charge storage unit of the CMOS sensor, in a state of no light emission by the lighting unit 101 this time. The second charge storage unit stores the generated charges due to the external light such as the illumination light and the sunlight, while the first charge storage unit stores the generated charges due to the reflected light including the external light and the light returned by the reflection of the object resulting from the light emitted by the lighting unit 101. Consequently, the reflected light amount can be obtained by taking a difference between the stored charges of the first charge storage unit and the second charge storage unit.

In the "state-2", the charge storing is carried out twice, so that the reflected light amount is doubled. In the "state-1", the charge storing is repeated for four times.

Figure 100:
FIG. 100 is a timing chart for explaining the operation carried out by the information input generation apparatus of FIG. 97 for three states in another exemplary case.

Note that, in this thirteenth embodiment, the emission light amount is controlled by the number of pulses, but this thirteenth embodiment is not necessarily limited to this case. For example, as shown in FIG. 100, it is also possible to provide three states by setting the pulse length of the lighting pulse in three sizes, i.e., a unit length, twice the unit length, and four times the unit length. In this case, in any of "state-1", "state-2" and "state-3", the charge storing operation stores charges into each of the first and second charge storage units once, and only the storing period is different in three cases.

The total lighting time of the lighting unit 101 for each state is the same as in a case of FIG. 99, so that the reflected light amount is also approximately the same as in a case of FIG. 99. Note however that, when the external light is fluctuating, it is less likely to receive the influence of the external light by emitting a plurality of short light pulses, rather than emitting one long light pulse.

Besides those described above, there are still some other methods for controlling the reflected light amount. For example, there is a method for changing the emission light intensity of the lighting unit 101. Namely, in this case, the lighting current is to be changed. Also, when a plurality of light sources are used for the lighting unit 101, there is a method for changing a number of light sources for emitting lights.

In addition, apart from these methods for controlling the reflected light amount, there are several methods for suppressing the variation of the digital data size after the A/D conversion. For example, there is a method for dynamically changing the amplification rate at an amplifier provided at a front stage of the A/D converter. Also, the A/D converter is to be given with input voltages corresponding to the 0 level output and the full scale output as references, and by changing these reference voltages, it is also possible realize the control such that the digital data will be contained within an appropriate range.

Figure 101:
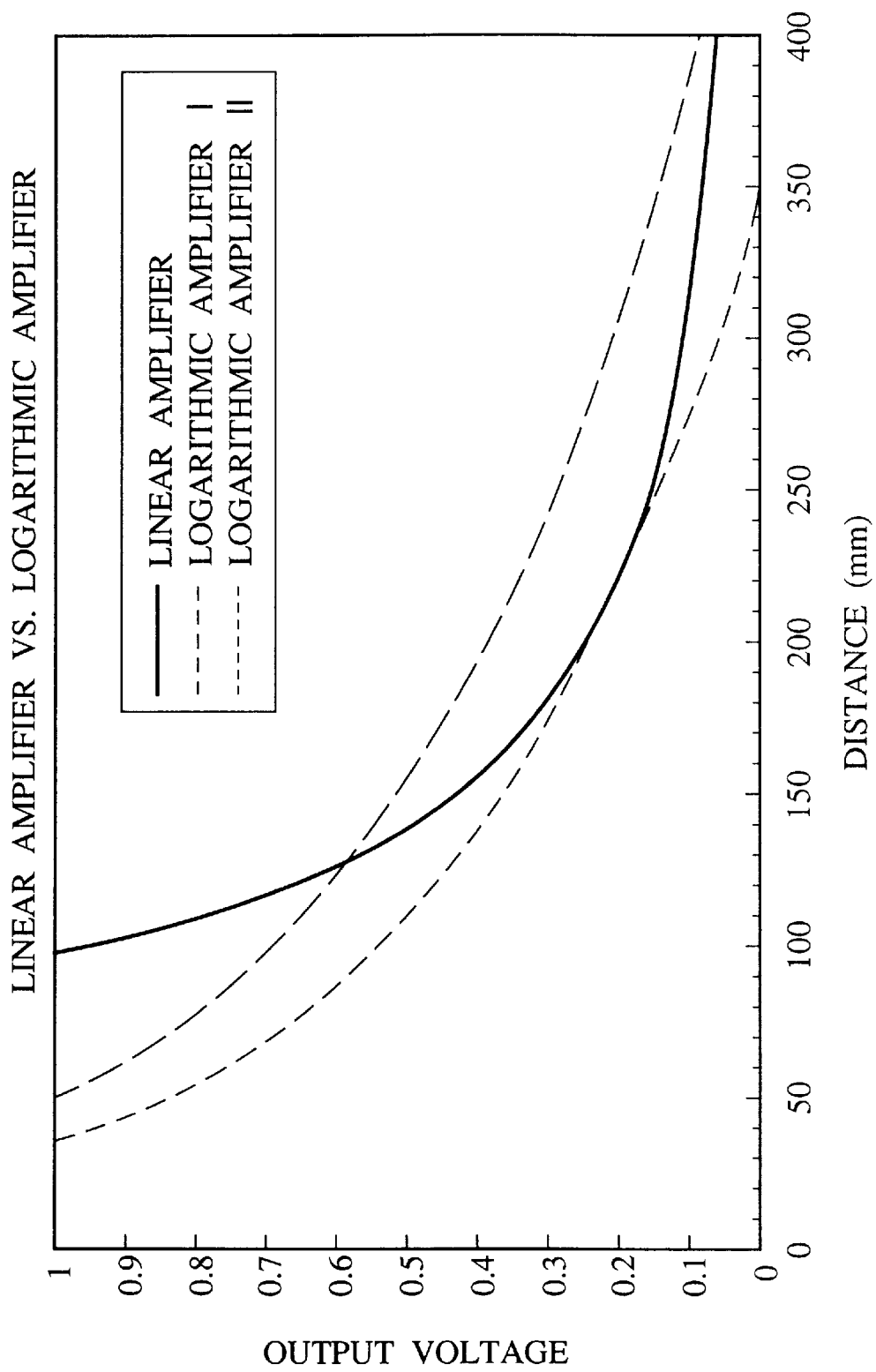
FIG. 101 is a graph showing a characteristic of a logarithmic amplifier that can be used in the information input generation apparatus of FIG. 97.

By inserting a logarithmic amplifier at a front stage of the A/D converter, the signal change with respect to the distance change can be suppressed as indicated in FIG. 101, so that the measurable range for one mode can be widened. For this reason, there may be cases where the above described processing can be omitted. However, even in a case of using the logarithmic amplifier, the use of the above described processing can enable the measurement even when the hand as the target object is located at far distance, at the same S/N level as in a case where the target object is located near.

In the above, the lighting state is determined solely according to the maximum value among the pixel values of the reflected light image, but there are other methods as well. For example, it is also possible to determine the state according a number of pixels that satisfy the threshold condition, in such a manner that the state is lowered when there are ten or more pixels that have the pixel values above "250", the state is raised when there are ten or more pixels that have the pixel values below "100", etc. In this case, there is an advantage in that the state will not be changed even when there is a pixel with the pixel value above "250" that appears locally due to the noise.

There is also a method which utilizes the mean value of the pixel values in addition. In this method, the mean pixel value of the pixels with the pixel values above a certain value (that is the pixels not belonging to the background) is obtained, and the state is lowered when the maximum pixel value is above "250" and the mean pixel value is above "150" and so on, for example. According to this method, there is an advantage in that it is possible to avoid the problematic situation in which only the maximum pixel value is prominent but the other pixel values are relatively small so that the resolution would be lowered for the most part if the state is lowered.

It is also possible to determine the state at the analog signal level before the reflected light amount is A/D converted. When the analog signals before the A/D conversion are entered through the low pass filter, the average signal amount can be obtained. This average signal amount is entered into a comparator and the lighting state is determined according to the comparator output. Else, when the analog signals are entered into the maximum value holding circuit instead of the low pass filter, the maximum value of the input signals can be determined, so that it is also possible to determine the lighting state according to this maximum value of the input signals.

In the examples described above, the lighting state is changed by stages, using the number of lighting pulses or the pulse width. In other words, the emission light amount of the lighting unit 101 is changed by changing the number of lighting pulses or the pulse width in the light amount control.

In such a case, there is a drawback in that the fine light amount control is rather difficult. In order to realize the fine light amount control, it is necessary to control the light amount linearly.

In view of this, an exemplary case of changing the lighting state linearly will now be described.

In this case, an analog feedback circuit is from the analog signals before the A/D conversion by the A/D converter so as to control the lighting current, that is, the lighting power itself.

Figure 102:
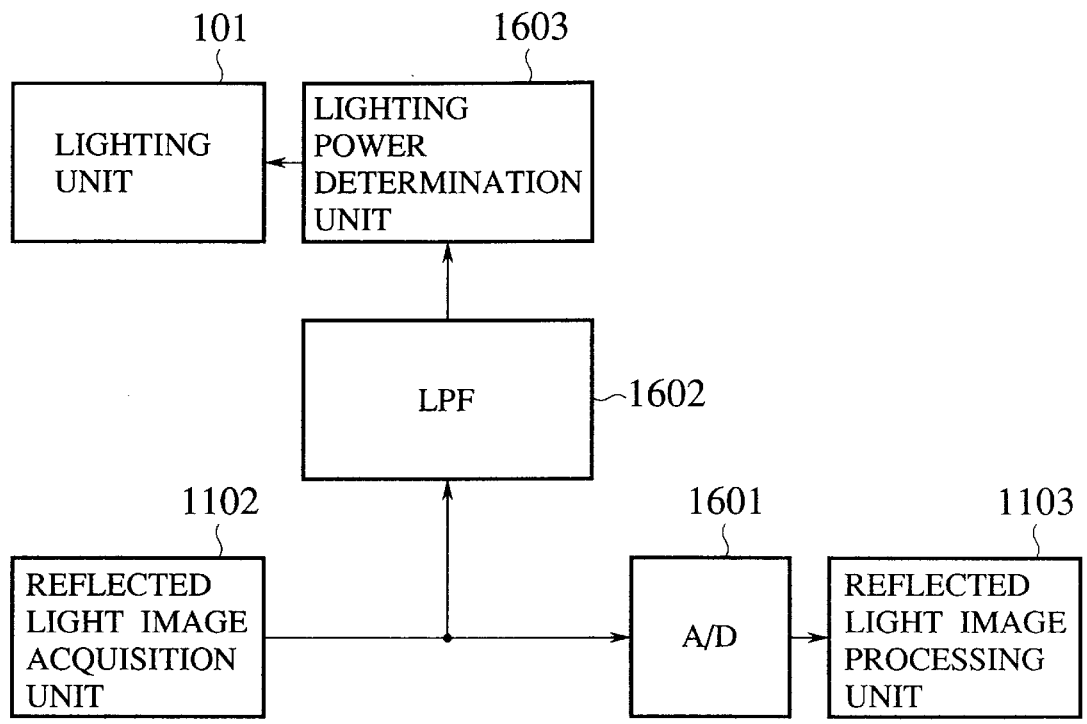
FIG. 102 is a block diagram showing another exemplary configuration of an information input generation apparatus according to the thirteenth embodiment of the present invention.

FIG. 102 shows an exemplary configuration for this case. In this configuration of FIG. 102, the reflected light image acquisition unit 1102 outputs analog signals. These analog signals are entered through a low pass filter (LPF) 1602 so as to extract the DC (direct current) component of the frame. The apparatus also includes a lighting power determination unit 1603 having a feedback loop by which the emission light amount is lowered when the DC component is above a certain value or the emission light amount is raised when the DC component is below that certain amount.

With this configuration, the emission light amount of the lighting unit 101 can be automatically adjusted such that the average of the reflected light image always remains constant.

In the configuration of FIG. 102, the low pass filter is used in order to extract the DC component of the frame from the analog signals, but this thirteen embodiment is not necessarily limited to this case. For example, it is also possible to realize the control such that the maximum value of the reflected light image always remains constant, by using the maximum value detection circuit instead. It is also possible to control the lighting pulse length linearly, instead of controlling the lighting current.

In these methods, the emission light amount is automatically controlled such that the average (or the maximum value) of the reflected light image always remains constant, so that when the distance of the hand as a whole is changed, it is impossible to detect this change. Consequently, these methods are effective when the automatic emission light amount control has a higher priority and the absolute distance value is required. Also, although the absolute distance value cannot be obtained, it is still possible to obtain the relative distance information, so that these methods are also suitable in a case of detecting the shape alone. Also, by supplying the emission light amount to the reflected light image processing unit 1103 somehow, it becomes possible to restore the range image from the obtained reflected light image and the emission light amount.

<Fourteenth Embodiment>

The thirteenth embodiment is directed to various cases for suppressing the influence of the distance (far or near) of the target object position on the image quality of the reflected light image, by controlling the emission light amount of the lighting unit.

In contrast, it is also possible to generate and acquire the reflected light image with a wide dynamic range by obtaining several reflected light images while changing the emission light intensity of the lighting unit, and composing these reflected light images. By means of this, the reflected light image in good quality can be obtained and the distance can be detected at high precision for a wide range of distances ranging from the near distance to the far distance. The fourteenth embodiment is directed to this case.

Figure 103:
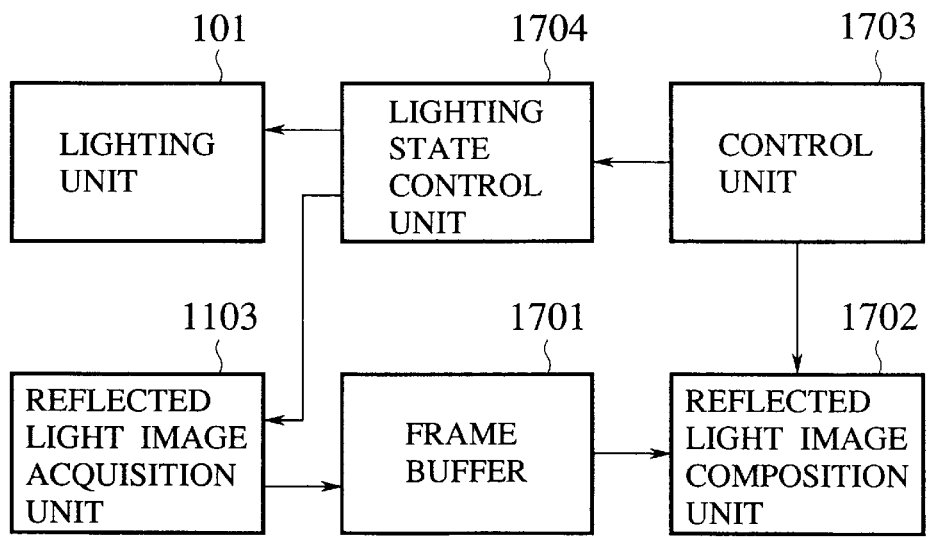
FIG. 103 is a block diagram showing an exemplary configuration of an information input generation apparatus according to the fourteenth embodiment of the present invention.

FIG. 103 shows an exemplary configuration of the information input generation apparatus in this fourteenth embodiment, which comprises the lighting unit 101, the reflected light image acquisition unit 1102, a frame buffer 1701, a reflected light image composition unit 1702, a control unit 1703, and a lighting state control unit 1704.

The lighting state control unit 1704 controls the lighting unit 101 to carry out the lighting operation in one of several lighting modes provided in advance. More specifically, for example, the lighting state control unit 1704 functions to generate the lighting pulse according to which the lighting unit 101 emits the light, and in this case, the lighting state control unit 1704 generates several patterns of the lighting pulse sequentially. At the same time, the lighting state control unit 1704 gives a storage control signal to the reflected light image acquisition unit 1102. The charge storing operation at the reflected light image acquisition unit 1102 needs to be synchronized with the lighting operation, so that the lighting state control unit 1704 controls both of them simultaneously.

The reflected light image data outputted from the reflected light image acquisition unit 1102 are stored in the frame buffer 1701. When data for a prescribed number of frames are stored in the frame buffer 1701, the reflected light image composition unit 1702 reads out these data and carries out the composition processing. The control unit 1703 carries out the timing control for the apparatus as a whole.

Now, the composition processing by the reflected light image composition unit 1702 will be described in further detail.

Here, it is assumed that the lighting state control unit 1704 sequentially carries out the operations of "state-1", "state-2" and "state-3" as described in the thirteenth embodiment. In other words, the lighting unit 101 emits the light first at a prescribed lighting power, next at a half of that prescribed lighting power next, and finally at a quarter of that prescribed lighting power.

In synchronization with this lighting operation, the reflected light image acquisition processing by the reflected light image acquisition unit 1102 is carried out, and three frames of the reflected light images are stored in the frame buffer 1701. The reflected light image composition unit 1702 carries out the composition processing by using these three frames of the reflected light images.

In the following, the reflected light images corresponding to "state-1", "state-2" and "state-3" will be referred to as "reflected light image-1", "reflected light image-2" and "reflected light image-3", respectively.

The "reflected light image-2" has the pixel values twice as high as those of the "reflected light image-3", and the "reflected light image-1" has the pixel values four times as high as those of the "reflected light image-3". Note however that the pixel value is "255" at most.

Figure 104:
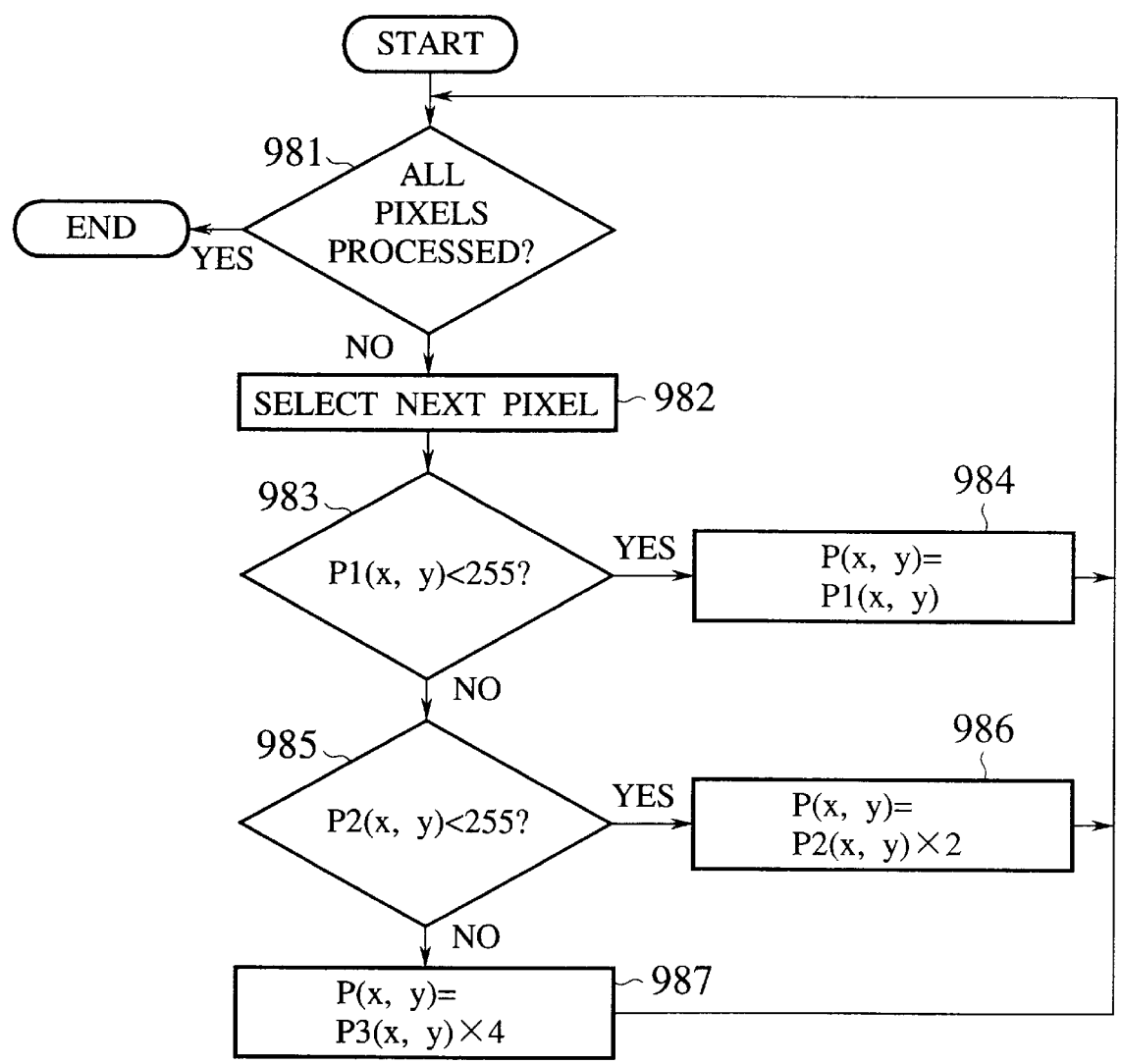
FIG. 104 is a flow chart for the operation carried out by the information input generation apparatus of FIG. 103.
Figure 105:
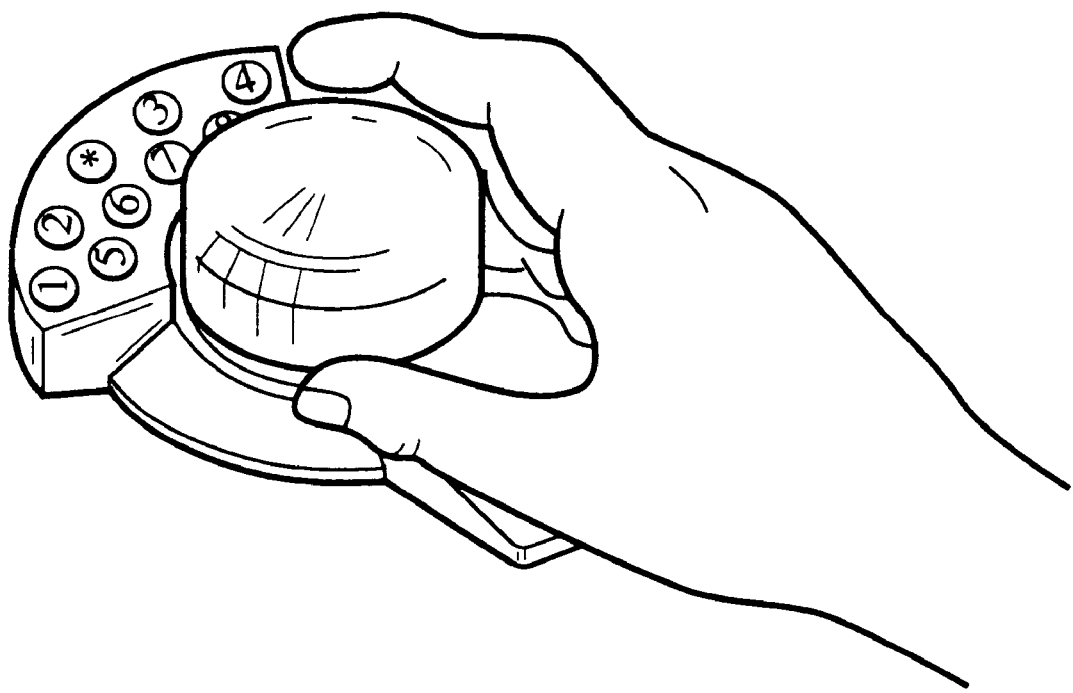
FIG. 105 is a perspective view of a conventional three-dimensional pointing device.

Now, the reflected light images are composed by the following algorithm according to the flow chart of FIG. 104. Here, for each coordinate (x, y), the pixel value for the coordinate (x, y) in "reflected light image-1", "reflected light image-2" and "reflected light image-3" will be denoted as P1(x, y), P2(x, y) and P3(x, y), respectively, while the pixel value for this coordinate in the composed image will be denoted as P(x, y).

In this algorithm of FIG. 104, one pixel (x, y) is selected (step 982) and for this one pixel (x, y), if P1(x, y)<255 (step 983 YES), then P(x, y) is set to be P(x, y)=P1(x, y) (step 984). Otherwise (step 983 NO), if P1(x, y)=255 and P2(x, y)<255 (step 985 YES), then P(x, y) is set to be P(x, y)=P2(x, y)×2 (step 986). Otherwise (step 985 NO), P1(x, y)=P2(x, y)=255, so that P(x, y) is set to be P(x, y)=P3(x, y)×4 (step 987). This operation is repeated for all the pixels of the reflected light image (step 981).

The above algorithm presupposes the fact that the pixel values are exactly doubled from "reflected light image-3" to "reflected light image-2" and from "reflected light image-2" to "reflected light image-1", but in practice, there may be some errors due to the nonlinearity or the charge storage capacity characteristic of the circuit. These errors can be corrected as follows.

Namely, here, the "reflected light image-2" is how many times (ideally twice) of the "reflected light image-3" and the "reflected light image-1" is how many times (ideally twice) of the "reflected light image-2" are exactly determined.

First, all the pixels which have the pixel values less than "255" are taken out from the "reflected light image-2", and ratios with respect to the corresponding pixel values in the "reflected light image-3" are obtained. Then an average $\alpha 23$ of these ratios can be regarded as the multiplication factor of the "reflected light image-2" with respect to the "reflected light image-3".

Then, in the algorithm of FIG. 104, this $\alpha 23$ is used instead of "2" appearing in the formula "P(x, y) P2(x, y)×2" of the step 986.

Also, the ratio $\alpha 12$ of the "reflected light image-1" with respect to the "reflected light image-2" is similarly obtained, and $\alpha 12 \times \alpha \alpha 23$ is used instead of "4" appearing in the formula "P(x, y)=P3(x, y)×4" of the step 987.

Note here that, in the above, the ratio with respect to the "reflected light image-3" is obtained for all the pixels with the pixel values less than "255" in the "reflected light image-2", but when this ratio is too small, the ratio calculation error may be large, so that the processing target may be limited by selecting only those pixels which have sufficiently large pixel values, such as the pixel values less than "255" and greater than "100", for example.

It is to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. An information input generation apparatus, comprising:
   a timing signal generation unit for generating a timing signal;
   a lighting unit for emitting a light whose intensity vary in time, according to the timing signal generated by the timing signal generation unit; and
   a reflected light extraction unit having a sensor array for detecting a reflected light from a target object resulting from the light emitted by the lighting unit, in synchronization with the timing signal generated by the timing signal generation unit, so as to obtain a spatial intensity distribution of the reflected light in a form of a reflected light image indicative of an information input related to the target object, in separation from an external light that is illuminating the target object.

2. The apparatus of claim 1, wherein the reflected light extraction unit obtains the reflected light image in separation from the external light by detecting a plurality of image data in a state of having a light emission by the lighting unit and in a state of having no light emission by the lighting unit.

3. The apparatus of claim 2, wherein the reflected light extraction unit obtains the reflected light image as a difference between the image data detected in a state of having a light emission by the lighting unit and the image data detected in a state of having no light emission by the lighting unit.

4. The apparatus of claim 1, wherein the lighting unit emits the light which is invisible to human eyes.

5. The apparatus of claim 1, wherein the reflected light extraction unit includes:

at least one photo-electric conversion unit for generating charges corresponding to input lights of the reflected light extraction unit;

at least two charge storage units for storing the charges generated by the photo-electric conversion unit under different lighting states of the lighting unit; and gates operated in synchronization with the timing signal generated by the timing signal generation unit, for selectively leading the charges generated by the photo-electric conversion unit to one of the charge storage units.

6. The apparatus of claim 1, wherein the reflected light extraction unit includes:

an optical filter for receiving input lights of the reflected light extraction unit, and passing those input lights which have wavelengths within a specified range and blocking those input lights which have wavelengths outside the specified range.

7. The apparatus of claim 1, wherein the target object is at least a part of a body of an operator, and the reflected light image is indicative of the information input for controlling a device to be operated by the operator.

8. The apparatus of claim 1, further comprising:

a feature data generation unit for generating feature data related to the target object from the reflected light image.

9. The apparatus of claim 8, wherein the feature data generation unit generates the feature data by extracting a distance information including a depth information of the target object.

10. The apparatus of claim 8, wherein the feature data generation unit generates the feature data by extracting an object property information including a color information or a material information of the target object.

11. The apparatus of claim 8, wherein the feature data generation unit includes:

an image extraction unit for extracting an object image of at least a part of the target object, from the reflected light image.

12. The apparatus of claim 11, wherein the image extraction unit extracts the object image according to one or both of a distance information including a depth information of the target object and an object property information including a color information or a material information of the target object.

13. The apparatus of claim 11, wherein the target object is at least a part of a body of an operator, and the object image extracted by the image extraction unit indicates the information input for a pointing operation by the operator.

14. The apparatus of claim 11, wherein the feature data generation unit also includes:

a shape interpretation unit for interpreting a shape of said at least a part of the target object in the object image extracted by the image extraction unit.

15. The apparatus of claim 14, wherein the target object is at least a part of a body of an operator, and the shape interpreted by the shape interpretation unit indicates the information input for a gesture input by the operator.

16. The apparatus of claim 14, wherein the target object is at least a part of a body of an operator, and the shape interpreted by the shape interpretation unit indicates the information input for a pointing operation by the operator.

17. The apparatus of claim 14, wherein the shape interpretation unit interprets the shape as a command to be used as the information input.

18. The apparatus of claim 14, wherein the shape interpretation unit interprets the shape as a viewpoint information to be used as the information input, the viewpoint information indicating a viewpoint from which three-dimensional objects are to be displayed on a display device.

19. The apparatus of claim 11, wherein the feature data generation unit also includes:

a motion extraction unit for extracting a change of said at least a part of the target object in the object image extracted by the image extraction unit.

20. The apparatus of claim 19, wherein the motion extraction unit extracts the change as a command to be used as the information input.

21. The apparatus of claim 19, wherein the target object is at least a part of a body of an operator, and the change extracted by the motion extraction unit indicates the information input for a motion input by the operator.

22. The apparatus of claim 11, wherein the feature data generation unit also includes:

a shape interpretation unit for interpreting a shape of said at least a part of the target object in the object image extracted by the image extraction unit;

a motion extraction unit for extracting a change of said at least a part of the target object in the object image extracted by the image extraction unit; and a command generation unit for generating at least one command to be used as the information input from the shape interpreted by the shape interpretation unit and the change extracted by the motion extraction unit.

23. The apparatus of claim 1, further comprising:

an imaging unit for imaging a visible light image of the target object.

24. The apparatus of claim 23, further comprising:

an image extraction unit for extracting at least one specific image region from the visible light image imaged by the imaging unit, according to one or both of the reflected light image and an information extracted from the reflected light image.

25. The apparatus of claim 24, further comprising:

an image memory unit for storing an extracted image data for said at least one specific image region extracted by the image extraction unit; and an image composition unit for composing the extracted image data stored by the image memory unit with another image data in a specified manner.

26. The apparatus of claim 23, further comprising:

a Z-value image generation unit for generating a Z-value image by setting the visible light image imaged by the imaging unit in correspondence to a distance information of the target object which Is extracted from the reflected light image.

27. The apparatus of claim 26, further comprising:

an image extraction unit for extracting image data for a specific image region from the the Z-value image generated by the Z-value image generation unit, according to the distance information contained in the Z-value image, the specific image region being a region for which the distance information is within a specified range.

28. The apparatus of claim 26, wherein the Z-value image generation unit generates the Z-value image as the information input for texture information to be mapped onto a three-dimensional model.

29. The apparatus of claim 1, further comprising:

a conversion unit for converting intensities of the reflected light defining pixel values of the reflected light image into distance values with respect to the target object so as to obtain a range image of the target object.

30. The apparatus of claim 29, wherein the conversion unit is a logarithmic amplifier.

31. The apparatus of claim 1, further comprising:

a correction unit for correcting a distortion of the reflected light image obtained by the reflected light extraction unit.

32. The apparatus of claim 1, further comprising:

a correction and conversion unit for correcting a distortion of the reflected light image obtained by the reflected light extraction unit while converting intensities of the reflected light defining pixel values of the reflected light image into distance values with respect to the target object so as to obtain a range image of the target object.

33. The apparatus of claim 1, further comprising:

a nonlinear conversion unit for converting intensities of the reflected light defining pixel values of the reflected light image into rough distance values with respect to the target object; and a correction unit for converting the rough distance values obtained by the nonlinear conversion unit into accurate distance values with respect to the target object so as to obtain a range image of the target object.

34. The apparatus of claim 1, further comprising:

a reference object activation unit for moving a reference object with respect to the reflected light extraction unit so that the reflected light extraction unit obtains the reflected light image of the reference object; and a correction data generation unit for generating correction data to be used in correcting a distortion of the reflected light image and/or generating a range image from the reflected light image, according to a position of the reference object moved by the reference object activation unit and the reflected light image of the reference object obtained by the reflected light extraction unit.

35. The apparatus of claim 1, further comprising:

a user commanding unit for commanding a user to place a reference object at a specified position with respect to the reflected light extraction unit so that the reflected light extraction unit obtains the reflected light image of the reference object; and a correction data generation unit for generating correction data to be used in correcting a distortion of the reflected light image and/or generating a range image from the reflected light image, according to a position of the reference object placed by the user in response to the user commanding unit and the reflected light image of the reference object obtained by the reflected light extraction unit.

36. The apparatus of claim 35, further comprising:

a verification unit for checking whether the correction data generated by the correction data generation unit are correct or not by obtaining the reflected light image of the reference object within a prescribed distance range by using the correction data.

37. The apparatus of claim 1, further comprising:

a filter for receiving the external light and the reflected light, and blocking the reflected light while passing the external light;

an external light detection unit for detecting a light amount of the external light received through the filter; and an external light state judgement unit for judging whether the external light is in an intolerable state that has a possibility of largely affecting the reflected light image or not according to the light amount detected by the external light detection unit, and generating an intolerable signal indicating the intolerable state when the external light is judged to be in the intolerable state.

38. The apparatus of claim 37, wherein the timing signal generation unit controls the lighting unit and the reflected light extraction unit according to the intolerable signal generated by the external light state judgement unit, so as to obtain the reflected light image while the external light is not in the intolerable state.

39. The apparatus of claim 37, further comprising:

a reflected light image processing unit for determining whether to accept or reject the reflected light image obtained by the reflected light extraction unit under the external light in the intolerable state, according to the intolerable signal generated by the external light state judgement unit.

40. The apparatus of claim 1, further comprising:

a filter for receiving the external light and the reflected light, and blocking the reflected light while passing the external light;

an external light detection unit for detecting a light amount of the external light received through the filter; and an external light fluctuation period detection unit for detecting a fluctuation period of the external light according to the light amount detected by the external light detection unit;

wherein the timing signal generation unit controls the lighting unit and the reflected light extraction unit in synchronization with the fluctuation period detected by the external light fluctuation period detection unit.

41. The apparatus of claim 1, further comprising:

an external light control unit for controlling the external light in relation to the timing signal for controlling the lighting unit and the reflected light extraction unit.

42. The apparatus of claim 1, wherein the timing signal generation unit controls the lighting unit and the reflected light extraction unit by using a plurality of operation patterns provided in advance, according to a change of the external light.

43. The apparatus of claim 42, wherein the timing signal generation unit in an optimal operation pattern selection mode controls the lighting unit to stop emitting the light while controlling the reflected light extraction unit to obtain the reflected light images by executing each of said plurality of operation patterns sequentially, and the apparatus further comprises:

an evaluation unit for generating evaluation values for the reflected light images obtained by the reflected light extraction unit in the optimal operation pattern selection mode; and an operation pattern selection unit for selecting an optimal operation pattern among said plurality of operation patterns according to the evaluation values generated by the evaluation unit, so that the timing signal generation unit in a normal operation mode controls the lighting unit and the reflected light extraction unit according to the optimal operation pattern selected by the operation pattern selection unit.

44. The apparatus of claim 43, wherein the operation pattern selection unit selects the optimal operation pattern by which a darkest reflected light image is obtained in the optimal operation pattern selection mode.

45. The apparatus of claim 1, further comprising:

a distance information detection unit for detecting a distance information indicating a distance of the target object with respect to the reflected light extraction unit according to the reflected light image obtained by the reflected light extraction unit;

a determination unit for determining a reflected light amount to be increased or decreased according to the distance information detected by the distance information detection unit; and a control unit for controlling the lighting unit or the reflected light extraction unit so that the reflected light amount received at the reflected light extraction unit is increased or decreased to the reflected light amount determined by the determination unit.

46. The apparatus of claim 45, wherein the lighting unit has a plurality of lighting modes with different emission light amounts, and the control unit controls the lighting unit to be operated in one of said plurality of lighting modes according to the reflected light amount determined by the determination unit.

47. The apparatus of claim 1, wherein the lighting unit has a plurality of lighting modes with different emission light amounts, and the apparatus further comprises:

a lighting state control unit for controlling the lighting unit to sequentially carry out lighting operations in said plurality of lighting modes so that the reflected light extraction unit obtains a plurality of reflected light images under the light emitted by the lighting unit in said plurality of lighting modes; and a reflected light image composition unit for composing said plurality of reflected light images obtained by the reflected light extraction unit.

48. A method of information input generation, comprising the steps of:

(a) generating a timing signal;

(b) emitting a light whose intensity vary in time at a lighting unit, according to the timing signal generated by the step (a); and (c) detecting a reflected light from a target object resulting from the light emitted by the step (b), in synchronization with the timing signal generated by the step (a), so as to obtain a spatial intensity distribution of the reflected light in a form of a reflected light image indicative of an information input related to the target object, in separation from an external light that is illuminating the target object, at a reflected light extraction unit.

49. The method of claim 48, wherein the step (c) obtains the reflected light image in separation from the external light by detecting a plurality of image data in a state of having a light emission by the step (b) and in a state of having no light emission by the step (b).

50. The method of claim 49, wherein the step (a) obtains the reflected light image as a difference between the image data detected in a state of having a light emission by the step (b) and the image data detected in a state of having no light emission by the step (b).

51. The method of claim 48, wherein the step (b) emits the light which is invisible to human eyes.

52. The method of claim 48, wherein the step (c) includes steps of:

(c1) generating charges corresponding to input lights of the reflected light extraction unit;

(c2) storing the charges generated by the step (c1) under different lighting states of the step (b), in at least two charge storage units; and (c3) operating gates in synchronization with the timing signal generated by the step (a), for selectively leading the charges generated by the step (c1) to one of the charge storage units.

53. The method of claim 48, wherein the step (c) includes the step of receiving input lights of the reflected light extraction unit by an optical filter for passing those input lights which have wavelengths within a specified range and blocking those input lights which have wavelengths outside the specified range.

54. The method of claim 48, wherein the target object is at least a part of a body of an operator, and the reflected light image is indicative of the information input for controlling a device to be operated by the operator.

55. The method of claim 48, further comprising the steps of:

(d) generating feature data related to the target object from the reflected light image.

56. The method of claim 55, wherein the step (d) generates the feature data by extracting a distance information including a depth information of the target object.

57. The method of claim 55, wherein the step (d) generates the feature data by extracting an object property information including a color information or a material information of the target object.

58. The method of claim 55, wherein the step (d) includes the step of:

(d1) extracting an object image of at least a part of the target object, from the reflected light image.

59. The method of claim 58, wherein the step (d1) extracts the object image according to one or both of a distance information including a depth information of the target object and an object property information including a color information or a material information of the target object.

60. The method of claim 58, wherein the target object is at least a part of a body of an operator, and the object image extracted by the step (d1) indicates the information input for a pointing operation by the operator.

61. The method of claim 58, wherein the step (d) also includes the step of:

(d2) interpreting a shape of said at least a part of the target object in the object image extracted by the step (d1).

62. The method of claim 61, wherein the target object is at least a part of a body of an operator, and the shape interpreted by the step (d2) indicates the information input for a gesture input by the operator.

63. The method of claim 61, wherein the target object is at least a part of a body of an operator, and the shape interpreted by the step (d2) indicates the information input for a pointing operation by the operator.

64. The method of claim 61, wherein the step (d2) interprets the shape as a command to be used as the information input.

65. The method of claim 61, wherein the step (d2) interprets the shape as a viewpoint information to be used as the information input, the viewpoint information indicating a viewpoint from which three-dimensional objects are to be displayed on a display device.

66. The method of claim 58, wherein the step (d) also includes the step of:

(d3) extracting a change of said at least a part of the target object in the object image extracted by the step (d1).

67. The method of claim 66, wherein the step (d3) extracts the change as a command to be used as the information input.

68. The method of claim 66, wherein the target object is at least a part of a body of an operator, and the change extracted by the step (d3) indicates the information input for a motion input by the operator.

69. The method of claim 58, wherein the step (d) also includes:
(d4) interpreting a shape of said at least a part of the target object in the object image extracted by the step (d1);
(d5) extracting a change of said at least a part of the target object in the object image extracted by the step (d1); and
(d6) generating at least one command to be used as the information input from the shape interpreted by the step (d4) and the change extracted by the step (d5).

70. The method of claim 48, further comprising the step of:
(e) imaging a visible light image of the target object.

71. The method of claim 70, further comprising the step of:
(f) extracting at least one specific image region from the visible light image imaged by the step (e), according to one or both of the reflected light image and an information extracted from the reflected light image.

72. The method of claim 71, further comprising the steps of:
(g) storing an extracted image data for said at least one specific image region extracted by the step (f); and
(h) composing the extracted image data stored by the step (g) with another image data in a specified manner.

73. The method of claim 70, further comprising the step of:
(i) generating a Z-value image by setting the visible light image imaged by the step (e) in correspondence to a distance information of the target object which is extracted from the reflected light image.

74. The method of claim 73, further comprising the step of:
(j) extracting image data for a specific image region from the the Z-value image generated by the step (i), according to the distance information contained in the Z-value image, the specific image region being a region for which the distance information is within a specified range.

75. The method of claim 73, wherein the step (i) generates the Z-value image as the information input for texture information to be mapped onto a three-dimensional model.

76. The method of claim 48, further comprising the steps of:
(k) converting intensities of the reflected light defining pixel values of the reflected light image into distance values with respect to the target object so as to obtain a range image of the target object.

77. The method of claim 76, wherein the step (k) converts the intensities by using a logarithmic amplifier.

78. The method of claim 48, further comprising the steps of:
(l) correcting a distortion of the reflected light image obtained by the reflected light extraction unit.

79. The method of claim 48, further comprising the step of:
(m) correcting a distortion of the reflected light image obtained by the reflected light extraction unit while converting intensities of the reflected light defining pixel values of the reflected light image into distance values with respect to the target object so as to obtain a range image of the target object.

80. The method of claim 48, further comprising the steps of:
(n) nonlinearly converting intensities of the reflected light defining pixel values of the reflected light image into rough distance values with respect to the target object; and
(o) converting the rough distance values obtained by the step (n) into accurate distance values with respect to the target object so as to obtain a range image of the target object.

81. The method of claim 48, further comprising the steps of:
(p) moving a reference object with respect to the reflected light extraction unit so that the reflected light extraction unit obtains the reflected light image of the reference object; and
(q) generating correction data to be used in correcting a distortion of the reflected light image and/or generating a range image from the reflected light image, according to a position of the reference object moved by the step (p) and the reflected light image of the reference object obtained by the reflected light extraction unit.

82. The method of claim 48, further comprising the step of:
(r) commanding a user to place a reference object at a specified position with respect to the reflected light extraction unit so that the reflected light extraction unit obtains the reflected light image of the reference object; and
(s) generating correction data to be used in correcting a distortion of the reflected light image and generating a range image from the reflected light image, according to a position of the reference object placed by the user in response to the step (r) and the reflected light image of the reference object obtained by the reflected light extraction unit.

83. The method of claim 82, further comprising the step of:
(t) checking whether the correction data generated by the step (s) are correct or not by obtaining the reflected light image of the reference object within a prescribed distance range by using the correction data.

84. The method of claim 48, further comprising the steps of:
(u) receiving the external light and the reflected light, and blocking the reflected light while passing the external light, at a filter;
(v) detecting a light amount of the external light received through the filter; and
(w) judging whether the external light is in an intolerable state that has a possibility of largely affecting the reflected light image or not according to the light amount detected by the step (v), and generating an intolerable signal indicating the intolerable state when the external light is judged to be in the intolerable state.

85. The method of claim 84, wherein the timing signal generated by the step (a) controls the lighting unit and the reflected light extraction unit according to the intolerable signal generated by the step (w), so as to obtain the reflected light image while the external light is not in the intolerable state.

86. The method of claim 84, further comprising the step of:
(x) determining whether to accept or reject the reflected light image obtained by the reflected light extraction unit under the external light in the intolerable state, according to the intolerable signal generated by the step (w).

87. The method of claim 48, further comprising the steps of:
(y) receiving the external light and the reflected light, and blocking the reflected light while passing the external light, at a filter;

(z) detecting a light amount of the external light received through the filter; and (aa) detecting a fluctuation period of the external light according to the light amount detected by the step (z); wherein the timing signal generated by the step (a) controls the lighting unit and the reflected light extraction unit in synchronization with the fluctuation period detected by the step (aa).

88. The method of claim 48, further comprising the steps of:

(bb) controlling the external light in relation to the timing signal for controlling the lighting unit and the reflected light extraction unit.

89. The method of claim 48, wherein the timing signal generated by the step (a) controls the lighting unit and the reflected light extraction unit by using a plurality of operation patterns provided in advance, according to a change of the external light.

90. The method of claim 89, wherein the timing signal generated by the step (a) in an optimal operation pattern selection mode controls the lighting unit to stop emitting the light while controlling the reflected light extraction unit to obtain the reflected light images by executing each of said plurality of operation patterns sequentially, and the method further comprises the steps of:

(cc) generating evaluation values for the reflected light images obtained by the reflected light extraction unit in the optimal operation pattern selection mode; and (dd) selecting an optimal operation pattern among said plurality of operation patterns according to the evaluation values generated by the step (cc), so that the timing signal generated by the step (a) in a normal operation mode controls the lighting unit and the reflected light extraction unit according to the optimal operation pattern selected by the step (dd).

91. The method of claim 90, wherein the step (dd) selects the optimal operation pattern by which a darkest reflected light image is obtained in the optimal operation pattern selection mode.

92. The method of claim 48, further comprising the steps of:

(ee) detecting a distance information indicating a distance of the target object with respect to the reflected light extraction unit according to the reflected light image obtained by the reflected light extraction unit;

(ff) determining a reflected light amount to be increased or decreased according to the distance information detected by the step (ee); and (gg) controlling the lighting unit or the reflected light extraction unit so that the reflected light amount received at the reflected light extraction unit is increased or decreased to the reflected light amount determined by the step (ff).

93. The method of claim 92, wherein the lighting unit has a plurality of lighting modes with different emission light amounts, and the step (gg) controls the lighting unit to be operated in one of said plurality of lighting modes according to the reflected light amount determined by the step (ff).

94. The method of claim 48, wherein the lighting unit has a plurality of lighting modes with different emission light amounts, and the method further comprises the steps of:

(hh) controlling the lighting unit to sequentially carry out lighting operations in said plurality of lighting modes so that the reflected light extraction unit obtains a plurality of reflected light images under the light emitted by the lighting unit in said plurality of lighting modes; and (ii) composing said plurality of reflected light images obtained by the reflected light extraction unit.

95. An imaging apparatus, comprising:

a plurality of unit photo-detector cells arranged in a two-dimensional array on a semiconductor substrate, each unit photo-detector cell having:

a photo-detection unit for receiving an input light and outputting signals corresponding to a light amount of the input light;

an amplification unit for amplifying the signals outputted by the photo-detection unit;

a selection unit for selecting said each unit photo-detector cell;

a reset unit for resetting the photo-detection unit; and at least two storage units for respectively storing the signals outputted by the photo-detection unit under different states and amplified by the amplification unit; and a difference circuit, provided on the semiconductor substrate, for detecting a difference between the signals stored in said at least two storage units of each unit photo-detector cell.

96. The apparatus of claim 95, wherein the photo-detection unit is formed by a photo-diode, the amplification unit is formed by an amplifying transistor, the resent unit is formed by a reset transistor, said at least two storage units are formed by capacitors, said photo-diode is connected with a gate of said amplifying transistor, and each of said capacitors has one electrode which is connected with the amplifying transistor and another electrode which is grounded.

* * * * *